United States Patent
Feder et al.

(10) Patent No.: US 12,375,614 B2
(45) Date of Patent: Jul. 29, 2025

(54) SYSTEM, METHOD, AND COMPUTER PROGRAM PRODUCT FOR EXCHANGING IMAGES

(71) Applicant: Duelight LLC, Sunnyvale, CA (US)

(72) Inventors: Adam Feder, Mountain View, CA (US); Brian Kindle, Sunnyvale, CA (US); William Rivard, Menlo Park, CA (US)

(73) Assignee: DUELIGHT LLC, Sunnyvale, CA (US)

( * ) Notice: Subject to any disclaimer, the term of this patent is extended or adjusted under 35 U.S.C. 154(b) by 0 days.

(21) Appl. No.: 18/957,506

(22) Filed: Nov. 22, 2024

(65) Prior Publication Data
US 2025/0086765 A1  Mar. 13, 2025

Related U.S. Application Data

(63) Continuation of application No. 17/865,299, filed on Jul. 14, 2022, which is a continuation of application
(Continued)

(51) Int. Cl.
*G06F 3/04847* (2022.01)
*G06F 3/04845* (2022.01)
(Continued)

(52) U.S. Cl.
CPC ............ *G06T 5/92* (2024.01); *G06F 3/04845* (2013.01); *G06F 16/51* (2019.01); *G06F 16/532* (2019.01);
(Continued)

(58) Field of Classification Search
CPC .... G06T 5/92; G06T 5/00; G06T 5/73; G06T 2207/20208; G06F 3/04845; G06F 16/51; G06F 16/532; G06F 16/583; G06F 16/5838; G06F 3/04847; G06F 3/0488; G06V 10/40; H04N 9/646; H04N 9/73
See application file for complete search history.

(56) References Cited

U.S. PATENT DOCUMENTS 8,194,993 B1 * 6/2012 Chen ..................... G06T 5/70
382/254
8,805,091 B1 * 8/2014 Hensel ................... G06T 11/60
382/218
(Continued)

FOREIGN PATENT DOCUMENTS

CN 103581556 A * 2/2014 ............ G06T 11/60
CN 104040292 A * 9/2014 ......... G01C 21/3664

OTHER PUBLICATIONS

Non-Final Office Action from U.S. Appl. No. 17/865,299, dated Mar. 28, 2025.

*Primary Examiner* — Daxin Wu
(74) *Attorney, Agent, or Firm* — Zilka-Kotab, P.C.

(57) ABSTRACT

A system, method, and computer program product are provided for exchanging images. In use, one or more images are received at a server. Additionally, the one or more images are analyzed. Further, image processing code is outputted referencing the one or more images, based on the analysis of the one or more images. Additional systems, methods, and computer program products are also presented.

78 Claims, 55 Drawing Sheets

Related U.S. Application Data

No. 15/913,742, filed on Mar. 6, 2018, now abandoned, which is a continuation of application No. 15/253,721, filed on Aug. 31, 2016, now Pat. No. 9,934,561, which is a continuation of application No. 14/843,896, filed on Sep. 2, 2015, now Pat. No. 9,460,118, which is a continuation-in-part of application No. 14/547,074, filed on Nov. 18, 2014, now Pat. No. 9,508,133, and a continuation-in-part of application No. 14/535,285, filed on Nov. 6, 2014, now Pat. No. 9,218,662, and a continuation-in-part of application No. 14/517,731, filed on Oct. 17, 2014, now Pat. No. 9,448,771, and a continuation-in-part of application No. 14/503,210, filed on Sep. 30, 2014, now Pat. No. 9,460,125, and a continuation-in-part of application No. 14/503,224, filed on Sep. 30, 2014, now Pat. No. 9,361,319.

(60) Provisional application No. 61/960,945, filed on Sep. 30, 2013.

(51) Int. Cl.

| | | |
|---|---|---|
| *G06F 16/51* | (2019.01) | |
| *G06F 16/532* | (2019.01) | |
| *G06F 16/583* | (2019.01) | |
| *G06T 5/00* | (2006.01) | |
| *G06T 5/73* | (2024.01) | |
| *G06T 5/92* | (2024.01) | |
| *G06V 10/40* | (2022.01) | |
| *H04N 9/64* | (2023.01) | |
| *H04N 9/73* | (2023.01) | |
| *G06F 3/0488* | (2022.01) | |

(52) U.S. Cl.
CPC ........ *G06F 16/583* (2019.01); *G06F 16/5838* (2019.01); *G06T 5/00* (2013.01); *G06T 5/73* (2024.01); *G06V 10/40* (2022.01); *H04N 9/646* (2013.01); *H04N 9/73* (2013.01); *G06F 3/04847* (2013.01); *G06F 3/0488* (2013.01); *G06T 2207/20208* (2013.01)

(56) References Cited

U.S. PATENT DOCUMENTS

| | | | | |
|---|---|---|---|---|
| 9,621,796 | B2 * | 4/2017 | Muukki | H04N 23/741 |
| 2007/0244925 | A1 * | 10/2007 | Albouze | G06F 16/58 |
| 2009/0041376 | A1 * | 2/2009 | Carletta | G06T 5/92 |
| | | | | 382/274 |
| 2012/0307096 | A1 * | 12/2012 | Ford | H04N 23/611 |
| | | | | 348/222.1 |
| 2013/0067093 | A1 * | 3/2013 | Moreno | H04W 28/16 |
| | | | | 709/226 |
| 2014/0176750 | A1 * | 6/2014 | Pajak | H04N 23/632 |
| | | | | 348/222.1 |
| 2014/0270543 | A1 * | 9/2014 | Zhang | H04N 23/80 |
| | | | | 382/209 |
| 2015/0026101 | A1 * | 1/2015 | Lin | G06N 20/00 |
| | | | | 707/739 |
| 2015/0085184 | A1 * | 3/2015 | Vidal | G06F 1/1686 |
| | | | | 348/376 |

\* cited by examiner

SYSTEM, METHOD, AND COMPUTER PROGRAM PRODUCT FOR EXCHANGING IMAGES

RELATED APPLICATIONS

This application is a continuation of U.S. application Ser. No. 17/865,299, filed Jul. 14, 2022, which is a continuation of U.S. application Ser. No. 15/913,742 (abandoned in favor of the above application), filed Mar. 6, 2018, which is a continuation of U.S. application Ser. No. 15/253,721, filed Aug. 31, 2016, now U.S. Pat. No. 9,934,561 issued on Apr. 3, 2018, which is a continuation of U.S. application Ser. No. 14/843,896, filed Sep. 2, 2015, now U.S. Pat. No. 9,460,118 issued on Oct. 4, 2016, which is a continuation-in-part of: U.S. application Ser. No. 14/535,285, filed Nov. 6, 2014, now U.S. Pat. No. 9,218,662 issued on Dec. 22, 2015; U.S. application Ser. No. 14/517,731, filed Oct. 17, 2014, now U.S. Pat. No. 9,448,771 issued on Sep. 20, 2016; U.S. application Ser. No. 14/503,210, filed Sep. 30, 2014, now U.S. Pat. No. 9,460,125 issued on Oct. 4, 2016; U.S. application Ser. No. 14/503,224, filed Sep. 30, 2014, now U.S. Pat. No. 9,361,319 issued on Jun. 7, 2016; and U.S. application Ser. No. 14/547,074, filed Nov. 18, 2014, now U.S. Pat. No. 9,508,133 issued on Nov. 29, 2016. U.S. application Ser. No. 14/503,210, filed Sep. 30, 2014, now U.S. Pat. No. 9,460,125 issued on Oct. 4, 2016 also claims priority to U.S. Patent Provisional Application No. 61/960,945 filed Sep. 30, 2013. The foregoing applications are herein incorporated by reference in their entirety for all purposes.

FIELD OF THE INVENTION

The present invention relates to digital photographic systems, and more particularly to systems and methods for exchanging images.

BACKGROUND

Traditional digital photography systems are generally limited by the number of ways in which a user can exchange images. One solution to such limitation is to transfer images to a second device which can then share the images in some manner. Such a solution, however, can be cumbersome, time consuming, and require many steps of interactions before achieving the desired result. As such, there is thus a need for addressing these and/or other issues associated with the prior art.

SUMMARY

A system, method, and computer program product are provided for exchanging images. In use, one or more images are received at a server. Additionally, the one or more images are analyzed. Further, image processing code is outputted referencing the one or more images, based on the analysis of the one or more images. Additional systems, methods, and computer program products are also presented.

BRIEF DESCRIPTION OF THE DRAWINGS

FIG. 14-1B shows a method for transmitting a package to a destination, in accordance with one embodiment.

FIG. 14-1C illustrates a network service system, configured to implement one or more aspects of the present invention.

FIG. 14-2A illustrates a back view of a wireless mobile device comprising a digital camera, according to one embodiment of the present invention.

FIG. 14-2B illustrates a front view of a wireless mobile device, according to one embodiment of the present invention.

FIG. 14-2C illustrates a block diagram of a wireless mobile device, according to one embodiment of the present invention.

FIG. 14-2D illustrates an exemplary software architecture of a wireless mobile device, according to one embodiment of the present invention.

FIG. 14-3A illustrates a block diagram of a data service system, configured to implement one or more aspects of the present invention.

FIG. 14-3B illustrates an exemplary system software architecture for a computation system within a data service system, configured to implement one or more aspects of the present invention.

FIG. 14-3C illustrates an exemplary application space, according to one embodiment of the present invention.

FIG. 14-4A illustrates an exemplary data structure comprising a dynamic image object, according to one embodiment of the present invention.

FIG. 14-4B illustrates a first dataflow process for generating a synthetic image comprising a dynamic image object, according to one embodiment of the present invention.

FIG. 14-4C illustrates a second dataflow process for generating a synthetic image comprising a dynamic image object, according to one embodiment of the present invention.

FIG. 14-5A illustrates a wireless mobile device configured to generate and transmit a dynamic image object to a data service system, according to one embodiment of the present invention.

FIG. 14-5B illustrates a data service system configured to generate a synthetic image associated with a dynamic image object, according to one embodiment of the present invention.

FIG. 14-5C illustrates an image processing server configured to generate a synthetic image associated with a dynamic image object, according to one embodiment of the present invention.

FIG. 14-6A is a flow diagram of method steps for sharing a dynamic image object generated by a client device, according to one embodiment of the present invention.

FIG. 14-6B is a flow diagram of method steps for sharing a dynamic image object generated by a data service system, according to one embodiment of the present invention.

FIG. 14-7A is flow diagram of method steps, performed by a data service system, for sharing a dynamic image object generated by a client device, according to one embodiment of the present invention.

FIG. 14-7B is a flow diagram of method steps, performed by a data service system, for generating and sharing a dynamic image object, according to one embodiment of the present invention.

FIG. 14-7C is a flow diagram of method steps, performed by a data service system, for sharing a dynamic image object generated by an image processing server, according to one embodiment of the present invention.

FIG. 14-8 illustrates a dynamic image object viewer, according to one embodiment of the present invention.

FIG. 15-1A shows a method for outputting an output image, in accordance with one embodiment.

FIG. 15-1B shows a process for outputting an output image, in accordance with one embodiment.

FIG. 16-1 illustrates a flow chart for a method for generating a lightweight source code for implementing an image processing pipeline, in accordance with one embodiment;

FIG. 16-2 illustrates a flow chart for a method for updating the GL representation of the image processing pipeline, in accordance with one embodiment;

FIG. 16-3 illustrates a viewer application configured to generate a resulting image based an image set, in accordance with one embodiment;

FIG. 16-4 illustrates an exemplary user interface associated with the viewer application of FIG. 16-3, in accordance with one embodiment;

FIG. 16-5 illustrates an image processing pipeline, in accordance with one embodiment;

FIG. 16-6 illustrates the generation of a graphics library (GL) representation of the image processing pipeline of FIG. 16-5, in accordance with one embodiment; and FIG. 16-7 illustrates the implementation of the image processing pipeline by the viewer application of FIG. 16-3, in accordance with one embodiment.

FIG. 17-1 shows a method for generating a result using one or more image operations, in accordance with one possible embodiment.

FIG. 17-2 shows a system for generating a result using one or more image operations, in accordance with one embodiment.

FIG. 17-3 shows a method for determining if a network is available, in accordance with one embodiment.

FIG. 17-4 shows a method for determining if a network threshold is exceeded, in accordance with one embodiment.

FIG. 17-5 shows a method for determining if a server is available, in accordance with one embodiment.

FIG. 17-6 shows a user interface for requesting one or more image operations, in accordance with one embodiment.

FIG. 17-7 shows a user interface for requesting one or more image operations on a server device, in accordance with one embodiment.

FIG. 17-8 illustrates a user interface (UI) system for generating a combined image, according to one embodiment.

FIG. 17-9 shows a method for generating a combined image, according to one embodiment.

DETAILED DESCRIPTION

Figure 1:
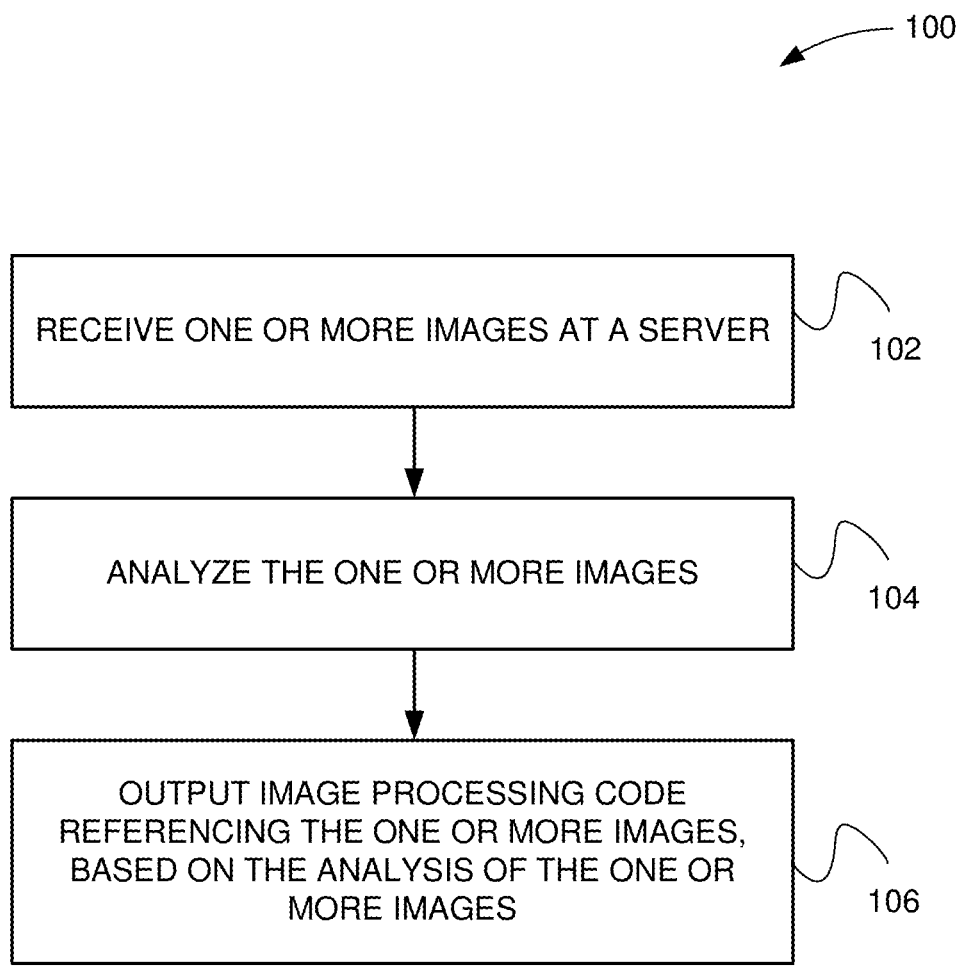
FIG. 1 illustrates an exemplary method for outputting image processing code, in accordance with one possible embodiment.

FIG. 1 illustrates an exemplary method 100 for outputting image processing code, in accordance with one embodiment. As an option, the method 100 may be carried out in the context of the details of any of the Figures disclosed herein. Of course, however, the method 100 may be carried out in any desired environment. Further, the aforementioned definitions may equally apply to the description below.

As shown, one or more images are received at a server. See operation 102. Additionally, the one or more images are analyzed. See operation 104. Lastly, image processing code referencing the one or more images is outputted, based on the analysis of the one or more images. See operation 106.

In the context of the present description, image processing code includes code used to process one or more images in some manner. For example, in various embodiments, image processing code may include WebGL, OpenGL code, OpenCL code, and/or any other code used to process graphics.

In one embodiment, the one or more images may be received at a server and analyzed upon receipt. In such an embodiment, the one or more images may be further outputted once the analyzing is complete. As such, in one embodiment, the flow of actions (e.g. images received, analysis of images, etc.) may be continuous until outputting occurs.

In another embodiment, the one or more images may be received and stored on a server, the analyzing and outputting occurring at a later time. In such an embodiment, the flow of actions (e.g. images received, analysis of images, etc.) may not be continuous from receipt of the images to the outputting. Of course, in other embodiments, the images may be stored for any length of time.

In one embodiment, the one or more images may include ancillary data associated with the one or more images. For example, in one embodiment, the one or more images may include metadata (e.g. camera type, film speed, ISO, aperture, etc.), and/or any other data (e.g. local URL to images and/or resources on the device which are being sent to the server, etc.) associated with the one or more images.

Still yet, in one embodiment, the analyzing may include at least one of creating at least one image, creating a high dynamic range (HDR) image, or processing at least one image. Of course, in other embodiments, the analyzing may include identifying metadata associated with an image, blending (or mixing) two or more images, applying an action based on metadata, and/or taking any other action associated with the image. Still yet, in some embodiments, analyzing the one or more images may include at least one of correcting white balance, correcting exposure levels, creating a high dynamic range (HDR) image, setting a black point, setting a white point, performing a dehaze function, performing a level mapping operation, performing a contrast enhancement operation, or adjusting a HDR strength. In a specific embodiment, a black point may be capable of being adjusted based on input by a user. In another embodiment, a white point may be capable of being adjusted based on input by a user.

In one embodiment, the image processing code may include or reference at least one image. For example, in such an embodiment, the image processing code may include one or more images, metadata (and/or other data) associated with the one or more images, local uniform resource locators (URLs) associated with the one or more images, instructions (e.g. for blending, for flattening, for creating a resulting image, etc.), and/or code for processing the one or more images in any manner. For example, in one embodiment, the image processing code may be sent back to a device from which the one or more images were received. In this embodiment, the image processing code may not send the original images back to the device, as they are already saved on the device, but may include code for processing (e.g. for blending, for flattening, for creating a resulting image, etc.) the one or more original images on the device. Of course, in such an embodiment, it is presumed that the resulting images can be created based on the one or more original images.

In another embodiment, the outputting may include at least one of providing access to a constructed web application associated with the one or more images, and/or pushing the web application associated with the one or more images to a recipient. In such an embodiment, the recipient may receive a URL (e.g. to a web application) and/or an address associated with the web application. The web application may include code to process the one or more images, and may permit the user, in real time, to manipulate the one or more images, including, but not limited to, blending two or more images, altering a parameter (e.g. exposure, ISO, warmth, color, saturation, contrast, etc.), identifying one or more points of interest (with potentially separate parameters, etc.), and/or applying any other modification to the one or more images.

In one embodiment, the outputting may include at least one of providing access to code created for rendering vector graphics in a web application, or providing access to a created resulting image which references one or more assets not stored on the server. For example, in one embodiment, one or more sections of code may be associated with a server, or may be associated entirely with the web application (e.g, functions and/or processing are not stored on a server, etc.). In another embodiment, the one or more assets not stored on the server may be stored on a client device such that a web application uses locally stored images in combination with the web application to create a resulting image. Further, in one embodiment, the outputting may include providing access to a created resulting image which references one or more assets not stored on the server. Additionally, in one embodiment, the one or more assets may be stored locally on a mobile device and/or any device (e.g. computer system, tablet, phone, etc.) which is separate from the server.

In an additional embodiment, the image processing code may reference one or more assets stored locally on the mobile device, as well as a resulting image stored on the server or, optionally, a different server. For example, in one embodiment, the web application may be accessed and utilized on a mobile device, and the image processing code may utilize one or more images on the mobile device as the basis for creating a resulting image. In one embodiment, the processing may occur via the image processing code which is sent from the server. Of course, in other embodiments, the resulting image may be stored in any location, including on the mobile device. In one embodiment, the resulting image may replace the one or more images originally used as the basis for creating the resulting image. In other embodiments, the resulting image may be added to the mobile device but not replace the one or more images. Still yet, in one embodiment, generating a resulting image may be based on one or more images, the resulting image being stored on the server.

In one embodiment, adjustable (e.g., sliding) indicia may be displayed utilizing a web application and one or more images may be blended based on a first aspect. Further, the one or more images may be blended based on a first aspect in response to the sliding indicia being manipulated by a user. In various embodiments, the first aspect may include at least one of a white balance, a focus, an exposure, a color correction, an intensity, and/or any other aspect associated with the one or more images.

In another embodiment, two or more versions of a web application associated with the one or more images may be constructed. For example, in one embodiment, at least one of the two or more versions may be associated with a paying account, a free account, a subscription service, a premium features account, and/or any other type of account. Of course, in one embodiment, a paying account (or any services based account) may be associated with a user identifier or a user account. In various embodiments, each version of the web application may provide a different set of features, at least in part, by which the one or more images are capable of being manipulated utilizing the web application.

Figure 2:
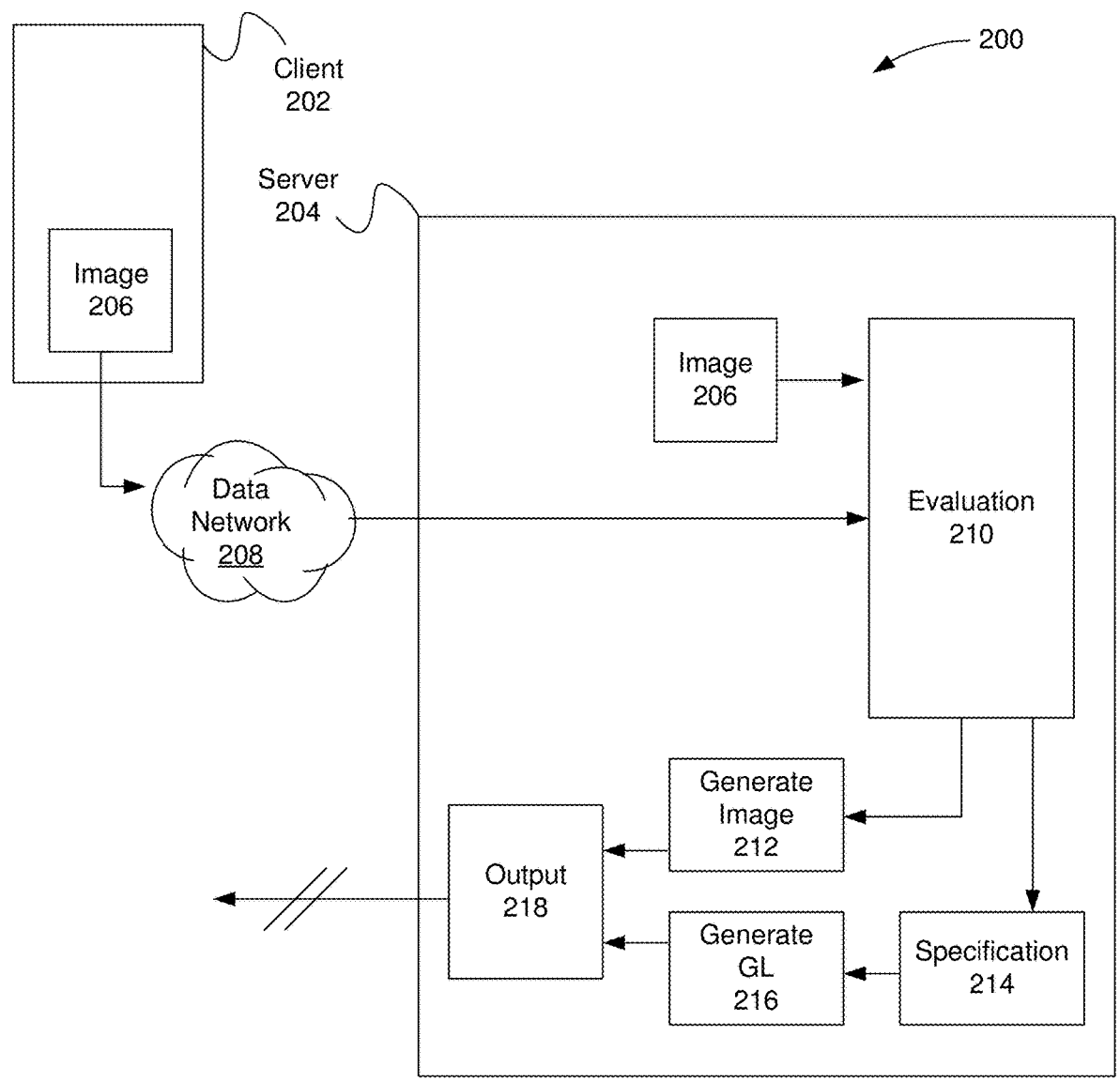
FIG. 2 illustrates an exemplary system carried out for outputting image processing code, in accordance with one embodiment.

FIG. 2 illustrates an exemplary system 200 carried out for outputting image processing code, in accordance with one embodiment. As an option, the system 200 may be implemented in the context of the details of any of the Figures disclosed herein. Of course, however, the system 200 may be implemented in any desired environment. Further, the aforementioned definitions may equally apply to the description below.

As shown, one or more images 206 may reside within a client 202. In one embodiment, the client 202 may be connected to a server 204 via a data network 208. For example, in one embodiment, the data network 208 may include an intranet, an internet, a local network (e.g. WLAN, WiFi, etc.), a cellular network, and/or any other type of network exchange.

As shown, one or more images 206 may reside within the server 204. The one or more images (e.g. from the client, from the server, etc.) 206 may be evaluated 210. In one embodiment, the evaluation 210 may cause an image 212 to be generated, and may cause a specification 214 to be created, the specification 214 being used to generate GL 216

(or any other processing code, etc.). Further, the generated image 212 and the generated GL 216 may comprise output 218.

In one embodiment, the evaluation may include generating processing code (e.g. GL code, GL object, WebGL object, etc.). In another embodiment, the evaluation may include forming a stack of images associated with processing code. For example, in one embodiment, a stack of images may include a series of more than one images of differing exposure (e.g. EV−1, EV0, and EV+1, etc.) which may be blended to form a HDR image.

In another embodiment, the output 218 may include creating a package including the generated image 212 and the generated GL 216 (or any other processing code). In one embodiment, the output may include pushing the package to a client device. For example, the client device may include the client 202 which may have sent the one or more images 206 to the server 204. In the context of the present description, a package may include, at a minimum, one or more generated images or references to images, and processing code for the one or more images.

In one embodiment, the one or more images may be pushed to a server for evaluation, or the one or more images may be already stored on a server for evaluation. Additionally, in one embodiment, the one or more images may be cached (e.g. stored, etc.) at a time before the evaluation occurs. Of course, in another embodiment, the caching may occur automatically. For example, in one embodiment, the user may have taken one or more photos on a mobile device, the one or more photos being saved to the mobile device and automatically uploaded to an online server (e.g. online cache, etc.), whereupon the online server may then evaluate the one or more photos.

Still yet, in one embodiment, the server may evaluate one image or more than one image. For example, an evaluation may include multiple frames of an image capture (e.g. with respect to a HDR, with respect to multiple ambient images and multiple flash images, etc.). In one embodiment, multiple images may be processed (e.g. individually and collectively, etc.) via a server, thereby displacing processing demands from a client device (e.g. mobile phone, tablet, etc.). In such an embodiment, the server can process higher quality (e.g. higher resolution, full frame, etc.) images. For example, the server may be configured to perform more computationally intensive operations, or operations that require data that may not stored on the mobile device to generate the higher quality images.

In one embodiment, the evaluation may include generating an image. As an example, the generating may include combining multiple images (e.g. creating an HDR, etc.). Additionally, the evaluation may include creating a specification and then generating GL (e.g. processing code, etc.) associated with the generated image. In one embodiment, the generated image may be manipulated based on the generated GL (and/or created specification, etc.).

In one embodiment, the specification may be created based on the evaluation performed by the server. For example, in one embodiment, the server may determine that the image is overexposed and may apply a filter to adjust the exposure, a filter to adjust the color tone, and a filter to adjust the contrast. Such filters may be inputted into the specification which is used as the basis for creating the processing code (e.g. GL code, etc.). In one embodiment, the output that is created (e.g. including the generated image and the generated GL, etc.) may allow the user to modify the one or more filters in some manner. Such modification may be associated with a weight value associated with the one or more filters previously defined in the specification and accounted for in the GL. In this manner, in such an embodiment, modifications made to the filter may be computed by the GL and a resulting image, based on the one or more images (e.g. generated image, etc.) provided by the server and commands as dictated by the GL, may be created.

In some embodiments, the output may be dependent on a type of client (user account type). For example, in one embodiment, the output may be designated for a premium services, free services, subscription service, and/or any other specific service associated with a client or individual. In another embodiment, the output may include more than one versions which may take into account the many types of users which may access the web app.

As an example, the output may include a premium service, the premium service allowing manipulation of or access to many filters including, but not limited to, exposure, focus, warmth, contrast, saturation, blending, gain, color, and/or any other parameter associated with the one or more images. In one embodiment, such filters may be controlled and/or manipulated through user input. In one embodiment, the user input may include a slider, an input box of weights (e.g. increase or decrease weight of filter, etc.), a gesture (e.g. thumbs up to increase, thumbs down to decrease, etc.), and/or any other feature which may be used to provide an input in some manner.

In one embodiment, a user may select a filter to modify an image, and a slider may allow the user to provide input on how to modify the particular filter with respect to the image. In another embodiment, manipulating a slider may affect one or more filters. For example, in one embodiment, increasing a warmth of a photograph may include increasing a blend of a flash image, increasing a gain for an image, increasing a temperature of an image, and/or otherwise changing a variety of filters to optimize the warmth of an image. Of course, any filter may be included and/or changed in response to manipulating a slider. In this manner, manipulating a slider may affect and/or change more than one filter associated with the one or more images.

In another embodiment, the premium service may include the ability to control which images (as provided by the server) are used to create the resulting image. Additionally, the user may be able to select a color scheme associated with the image, including, but not limited to, RGB, grayscale, CMYK, and/or any other color scale as defined by the user.

In a separate embodiment, the output may include a free service. In such an embodiment, the user may be able to control a slider, but not otherwise be permitted to control a selection of one or more filters, source of images, and/or color scheme. In some embodiments, manipulating the slider may alter one or more underlying filters, the output image being optimized based on the one or more altered filters. In one embodiment, having a slider associated with more than one filters may be configured to optimize the final output. For example, increasing the exposure alone may cause contrast and saturation to be lost in the image. As such, in one embodiment, saturation may likewise increase as exposure increases to compensate for lost color vibrancy. Of course, in other embodiments, any combination of filters may be used to optimize the resulting image.

As another example, in one embodiment, modifying a slider may adjust white balance, exposure, and color correction. In one embodiment, such modification may occur simultaneously. In one embodiment, a single slider may be used to control all three (or any number) of filters. In another embodiment, an option may be provided to separate the slider into three (or a corresponding number) sliders, each one for the specific filter (e.g. a slider for white balance, exposure, and color correction, etc.). In this manner, the end user may choose to apply a bundle of filters via one slider, or may have the option to fine tune each of the filters which were applied.

In one embodiment, the output may include more than one version (e.g. premium, free, etc.) corresponding with specific processing code (e.g. GL code, etc.). In another embodiment, the output may be specific to one version (e.g. premium, free, etc.) corresponding with specific processing code (e.g. GL code, etc.). In this manner, the output corresponding to a specific one version will be more lightweight (e.g. less data required, etc.) than a package including more than one version.

In one embodiment, the one or more images may be included in a dynamic image object (DIO) package. Of course, any functionality associated with a DIO may be included, utilizing the systems and methods disclose within application Ser. No. 14/503,210, filed Sep. 30, 2014, entitled "SYSTEMS, METHODS, AND COMPUTER PROGRAM PRODUCTS FOR DIGITAL PHOTOGRAPHY"; and application Ser. No. 14/503,224, filed Sep. 30, 2014, entitled "SYSTEMS, METHODS, AND COMPUTER PROGRAM PRODUCTS FOR DIGITAL PHOTOGRAPHY", the contents of each are herein incorporated by reference.

In various embodiments, the output may be self-contained. For example, in one embodiment, the package associated with the output may contain all of the processing code necessary to display and manipulate an image based on user feedback. In such an embodiment, the manipulation of an image does not require any interaction with a server (e.g. apart from providing the package, etc.), as all of the processing code may account for manipulation of the image.

Still yet, in one embodiment, applying a modification to the image (e.g. via a slider, etc.) may cause a modification to one or more elements that are used in processing code. For example, in one embodiment, modifying a slider may correspond with modifying a uniform which is used with GL code to generate a resulting image for display. In this manner, modifications to the image are requested directly to the processing code of the package without having to call a server.

In one embodiment, the one or more images may include at least some pre-evaluation application. For example, in one embodiment, a client device may use a preconfigured hardware element to correct a white balance and/or take any other action which may improve the one or more images. In this manner, the one or more images that are sent to the server (e.g. for storage, for evaluation, etc.) may reflect at least some pre-evaluation application. In other embodiments, it may be determined that evaluating (e.g. even by hardwired, etc.) may occur overall faster on a server, in which case, the client device may be used simply to capture and send without evaluating the one or more images. Of course, in other embodiments, any interaction between a client device and a server may be used to optimize the processing of the one or more images.

Additionally, in a further embodiment, the output may include a package of multiple images, the package referencing local URLs corresponding to the images, code for processing the one or more images, and/or any other relevant information (e.g. metadata, etc.) necessary to effectively modify the multiple images to create a final image. Further, the output may include a package referencing items both on a client device and in the package. For example, original images 1 and 2 may be stored on a client device, and image 3 may be the optimized generated image based on the original images 1 and 2. The output package may include image 3 (e.g. as created by the server, etc.) but not include images 1 and 2 if the output package is sent back to the user to manipulate the generated image. In such an embodiment, the user may manipulate the image, the manipulation referencing the original images 1 and 2 stored on the device, as well as image 3 which is included in the package (as provided by the server). In this manner, the output package may reference one or more images, which may be stored at more than one storage location.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3A:
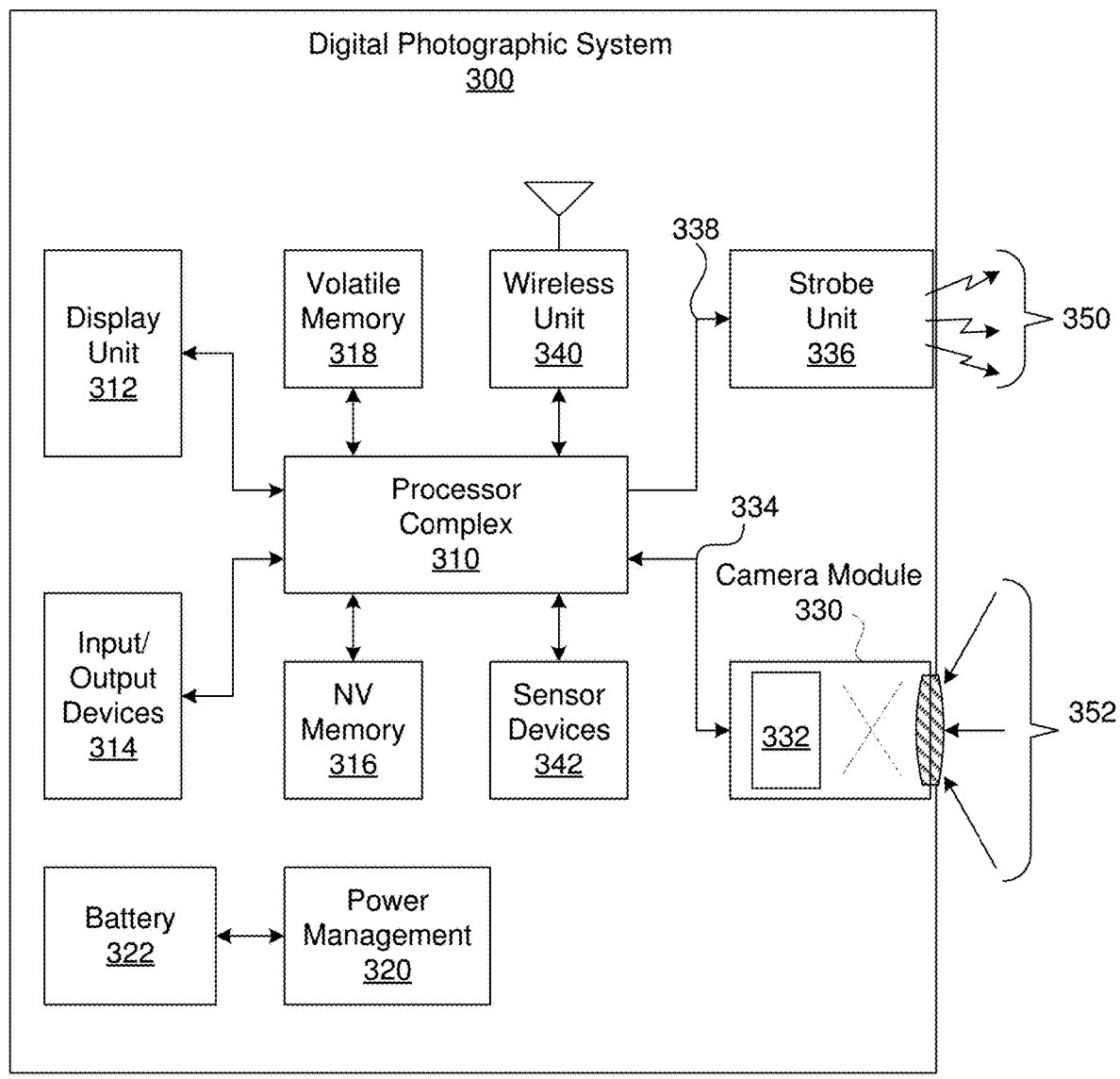
FIG. 3A illustrates a digital photographic system, in accordance with an embodiment.

FIG. 3A illustrates a digital photographic system 300, in accordance with one embodiment. As an option, the digital photographic system 300 may be implemented in the context of the details of any of the Figures disclosed herein. Of course, however, the digital photographic system 300 may be implemented in any desired environment. Further, the aforementioned definitions may equally apply to the description below.

As shown, the digital photographic system 300 may include a processor complex 310 coupled to a camera module 330 via an interconnect 334. In one embodiment, the processor complex 310 is coupled to a strobe unit 336. The digital photographic system 300 may also include, without limitation, a display unit 312, a set of input/output devices 314, non-volatile memory 316, volatile memory 318, a wireless unit 340, and sensor devices 342, each coupled to the processor complex 310. In one embodiment, a power management subsystem 320 is configured to generate appropriate power supply voltages for each electrical load element within the digital photographic system 300. A battery 322 may be configured to supply electrical energy to the power management subsystem 320. The battery 322 may implement any technically feasible energy storage system, including primary or rechargeable battery technologies. Of course, in other embodiments, additional or fewer features, units, devices, sensors, or subsystems may be included in the system.

In one embodiment, a strobe unit 336 may be integrated into the digital photographic system 300 and configured to provide strobe illumination 350 during an image sample event performed by the digital photographic system 300. In another embodiment, a strobe unit 336 may be implemented as an independent device from the digital photographic system 300 and configured to provide strobe illumination 350 during an image sample event performed by the digital photographic system 300. The strobe unit 336 may comprise one or more LED devices, a gas-discharge illuminator (e.g. a Xenon strobe device, a Xenon flash lamp, etc.), or any other technically feasible illumination device. In certain embodiments, two or more strobe units are configured to synchronously generate strobe illumination in conjunction with sampling an image. In one embodiment, the strobe unit 336 is controlled through a strobe control signal 338 to either emit the strobe illumination 350 or not emit the strobe illumination 350. The strobe control signal 338 may be implemented using any technically feasible signal transmission protocol. The strobe control signal 338 may indicate a strobe parameter (e.g. strobe intensity, strobe color, strobe time, etc.), for directing the strobe unit 336 to generate a specified intensity and/or color of the strobe illumination 350. The strobe control signal 338 may be generated by the processor complex 310, the camera module 330, or by any other technically feasible combination thereof. In one embodiment, the strobe control signal 338 is generated by a camera interface unit within the processor complex 310 and transmitted to both the strobe unit 336 and the camera module 330 via the interconnect 334. In another embodiment, the strobe control signal 338 is generated by the camera module 330 and transmitted to the strobe unit 336 via the interconnect 334.

Optical scene information 352, which may include at least a portion of the strobe illumination 350 reflected from objects in the photographic scene, is focused as an optical image onto an image sensor 332 within the camera module 330. The image sensor 332 generates an electronic representation of the optical image. The electronic representation comprises spatial color intensity information, which may include different color intensity samples (e.g. red, green, and blue light, etc.). In other embodiments, the spatial color intensity information may also include samples for white light. The electronic representation is transmitted to the processor complex 310 via the interconnect 334, which may implement any technically feasible signal transmission protocol.

In one embodiment, input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, the input/output devices 314 include a capacitive touch input surface coupled to a display unit 312. A touch entry display system may include the display unit 312 and a capacitive touch input surface, also coupled to processor complex 310.

Additionally, in other embodiments, non-volatile (NV) memory 316 is configured to store data when power is interrupted. In one embodiment, the NV memory 316 comprises one or more flash memory devices (e.g. ROM, PCM, FeRAM, FRAM, PRAM, MRAM, NRAM, etc.). The NV memory 316 comprises a non-transitory computer-readable medium, which may be configured to include programming instructions for execution by one or more processing units within the processor complex 310. The programming instructions may implement, without limitation, an operating system (OS), UI software modules, image processing and storage software modules, one or more input/output devices 314 connected to the processor complex 310, one or more software modules for sampling an image stack through camera module 330, one or more software modules for presenting the image stack or one or more synthetic images generated from the image stack through the display unit 312. As an example, in one embodiment, the programming instructions may also implement one or more software modules for merging images or portions of images within the image stack, aligning at least portions of each image within the image stack, or a combination thereof. In another embodiment, the processor complex 310 may be configured to execute the programming instructions, which may implement one or more software modules operable to create a high dynamic range (HDR) image.

Still yet, in one embodiment, one or more memory devices comprising the NV memory 316 may be packaged as a module configured to be installed or removed by a user. In one embodiment, volatile memory 318 comprises dynamic random access memory (DRAM) configured to temporarily store programming instructions, image data such as data associated with an image stack, and the like, accessed during the course of normal operation of the digital photographic system 300. Of course, the volatile memory may be used in any manner and in association with any other input/output device 314 or sensor device 342 attached to the process complex 310.

In one embodiment, sensor devices 342 may include, without limitation, one or more of an accelerometer to detect motion and/or orientation, an electronic gyroscope to detect motion and/or orientation, a magnetic flux detector to detect orientation, a global positioning system (GPS) module to detect geographic position, or any combination thereof. Of course, other sensors, including but not limited to a motion detection sensor, a proximity sensor, an RGB light sensor, a gesture sensor, a 3-D input image sensor, a pressure sensor, and an indoor position sensor, may be integrated as sensor devices. In one embodiment, the sensor devices may be one example of input/output devices 314.

Wireless unit 340 may include one or more digital radios configured to send and receive digital data. In particular, the wireless unit 340 may implement wireless standards (e.g. WiFi, Bluetooth, NFC, etc.), and may implement digital cellular telephony standards for data communication (e.g. CDMA, 3G, 4G, LTE, LTE-Advanced, etc.). Of course, any wireless standard or digital cellular telephony standards may be used.

In one embodiment, the digital photographic system 300 is configured to transmit one or more digital photographs to a network-based (online) or "cloud-based" photographic media service via the wireless unit 340. The one or more digital photographs may reside within either the NV memory 316 or the volatile memory 318, or any other memory device associated with the processor complex 310. In one embodiment, a user may possess credentials to access an online photographic media service and to transmit one or more digital photographs for storage to, retrieval from, and presentation by the online photographic media service. The credentials may be stored or generated within the digital photographic system 300 prior to transmission of the digital photographs. The online photographic media service may comprise a social networking service, photograph sharing service, or any other network-based service that provides storage of digital photographs, processing of digital photographs, transmission of digital photographs, sharing of digital photographs, or any combination thereof. In certain embodiments, one or more digital photographs are generated by the online photographic media service based on image data (e.g. image stack, HDR image stack, image package, etc.) transmitted to servers associated with the online photographic media service. In such embodiments, a user may upload one or more source images from the digital photographic system 300 for processing by the online photographic media service.

In one embodiment, the digital photographic system 300 comprises at least one instance of a camera module 330. In another embodiment, the digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view (e.g., greater than forty-five degrees of sweep among cameras) to generate a panoramic photograph. In one embodiment, a plurality of camera modules 330 may be configured to sample two or more narrow angle views (e.g., less than forty-five degrees of sweep among cameras) to generate a stereoscopic photograph. In other embodiments, a plurality of camera modules 330 may be configured to generate a 3-D image or to otherwise display a depth perspective (e.g. a z-component, etc.) as shown on the display unit 312 or any other display device.

In one embodiment, a display unit 312 may be configured to display a two-dimensional array of pixels to form an image for display. The display unit 312 may comprise a liquid-crystal (LCD) display, a light-emitting diode (LED) display, an organic LED display, or any other technically feasible type of display. In certain embodiments, the display unit 312 may be able to display a narrower dynamic range of image intensity values than a complete range of intensity values sampled from a photographic scene, such as within a single HDR image or over a set of two or more images comprising a multiple exposure or HDR image stack. In one embodiment, images comprising an image stack may be merged according to any technically feasible HDR blending technique to generate a synthetic image for display within dynamic range constraints of the display unit 312. In one embodiment, the limited dynamic range may specify an eight-bit per color channel binary representation of corresponding color intensities. In other embodiments, the limited dynamic range may specify more than eight-bits (e.g., 10 bits, 12 bits, or 14 bits, etc.) per color channel binary representation.

Figure 3B:
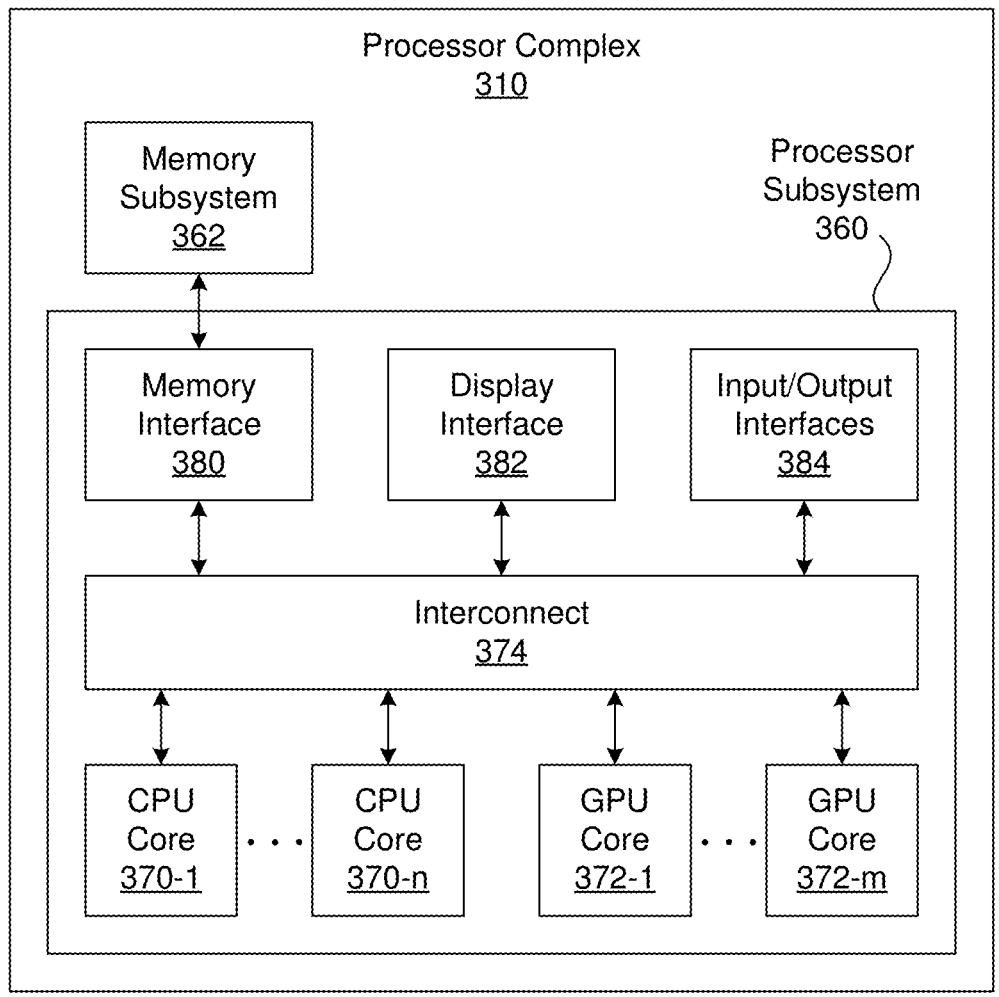
FIG. 3B illustrates a processor complex within the digital photographic system, according to one embodiment.

FIG. 3B illustrates a processor complex 310 within the digital photographic system 300 of FIG. 3A, in accordance with one embodiment. As an option, the processor complex 310 may be implemented in the context of the details of any of the Figures disclosed herein. Of course, however, the processor complex 310 may be implemented in any desired environment. Further, the aforementioned definitions may equally apply to the description below.

As shown, the processor complex 310 includes a processor subsystem 360 and may include a memory subsystem 362. In one embodiment, processor complex 310 may comprise a system on a chip (SoC) device that implements processor subsystem 360, and memory subsystem 362 comprises one or more DRAM devices coupled to the processor subsystem 360. In another embodiment, the processor complex 310 may comprise a multi-chip module (MCM) encapsulating the SoC device and the one or more DRAM devices comprising the memory subsystem 362.

The processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within the memory subsystem 362, volatile memory 318, NV memory 316, or any combination thereof. Each of the one or more CPU cores 370 may be configured to retrieve and store data through interconnect 374 and the memory interface 380. In one embodiment, each of the one or more CPU cores 370 may include a data cache, and an instruction cache. Additionally, two or more of the CPU cores 370 may share a data cache, an instruction cache, or any combination thereof. In one embodiment, a cache hierarchy is implemented to provide each CPU core 370 with a private cache layer, and a shared cache layer.

In some embodiments, processor subsystem 360 may include one or more graphics processing unit (GPU) cores 372. Each GPU core 372 may comprise a plurality of multi-threaded execution units that may be programmed to implement, without limitation, graphics acceleration functions. In various embodiments, the GPU cores 372 may be configured to execute multiple thread programs according to well-known standards (e.g. OpenGL™, WebGL™, OpenCL™, CUDA™, etc.), and/or any other programmable rendering graphic standard. In certain embodiments, at least one GPU core 372 implements at least a portion of a motion estimation function, such as a well-known Harris detector or a well-known Hessian-Laplace detector. Such a motion estimation function may be used at least in part to align images or portions of images within an image stack. For example, in one embodiment, an HDR image may be compiled based on an image stack, where two or more images are first aligned prior to compiling the HDR image.

As shown, the interconnect 374 is configured to transmit data between and among the memory interface 380, the display interface unit 382, the input/output interfaces unit 384, the CPU cores 370, and the GPU cores 372. In various embodiments, the interconnect 374 may implement one or more buses, one or more rings, a cross-bar, a mesh, or any other technically feasible data transmission structure or technique. The memory interface 380 is configured to couple the memory subsystem 362 to the interconnect 374. The memory interface 380 may also couple NV memory 316, volatile memory 318, or any combination thereof to the interconnect 374. The display interface unit 382 may be configured to couple a display unit 312 to the interconnect 374. The display interface unit 382 may implement certain frame buffer functions (e.g. frame refresh, etc.). Alternatively, in another embodiment, the display unit 312 may implement certain frame buffer functions (e.g. frame refresh, etc.). The input/output interfaces unit 384 may be configured to couple various input/output devices to the interconnect 374.

In certain embodiments, a camera module 330 is configured to store exposure parameters for sampling each image associated with an image stack. For example, in one embodiment, when directed to sample a photographic scene, the camera module 330 may sample a set of images comprising the image stack according to stored exposure parameters. A software module comprising programming instructions executing within a processor complex 310 may generate and store the exposure parameters prior to directing the camera module 330 to sample the image stack. In other embodiments, the camera module 330 may be used to meter an image or an image stack, and the software module comprising programming instructions executing within a processor complex 310 may generate and store metering parameters prior to directing the camera module 330 to capture the image. Of course, the camera module 330 may be used in any manner in combination with the processor complex 310.

In one embodiment, exposure parameters associated with images comprising the image stack may be stored within an exposure parameter data structure that includes exposure parameters for one or more images. In another embodiment, a camera interface unit (not shown in FIG. 3B) within the processor complex 310 may be configured to read exposure parameters from the exposure parameter data structure and to transmit associated exposure parameters to the camera module 330 in preparation of sampling a photographic scene. After the camera module 330 is configured according to the exposure parameters, the camera interface may direct the camera module 330 to sample the photographic scene; the camera module 330 may then generate a corresponding image stack. The exposure parameter data structure may be stored within the camera interface unit, a memory circuit within the processor complex 310, volatile memory 318, NV memory 316, the camera module 330, or within any other technically feasible memory circuit. Further, in another embodiment, a software module executing within processor complex 310 may generate and store the exposure parameter data structure.

Figure 3C:
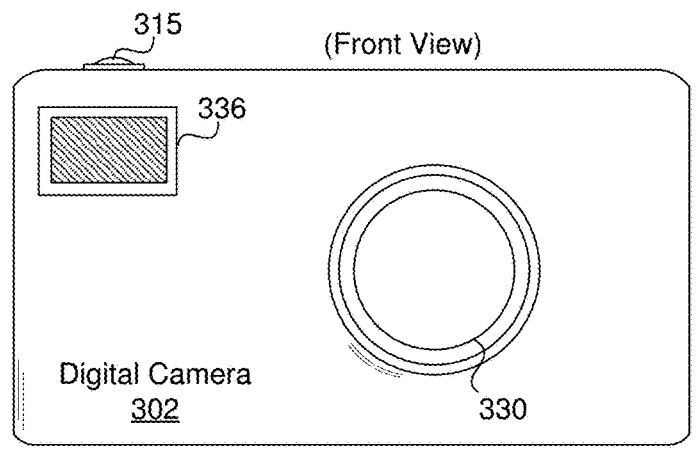
FIG. 3C illustrates a digital camera, in accordance with an embodiment.

FIG. 3C illustrates a digital camera 302, in accordance with one embodiment. As an option, the digital camera 302 may be implemented in the context of the details of any of the Figures disclosed herein. Of course, however, the digital camera 302 may be implemented in any desired environment. Further, the aforementioned definitions may equally apply to the description below.

In one embodiment, the digital camera 302 may be configured to include a digital photographic system, such as digital photographic system 300 of FIG. 3A. As shown, the digital camera 302 includes a camera module 330, which may include optical elements configured to focus optical scene information representing a photographic scene onto an image sensor, which may be configured to convert the optical scene information to an electronic representation of the photographic scene.

Additionally, the digital camera 302 may include a strobe unit 336, and may include a shutter release button 315 for triggering a photographic sample event, whereby digital camera 302 samples one or more images comprising the electronic representation. In other embodiments, any other technically feasible shutter release mechanism may trigger the photographic sample event (e.g. such as a timer trigger or remote control trigger, etc.).

Figure 3D:
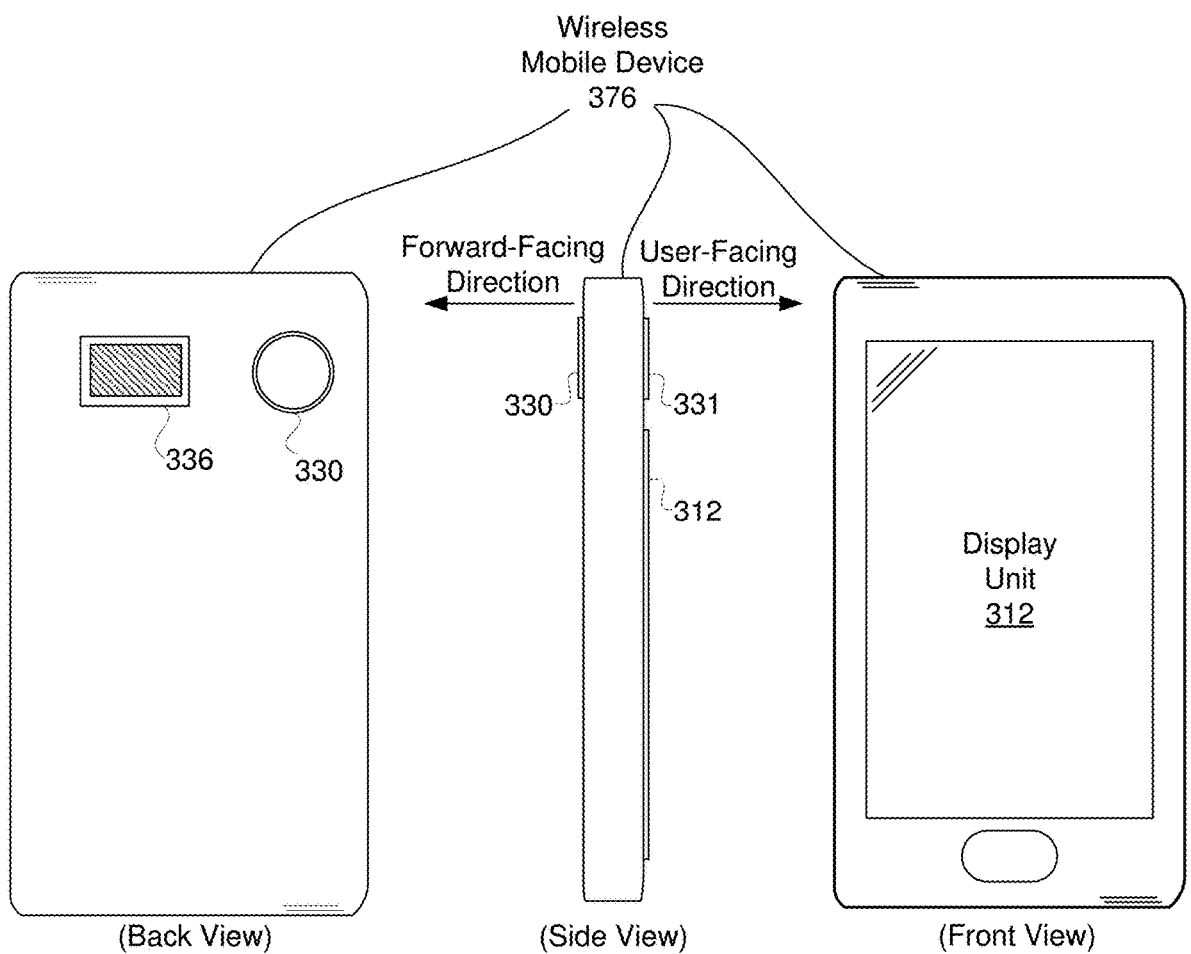
FIG. 3D illustrates a wireless mobile device, in accordance with another embodiment.

FIG. 3D illustrates a wireless mobile device 376, in accordance with one embodiment. As an option, the mobile device 376 may be implemented in the context of the details of any of the Figures disclosed herein. Of course, however, the mobile device 376 may be implemented in any desired environment. Further, the aforementioned definitions may equally apply to the description below.

In one embodiment, the mobile device 376 may be configured to include a digital photographic system (e.g. such as digital photographic system 300 of FIG. 3A), which is configured to sample a photographic scene. In various embodiments, a camera module 330 may include optical elements configured to focus optical scene information representing the photographic scene onto an image sensor, which may be configured to convert the optical scene information to an electronic representation of the photographic scene. Further, a shutter release command may be generated through any technically feasible mechanism, such as a virtual button, which may be activated by a touch gesture on a touch entry display system comprising display unit 312, or a physical button, which may be located on any face or surface of the mobile device 376. Of course, in other embodiments, any number of other buttons, external inputs/outputs, or digital inputs/outputs may be included on the mobile device 376, and which may be used in conjunction with the camera module 330.

As shown, in one embodiment, a touch entry display system comprising display unit 312 is disposed on the opposite side of mobile device 376 from camera module 330. In certain embodiments, the mobile device 376 includes a user-facing camera module 331 and may include a user-facing strobe unit (not shown). Of course, in other embodiments, the mobile device 376 may include any number of user-facing camera modules or rear-facing camera modules, as well as any number of user-facing strobe units or rear-facing strobe units.

In some embodiments, the digital camera 302 and the mobile device 376 may each generate and store a synthetic image based on an image stack sampled by camera module 330. The image stack may include one or more images sampled under ambient lighting conditions, one or more images sampled under strobe illumination from strobe unit 336, or a combination thereof.

Figure 3E:
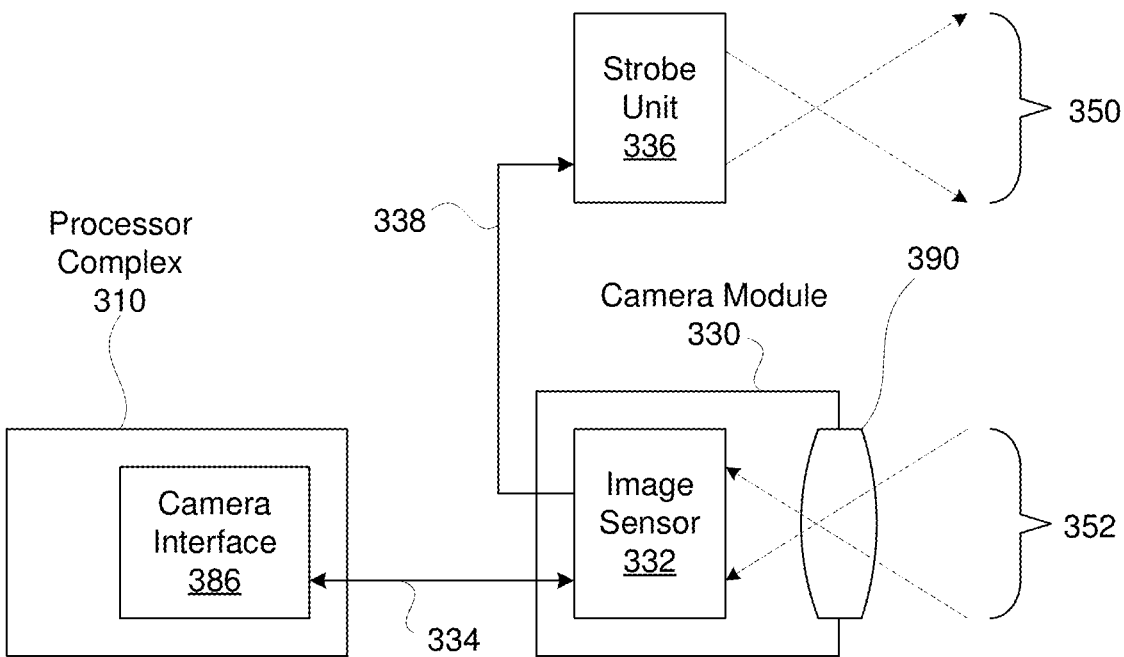
FIG. 3E illustrates a camera module configured to sample an image, according to one embodiment.

FIG. 3E illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to control strobe unit 336 through strobe control signal 338. As shown, a lens 390 is configured to focus optical scene information 352 onto image sensor 332 to be sampled. In one embodiment, image sensor 332 advantageously controls detailed timing of the strobe unit 336 though the strobe control signal 338 to reduce inter-sample time between an image sampled with the strobe unit 336 enabled, and an image sampled with the strobe unit 336 disabled. For example, the image sensor 332 may enable the strobe unit 336 to emit strobe illumination 350 less than one microsecond (or any desired length) after image sensor 332 completes an exposure time associated with sampling an ambient image and prior to sampling a strobe image.

In other embodiments, the strobe illumination 350 may be configured based on a desired one or more target points. For example, in one embodiment, the strobe illumination 350 may light up an object in the foreground, and depending on the length of exposure time, may also light up an object in the background of the image. In one embodiment, once the strobe unit 336 is enabled, the image sensor 332 may then immediately begin exposing a strobe image. The image sensor 332 may thus be able to directly control sampling operations, including enabling and disabling the strobe unit 336 associated with generating an image stack, which may comprise at least one image sampled with the strobe unit 336 disabled, and at least one image sampled with the strobe unit 336 either enabled or disabled. In one embodiment, data comprising the image stack sampled by the image sensor 332 is transmitted via interconnect 334 to a camera interface unit 386 within processor complex 310. In some embodiments, the camera module 330 may include an image sensor controller, which may be configured to generate the strobe control signal 338 in conjunction with controlling operation of the image sensor 332.

Figure 3F:
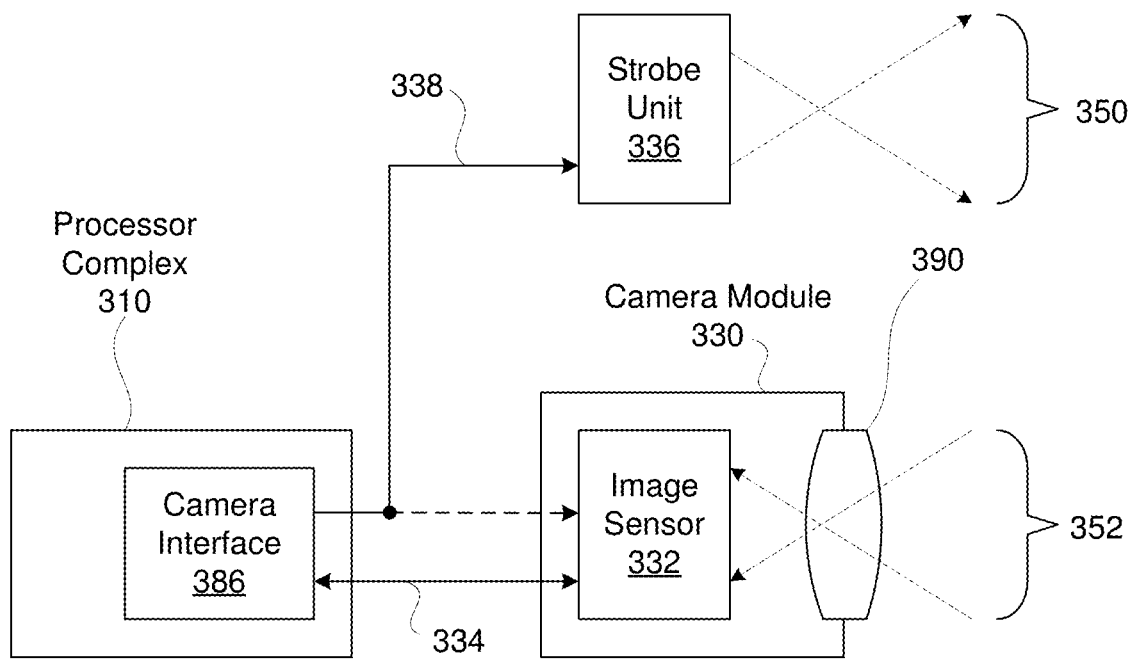
FIG. 3F illustrates a camera module configured to sample an image, according to another embodiment.

FIG. 3F illustrates a camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to sample an image based on state information for strobe unit 336. The state information may include, without limitation, one or more strobe parameters (e.g. strobe intensity, strobe color, strobe time, etc.), for directing the strobe unit 336 to generate a specified intensity and/or color of the strobe illumination 350. In one embodiment, commands for configuring the state information associated with the strobe unit 336 may be transmitted through a strobe control signal 338, which may be monitored by the camera module 330 to detect when the strobe unit 336 is enabled. For example, in one embodiment, the camera module 330 may detect when the strobe unit 336 is enabled or disabled within a microsecond or less of the strobe unit 336 being enabled or disabled by the strobe control signal 338. To sample an image requiring strobe illumination, a camera interface unit 386 may enable the strobe unit 336 by sending an enable command through the strobe control signal 338. In one embodiment, the camera interface unit 386 may be included as an interface of input/output interfaces 384 in a processor subsystem 360 of the processor complex 310 of FIG. 3B The enable command may comprise a signal level transition, a data packet, a register write, or any other technically feasible transmission of a command. The camera module 330 may sense that the strobe unit 336 is enabled and then cause image sensor 332 to sample one or more images requiring strobe illumination while the strobe unit 336 is enabled. In such an implementation, the image sensor 332 may be configured to wait for an enable signal destined for the strobe unit 336 as a trigger signal to begin sampling a new exposure.

In one embodiment, camera interface unit 386 may transmit exposure parameters and commands to camera module 330 through interconnect 334. In certain embodiments, the camera interface unit 386 may be configured to directly control strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization may be less than five hundred microseconds of event timing error. Additionally, event timing error may be a difference in time from an intended event occurrence to the time of a corresponding actual event occurrence.

In another embodiment, camera interface unit 386 may be configured to accumulate statistics while receiving image data from camera module 330. In particular, the camera interface unit 386 may accumulate exposure statistics for a given image while receiving image data for the image through interconnect 334. Exposure statistics may include, without limitation, one or more of an intensity histogram, a count of over-exposed pixels, a count of under-exposed pixels, an intensity-weighted sum of pixel intensity, or any combination thereof. The camera interface unit 386 may present the exposure statistics as memory-mapped storage locations within a physical or virtual address space defined by a processor, such as one or more of CPU cores 370, within processor complex 310. In one embodiment, exposure statistics reside in storage circuits that are mapped into a memory-mapped register space, which may be accessed through the interconnect 334. In other embodiments, the exposure statistics are transmitted in conjunction with transmitting pixel data for a captured image. For example, the exposure statistics for a given image may be transmitted as in-line data, following transmission of pixel intensity data for the captured image. Exposure statistics may be calculated, stored, or cached within the camera interface unit 386.

In one embodiment, camera interface unit 386 may accumulate color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image.

In one embodiment, camera interface unit 386 may accumulate spatial color statistics for performing color-matching between or among images, such as between or among an ambient image and one or more images sampled with strobe illumination. As with the exposure statistics, the color statistics may be presented as memory-mapped storage locations within processor complex 310. In one embodiment, the color statistics are mapped in a memory-mapped register space, which may be accessed through interconnect 334, within processor subsystem 360. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386.

In one embodiment, camera module 330 may transmit strobe control signal 338 to strobe unit 336, enabling the strobe unit 336 to generate illumination while the camera module 330 is sampling an image. In another embodiment, camera module 330 may sample an image illuminated by strobe unit 336 upon receiving an indication signal from camera interface unit 386 that the strobe unit 336 is enabled. In yet another embodiment, camera module 330 may sample an image illuminated by strobe unit 336 upon detecting strobe illumination within a photographic scene via a rapid rise in scene illumination. In one embodiment, a rapid rise in scene illumination may include at least a rate of increasing intensity consistent with that of enabling strobe unit 336. In still yet another embodiment, camera module 330 may enable strobe unit 336 to generate strobe illumination while sampling one image, and disable the strobe unit 336 while sampling a different image.

Figure 3G:
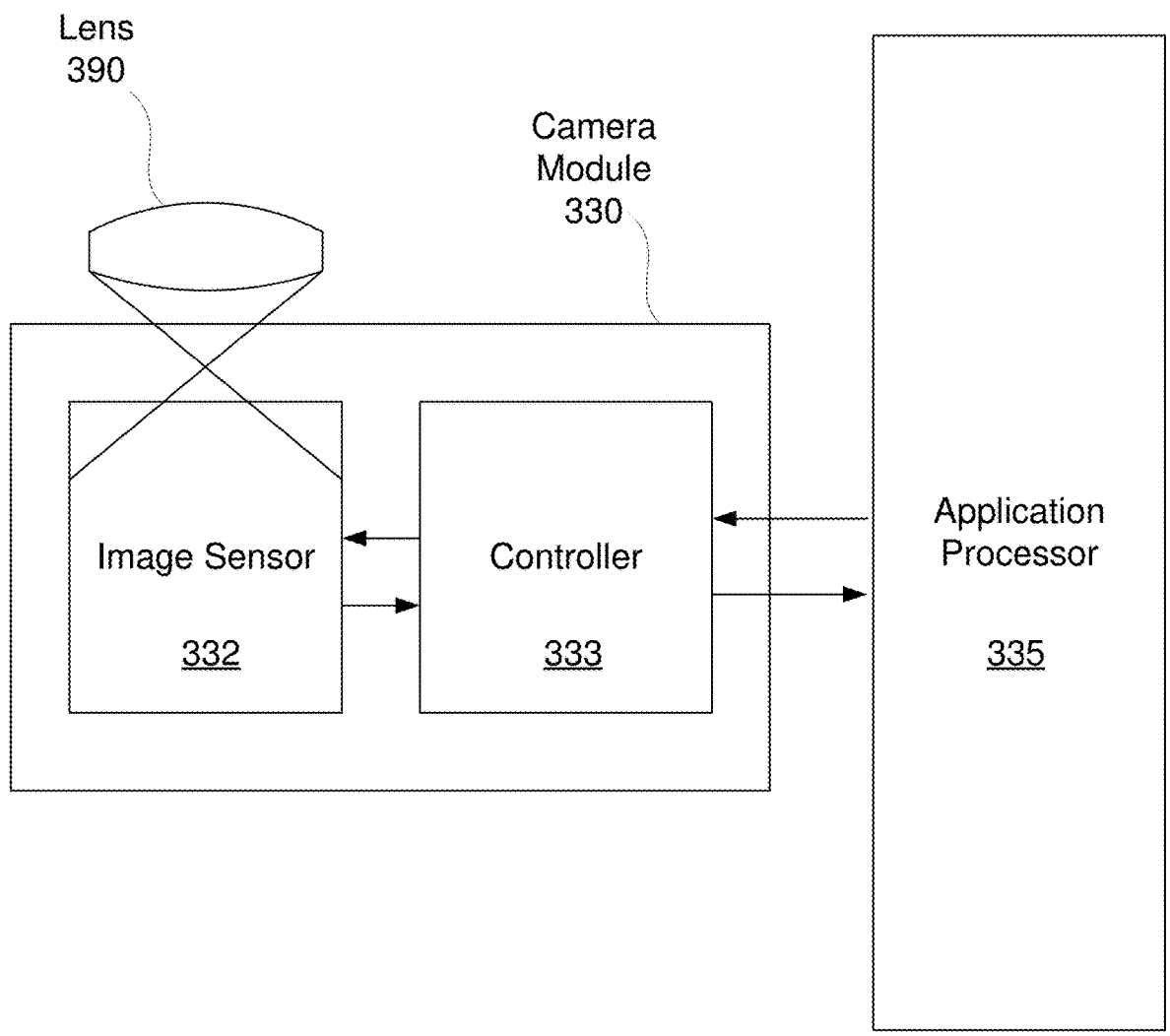
FIG. 3G illustrates a camera module in communication with an application processor, in accordance with an embodiment.

FIG. 3G illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be in communication with an application processor 335. The camera module 330 is shown to include image sensor 332 in communication with a controller 333. Further, the controller 333 is shown to be in communication with the application processor 335.

In one embodiment, the application processor 335 may reside outside of the camera module 330. As shown, the lens 390 may be configured to focus optical scene information onto image sensor 332 to be sampled. The optical scene information sampled by the image sensor 332 may then be communicated from the image sensor 332 to the controller 333 for at least one of subsequent processing and communication to the application processor 335. In another embodiment, the controller 333 may control storage of the optical scene information sampled by the image sensor 332, or storage of processed optical scene information.

In another embodiment, the controller 333 may enable a strobe unit to emit strobe illumination for a short time duration (e.g. less than one microsecond, etc.) after image sensor 332 completes an exposure time associated with sampling an ambient image. Further, the controller 333 may be configured to generate strobe control signal 338 in conjunction with controlling operation of the image sensor 332.

In one embodiment, the image sensor 332 may be a complementary metal oxide semiconductor (CMOS) sensor or a charge-coupled device (CCD) sensor. In another embodiment, the controller 333 and the image sensor 332 may be packaged together as an integrated system or integrated circuit. In yet another embodiment, the controller 333 and the image sensor 332 may comprise discrete packages. In one embodiment, the controller 333 may provide circuitry for receiving optical scene information from the image sensor 332, processing of the optical scene information, timing of various functionalities, and signaling associated with the application processor 335. Further, in another embodiment, the controller 333 may provide circuitry for control of one or more of exposure, shuttering, white balance, and gain adjustment. Processing of the optical scene information by the circuitry of the controller 333 may include one or more of gain application, amplification, and analog-to-digital conversion. After processing the optical scene information, the controller 333 may transmit corresponding digital pixel data, such as to the application processor 335.

In one embodiment, the application processor 335 may be implemented on processor complex 310 and at least one of volatile memory 318 and NV memory 316, or any other memory device and/or system. The application processor 335 may be previously configured for processing of received optical scene information or digital pixel data communicated from the camera module 330 to the application processor 335.

Figure 4:
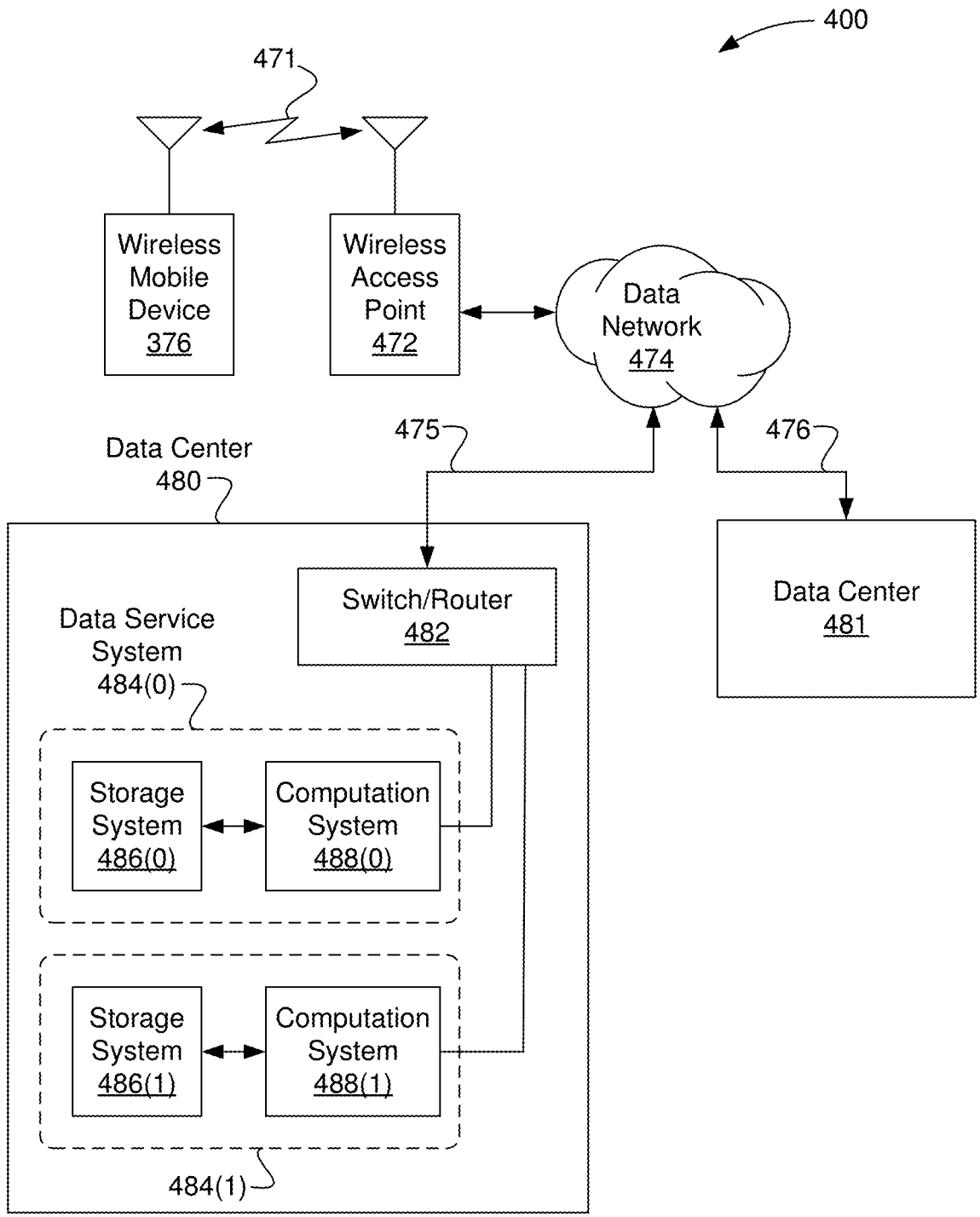
FIG. 4 illustrates a network service system, in accordance with another embodiment.

FIG. 4 illustrates a network service system 400, in accordance with one embodiment. As an option, the network service system 400 may be implemented in the context of the details of any of the Figures disclosed herein. Of course, however, the network service system 400 may be implemented in any desired environment. Further, the aforementioned definitions may equally apply to the description below.

In one embodiment, the network service system 400 may be configured to provide network access to a device implementing a digital photographic system. As shown, network service system 400 includes a wireless mobile device 376, a wireless access point 472, a data network 474, data center 480, and a data center 481. The wireless mobile device 376 may communicate with the wireless access point 472 via a digital radio link 471 to send and receive digital data, including data associated with digital images. The wireless mobile device 376 and the wireless access point 472 may implement any technically feasible transmission techniques for transmitting digital data via digital a radio link 471 without departing the scope and spirit of the present invention. In certain embodiments, one or more of data centers 480, 481 may be implemented using virtual constructs so that each system and subsystem within a given data center 480, 481 may comprise virtual machines configured to perform specified data processing and network tasks. In other implementations, one or more of data centers 480, 481 may be physically distributed over a plurality of physical sites.

The wireless mobile device 376 may comprise a smart phone configured to include a digital camera, a digital camera configured to include wireless network connectivity, a reality augmentation device, a laptop configured to include a digital camera and wireless network connectivity, or any other technically feasible computing device configured to include a digital photographic system and wireless network connectivity.

In various embodiments, the wireless access point 472 may be configured to communicate with wireless mobile device 376 via the digital radio link 471 and to communicate with the data network 474 via any technically feasible transmission media, such as any electrical, optical, or radio transmission media. For example, in one embodiment, wireless access point 472 may communicate with data network 474 through an optical fiber coupled to the wireless access point 472 and to a router system or a switch system within the data network 474. A network link 475, such as a wide area network (WAN) link, may be configured to transmit data between the data network 474 and the data center 480.

In one embodiment, the data network 474 may include routers, switches, long-haul transmission systems, provisioning systems, authorization systems, and any technically feasible combination of communications and operations subsystems configured to convey data between network endpoints, such as between the wireless access point 472 and the data center 480. In one implementation, a wireless the mobile device 376 may comprise one of a plurality of wireless mobile devices configured to communicate with the data center 480 via one or more wireless access points coupled to the data network 474.

Additionally, in various embodiments, the data center 480 may include, without limitation, a switch/router 482 and at least one data service system 484. The switch/router 482 may be configured to forward data traffic between and among a network link 475, and each data service system 484. The switch/router 482 may implement any technically feasible transmission techniques, such as Ethernet media layer transmission, layer 2 switching, layer 3 routing, and the like. The switch/router 482 may comprise one or more individual systems configured to transmit data between the data service systems 484 and the data network 474.

In one embodiment, the switch/router 482 may implement session-level load balancing among a plurality of data service systems 484. Each data service system 484 may include at least one computation system 488 and may also include one or more storage systems 486. Each computation system 488 may comprise one or more processing units, such as a central processing unit, a graphics processing unit, or any combination thereof. A given data service system 484 may be implemented as a physical system comprising one or more physically distinct systems configured to operate together. Alternatively, a given data service system 484 may be implemented as a virtual system comprising one or more virtual systems executing on an arbitrary physical system. In certain scenarios, the data network 474 may be configured to transmit data between the data center 480 and another data center 481, such as through a network link 476.

In another embodiment, the network service system 400 may include any networked mobile devices configured to implement one or more embodiments of the present invention. For example, in some embodiments, a peer-to-peer network, such as an ad-hoc wireless network, may be established between two different wireless mobile devices. In such embodiments, digital image data may be transmitted between the two wireless mobile devices without having to send the digital image data to a data center 480.

Figure 5:
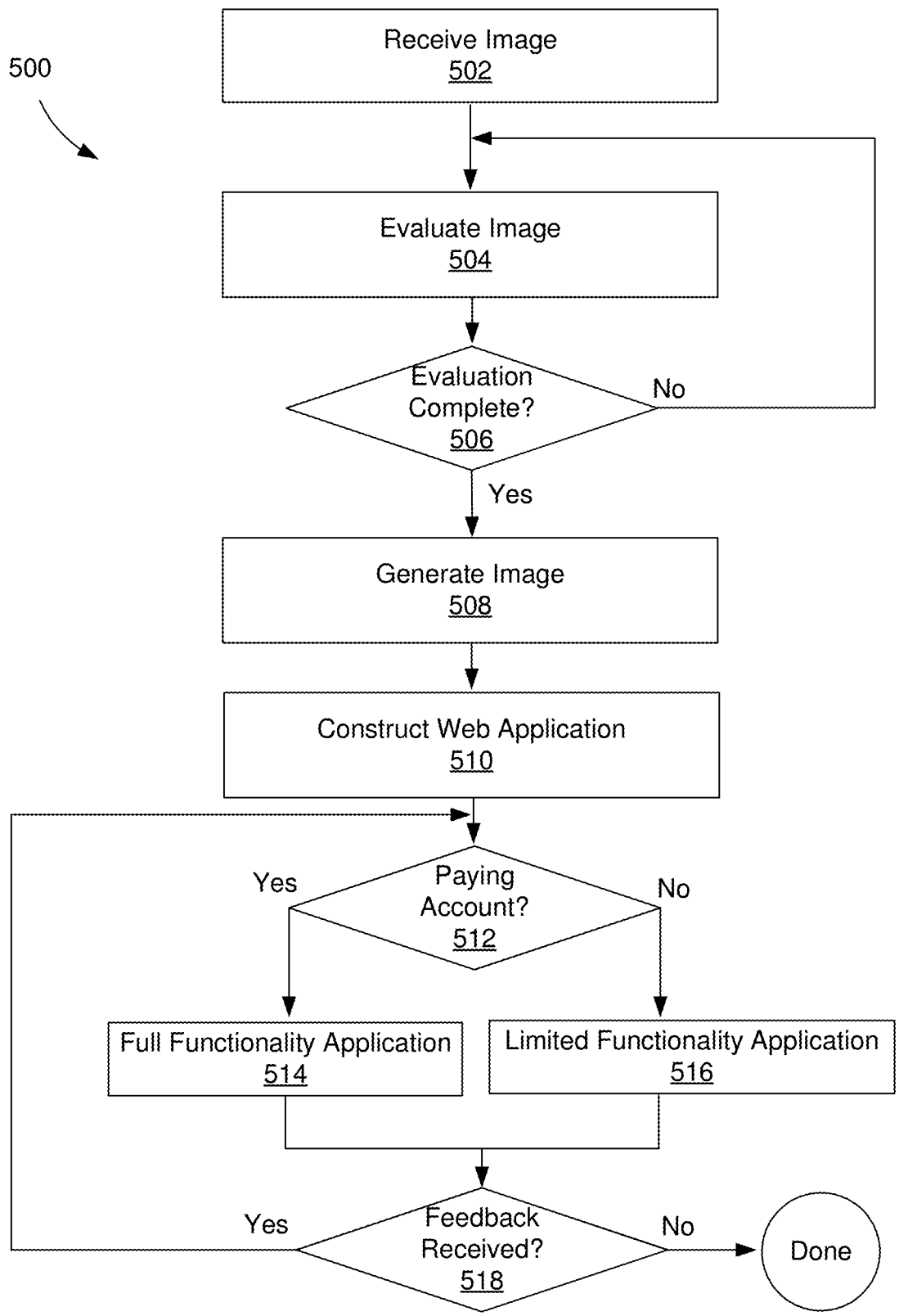
FIG. 5 illustrates a method for constructing a web application, in accordance with another embodiment.

FIG. 5 illustrates a method 500 for constructing a web application, in accordance with another embodiment. As an option, the method 500 may be implemented in the context of the details of any of the Figures disclosed herein. Of course, however, the method 500 may be implemented in any desired environment. Further, the aforementioned definitions may equally apply to the description below.

As shown, the method begins with receiving an image. See operation 502. As described hereinabove, the image may include one or more images, which may be received by a server. After being received, the one or more images may be evaluated. See operation 504.

In one embodiment, the evaluation may include generating processing code (e.g. GL code, GL object, WebGL object, etc.). In another embodiment, the evaluation may include forming a stack of images associated with processing code. For example, in one embodiment, a stack of images may include a series of EV−1, EV0, and EV+1 images which may be blended to form a HDR image. Additionally, the evaluation may include generating an image. As an example, the generating may include combining multiple images (e.g. creating an HDR, etc.). Additionally, the evaluation may include creating a specification and then generating processing code associated with the generated image. In one embodiment, the generated image may be manipulated based on the processing code (and/or created specification, etc.).

As shown, it is determined if the evaluation is complete. See decision 506. In one embodiment, an evaluation may proceed in steps, including for example, correcting a white balance, correcting a saturation, creating processing code, creating a blended image, and/or taking any series of actions. In a separate embodiment, an evaluation may proceed in a parallel fashion whereby each of the filters (e.g. white balance, saturation, etc.) and/or processing (e.g. create GL code, create blended image, etc.) may occur near simultaneously.

After completing the evaluation, an image may be generated. See operation 508. In one embodiment, the image may be generated at the conclusion of an evaluation step (e.g. after filters have been identified and applied, etc.). In another embodiment, the image may be generated as part of the evaluation step.

After an image is generated, a web application is constructed. See operation 510. In one embodiment, the web application may be created based on an output including a package, the package including a generated image, processing code (e.g. GL code, etc.), and/or any other data necessary to independently control and modify the generated image. In one embodiment, the package may include a web application.

In one embodiment, multiple versions or a specific version based on a user account type of a web application may be created prior to outputting a package. For example, in one embodiment, a premium (paid) version and/or a free version web application may be created, but the output package may include one and/or both of the versions, depending on the intended recipient.

For example, as shown, after constructing a web application, it is determined whether there is a paying account. See decision 512. In one embodiment, if it is a paying account, a full functionality application may be provided. See operation 514. In another embodiment, if an account is not a paying account, then a limited functionality application may be provided. Sec operation 516. Further, it is determined whether feedback is received. See decision 518.

In one embodiment, a first feedback may be associated with a full functionality application and a second feedback may be associated with a limited functionality application. For example, in one embodiment, the first feedback may include one or more modifications made to one or more features. In another embodiment, the second feedback may include one or more modifications made to a single feature.

For example, in various embodiments, the first feedback may be comprised of multiple settings, including a modification made to a filter (e.g. white balance, saturation, etc.), to processing (e.g. GL code, blending of two or more images, etc.), to the selected images (e.g. used as the basis for blending, etc.), and/or any other modification. In one embodiment, the first feedback may include a first modification and a second modification, the first modification and second modification being received simultaneous and/or at a separate time. For example, in one embodiment, a first modification may be received at a first time and a second modification may be received at a second time, wherein the first time and the second time are different times. Additionally, the first modification may include a set of modifications and the second modification may include a set of modifications.

As shown, if feedback is received, then the modification(s) are displayed on the full functionality application or the limited functionality application, depending on whether the web application is associated with a paying account. In one embodiment, the web application may include processing code necessary to implement the changes received via the feedback. In another embodiment, the feedback may be sent to a server to generate an image, and reconstruct a web application. In such an embodiment, it may be necessary to send such feedback to a server in the event that, for example, a custom setting or a new filter is created by the user. In other embodiments, however, if a new filter or custom filter is not created, then the processing code contained in the web application may contain all of the code necessary to implement the one or more modifications inputted by the user.

Figure 6:
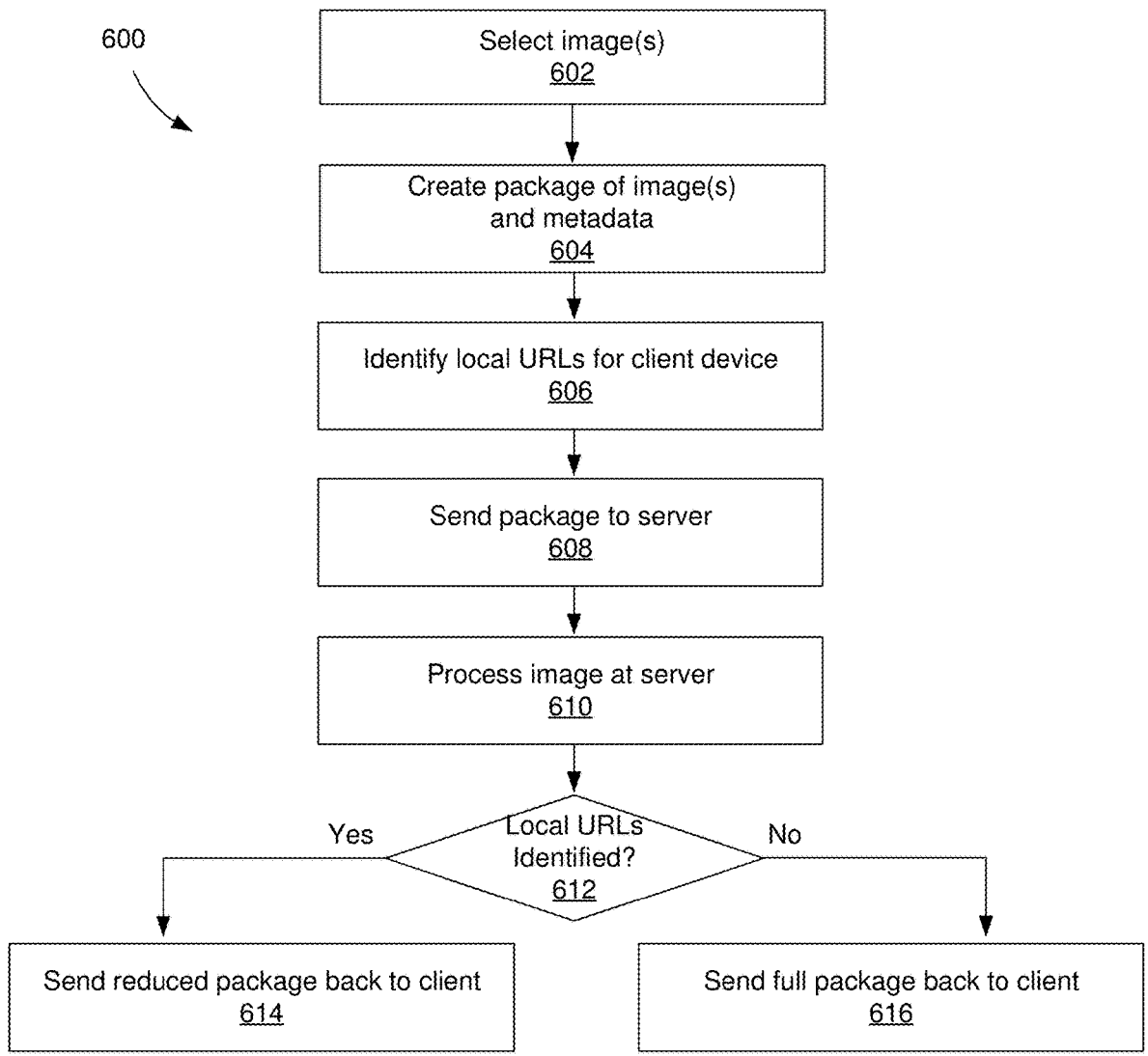
FIG. 6 illustrates a method for exchanging images, in accordance with another embodiment.

FIG. 6 illustrates a method 600 for exchanging images, in accordance with another embodiment. As an option, the method 600 may be implemented in the context of the details of any of the Figures disclosed herein. Of course, however, the method 600 may be implemented in any desired environment. Further, the aforementioned definitions may equally apply to the description below.

As shown, one or more images are selected. See operation 602. Additionally, a package of the one or more images and metadata is created. See operation 604. Local URLs for the client device are identified. See operation 606. Further, the package is sent from the client device to the server. See operation 608.

In one embodiment, the selection of the one or more images may occur manually. For example, in one embodiment, after capturing a number of images, a user may select all or a subset of the captured images. In another embodiment, the selection of the one or more images may occur automatically. For example, in one embodiment, after capturing a single image, the image may be automatically packaged and sent to a server for processing. In another embodiment, the package may be sent once a threshold is reached (e.g. a minimum of five photos, a set number of photos within a specified time frame, etc.).

In various embodiments, local URLs may be identified once the package is created. For example, before sending the package to a server, the device may analyze the contents of the package and provide a local URL for any resource (e.g. photo, metadata, data, etc.) being transferred. In a separate embodiment, local URLs may be already associated with the one or more images and/or metadata. For example, in one embodiment, when one or more images are selected, the selection may inherently include an address to the one or more images (e.g. sdcard/DCIM/images/image001.jpg, etc.). In such an embodiment, the address associated with the location of the image to be uploaded may be used as an identification (included in the package) of a local URL. For example, when a hypothetical image 01 is selected on client device X, the address of the location where the image is stored is first determined. Such a location may be included in the package which is subsequently sent to a server for processing. The server may identify which assets are stored locally on client device X.

As shown, the one or more images are processed at the server. See operation 610. In one embodiment, the processing at the server may be analogous to evaluating image in operation 504. The processing may analyze the one or more images, the associated metadata, and/or any other data which is contained in the sent package. In one embodiment, the processing may include enhancing the image in some manner (e.g. correct white balance, fix contrast, etc.). In other embodiments, the processing may include blending two or more photos (e.g. mix an ambient photo and a flash photo, etc.), creating a new generated image (e.g. based off of enhancing and/or any other action, etc.), and/or taking any other action with respect to the sent package.

As shown, after processing the one or more images at the server (and any other data sent), it is determined whether local URLs are identified. See decision 612. In various embodiments, local URLs may be previously identified and sent by the client device. In other embodiments, local URLs may be assigned by a server. For example, in one embodiment, the server may identify a first client device as the source of the sent one or more images. In such an embodiment, the server may identify the location (e.g. on the storage medium) of the one or more images, and/or may identify simply the source (e.g. the device, etc.).

In one embodiment, if the server identifies the source and not the full location, the local URL may be incomplete (e.g. the full address to the resource may not be identified, etc.). In such an embodiment, when sending the modified package back to the client, the server may request whether the resources initially sent can be located on the client device. If so, then then the server may not include such one or more images. In the event, however, that the client device cannot locate the one or more images, then the server may send the one or more images back to the client device.

As shown, if local URLs are identified, then a reduced package is sent back to the client. See operation 614. Additionally, if local URLs are not identified, then a full package is sent back to the client. See operation 616.

In one embodiment, a reduced package may include any data less than a full package, the full package containing all images, metadata, code (e.g. GL, etc.) necessary to enable an independent web application. In another embodiment, a reduced package may not include those resources (e.g. images, etc.) for which a local URL was identified. In some embodiments, a reduced package may include a full package but at a lower overall data amount. For example, in one embodiment, the one or more images may be compressed in some manner to minimize data exchange. In such an embodiment, the client web application may use lower resolution photos to manipulate the photo. After manipulating the photos via the web application, the instructions as dictated by the user may be sent back to the server to create a full resolution generated image. Such a full resolution generated image may then be returned to the client (e.g. via email, via an application, via a cloud storage service, etc.).

In the context of the present description, a local URL may include any reference to a resource stored on a local device. In one embodiment, a local URL may refer to the storage location of an image. Additionally, a local URL may refer to an object that resides within the mobile device, such as within a local file system associated with the mobile device.

Figure 7:
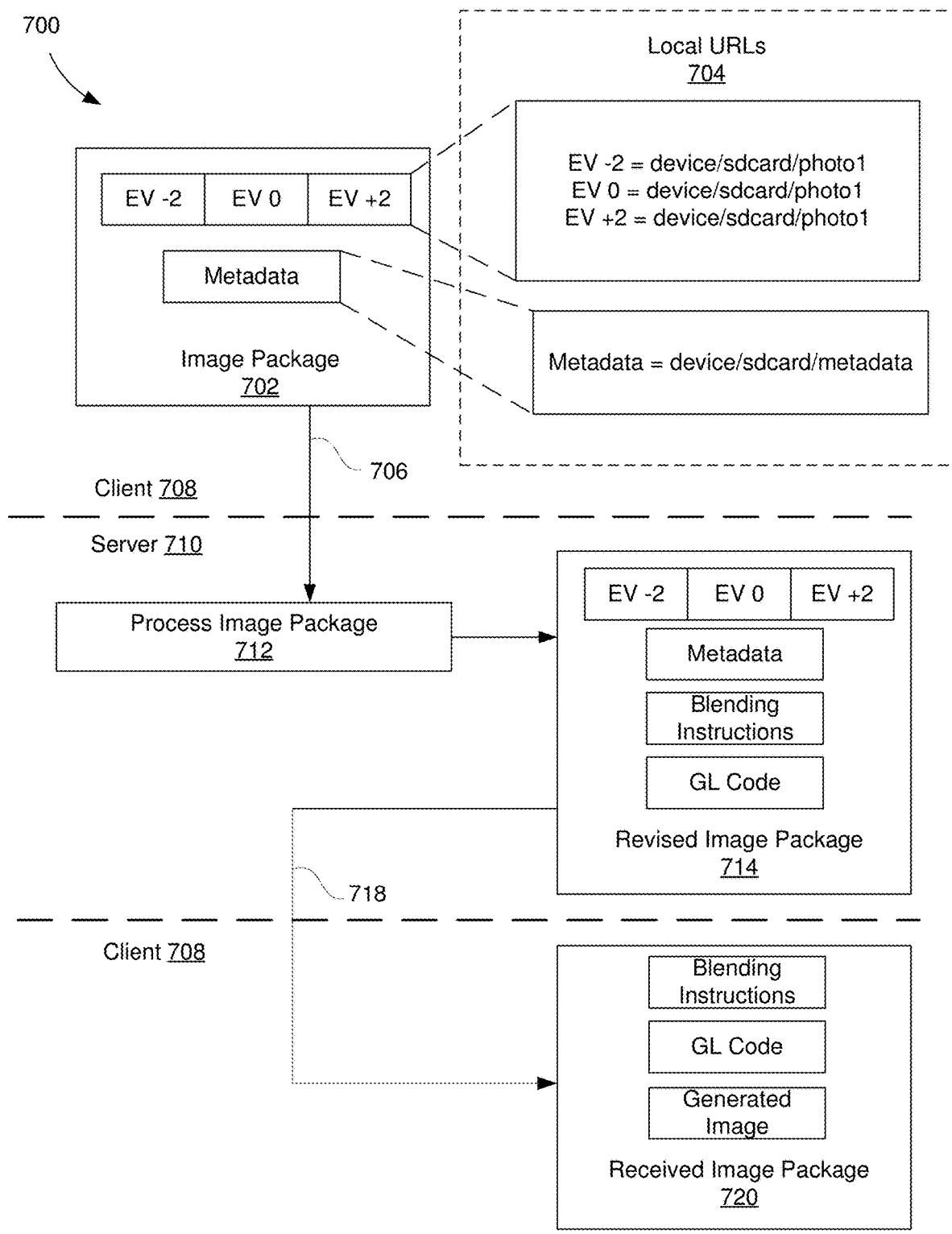
FIG. 7 illustrates a method for exchanging images, in accordance with another embodiment.

FIG. 7 illustrates a method 700 for exchanging images, in accordance with another embodiment. As an option, the method 700 may be carried out in the context of the details of any of the Figures disclosed herein. Of course, however, the method 700 may be carried out in any desired environment. Further, the aforementioned definitions may equally apply to the description below.

As shown, a client 708 may include a package 702. In one embodiment, the package 702 may include one or more images (e.g. EV−2, EV0, EV+2, etc.), metadata associated with the one or more images, metadata associated with the device (e.g. camera, mobile device, etc.), and/or any other pertinent data relating to the one or more images. In various embodiments, the package may include local URLs 704 which may provide a location for any of the resources (e.g. one or more images, metadata, etc.). The package is then sent 706 from a client 708 to a server 710.

In one embodiment, the package may be processed 712 which may include evaluating one or more images, metadata, and/or any of the data which is sent from the client device. In another embodiment, the processing may include taking an action (e.g. blend two or more images, enhance the one or more images, etc.).

As shown, a revised image package 714 may be created. In one embodiment, the revised image package may include blending instructions, code (e.g. GL code, etc.), a generated image (e.g. based on the one or more images, etc.), data necessary for a web application (e.g. full functionality web application, limited functionality web application, etc.), and/or any other information which may be associated with the one or more images.

In one embodiment, more than one revised package may be created or different revised packages may be created based on the original image package 702. For example, a revised package may be created for a limited functionality application, for a full functionality application, for a client which has one or more resources (e.g. local URLs, images, metadata, etc.), for a mobile-version web application, for a desktop-version web application, for a reduced size package, and/or any combination of the foregoing. As such, in some embodiments, multiple versions of an image package may be created. In some embodiments, the version of the revised image package created may depend on the intended destination. For example, in one embodiment, the end destination may include a user which pays for a premium service for access to more or all of the functions and controls of the web application. In such an embodiment, a revised image package may be created such that the end destination has full access to the functions and controls of the web application. Of course, in other embodiments, any type of revised image package may be created which may be associated with the intended destination in some manner.

As shown, the revised image package may be sent 718 from the server 710 to the client 708. Additionally, the received image package 720 may be received from the server.

In one embodiment, the received image package may not include those resources which are already provided for on the client device. For example, in various embodiments, a client device may include one or more images as well as associated metadata. As such, when the received image package is received from the server, the package may not include such resources, but only include those items which were not previously found on the client device. For example, one or more objects, resources, and/or code may have originated on the server device, and therefore would not be found on the original client device. As such, the revised image package may include those items which originated from the server device and which did not originally come from the client device. Of course, in other embodiments, the revised image package may include objects from any location (e.g. server, client, etc.).

In some embodiments, the received image package may be sent on a temporary basis to the client device. For example, in one embodiment, the received image package may be sent to the client for approval, after which the received image package may be publicly released. In other embodiments, an action may be taken (e.g. generate full resolution combined image, etc.), a full feature web application may be released (e.g. in response to being approve for premium features, etc.), and/or any other action may be taken in response to receiving feedback (e.g. approval, etc.) from the client.

Figure 8:
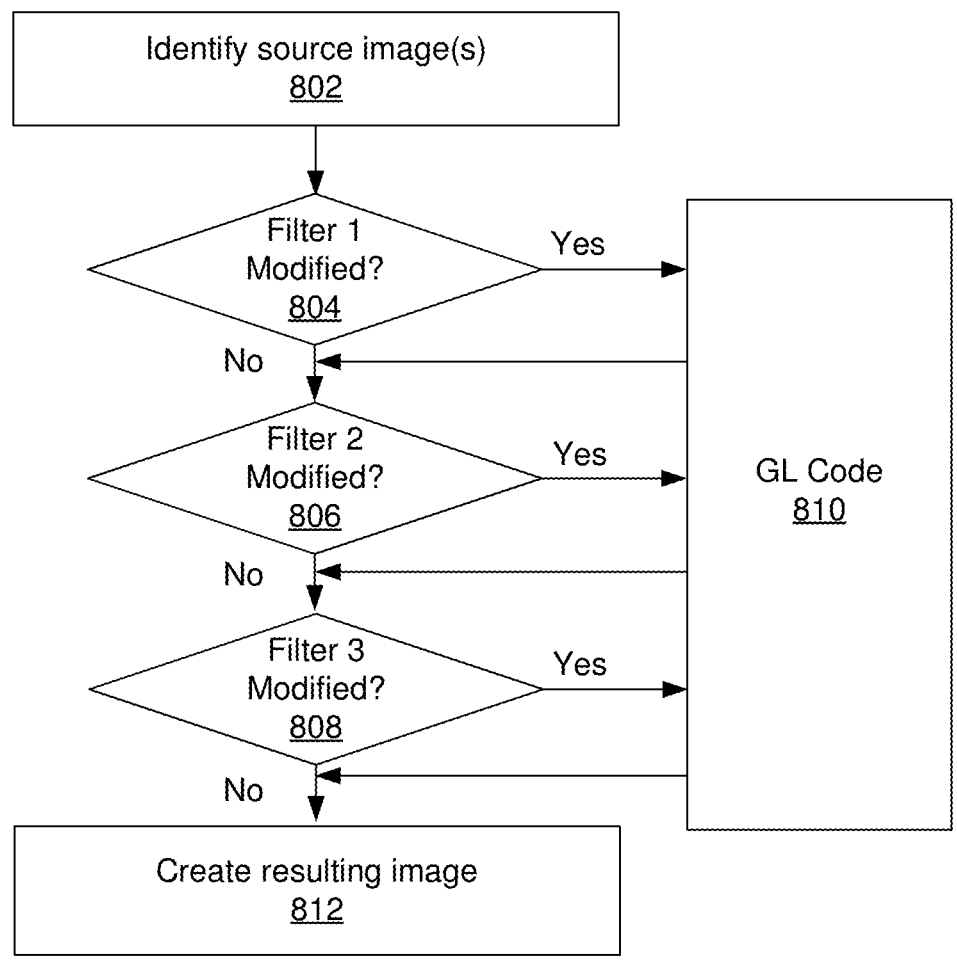
FIG. 8 illustrates a method for determining whether a filter is to be included in a pipeline, in accordance with another embodiment.

FIG. 8 illustrates a method 800 for determining whether a filter is to be included in a pipeline, in accordance with another embodiment. As an option, the method 800 may be implemented in the context of the details of any of the Figures disclosed herein. Of course, however, the method 800 may be implemented in any desired environment. Further, the aforementioned definitions may equally apply to the description below.

As shown, a method 800 may include identifying one or more source images. See operation 802. It is then determined whether filter 1 is modified, whether filter 2 is modified, and/or whether filer 3 is modified. See decisions 804, 806, 808. If it is determined that filter 1, filter 2, and/or filter 3 has been modified, then the input is sent to GL code. See object 810. Further, after input from GL Code has concluded, or if no filter is modified, then a resulting image is created. See operation 812.

In various embodiments, the image package 814 may be independent of other resources, such that when one or more inputs are received (e.g. a modification to filter 1, filter 2, filter 3, etc.), the image package can receive such inputs and provide an output without having to fetch and/or retrieve data or code from another source.

In some embodiments, filter 1, filter 2, filter 3, and/or any number of filters may relate to color modification and mapping (e.g., white balance, saturation, color selection, hue mapping, etc.), exposure, contrast, general level mapping, any sampling kernel filter, any mixing filter (e.g., of two or more input images), and/or any other parameter associated with an image. In other embodiments, an application (e.g. web application, etc.) may dictate what parameters should be applied for the filters. In one embodiment, a filter may be comprised of multiple parameters (e.g. white balance, exposure, warmth, etc.) wherein modification to one filter value may modify multiple parameters. In another embodiment, a filter may include a dehazing and/or a blurring operation.

In one embodiment, the image package 814 may be provided by a server to run locally on a client device. For example, in one embodiment, the GL code included in the image package may provide the functionality such that inputs may be received, modifications to the one or more images may occur (e.g. based on the inputs, etc.), and/or a resulting image may be created.

Figure 9:
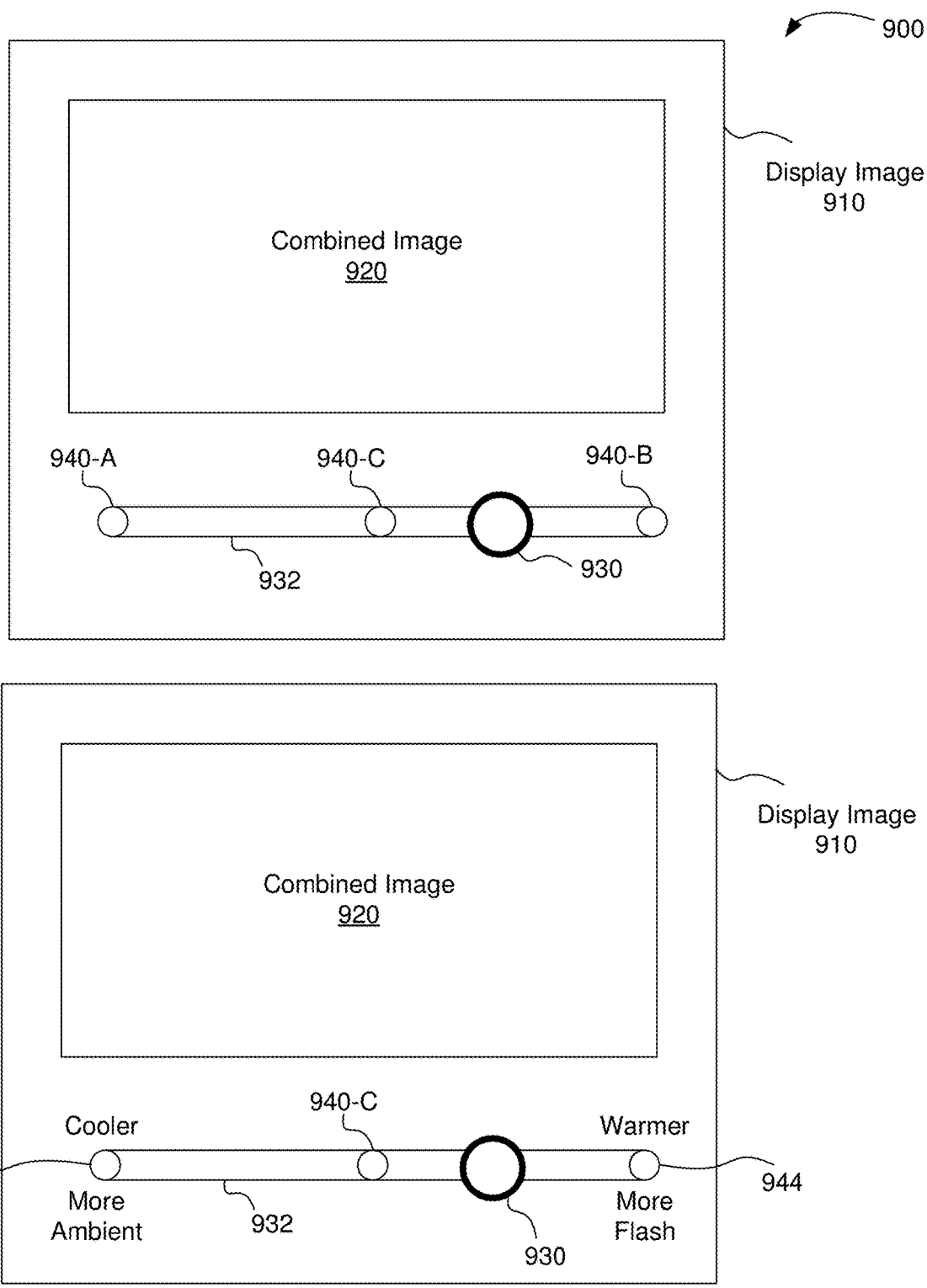
FIG. 9 illustrates a user interface (UI) system for generating a combined image, according to one embodiment of the present invention

FIG. 9 illustrates a user interface (UI) system 900 for generating a combined image 920, according to one embodiment of the present invention. As an option, the UI system 900 may be implemented in the context of the details of any of the Figures disclosed herein. Of course, however, the UI system 900 may be carried out in any desired environment. Further, the aforementioned definitions may equally apply to the description below.

In one embodiment, a combined image 920 comprises a combination of at least two related digital images. In one embodiment, the combined image 920 comprises, without limitation, a combined rendering of a first digital image and a second digital image. In another embodiment, the digital images used to compute the combined image 920 may be generated by amplifying an analog signal with at least two different gains, where the analog signal includes optical scene information captured based on an optical image focused on an image sensor. In yet another embodiment, the analog signal may be amplified using the at least two different gains on a pixel-by-pixel, line-by-line, or frame-by-frame basis.

In one embodiment, the UI system 900 presents a display image 910 that includes, without limitation, a combined image 920, a slider control 930 configured to move along track 932, and two or more indication points 940, which may each include a visual marker displayed within display image 910.

In one embodiment, the UI system 900 is generated by an adjustment tool executing within a processor complex 310 of a digital photographic system 300, and the display image 910 is displayed on display unit 312. In one embodiment, at least two digital images, such as the at least two related digital images, comprise source images for generating the combined image 920. The at least two digital images may reside within NV memory 316, volatile memory 318, memory subsystem 362, or any combination thereof. In another embodiment, the UI system 900 is generated by an adjustment tool executing within a computer system, such as a laptop computer or a desktop computer. The at least two digital images may be transmitted to the computer system or may be generated by an attached camera device. In yet another embodiment, the UI system 900 may be generated by a cloud-based server computer system, which may download the at least two digital images to a client browser, which may execute combining operations described below. In another embodiment, the UI system 900 is generated by a cloud-based server computer system, which receives the at least two digital images from a digital photographic system in a mobile device, and which may execute the combining operations described below in conjunction with generating combined image 920.

The slider control 930 may be configured to move between two end points corresponding to indication points 940-A and 940-B. One or more indication points, such as indication point 940-C may be positioned between the two end points. Each indication point 940 may be associated with a specific version of combined image 920, or a specific combination of the at least two digital images. In one embodiment, when the slider control 930 is positioned directly over the indication point 940-A, only the first digital image may be displayed as the combined image 920 in the display image 910, and similarly when the slider control 930 is positioned directly over the indication point 940-B, only the second digital image may be displayed as the combined image 920 in the display image 910.

In one embodiment, indication point 940-C may be associated with a blending of the first digital image and the second digital image. For example, when the slider control 930 is positioned at the indication point 940-C, the combined image 920 may be a blend of the first digital image and the second digital image. In one embodiment, blending of the first digital image and the second digital image may comprise alpha blending, brightness blending, dynamic range blending, and/or tone mapping or other non-linear blending and mapping operations. In another embodiment, any blending of the first digital image and the second digital image may provide a new image that has a greater dynamic range or other visual characteristics that are different than either of the first image and the second image alone. Thus, a blending of the first digital image and the second digital image may provide a new computed HDR image that may be displayed as combined image 920 or used to generate combined image 920. To this end, a first digital signal and a second digital signal may be combined, resulting in at least a portion of a HDR image. Further, one of the first digital signal and the second digital signal may be further combined with at least a portion of another digital image or digital signal. In one embodiment, the other digital image may include another HDR image.

In one embodiment, when the slider control 930 is positioned at the indication point 940-A, the first digital image is displayed as the combined image 920, and when the slider control 930 is positioned at the indication point 940-B, the second digital image is displayed as the combined image 920; furthermore, when slider control 930 is positioned at indication point 940-C, a blended image is displayed as the combined image 920. In such an embodiment, when the slider control 930 is positioned between the indication point 940-A and the indication point 940-B, a mix (e.g. blend) weight may be calculated for the first digital image and the second digital image. For the first digital image, the mix weight may be calculated as having a value of 0.0 when the slider control 930 is at indication point 940-B and a value of 1.0 when slider control 930 is at indication point 940-A, with a range of mix weight values between 0.0 and 1.0 located between the indication points 940-B and 940-A, respectively. Referencing the mix operation, the mix weight may be calculated as having a value of 0.0 when the slider control 930 is at indication point 940-A and a value of 1.0 when slider control 930 is at indication point 940-B, with a range of mix weight values between 0.0 and 1.0 located between the indication points 940-A and 940-B, respectively.

In one embodiment, a mix operation may be applied to the first digital image and the second digital image based upon at least one mix weight value associated with at least one of the first digital image and the second digital image. In one embodiment, a mix weight of 1.0 gives complete mix weight to the digital image associated with the 1.0 mix weight. In this way, a user may blend between the first digital image and the second digital image. To this end, a first digital signal and a second digital signal may be blended in response to user input. For example, sliding indicia may be displayed, and a first digital signal and a second digital signal may be blended in response to the sliding indicia being manipulated by a user.

This system of mix weights and mix operations provides a UI tool for viewing the first digital image, the second digital image, and a blended image as a gradual progression from the first digital image to the second digital image. In one embodiment, a user may save a combined image 920 corresponding to an arbitrary position of the slider control 930. The adjustment tool implementing the UI system 900 may receive a command to save the combined image 920 via any technically feasible gesture or technique. For example, the adjustment tool may be configured to save the combined image 920 when a user gestures within the area occupied by combined image 920. Alternatively, the adjustment tool may save the combined image 920 when a user presses, but does not otherwise move the slider control 930. In another implementation, the adjustment tool may save the combined image 920 when a user gestures, such as by pressing a UI element (not shown), such as a save button, dedicated to receive a save command.

To this end, a slider control may be used to determine a contribution of two or more digital images to generate a final computed image, such as combined image 920. Persons skilled in the art will recognize that the above system of mix weights and mix operations may be generalized to include two or more indication points, associated with two or more related images without departing the scope and spirit of the present invention. Such related images may comprise, without limitation, any number of digital images that have been generated using a same analog signal to have different brightness values, which may have zero interframe time.

Furthermore, a different continuous position UI control, such as a rotating knob, may be implemented rather than the slider 930 to provide mix weight input or color adjustment input from the user.

Of course, in other embodiments, other user interfaces may be used to receive input relating to selecting one or more points of interest (e.g. for focus, for metering, etc.), adjusting one or more parameters associated with the image (e.g. white balance, saturation, exposure, etc.), and/or any other input which may affect the image in some manner.

As shown, in a particular embodiment, the UI System 900 may include an indication point for cooler/more ambient 942 and/or warmer/more flash 944. Of course, one or more indication points may be used for any parameter.

In one embodiment, the cooler/more ambient indication point 942 may control an exposure value, a white balance, a warmth (e.g. temperature, etc.), a blending priority for the ambient photo, etc. In other embodiments, the warmer, more flash indication point 944 may control an exposure value, a white balance, a warmth (e.g. temperature, etc.) a blending priority for the flash photo, etc. Of course, in one embodiment, any combination of parameters may be used and/or controlled by a single indication point.

In another embodiment, an indication point may include one or more parameters. Still yet, in one embodiment, an advanced user may expand the slider to display each parameter associated with the indication point. For example, in one embodiment, a slider may be expanded to display an individual slider associated with each parameter related to the indication point. For example, in one embodiment, an indication point may control, in combination, an exposure value, a white balance, a warmth, and a blending priority. In one embodiment, such parameters may be expanded such that an individual slider may be displayed for each of an exposure value, a white balance, a warmth, and a blending priority. In this manner, an advanced user may have fine-grain control over how parameters are implemented. Nonetheless, in some embodiments, the default settings associated with the indication (having the parameters in combination, etc.) may be associated with optimized settings (e.g. based on the type of photos, camera, date, time, etc.).

Figure 10:
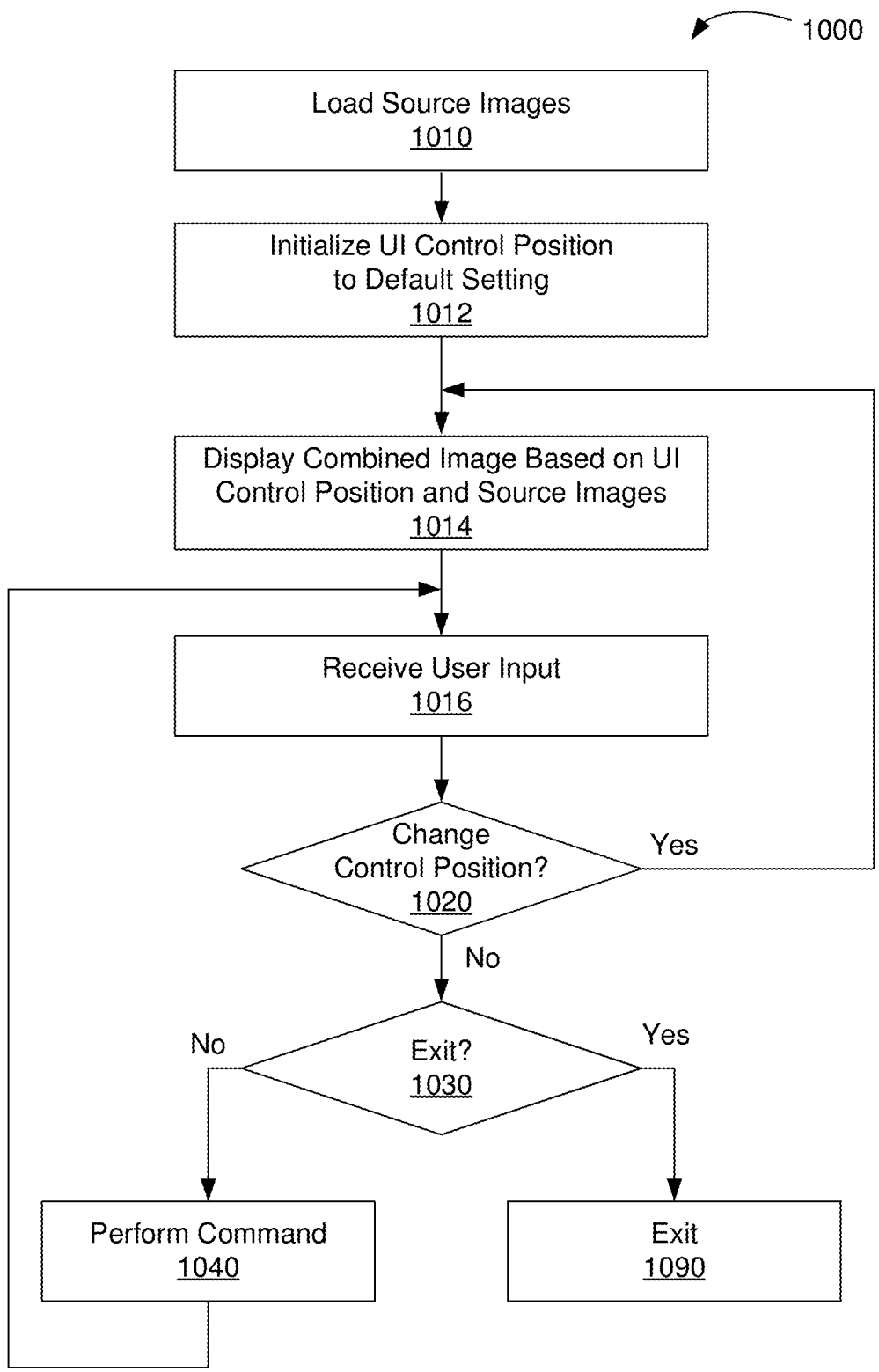
FIG. 10 is a method for generating a combined image, according to one embodiment of the present invention.

FIG. 10 is a method 1000 for generating a combined image, according to one embodiment of the present invention. As an option, the method 1000 may be carried out in the context of the details of any of the Figures disclosed herein. Of course, however, the method 1000 may be carried out in any desired environment. Further, the aforementioned definitions may equally apply to the description below.

The method 1000 begins in step 1010, where an adjustment tool executing within a processor complex, such as processor complex 310, loads at least two related source images, such as the first digital image and the second digital image described in the context of FIG. 9. In step 1012, the adjustment tool initializes a position for a UI control, such as slider control 930 of FIG. 9, to a default setting. In one embodiment, the default setting comprises an end point, such as indication point 940-A, for a range of values for the UI control. In another embodiment, the default setting comprises a calculated value based on one or more of the at least two related source images. In certain embodiments, the default setting is initialized to a value previously selected by a user in association with an image object comprising at least the first digital image and the second digital image.

In step 1014, the adjustment tool generates and displays a combined image, such as combined image 920 of FIG. 9, based on a position of the UI control and the at least two related source images. In one embodiment, generating the combined image comprises mixing the at least two related source images as described previously in FIG. 9. In step 1016, the adjustment tool receives user input. The user input may include, without limitation, a UI gesture such as a selection gesture or click gesture within display image 910. If, in step 1020, the user input should change the position of the UI control, then the adjustment tool changes the position of the UI control and the method proceeds back to step 1014. Otherwise, the method proceeds to step 1030.

If, in step 1030, the user input does not comprise a command to exit, then the method proceeds to step 1040, where the adjustment tool performs a command associated with the user input. In one embodiment, the command comprises a save command and the adjustment tool then saves the combined image, which is generated according to a position of the UI control. The method then proceeds back to step 1016.

Returning to step 1030, if the user input comprises a command to exit, then the method terminates in step 1090, where the adjustment tool exits, thereby terminating execution.

Of course, in various embodiments, the adjustment tool may be used to blend one or more points of interest, one or more white-balance points, and/or any other parameter associated with the image. In some embodiments, the adjustment tool may relate to a full scene (e.g. entire image, etc.) associated with two or more images. In other embodiments, the adjustment tool may relate to a subset (e.g. a particular point(s), etc.) of the image.

Figure 11:
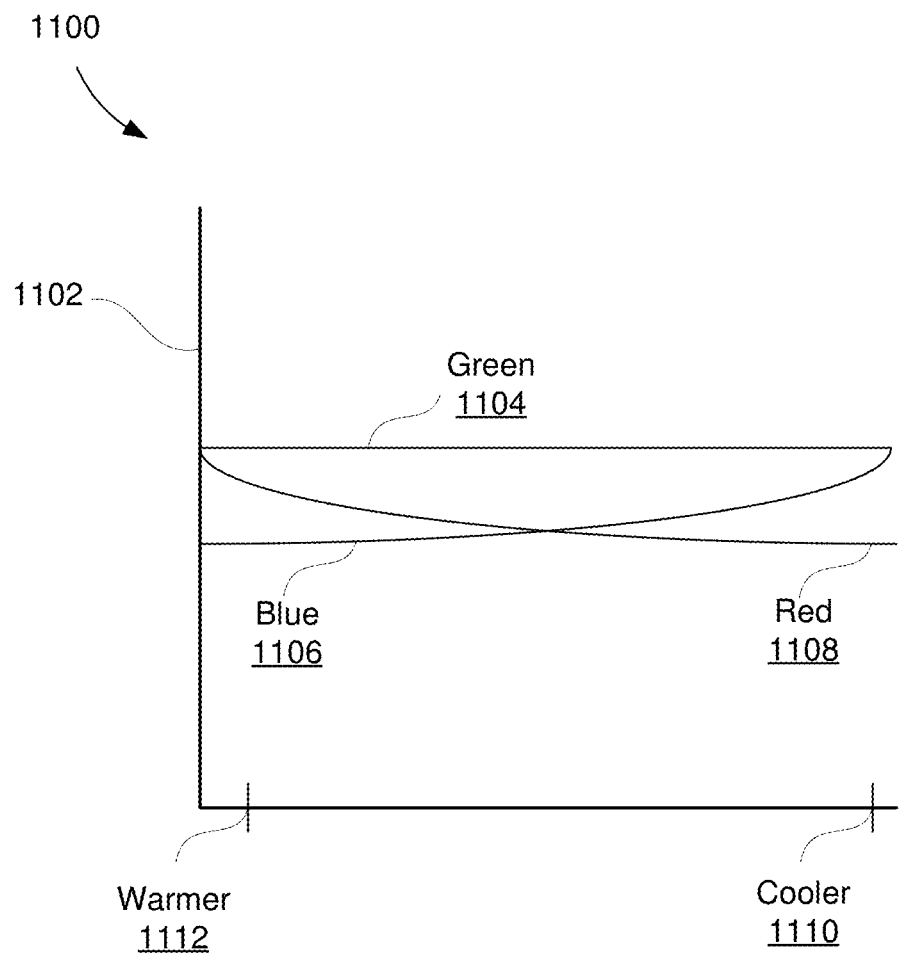
FIG. 11 illustrates a color adjustment graph for altering a color associated with an image, according to one embodiment of the present invention.

FIG. 11 illustrates a color adjustment graph 1100 for altering a color associated with an image, according to one embodiment of the present invention. As an option, the color operation 1100 may be implemented in the context of the details of any of the Figures disclosed herein. Of course, however, the color operation 1100 may be implemented in any desired environment. Further, the aforementioned definitions may equally apply to the description below.

As shown, a color adjustment graph 1102 is included. The color adjustment graph 1102 may include a first color curve, green 1104, a second color curve, blue 1106, and a third color curve, red 1108. Further, a cooler indication point 1110 and a warmer 1112 may be included.

In various embodiments, the color adjustment graph 1102 may relate to color adjustment, including, but not limited to, white balance, warming/cooling, saturation, temperature, color scheme (e.g. b&w, sepia, etc.), selective color schemes (e.g. only display color red, etc.), etc. In one embodiment, the horizontal axis may represent a color adjustment value. Additionally, as shown in one embodiment, as the color adjustment values decrease, the color tone warms (more red, less blue), whereas as the color adjustment values increase, the color tone cools (more blue, less red). In one embodiment, blue and red values may intersect horizontally directly in the middle of the color adjustment graph.

In one embodiment, the vertical axis represents color adjustment values associated with red, green, and blue. The horizontal axis may represent an input value, such as a value corresponding to a position of slider control 930. A red curve 1108 represents a red adjustment value (Cr), a green curve 1104 represents a green adjustment value (Cg), and the blue curve 1106 represents a blue adjustment value (Cb). As shown, Cr is reduced as the input value ranges towards a cooler direction 1110, while Cb is reduced as the input value ranges towards the warmer direction 1112. Each color channel (red, greed, blue) of each pixel within an image may be multiplied by a corresponding adjustment value (Cr, Cg, Cb) to yield a color-adjusted image. A cooler color-adjusted image is produced when the user input ranges towards the cooler direction 1110, while a warmer color-adjusted image is produced when the user input ranges towards the warmer direction 1112.

Figure 12:
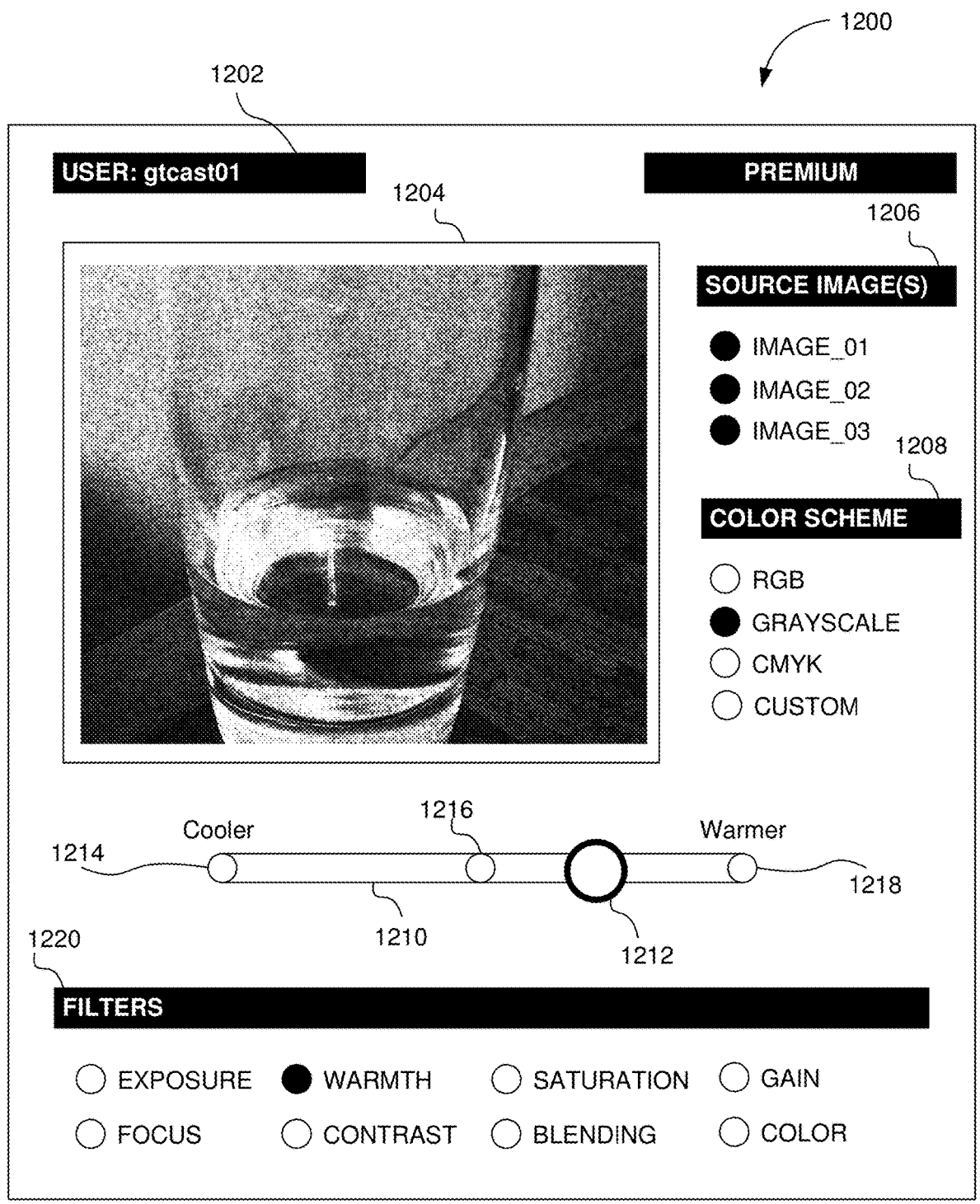
FIG. 12 illustrates a user interface (UI) for a first user, according to one embodiment of the present invention.

FIG. 12 illustrates a user interface (UI) 1200 for a first user, according to one embodiment of the present invention. As an option, the UI 1200 may be implemented in the context of the details of any of the Figures disclosed herein. Of course, however, the UI 1200 may be implemented in any desired environment. Further, the aforementioned definitions may equally apply to the description below.

As shown, user interface 1200 may include a user identification 1202, a resulting image 1204, source image(s) selection 1206, color scheme(s) selection 1208, slider 1210, slider control 1212, a first indication point 1214, a second indication point 1218, a middle indication point 1216, and filter(s) selection 1220.

In one embodiment, the user interface 1200 may be presented for a first user, including, for example, a paying user, for premium access, and/or a for a full feature web application, etc. In various embodiments, such an user interface may be adapted for mobile use and/or desktop use.

In various embodiments, a user identification may include any identification relating to a user, including a name, a username, an account id, and/or any other identification. In one embodiment, a resulting image may include a generated image (e.g. from a server, based on modifications from one or more inputs, etc.), a blended image (e.g. from two or more images, etc.), and/or any other image associated with an image package.

In one embodiment, source image(s) selection may include the ability to select which images are used as the basis for processing (e.g. mixing, blending, etc.). For example, in one embodiment, a first image may be an ambient image, and the second and third images may be flash images. The user may select to only include one of the two flash images.

In various embodiments, color scheme may include RGB, grayscale, CMYK, and/or a custom color scheme. Of course, in other embodiments, any color scheme may be included. Additionally, in one embodiment, the slider may be associated with a filter. For example, in one embodiment, a filter may include exposure, focus, warmth, contrast, saturation, blending, gain, and/or color. Of course, in other embodiments, a filter may include other parameters associated with manipulating and/or adjusting the image. Based off of the selection of the filter, the slider may adjust and/or change accordingly. In one embodiment, a selection of warmth may cause a slider to display "cooler" to one side and "warmer" to the other side.

In another embodiment, selection of a filter may cause modification of multiple parameters. For example, in one embodiment, a selection of warmth may cause a slider to display "cooler" and/or "more ambient" on one side and "warmer" and/or "more flash" to the other. Of course, any parameters in combination may be used and manipulated by a single slider. In another embodiment, if multiple parameters are controlled by a single slider, an option may be presented to display multiple sliders, one for each parameter which is being controlled in combination.

Figure 13:
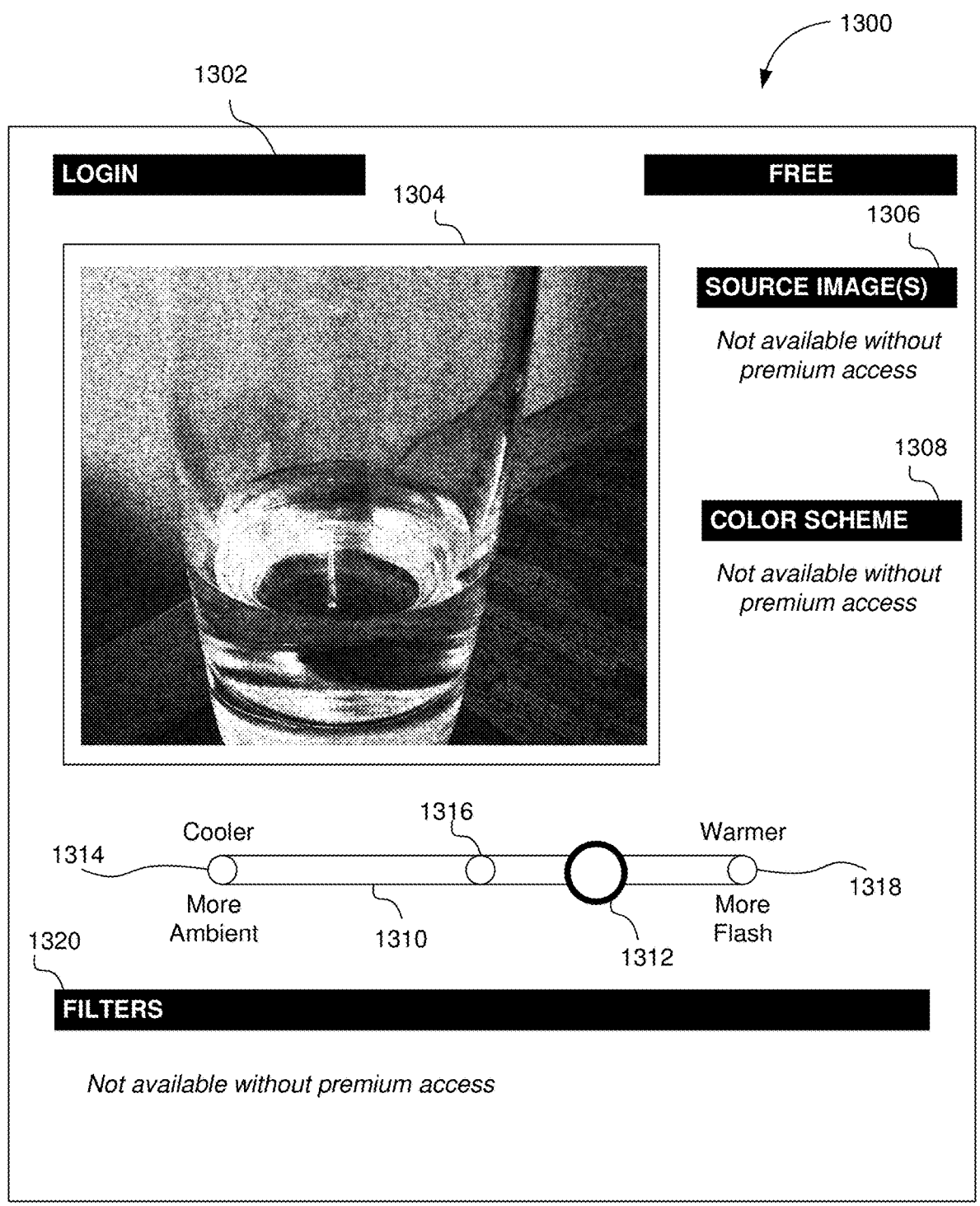
FIG. 13 illustrates a user interface (UI) for a second user, according to one embodiment of the present invention.

FIG. 13 illustrates a user interface (UI) 1300 for a second user, according to one embodiment of the present invention. As an option, the UI 1300 may be implemented in the context of the details of any of the Figures disclosed herein. Of course, however, the UI 1300 may be implemented in any desired environment. Further, the aforementioned definitions may equally apply to the description below.

As shown, user interface 1300 may include a user identification 1302, a resulting image 1304, source image(s) selection 1306, color scheme(s) selection 1308, slider 1310, slider control 1312, a first indication point 1314, a second indication point 1318, a middle indication point 1316, and filter(s) selection 1320.

In one embodiment, the user interface 1300 may be presented for a second user, including, for example, a non-paying user, for free access, and/or for a limited feature web application, etc. In various embodiments, such a user interface may be adapted for mobile use and/or desktop use. As shown, one or more features may be disabled due to the user interface 1300 being of limited features. For example, source image(s) selection, color scheme(s) selection, and filter(s) selection may indicate "Not available without premium access."

In one embodiment, the slider may alter one or more parameters associated with the image. In another embodiment, the slider may alter the warmth and/or control the blending associated with an image. As an example, the slider may display "cooler" and "more ambient" to one side and "warmer" and "more flash" to the other side. Additionally, in one embodiment, because the user interface is of limited functionality, the user may not have the ability to separate the slider into separate sliders for each of the parameters included in the general slider (unlike the full functionality application which may do so). Of course, however, in other embodiments, any of the functionality of the limited feature application may be restricted in any manner. In one embodiment, such restrictions may be defined in the image package sent from the server.

One advantage of the present invention is that a digital photograph may be selectively generated based on user input using two or more different exposures of a single capture of a photographic scene. Accordingly, the digital photograph generated based on the user input may have a greater dynamic range than any of the individual exposures.

Traditional techniques for generating a HDR photograph involve significant computational resources, as well as produce artifacts which reduce the image quality of the resulting image. Accordingly, strictly as an option, one or more of the above issues may or may not be addressed utilizing one or more of the techniques disclosed herein.

Still yet, in various embodiments, one or more of the techniques disclosed herein may be applied to a variety of markets and/or products. For example, although the techniques have been disclosed in reference to a photo capture, they may be applied to televisions, web conferencing (or live streaming capabilities, etc.), security cameras (e.g. increase contrast to determine characteristic, etc.), automobiles (e.g. driver assist systems, in-car infotainment systems, etc.), and/or any other product which includes a camera input.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Embodiments of the present invention enable a wireless mobile device to share a dynamic image object (DIO), thereby enabling a recipient to modify their view of an image generated from the DIO using a DIO viewer that is configured to include an interactive user interface (UI) control. In certain embodiments, the DIO viewer may comprise an independent application program. In other embodiments, the DIO viewer may be implemented as a feature of another application having additional features. In one embodiment, the wireless mobile device may be configured to cause a data service system to generate a DIO by processing one or more digital images transmitted from the wireless mobile device to the data service system.

In one embodiment, a DIO may comprise a data object configured to include at least two digital images and may include metadata associated with the at least two digital images. In one embodiment, the metadata may include information related to generating a display image based on combining the at least two digital images. The metadata may also include one or more functions used to generate the display image, an additional image used to generate the display image, or any combination thereof. In another embodiment, a DIO may comprise a data object configured to include one digital image and metadata that may include one or more functions used to generate a display image from the one digital image. The DIO construct is described in greater detail below in FIGS. 14-4A-14-4C.

In one embodiment, a given DIO may be presented to a user through the wireless mobile device executing a DIO viewer and, optionally, presented similarly to other users through different wireless mobile devices or through any other technically feasible computing devices. While certain embodiments are described in conjunction with a wireless mobile device, other embodiments employing different technically feasible computing devices configured to implement the techniques taught herein are within the scope and spirit of the present invention.

Figures 1A, 14:
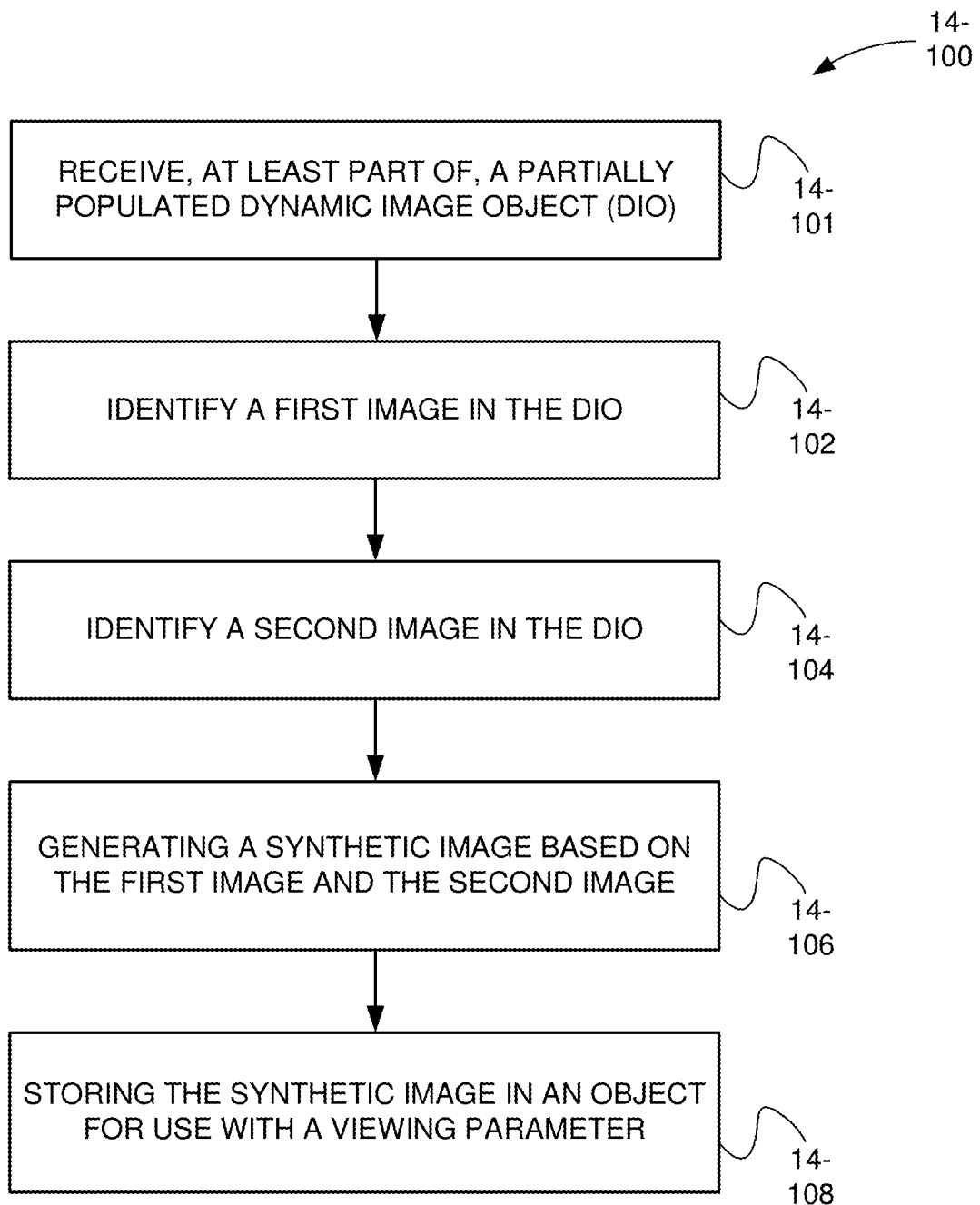
FIG. 14-1A shows a method for storing a synthetic image in an object, in accordance with one embodiment.

FIG. 14-1A shows a method 14-100 for storing a synthetic image in an object, in accordance with one embodiment. As an option, the method 14-100 may be implemented in the context of the details of any of the Figures. Of course, however, the method 14-100 may be carried out in any desired environment. Further, the aforementioned definitions may equally apply to the description below.

As shown, at least part of a partially populated dynamic image object (DIO) is received. See operation 14-101. Next, a first image is identified in the DIO. See operation 14-102. Additionally, a second image is identified in the DIO. See operation 14-104. Further, a synthetic image is generated based on the first image and the second image. See operation 14-106. Still yet, the synthetic image is stored in an object for use with a viewing parameter. See operation 14-108.

In various embodiments, the first image may be an ambient image and the second image may be a flash image. Of course, in other embodiments, the first image and the second image may be any type of image.

In the context of the present description, a synthetic image includes any image that is based on a combination of at least two input images. In one optional embodiment, such combination may be accomplished utilizing an image synthesis algorithm, and/or any process capable of combining two images together.

In some embodiments, the object used for storing the synthetic image may include a dynamic image object. Additionally, in other embodiments, the object may store the first image, the second image, metadata, image metadata (e.g. data associated with the first image and/or second image (and/or any other image), etc.), view behavior metadata, generation behavior metadata, and/or any other information or data which may relate to any of the images in some manner.

In one embodiment, the first image or the second image may be used to produce at least one processed image. In another embodiment, the processed image may be stored in the object.

In the context of the present description, a viewing parameter includes any parameter that is used to view an image. In one embodiment, a viewing parameter may be used to view a synthetic image, a processed image, the first image, the second image, and/or any other image. In another embodiment, the viewing parameter may be user selectable. In one embodiment, the viewing parameter may include device type, screen size, processor type, amount of RAM, input type, and/or any other feature which may affect how the image (e.g. synthetic image, etc.) is displayed.

In various embodiments, operating parameters associated with the viewing parameter may include an ability to control a blend (or mix) between a first image and a second image (and/or any number of images), an exposure, a brightness, a color, a contrast, a sharpness, a filter (e.g. watercolor, color-selection, etc.), a saturation, and/or any other feature which may alter the resulting image in some manner.

Still yet, in one embodiment, a second synthetic image may be generated based on the first synthetic image and at least one of the first image or the second image. Of course, any number of synthetic images may be created based on any previously created synthetic images and/or based on a combination of a previously created synthetic image and the first image or the second image or another image. In one embodiment, the second synthetic image may be stored in the object for use with a viewing parameter.

In one embodiment, the object for use with a viewing parameter may be accessible over a network. For example, in one embodiment, the object may be stored initially on a mobile device. In some embodiments, the mobile device may only store the object for a limited duration. In other embodiments, the object may be sent to a server and transmitted via a network.

In another embodiment, identifying the first image may include receiving the first image utilizing at least one server. In one embodiment, the identifying the second image may include includes receiving the second image utilizing the at least one server. Further, in one embodiment, the synthetic image may be generated and stored utilizing the at least one server. In an additional embodiment, the synthetic image may be generated and stored utilizing at least one client.

In one embodiment, application code may be provided for utilizing the object to generate an output image, such that the viewing parameter may be capable of being adjusted utilizing the application code.

Figures 1B, 14:
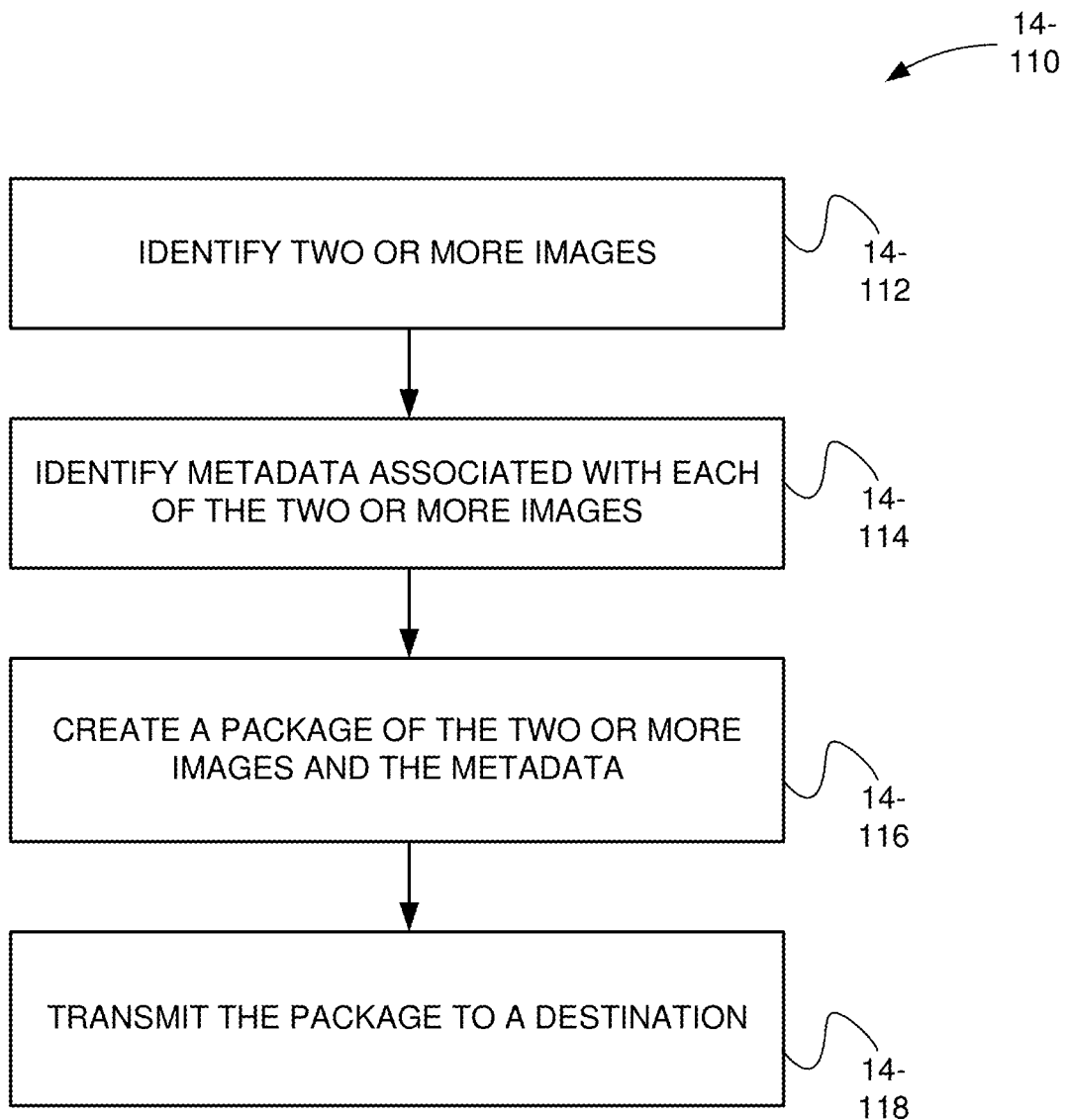

FIG. 14-1B shows a method 14-110 for transmitting a package to a destination, in accordance with one embodiment. As an option, the method 14-110 may be implemented in the context of the details of any of the Figures. Of course, however, the method 14-110 may be carried out in any desired environment. Further, the aforementioned definitions may equally apply to the description below.

As shown, two or more images are identified. See operation 14-112. Additionally, metadata associated with each of the two or more images is identified. See operation 14-114. Further, a package of the two or more images and the metadata is created. See operation 14-116. Lastly, the package is transmitted to a destination. See operation 14-118.

In one embodiment, the metadata associated with each image may include data associated with the image (e.g. resolution of image, color of image, compression type, etc.), the camera (e.g. model, processor type, etc.), the lens (e.g. make, model, etc.), the user (e.g. past behavior interacting with images and/or the image system, etc.), connections associated with the user (e.g. via a social network, etc.), and/or any other data which may affect the image in some manner.

In various embodiments, creating a package may include creating local URLs and/or paths associated with data on the originating device. In this manner, if the package is sent back to the original user at a later time, the revised package may include only that data (e.g. revised photo, etc.) which was not originally included in the package. In another embodiment, URLs and/or paths may be created associated with cloud-based information. For example, in one embodiment, data for rectifying chromatic aberrations associated with a particular lens may be stored in the cloud, and may be accessed using a path and/or URL associated with the identified lens.

In one embodiment, the package may be transmitted immediately upon completion. In other embodiments, the package may be transmitted based on bandwidth availability, data allocation (e.g. whether the user has already used up a set amount of network connectivity, etc.), user connections (e.g. via social network, etc.), and/or any other threshold or trigger associated with the user, device, and/or image.

Figures 1C, 14:
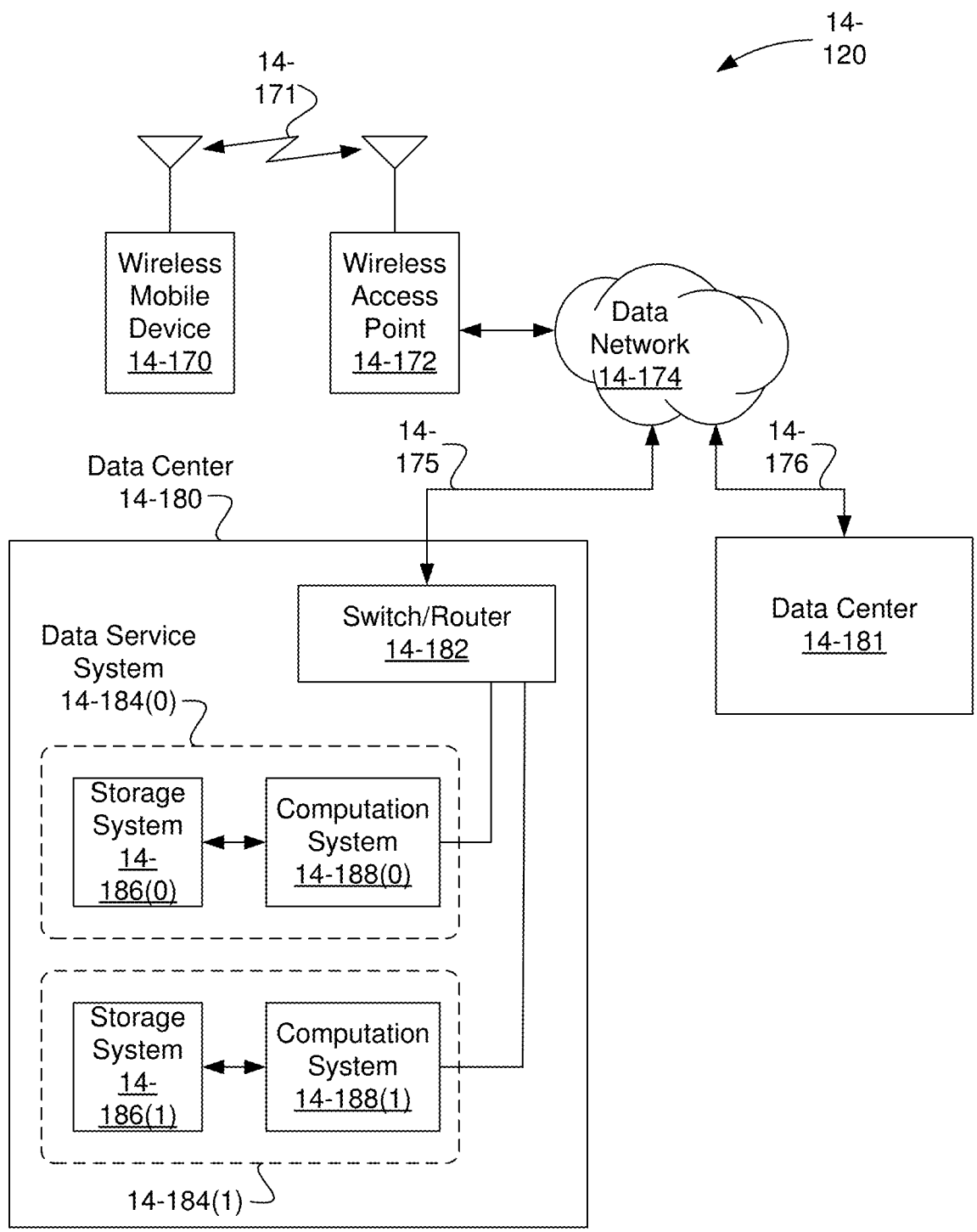

FIG. 14-1C illustrates a network service system 14-120, configured to implement one or more aspects of the present invention. As shown, network service system 14-120 includes a wireless mobile device 14-170, a wireless access point 14-172, a data network 14-174, and a data center 14-180. Wireless mobile device 14-170 communicates with wireless access point 14-172 via a digital radio link 14-171 to send and receive digital data, including data associated with digital images. Wireless mobile device 14-170 and wireless access point 14-172 may implement any technically feasible transmission techniques for transmitting digital data via digital radio link 14-171 without departing the scope and spirit of the present invention.

Wireless mobile device 14-170 may comprise a smart phone configured to include a digital camera, a digital camera configured to include wireless connectivity, a reality augmentation device, a laptop configured to include a digital camera and wireless connectivity, or any other technically feasible computing device configured to include a digital camera and wireless connectivity.

Wireless access point 14-172 is configured to communicate with wireless mobile device 14-170 via digital radio link 14-171 and to communicate with data network 14-174 via any technically feasible transmission media, such as any electrical, optical, or radio transmission media. For example, wireless access point 14-172 may communicate with data network 14-174 through an optical fiber coupled to wireless access point 14-172 and to a router system or a switch system within data network 14-174. A network link 14-175, such as a wide area network (WAN) link, is configured to transmit data between data network 14-174 and a data center 14-180.

In various embodiments, data network 14-174 may include routers, switches, long-haul transmission systems, provisioning systems, authorization systems, and any technically feasible combination of communications and operations subsystems configured to convey data between network endpoints, such as between wireless access point 14-172 and data center 14-180. Additionally, wireless mobile device 14-170 may comprise one of a plurality of wireless mobile devices configured to communicate with data center 14-180 via one or more wireless access points coupled to data network 14-174.

Data center 14-180 may include, without limitation, a switch/router 14-182 and at least one data service system 14-184. Switch/router 14-182 is configured to forward data traffic between and among network link 14-175, and each data service system 14-184. Switch/router 14-182 may implement any technically feasible transmission techniques, such as Ethernet media layer transmission, layer 2 switching, layer 3 routing, and the like. Switch/router 14-182 may comprise one or more individual systems configured to transmit data between data service systems 14-184 and data network 14-174. In one embodiment, switch/router 14-182 implements session-level load balancing among plural data service systems 14-184.

In one embodiment, each data service system 14-184 may include at least one computation system 14-188 and may also include one or more storage systems 14-186. In another embodiment, each computation system 14-188 may comprise one or more processing unit, such as a central processing unit, a graphics processing unit, or any combination thereof. A given data service system 14-184 may be implemented as a physical system comprising one or more physically distinct systems configured to operate together. Alternatively, a given data service system 14-184 may be implemented as a virtual system comprising one or more virtual systems executing on an arbitrary physical system. In certain scenarios, data network 14-174 is configured to transmit data between data center 14-180 and another data center 14-181, such as through network link 14-176.

Still yet, in some embodiments, network service system 14-120 may be described in specific terms herein, but any system of wireless mobile devices configured to communicate with one or more data service systems may be configured to implement one or more embodiments of the present invention. Certain embodiments of the present invention may be practiced with a peer-to-peer network, such as an ad-hoc wireless network established between two different mobile wireless devices. In such embodiments, digital image data may be transmitted between two mobile wireless devices without having to send the digital image data to data center 14-180.

Figures 2A, 14:
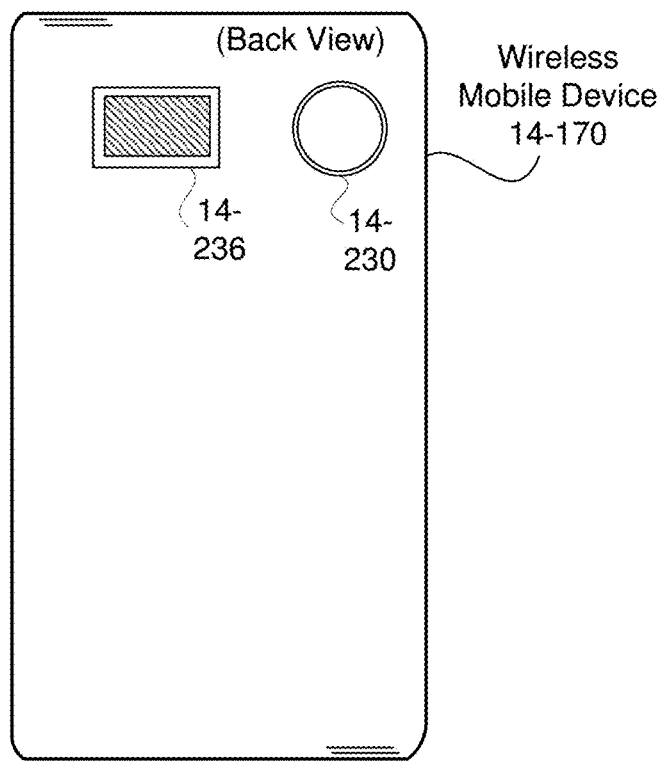

FIG. 14-2A illustrates a back view of wireless mobile device 14-170, comprising a digital camera 14-230, according to one embodiment of the present invention. Wireless mobile device 14-170 may also include a strobe unit 14-236, configured to generate illumination. In certain settings, strobe unit 14-236 may be activated to generate illumination while digital camera 14-230 generates a digital image by sampling a scene.

Figures 2B, 14:
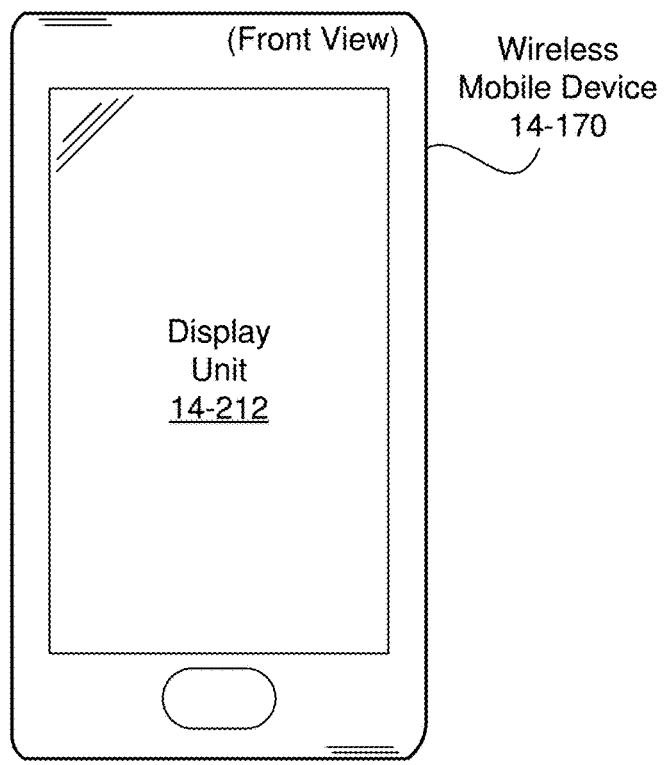

FIG. 14-2B illustrates a front view of wireless mobile device 14-170, according to one embodiment of the present invention. As shown, wireless mobile device 14-170 may include a display unit 14-212, configured to display image data, such as image data associated with images sampled by digital camera 14-230. Display unit 14-212 may also display user interface elements, such as a UI control, associated with software applications configured to execute on wireless mobile device 14-170, and the like.

Figures 2C, 14:
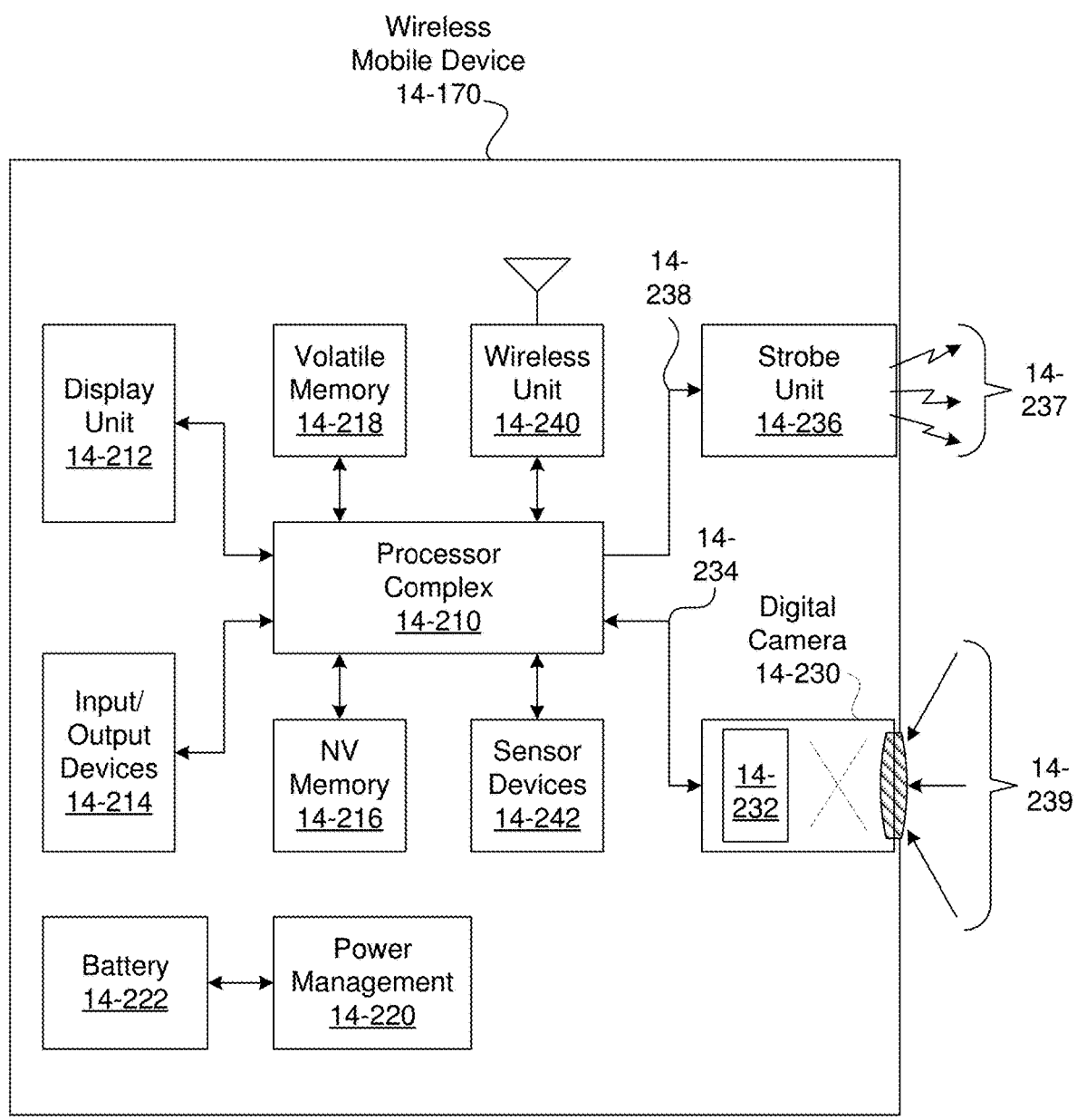

FIG. 14-2C illustrates a block diagram of wireless mobile device 14-170, according to one embodiment of the present invention. Wireless mobile device 14-170 may include a processor complex 14-210 coupled to digital camera 14-230. Wireless mobile device 14-170 may also include, without limitation, a display unit 14-212, a set of input/output devices 14-214, non-volatile memory 14-216, volatile memory 14-218, a wireless unit 14-240, and sensor devices 14-242, coupled to processor complex 14-210. In one embodiment, a power management subsystem 14-220 is configured to generate appropriate power supply voltages for each electrical load element within wireless mobile device 14-170, and a battery 14-222 is configured to supply electrical energy to power management subsystem 14-220. Battery 14-222 may implement any technically feasible battery, including primary or rechargeable battery technologies. Alternatively, battery 14-222 may be implemented as a fuel cell, or a high capacity electrical capacitor.

Processor complex 14-210 may include one or more central processing unit (CPU) core, one or more graphics processing unit (GPU), a memory controller coupled to memory subsystems such as volatile memory 14-218 and NV memory 14-216, a frame buffer controller coupled to display unit 14-212, and peripheral controllers coupled to input/output devices 14-214, sensor devices, and the like. Processor complex 14-210 may be configured to execute an operating system and an application program. The application program may include programming instructions directed to a CPU execution model, programming instructions directed to a GPU execution model, or any technically feasible combination thereof. In one embodiment the operating system is loaded for execution from NV memory 14-216.

In one embodiment, strobe unit 14-236 is integrated into wireless mobile device 14-170 and configured to provide strobe illumination 14-237 that is synchronized with an image capture event performed by digital camera 14-230. In an alternative embodiment, strobe unit 14-236 is implemented as an independent device from wireless mobile device 14-170 and configured to provide strobe illumination 14-237 that is synchronized with an image capture event performed by digital camera 14-230. Strobe unit 14-236 may comprise one or more LED devices, one or more Xenon cavity devices, one or more instances of another technically feasible illumination device, or any combination thereof. In one embodiment, strobe unit 14-236 is directed to either emit illumination or not emit illumination via a strobe control signal 14-238, which may implement any technically feasible signal transmission protocol. Strobe control signal 14-238 may also indicate an illumination intensity level for strobe unit 14-236.

In one usage scenario, strobe illumination 14-237 comprises at least a portion of overall illumination in a scene being photographed by digital camera 14-230. Optical scene information 14-239, which may include strobe illumination 14-237 reflected or reemitted from objects in the scene, is focused onto an image sensor 14-232 as an optical image. Image sensor 14-232, within digital camera 14-230, generates an electronic representation of the optical image. The electronic representation comprises spatial color intensity information, which may include different color intensity samples for red, green, and blue light. In alternative embodiments the color intensity samples may include, without limitation, cyan, magenta, and yellow spatial color intensity information. Persons skilled in the art will recognize that other sets of spatial color intensity information may be implemented without departing the scope of embodiments of the present invention. The electronic representation is transmitted to processor complex 14-210 via interconnect 14-234, which may implement any technically feasible signal transmission protocol.

Display unit 14-212 is configured to display a two-dimensional array of pixels to form a digital image for display. Display unit 14-212 may comprise a liquid-crystal display, an organic LED display, or any other technically feasible type of display. Input/output devices 14-214 may include, without limitation, a capacitive touch input surface, a resistive tablet input surface, buttons, knobs, or any other technically feasible device for receiving user input and converting the input to electrical signals. In one embodiment, display unit 14-212 and a capacitive touch input surface comprise a touch entry display system, configured to display digital images and to receive user touch input. Input/output devices 14-214 may also include a speaker and may further include a microphone.

Non-volatile (NV) memory 14-216 is configured to store data when power is interrupted. In one embodiment, NV memory 14-216 comprises one or more flash memory chips or modules. NV memory 14-216 may be configured to include programming instructions for execution by one or more processing units within processor complex 14-210. The programming instructions may include, without limitation, an application program, an operating system (OS), user interface (UI) modules, imaging processing and storage modules, and modules implementing one or more embodiments of techniques taught herein. NV memory 14-216 may include both fixed and removable devices. One or more memory devices comprising NV memory 14-216 may be packaged as a module that can be installed or removed by a user. NV memory 14-216 may be configured to store one or more digital images, such as digital images sampled by digital camera 14-230. In one embodiment, volatile memory 14-218 comprises dynamic random access memory (DRAM) configured to temporarily store programming instructions, image data, and the like. Sensor devices 14-242 may include, without limitation, an accelerometer configured to detect directional force, an electronic gyroscope configured to detect motion or orientation, a magnetic flux detector configured to detect orientation, a global positioning system (GPS) module configured to detect geographic position, or any combination thereof.

Wireless unit 14-240 may include one or more digital radios configured to transmit and receive digital data. In particular, wireless unit 14-240 may implement wireless transmission standards known in the art as "WiFi" based on institute for electrical and electronics engineers (IEEE) standard 802.11, digital cellular telephony standards for data communication such as the well-known "3G," long term evolution ("LTE") standards, "4G" standards, or any technically feasible combination thereof. In one embodiment, wireless mobile device 14-170 is configured to transmit one or more digital photographs residing within either NV memory 14-216 or volatile memory 14-218 to an online photographic media service via wireless unit 14-240. In such an embodiment, a user may possess credentials to access the online photographic media service and to transmit the one or more digital photographs for storage, sharing, and presentation by the online photographic media service. The credentials may be stored within or generated within wireless mobile device 14-170 prior to transmission of the digital photographs. The online photographic media service may comprise a social networking service, photograph sharing service, or any other web-based service that provides storage and transmission of digital photographs.

In one embodiment, wireless mobile device 14-170 comprises a plurality of digital cameras 14-230 configured to sample multiple views of a scene. In one implementation, a plurality of digital cameras 14-230 is configured to sample a wide angle to generate a panoramic photograph. In another implementation, a plurality of digital cameras 14-230 is configured to sample two or more narrow angles to generate a stereoscopic photograph. In yet another implementation, a plurality of digital cameras 14-230 is configured to sample a plurality of focus points to generate a synthetic focus image. In still yet another embodiment, a plurality of digital cameras 14-230 is configured to sample a plurality of different exposures to generate a high dynamic range image.

Figures 2D, 14:
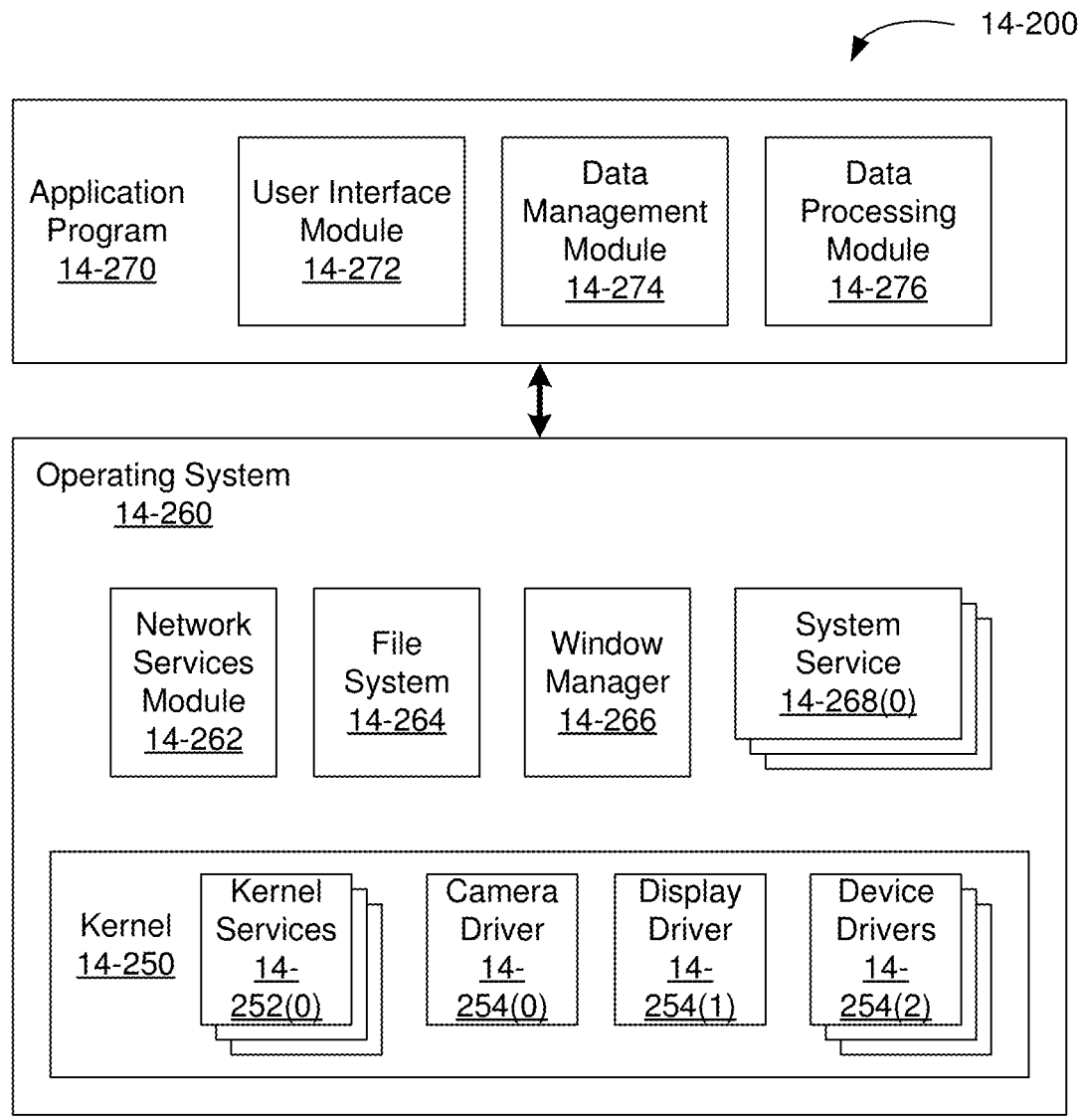
Figures 3A, 14:
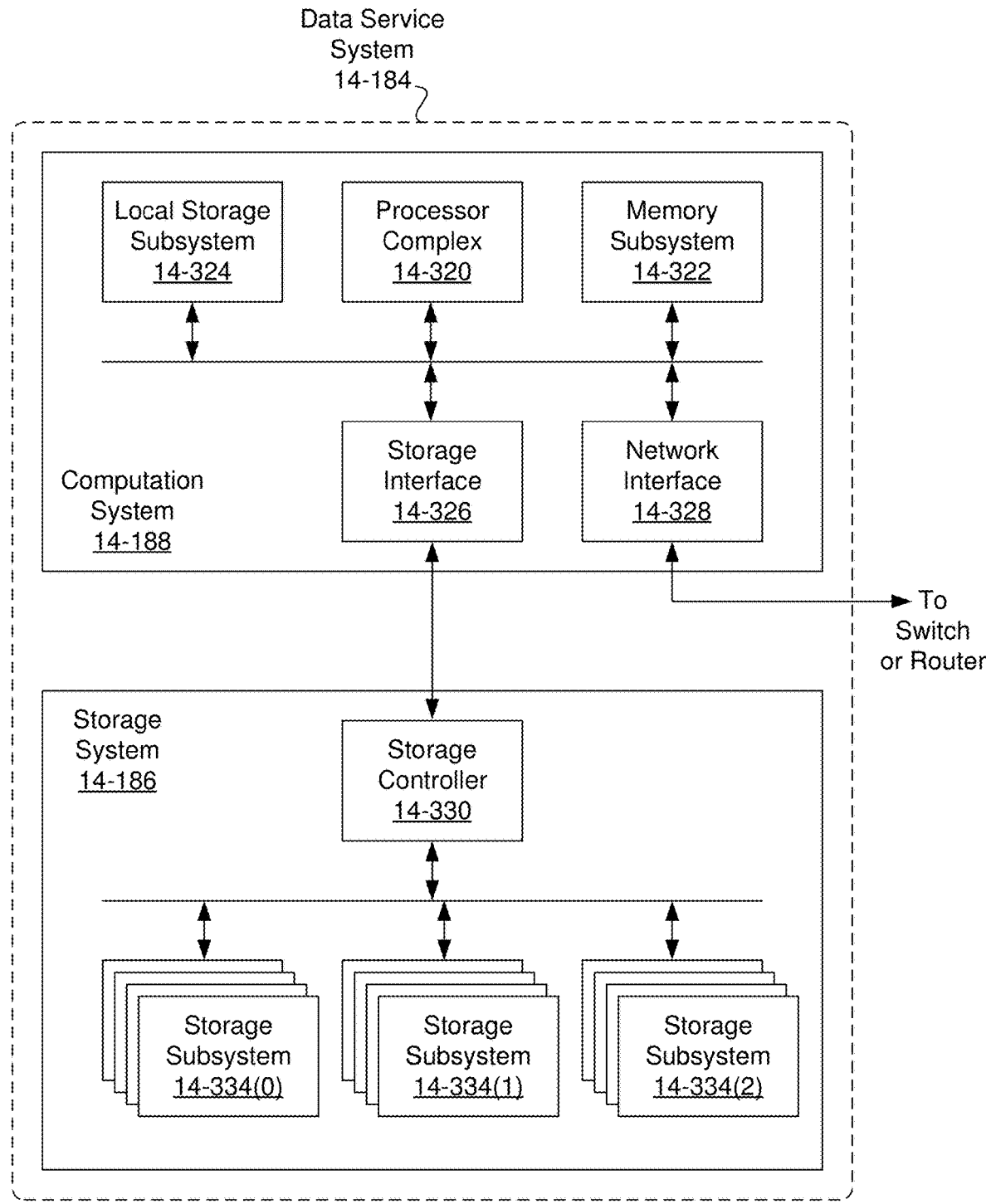
Figures 3B, 14:
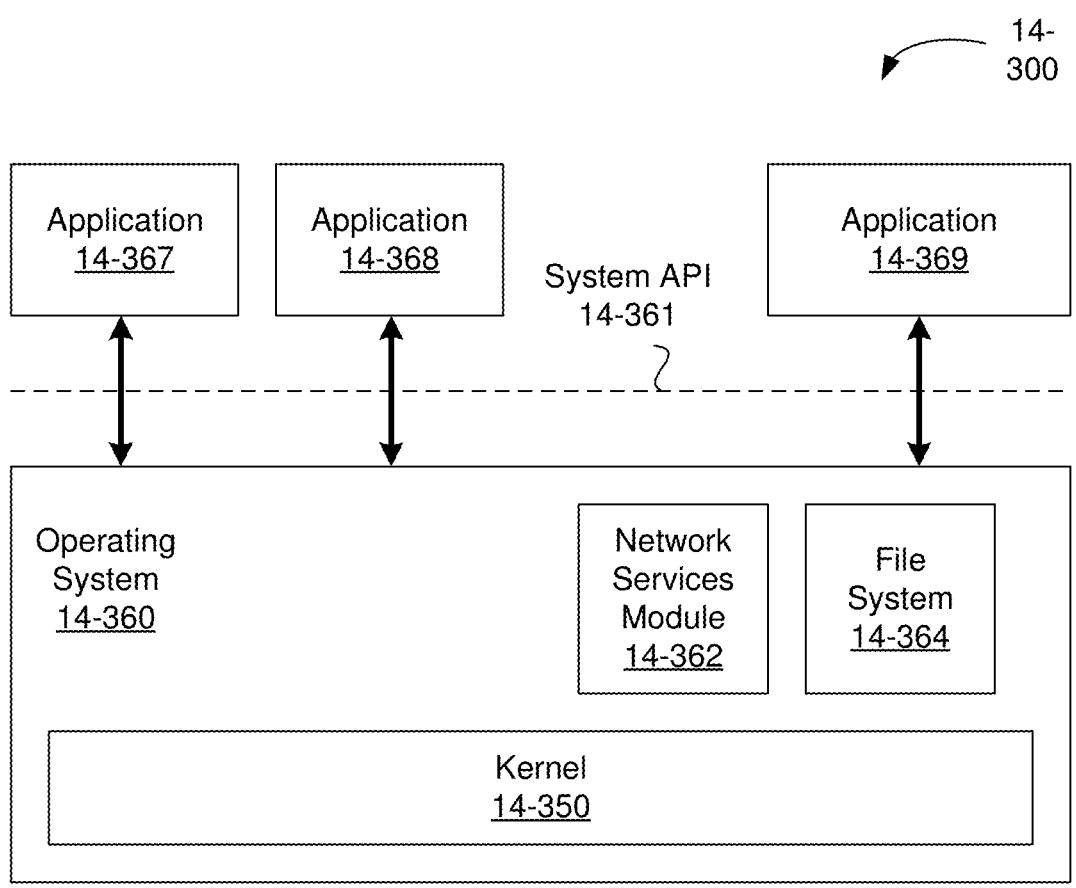
Figures 3C, 14:
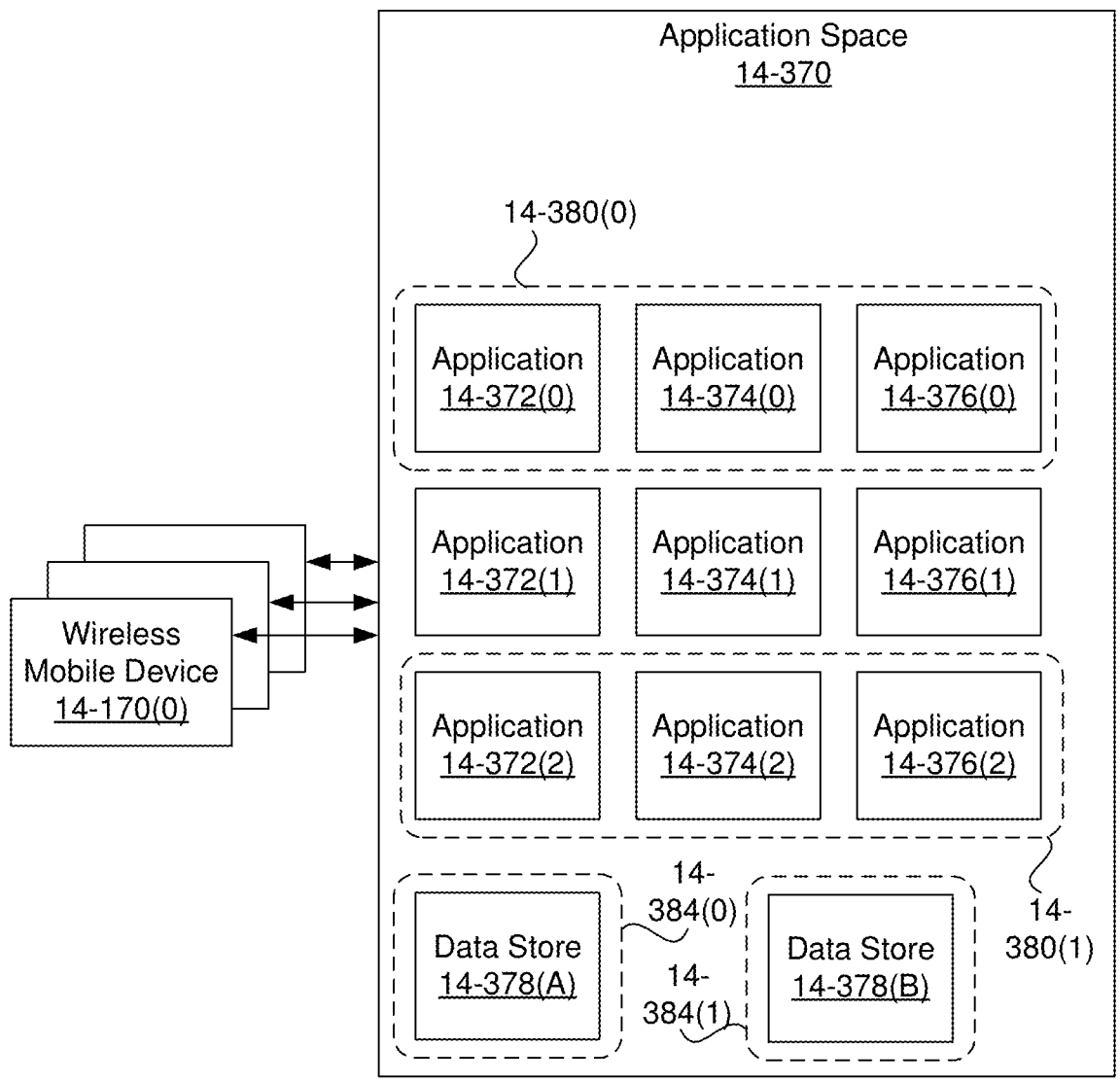

FIG. 14-2D illustrates an exemplary software architecture 14-200 of wireless mobile device 14-170, according to one embodiment of the present invention. Software architecture 14-200 may include an operating system 14-260, and an application program 14-270 configured to execute in conjunction with the operating system. In one embodiment, application program 14-270 includes a user interface (UI) module 14-272, a data management module 14-274, and a data processing module 14-276. Operating system 14-260 includes a kernel 14-250, a network services module 14-262, and a file system 14-264. Operating system 14-260 may also include a window manager 14-266 and one or more system services 14-268. While network services module 14-262, file system 14-264, window manager 14-266, and system services 14-268 are shown here as being implemented external to kernel 14-250, portions of each may be implemented within kernel 14-250.

In one embodiment, kernel 14-250 may include one or more kernel service modules 14-252, and one or more device drivers 14-254, configured to manage hardware devices and to present an abstracted programming interface to client software modules requesting access to the hardware devices. Kernel services modules 14-252 may be configured to provide process control services, memory management services, and the like. In one embodiment, a camera driver 14-254(0) is configured to manage operation of digital camera 14-230 and a display driver 14-254(1) is configured to manage operation of display unit 14-212. Another device driver (not shown) may be configured to manage operation of wireless unit 14-240, and so forth. Certain device drivers 14-254 may be configured to present a corresponding device as a system resource having functionality that is abstracted through an application programming interface (API).

In some embodiments, network services module 14-262 may provide services related to network connectivity, data transmission, and data stream management. In one embodiment, network services module 14-262 implements network protocols, such as the well-known suite of protocols referred to in the art as Internet protocol (IP). Network services module 14-262 may also implement wireless communication protocols and control stacks, such as those related to cellular communications (LTE, etc.) and local network communications (WiFi, etc.). Network services module 14-262 may be implemented as a collection of different service modules, each configured to execute in conjunction with operating system 14-260.

In one embodiment, file system 14-264 may implement a file abstraction over unstructured or block level storage. For example, in one embodiment, file system 14-264 may present an organized, hierarchical file system of named files and directories that are mapped onto sequential storage blocks comprising a flash memory implementation of NV memory 14-216. In such an example, application program 14-270 may access files by name without regard to physical layout within NV memory 14-216.

In another embodiment, window manager 14-266 may include tools and subsystems for providing a data metaphor comprising windows and data objects for intuitive user interaction. Window manager 14-266 may also implement a collection of interactive UI tools, which may be called and configured by application program 14-270. Window manager 14-266 may also implement a runtime environment for managing different events, such as user input events, such as certain user events that require a corresponding update to UI state. Additional system services may be implemented in system services 14-268. For example, in one embodiment, a runtime event manager may be implemented as a system service 14-268, which is called by window manager 14-266.

Still yet, in one embodiment, application program 14-270 may include programming instructions that implement tangible user interaction behaviors. For example, in one embodiment, application program 14-270 may cause operating system 14-260 to display a window with UI objects, such as input widgets and one or more output display surfaces. In another embodiment the window and related UI objects may be displayed on display unit 14-212 of FIG. 14-2C. In one embodiment, UI module 14-272 may be configured to define and manage UI objects comprising an application user interface associated with application program 14-270. In a mode-view-controller application architecture, UI module 14-272 may implement view functions and controller functions. UI module 14-272 may call window manager 14-266 to implement certain functions. Certain model functions may be implemented by data management module 14-274 and data processing module 14-276. Data management module 14-274 may include a database subsystem for storing, organizing, retrieving, and otherwise managing data objects, such as digital photos and related metadata. Data management module 14-274 may call certain system services modules 14-268 for certain common data management operations. Data processing module 14-276 may include, without limitation, image processing functions for operating on digital images. For example, in one embodiment, data processing module 14-276 may include image compression functions, such as JPEG compressor and extractor functions, high-dynamic range (HDR) functions for generating a digital image from an HDR stack, image alignment operations for aligning related images, image merge operations for combining data associated with related images, such as HDR images or flash-ambient images, and the like.

In one embodiment, application program 14-270 is configured to execute within processor complex 14-210 of FIG. 14-2C. The application program may enable a user to cause digital camera 14-230 to sample one or more digital images in response to a shutter release event. The one or more digital images are stored within NV memory 14-216. One exemplary shutter release event comprises a user activating a UI widget, such as a UI button control. The one or more digital images may then be processed by data processing module 14-276 and one or more resulting images stored to NV memory 14-216 or volatile memory 14-218. One or more resulting images may be shared through a digital wireless connection facilitated by wireless unit 14-240.

Sharing an image may include transmitting image data from one user to one or more different users, or from one device to one or more different devices. The process of sharing may be accomplished according to an arbitrary technique or chronology. For example, a device may transmit image data to a server during one time interval, after which the server makes the image data available to different devices. A different device may then retrieve the image data during a second time interval. The first time interval and the second time interval may be separated by an arbitrary time duration. In one embodiment, sharing comprises a first step of transmitting image data from a first device to a server, and a second step of transmitting image data from the server to a second device. In another embodiment, sharing may comprise transmitting image data from the first device to the second device as a peer-to-peer transmission. In each embodiment, an access control system, such as an account login or account credentials system, may implement controls on which users or which devices may access a particular set of image data.

FIG. 14-3A illustrates a block diagram of data service system 14-184 of FIG. 14-1C, configured to implement one or more aspects of the present invention. Data service system 14-184 includes a computation system 14-188 coupled to a storage system 14-186. Computation system 14-188 includes a processor complex 14-320, a memory subsystem 14-322, a network interface 14-328, and a storage interface 14-326. Computation system 14-188 may also include a local storage subsystem 14-324, comprising, without limitation, a magnetic hard disk drive or solid-state drive.

In one embodiment, processor complex 14-320 may comprise one or more processing units coupled to memory subsystem 14-322, which may include dynamic random access memory (DRAM), or any other technically feasible form of system memory. Each of the processing units may comprise a central processing unit (CPU), graphics processing unit (GPU), digital signal processor (DSP), or any technically feasible combination thereof. In one embodiment, each GPU may comprise a plurality of thread processors configured to execute corresponding instances of one or more thread programs. Processing units within processor complex 14-320 may be configured to execute programming instructions stored within memory subsystem 14-322, local storage system 14-324, a local cache (not shown), or any other technically feasible memory or storage subsystem.

In one embodiment, network interface 14-328 may implement an Ethernet interface and storage interface 14-326 may implement a Fibre Channel interface. In other embodiments, storage interface 14-326 may implement a second Ethernet interface and a block level storage protocol or a file level storage protocol. In still other embodiments, storage interface 14-326 may implement a direct attachment storage protocol, such as external serial advanced technology attachment (e-SATA).

In one embodiment, storage system 14-186 may be configured to store data within storage subsystems 14-334. A storage controller 14-330 may be configured to manage data stored within storage subsystems 14-334. In one embodiment, storage controller 14-330 may comprise a processing unit (not shown) and storage adapters (not shown) coupled to storage subsystems 14-334. The processing unit may be configured to implement a file system, a block storage system, or any technically feasible combination thereof. Storage controller 14-330 may implement any technically feasible storage protocol for networked or directly attached storage devices. Data may be written to storage subsystems 14-334 or read from storage subsystems 14-334 in response to a storage access request transmitted from computation system 14-188 to storage system 14-186 through storage controller 14-330.

In certain embodiments, computation system 14-188 may comprise virtual computation resources configured to be independent of specific hardware computation resources. For example, in one embodiment, a virtual machine may implement virtual processing units, virtual storage interfaces, virtual network interfaces, and the like. Similarly, storage system 14-186 may comprise virtual storage resources configured to be independent of specific hardware storage resources. For example, a virtual file system may implement virtual storage units mapped on to arbitrary physical storage resource. In another example, a virtual object data store may implement object storage functions that are independent of underlying physical storage resources and, may be independent of any underlying file system.

FIG. 14-3B illustrates an exemplary software architecture 14-300 for a computation system 14-188 of FIG. 14-1C within data service system 14-184, configured to implement one or more aspects of the present invention. In one embodiment, elements of software architecture 14-300 are configured to execute within processor complex 14-320 of computation system 14-188. Software architecture 14-300 may include one or more applications 14-367, 14-368, 14-369 configured to execute in conjunction with a system API 14-361. Software architecture 14-300 may also include an operating system 14-360, configured to implement certain system functions and avail certain system resources through system API 14-361. Operating system 14-360 may include a kernel 14-350, a network services module 14-362, and a file system 14-364. In certain embodiments, at least a portion of network services module 14-362 may be implemented within kernel 14-350. Similarly, in certain embodiments, at least a portion of file system 14-364 may be implemented within kernel 14-350. Network services module 14-362 may implement networking functions and protocol stacks for communicating with other devices, such as through network interface 14-328.

Applications 14-367, 14-368, 14-369 may be configured to implement specific services related to generation of and sharing of a DIO. In one embodiment, an application 14-367 may be configured to receive and store a DIO, discussed in greater detail below in FIGS. 14-4A-14-4C. Application 14-367 may be further configured to share a DIO. In one embodiment, an application 14-368 may be configured to receive and store image data for generating a DIO. Application 14-368 may be further configured to share the generated DIO. In one embodiment, an application 14-369 may be configured to receive and store image data for generating a DIO. Application 14-369 may then transmit the image data to an image processing server, which may generate the DIO and transmit the DIO to application 14-369. Application 14-369 may be further configured to share the DIO generated by the image processing server.

In one embodiment, system API 14-361 may comprise an API implemented by a virtual operating system, which may be configured to execute on a virtual machine. In this way, applications 14-367-14-369 may be configured to execute independently with respect to specific physical hardware resources. As illustrated below in FIG. 14-3C, an application space may be implemented that is independent of specific physical resources, allowing applications to execute as needed on available physical resources.

FIG. 14-3C illustrates an exemplary application space 14-370, according to one embodiment of the present invention. Each application 14-372, 14-374, 14-376 within application space 14-370 may execute within a private virtual memory space, and a private process space. In various embodiments, application 14-372(0) may represent a first instance of application 14-372, application 14-372(1) may represent a second instance of application 14-372, and so forth. Inter-process communication (IPC) among applications 14-372, 14-374, 14-376, and data stores 14-378 may be performed through a shared memory space, a socket system, a data network, or any other technically feasible technique.

Data stores 14-378 may be configured to store data for an application 14-372, 14-374, 14-376. For example, application 14-372(0) may be configured to store data within data store 14-378(A) through a file system interface. Alternatively application 14-372(0) may be configured to store data within data store 14-378(A) through a data object interface. Each application and each data store within application space 14-370 may be mapped to a corresponding physical resource. For example, application 14-372(0) may be mapped to a computation server 14-380(0), while applications 14-372(2), 14-374(2), 14-376(2) may be mapped to a computation server 14-380(1). Similarly, data store 14-378(A) may be mapped to a first physical storage system 14-384(0), while data store 14-378(B) may be mapped to a second, different physical storage system 14-384(1). In certain embodiments, data store 14-378(A) and 14-378(B) are configured to substantially mirror stored data, and physical storage system 14-384(0) is disposed in a geographically different physical location from physical storage system 14-384(1). In such a configuration, either data store 14-378(A) or data store 14-378(B) may be disabled, such as due to a natural disaster, but data availability within the application space 14-370 is maintained for uninterrupted operation by a mirror copy. Computation servers 14-380 may also be disposed in different geographical locations to enable continued availability of each application 14-372, 14-374, 14-376 in the event a certain data center is disabled. Within the same data center, different computation servers 14-380 and different data stores 14-378 may be configured to provide resource redundancy for continued operation, such as continued operation following a fault condition associated with one or more computation servers 14-380.

In one embodiment, each application 14-372, 14-374, 14-376 may be configured for fully reentrant operation, with each selected point of progress by each application recorded within a data store 14-378 through a reliable transaction mechanism, such as a database transaction of file journal transaction.

One or more wireless mobile devices 14-170 may be configured to communicate with a corresponding instance of one or more applications within application space 14-370. For example, during a given time span, wireless mobile device 14-170(0) may transmit image data to application 14-374(0), which may concurrently or subsequently store the image data within data store 14-378(0). In one embodiment, application 14-374(0) may be configured to apply one or more image processing algorithms to inbound image data from wireless mobile device 14-170(0) to generate associated processed image data, which is then stored to data store 14-378(0).

In one embodiment, one or more applications 14-372, 14-374, 14-376 are mapped onto an instance of computation system 14-188 for execution. Multiple instances of computation system 14-188 may host an arbitrary set of mapped applications. A given data store 14-378 may be mapped onto one instance of storage system 14-186, while a different data store 14-378 may be mapped onto an arbitrary instance of storage system 14-186. In certain embodiments, a computation system 14-188 may implement a storage application, and a data store 14-378 may comprise the storage application coupled to an instance of storage system 14-186.

Figures 4A, 14:
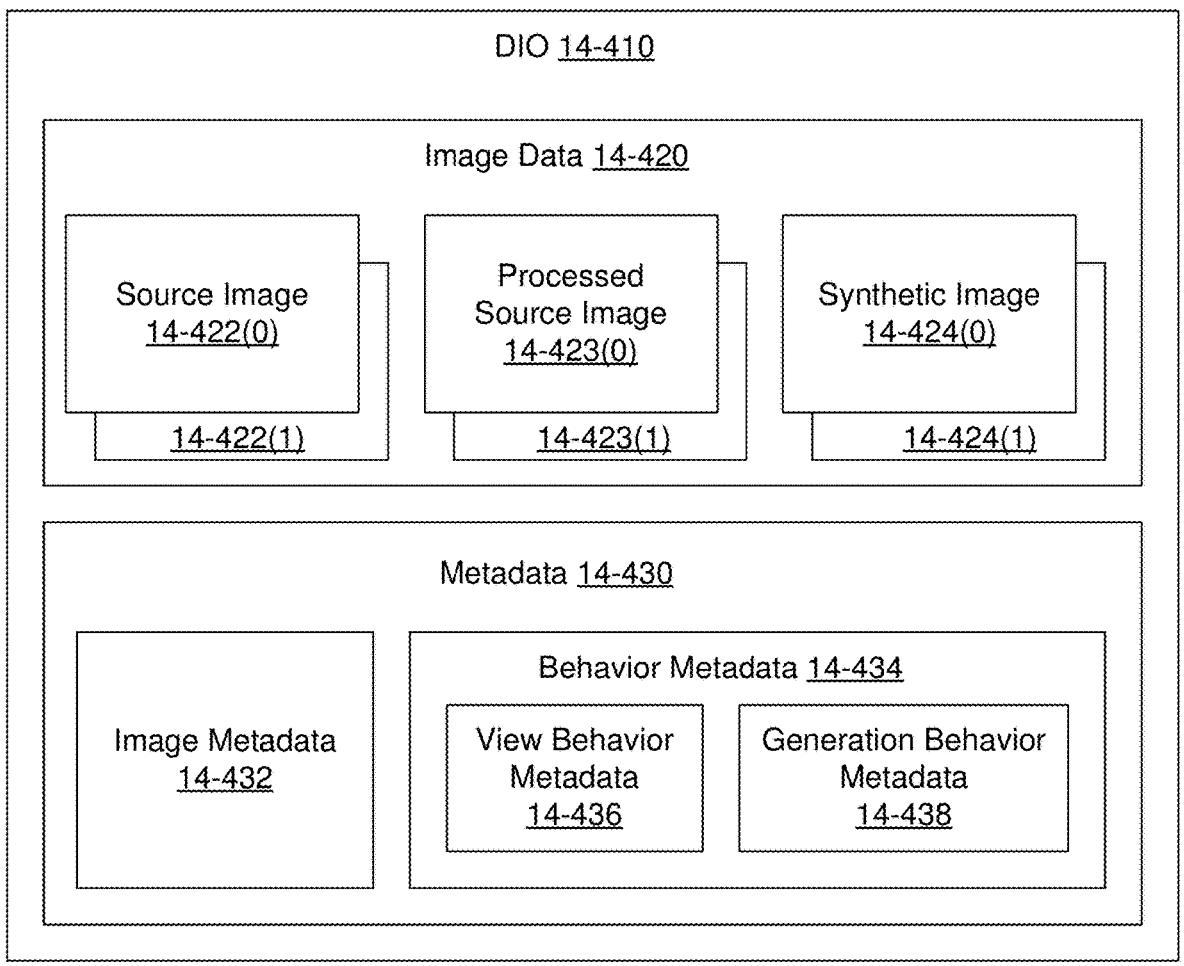

FIG. 14-4A illustrates an exemplary data structure 14-400 comprising a DIO 14-410, according to one embodiment of the present invention. As shown, DIO 14-410 includes metadata 14-430 and image data 14-420, comprising at least one image. In one embodiment, the at least one image may include one or more source images 14-422, one or more processed source images 14-423, one or more synthetic images 14-424, or any combination thereof. In one embodiment, each source image 14-422 may comprise a digital photograph that may have been sampled by a digital camera, such as digital camera 14-230 of FIG. 14-2A.

In another embodiment, each processed source image 14-423 may be generated from a corresponding source image 14-422 through an appropriate image processing algorithm. The image processing algorithm may implement, without limitation, resolution adjustment (resizing), level adjustment, sharpness adjustment, contrast adjustment, color adjustment, alignment adjustment, or any combination thereof. Each synthetic image 14-424 may be generated based on a combination of at least two input images through an image synthesis algorithm. The at least two input images may comprise one or more source images 14-422, one or more processed source images 14-423, one or more synthetic images 14-424, or any combination thereof.

In one embodiment, metadata 14-430 may include image metadata 14-432 and behavior metadata 14-434. Image metadata 14-432 may include configuration information associated with one or more source images 14-422, such as exposure conditions, lens configuration, geographic location information, other sampling information, or any combination thereof. Image metadata 14-432 may also include information associated with how one or more images are generated. The one or more images may include one or more processed source images 14-423, one or more synthetic images 14-424, or any combination thereof. Behavior metadata 14-434 may include view behavior metadata 14-436, generation behavior metadata 14-438, or any combination thereof. View behavior metadata 14-436 may specify how image data 14-420 should be viewed or displayed to a user by specifying functions for performing operations related thereto. Generation behavior metadata 14-438 may specify how a processed source image 14-423, a synthetic image 14-424, or any combination thereof should be generated by specifying functions for performing image generation operations related thereto.

In one embodiment, view behavior metadata 14-436 may comprise a reference to a predefined function for combining one or more images from image data 14-420 into a display image, which may be displayed to a user, such as through display unit 14-212 of FIG. 14-2B. For example, view behavior metadata 14-436 may specify a reference to a linear alpha blend operation to be performed on an ordered set of images comprising a processed source image 14-423, a first synthetic image 14-424(0), and a second synthetic image 14-425. In one implementation, a value of alpha for the linear alpha blend operation may be determined by a real-time continuous value UI control, which the user may manipulate to achieve a desired resulting image. In another example, view behavior metadata 14-436 may specify a linear alpha blend operation to be performed on a processed source image 14-423 and a synthetic image 14-424. In other examples, view behavior metadata 14-436 may specify non-linear blend operations, spatially variant blend operations such as gradient blends, and the like. In one embodiment, the real-time continuous value UI control may comprise a linear slider, illustrated below in FIG. 14-8.

In another embodiment, view behavior metadata 14-436 may comprise programming instructions to be performed for combining one or more images from image data 14-420 into a display image, which may be displayed to the user. In one example, view behavior metadata 14-436 may include programming instructions for generating pixels within the display image. The programming instructions may be specified according to any technically feasible programming language. For example, view behavior metadata 14-436 may include programming instructions specified as an OpenGL shader, according to the well-known language of OpenGL. In one embodiment, a viewer application configured to display DIO 14-410 may submit the OpenGL shader to an OpenGL compiler for execution by a GPU residing within processor complex 14-210 to generate the display image. The OpenGL shader may receive, as input, a parameter determined by the real-time continuous value UI control.

In one embodiment, generation behavior metadata 14-438 may comprise a reference to a predefined function for generating one or more processed source images 14-423, generating one or more synthetic images 14-424, or any combination thereof. For example, generation behavior metadata 14-438 may specify a reference to a blend operation configured to generate a synthetic image 14-424 by combining a first processed source image 14-423(0) and a second processed source image 14-423(1). The first processed source image 14-423(0) may be generated from a corresponding source image 14-422(0), sampled by digital camera 14-230 of FIG. 14-2A, using ambient illumination. The second processed source image 14-423(1) may be generated from a corresponding source image 14-422(1), sampled by digital camera 14-230, using both ambient illumination and strobe illumination provided by strobe unit 14-236. The processed source images 14-423 may be aligned in a previously performed alignment step. In another example, generation behavior metadata 14-438 specifies a reference to an HDR blend operation that generates a synthetic image 14-424 by combining processed source images 14-423 comprising an aligned HDR image stack. Each processed source image 14-423 may be generated by aligning a corresponding source image 14-422 with other source images 14-422 or other processed source images 14-423. Of course, in other embodiments, any technically feasible techniques may be implemented to combine images within the HDR image stack to generate one or more synthetic images 14-424.

In another embodiment, generation behavior metadata 14-438 may comprise programming instructions to be performed for generating one or more processed source images 14-423, one or more synthetic images 14-424, or any combination thereof. In one example, generation behavior metadata 14-438 may include programming instructions specified as an OpenGL shader, according to the well-known language of OpenGL. In certain embodiments, a viewer application configured to display DIO 14-410 may submit the OpenGL shader to an OpenGL compiler for execution by a GPU residing within processor complex 14-210 to generate one or more synthetic images 14-424. The OpenGL shader may receive, as input, a parameter determined by a UI control as an algorithmic input parameter. Alternatively, the OpenGL shader may operate according to default parameter settings appropriate to an associated image processing algorithm implemented by the OpenGL shader.

In one embodiment, processed source image 14-423(0) may comprise a digital photograph generated from a source image 14-422(0) taken under ambient lighting conditions, while processed source image 14-423(1) comprises a digital photograph generated from a source image 14-422(1) taken with both strobe illumination and ambient illumination. In another embodiment, a synthetic image 14-424 may be generated from the processed source images 14-423(0), 14-423(1), and stored within DIO 14-410. The synthetic image 14-424 may be generated by combining source image 14-422(0) and source image 14-422(1), such as through a non-linear, per-pixel contribution function, an alpha (opacity) blend function, and/or any other technically feasible function or combination or functions suitable for combining images. In another embodiment, two or more source images 14-422 may comprise an HDR image stack sampled by digital camera 14-230. Metadata 14-430 may be populated with alignment information for aligning the two or more source images 14-422 in preparation for performing an HDR merge operation. DIO 14-410 may further include a synthetic image 14-424 comprising an HDR merge of the HDR image stack.

In certain embodiments, two or more processed source images 14-423 may be generated based on the same algorithm, but with different corresponding algorithmic parameters. For example, a first processed source image 14-423(0) may be generated from source image 14-422(0) by performing an intensity curve compensation operation to recover tone from shadows, while a second processed source image 14-423(1) may be generated from source image 14-422(0) by performing an intensity curve compensation operation to recover tone from highlights. In one embodiment, a DIO 14-410 configured to present both processed source images 14-423(0), 14-423(1) may store the processed source images 14-423(0) and 14-423(1). In an alternative embodiment, the DIO 14-410 may include source images 14-422(0) and 14-422(1), and additionally may include generation behavior metadata 14-438 that specifies functions for performing the intensity curve compensation operations for generating processed source images 14-423(0) and 14-423(1).

In one embodiment, DIO 14-410 may include one or more source images 14-422, one or more processed source images 14-423, and a shader function (e.g. an OpenGL shader), which may be stored within generation behavior metadata 14-438. The DIO viewer may use the generation behavior metadata 14-438 to generate one or more synthetic images 14-424. In another embodiment, the DIO viewer may implement viewing behavior based on view behavior metadata 14-436.

In one embodiment, source images 14-422 may be stored as difference images relative to a reference source image 14-422(0). Each source image 14-422 may be generated from a corresponding difference image and the reference image 14-422(0). A given difference image may advantageously require less data than its corresponding source image 14-422. In one embodiment, a difference operation may comprise a component color space numerical difference, a chroma-luminance color space difference, and/or any other technically feasible color space difference. A difference operation may further comprise a motion estimation operation relative to the reference source image. A difference operation may comprise an offset and/or scale value per pixel or region, the offset and/or scale values being represented in a compressed format within the difference image. In another embodiment, certain processed source images 14-423 may be stored as difference images relative to a processed source image 14-423, or a source image 14-422.

In certain embodiments, a processed source image 14-423 or a synthetic image 14-424 may represent an intermediate algorithmic step and the synthetic image need not be rendered ("materialized") into a memory buffer. Instead, in such an embodiment, each image represents an intermediate step within a processing pipeline, and final pixel values for a displayed image may be computed by performing certain pipeline steps within a single shader pass, thereby obviating any need intermediate buffers with intermediate image data. In certain embodiments, metadata 14-430 may be configured to include results of certain computations associated with generating a final image for display. For example, metadata 14-430 may include alignment parameters that, when applied to source images 14-422, expedite generating an HDR merge of source images 14-422. Alternatively, source images 14-422 may be aligned and stored as corresponding processed images 14-423.

Figures 4B, 14:
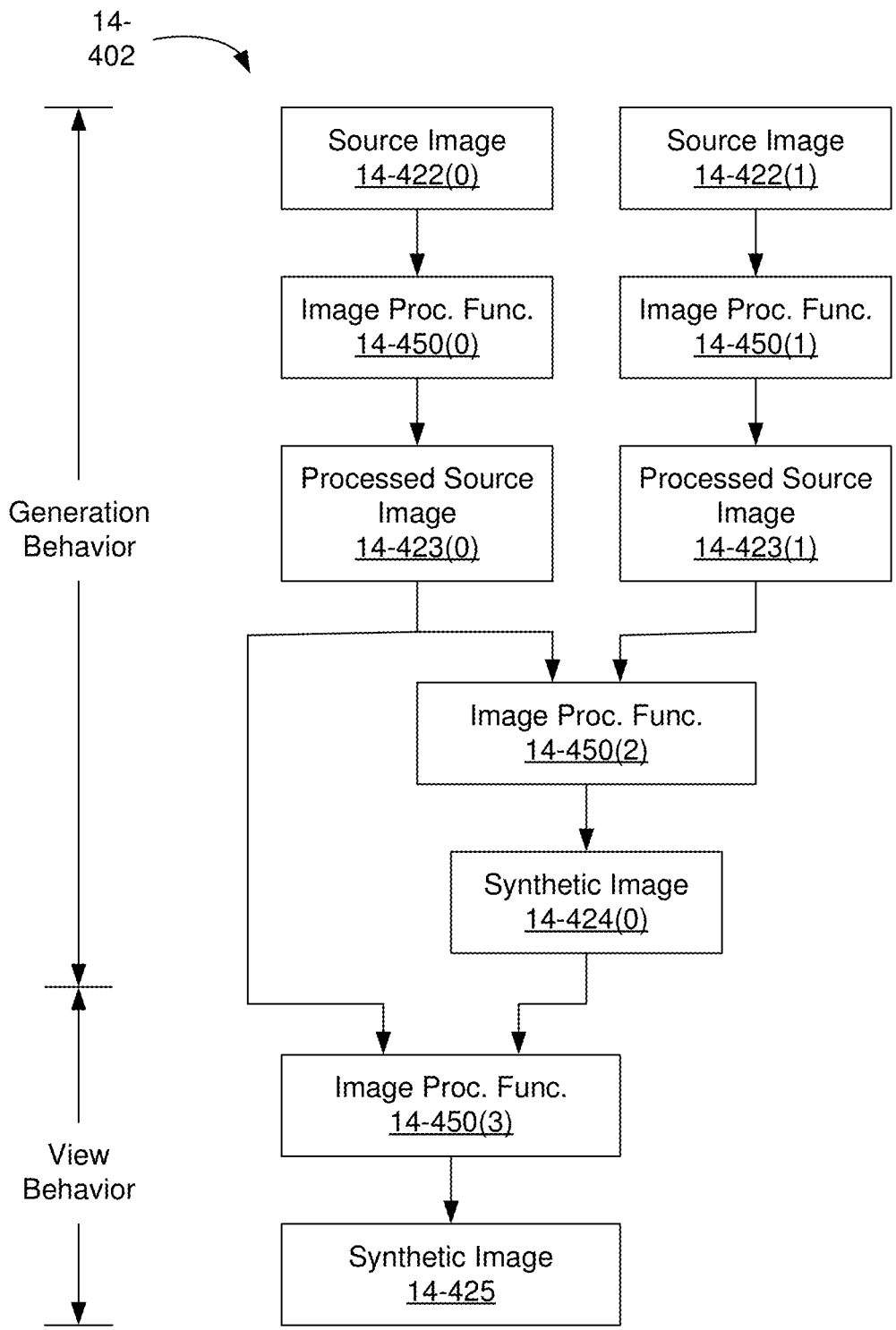

FIG. 14-4B illustrates a first dataflow process 14-402 for generating a synthetic image 14-425 comprising dynamic image object 14-410 of FIG. 14-4A, according to one embodiment of the present invention. As shown, processed source images 14-423(0), 14-423(1) are each generated from a respective source image 14-422(0) through a corresponding image processing function 14-450. Synthetic image 14-424(0) is generated by combining processed source images 14-423(0) and 14-423(1) through image processing function 14-450(2). Synthetic image 14-425 is generated by combining processed source image 14-423(0) and synthetic image 14-424(0) through image processing function 14-450(3).

In one embodiment, source image 14-422(0) may comprise a digital image captured by digital camera 14-230 of FIG. 14-2A under ambient lighting conditions and source image 14-422(1) comprises a digital image captured by digital camera 14-230 under flash and ambient lighting conditions. In an alternative embodiment, source image 14-422(0) may comprise a digital image captured by digital camera 14-230 according to a first exposure, while source image 14-422(1) comprises a digital image captured by digital camera according to a second, different exposure. In such an embodiment, source images 14-422(0) and 14-422(1) may comprise a two image HDR image stack.

In one embodiment, image processing functions 14-450(0) and 14-450(1) may perform, without limitation, color adjustments, resolution adjustments, and formatting adjustments. Image processing function 14-450(2) may perform an image alignment operation to align processed source image 14-423(1) with processed source image 14-423(0) to generate synthetic image 14-424(0). Image processing function 14-450(3) may be configured to combine processed source image 14-423(0) and synthetic image 14-424(0) based on a viewing parameter, which may be specified by a user through a UI control.

In one embodiment, DIO 14-410 may include processed source image 14-423(0) and synthetic image 14-424(0). A DIO viewer may be configured to perform image processing function 14-450(3), which may be specified in view of behavior metadata 14-436, based on the viewing parameter to generate synthetic image 14-425 for display to the user. In an alternative embodiment, DIO 14-410 may include processed source images 14-423(0) and 14-423(1). The DIO viewer may be configured to perform image processing function 14-450(2), which may be specified in generation behavior metadata 14-436, to generate synthetic image 14-424(0). The DIO viewer may be further configured to perform image processing function 14-450(3), which may be specified in view behavior metadata 14-436, based on the viewing parameter to generate synthetic image 14-425 for display to the user.

In certain embodiments, generating a synthetic image may require a sufficiently large computational load as to preclude real-time generation of the synthetic image in response to the viewing parameter. In such embodiments, one or more synthetic images may be generated once and provided to the DIO viewer for real-time blending operations that may be feasibly performed in real-time. For example, in an embodiment where synthetic image 14-424(0) comprises an aligned version of processed source image 14-423(1), the alignment process may be computationally too intense to be computed in real-time as a user adjusts the viewing parameter, but synthetic image 14-424(0) need only be created once prior to being viewed. Similarly, a synthetic image generated through an HDR merge may be computationally intense to generate, but need only be generated once. Once generated, the HDR image may be blended in real-time through a simpler image processing function 14-450(3), configured to be responsive in real-time to the viewing parameter.

Figures 4C, 14:
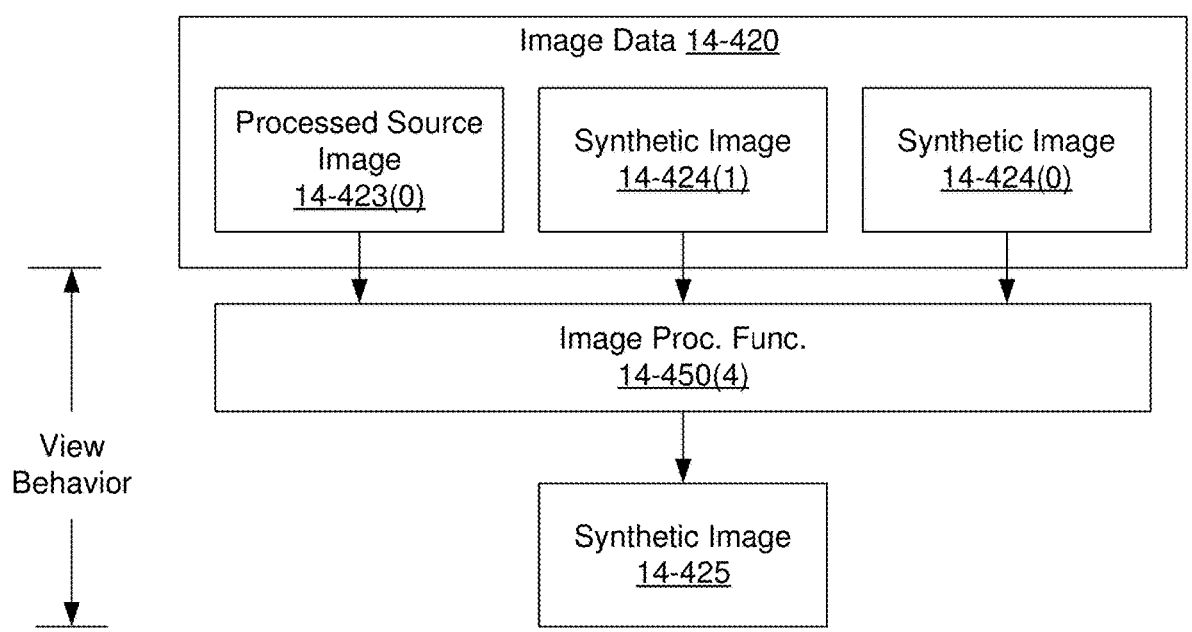

FIG. 14-4C illustrates a second dataflow process 14-404 for generating a synthetic image comprising a dynamic image object, according to one embodiment of the present invention. As shown, an image processing function 14-450(4), which may be specified in view behavior metadata 14-436, is configured to generate synthetic image 14-425 by combining processed source image 14-423(0), synthetic image 14-424(1), and synthetic image 14-424(0).

In one embodiment, image data 14-420 comprising DIO 14-410 may include processed source image 14-423(0), synthetic image 14-424(1), and synthetic image 14-424(0). Processed source image 14-423(0) may be generated based on a source image 14-422(0), sampled by digital camera 14-230, using ambient illumination. Synthetic image 14-424(0) may be generated from a corresponding source image, sampled by digital camera 14-230, using both ambient illumination and strobe illumination provided by strobe unit 14-236. Synthetic image 14-424(0) may be aligned to processed source image 14-423(0). Additionally, synthetic image 14-424(1) may be generated by combining processed source image 14-423(0) and synthetic image 14-424(0).

In one embodiment, combining processed source image 14-423(0) and synthetic image 14-424(0) to generate synthetic image 14-424(1) may comprise a non-linear blend operation. A pixel pair may comprise one pixel from the processed source image 14-423(0) and one corresponding pixel from the synthetic image 14-424(0). The non-linear blend operation may assign a greater blending weight to one or the other pixel in the pixel pair based on relative intensity of the pixels comprising the pixel pair. In an alternative embodiment, combining processed source image 14-423(0) and synthetic image 14-424(0) may comprise a linear blend operation, such as an alpha blend operation. A level adjustment operation may be applied to an image resulting from the alpha blend operation. The level adjustment operation may be configured to brighten a certain range of intensity values, darken a range of intensity values, or any combination thereof. In certain embodiments, combining processed source image 14-423(0) and synthetic image 14-424(0) may further comprise adjusting color within synthetic image 14-424(0) according to color information from processed source image 14-423(0).

In one embodiment, a DIO viewer may be configured to display a blended image comprising zero through full weight contributions from processed source image 14-423(0), synthetic image 14-424(1), and synthetic image 14-424(0). In one embodiment, the DIO viewer may be configured to execute image processing function 14-450(4) to generate synthetic image 14-425 for display. Image processing function 14-450(4) may implement any technically feasible blend function, such as an alpha blend, whereby the viewing parameter may determine an alpha value for each of three images comprising processed source image 14-423(0), synthetic image 14-424(1), and synthetic image 14-424(0). The three images may be conceptually layered, so that the top image may be essentially copied to synthetic image 14-425 when the top image has an alpha of one. In one embodiment, if the top image is transparent (alpha is zero), and the middle image has an alpha of one, then the middle image may be essentially copied to the synthetic image 14-425. The bottom image may be assigned an alpha of one. In another embodiment, each alpha value for each image may be calculated from the viewing parameter, which may be generated from a UI control, such as a linear control. When the viewing parameter is assigned one extreme value (such as from a fully left position of the UI control), both the top image and the middle image may be assigned an alpha of zero, giving the bottom image full weight in synthetic image 14-425. When the viewing parameter is assigned an opposite extreme value (such as from a fully right position of the UI control), the top image may be assigned an alpha of one. When the viewing parameter is assigned a mid-point value (such as from a mid position of the UI control), the middle image may be assigned an alpha of one (opaque) and the top image may be assigned an alpha of zero (transparent).

Figures 5A, 14:
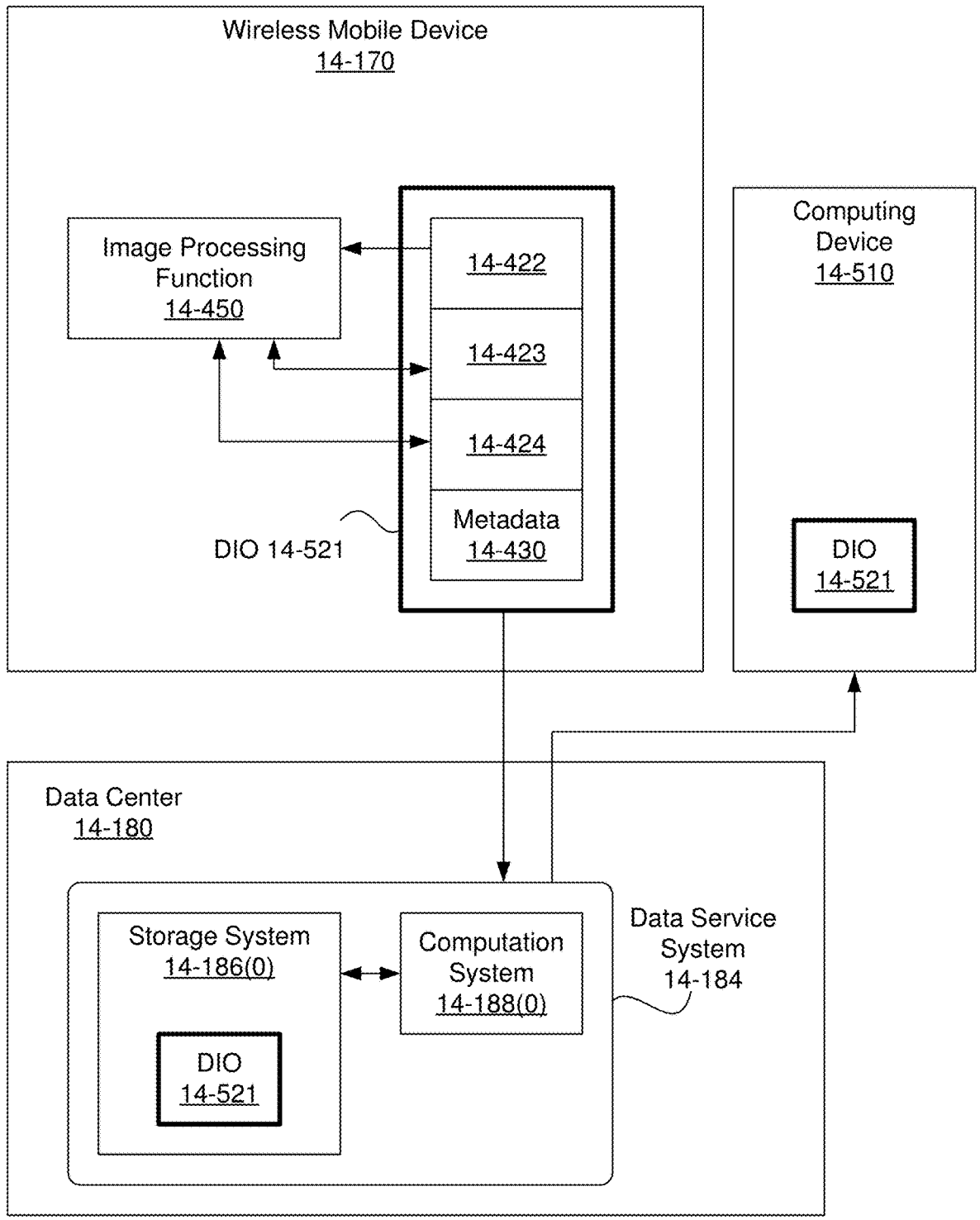

FIG. 14-5A illustrates wireless mobile device 14-170 configured to generate and transmit a DIO 14-521 to a data service system 14-184, according to one embodiment of the present invention. DIO 14-521 comprises an instance of a data structure that substantially conforms to DIO 14-410 of FIG. 14-4A. As shown, image processing function 14-450 may generate one or more processed source images 14-423, one or more synthetic images 14-424, or any combination thereof, based on one or more source images 14-422. Image processing function 14-450 may be specified by generation behavior metadata 14-438 within metadata 14-430. Image processing function 14-450 may be specified explicitly, such as by programming instructions, or implicitly, such as by a reference to a predefined set of image processing functions.

Wireless mobile device 14-170 may be configured to compute the one or more processed source images 14-423, the one or more synthetic images 14-424, or any combination thereof, to populate DIO 14-521. In certain configurations, DIO 14-521 may include a minimum set of images needed by a DIO viewer to generate a synthetic image for display, such as synthetic image 14-425 of FIG. 14-4C. In one embodiment, the DIO viewer may be configured to generate one or more synthetic images based on generation behavior metadata 14-438, and to generate the synthetic image for display based on view behavior metadata 14-436.

After DIO 14-521 has been populated with an appropriate set of images, wireless mobile device 14-170 may transmit the DIO 14-521 to the data service system 14-184, comprising any technically feasible computing system, such as a server executing within a virtual machine. Data service system 14-184 may be configured to share DIO 14-521 with a computing device 14-510, which may comprise any technically feasible computing platform such as a smartphone, a tablet computer, a laptop computer, or a desktop computer. Such sharing may be directed by a user operating wireless mobile device 14-170, which serves as a sharing source, while computing device 14-510 serves as a sharing target. Sharing may be performed asynchronously, whereby wireless mobile device 14-170 may transmit DIO 14-521 to data service system 14-184 for sharing at one time, while computing device 14-510 may retrieve the DIO 14-521 at some later point in time.

In one embodiment, application program 14-270 of FIG. 14-2D may be configured to generate and share DIO 14-521. In such an embodiment, the application program 14-270 may be configured to transmit DIO 14-521 to data service system 14-184. The application program 14-270 may also be configured to execute image processing function 14-450 to generate synthetic image 14-424 within DIO 14-521, and to further generate a synthetic image for display within wireless mobile device 14-170. In certain embodiments, a user may select among predefined image processing functions to designate which image processing function or combination of functions should be executed as image processing function 14-450. A UI tool may be configured to present the predefined image processing functions and allow a user to select among the functions. The UI tool may define a menu system, a searchable library system, or any other technically feasible selection technique. Application program 14-270 may implement a DIO viewer for viewing DIO 14-521 within mobile device 14-170.

In certain embodiments, a DIO viewer (not shown) executing within computing device 14-510 may be configured to execute certain image processing functions 14-450, specified within metadata 14-430 to generate a local copy of one or more synthetic image 14-424. In such an embodiment, synthetic image 14-424 need not be populated within DIO 14-521. Computing synthetic image 14-424 locally within computing device 14-510 may advantageously reduce transmission time and net data transmitted between wireless mobile device 14-170 and data service system 14-184, as well as between data service system 14-184 and computing device 14-510. In other embodiments, the DIO viewer may be configured to receive processed source images 14-423 and generate all downstream synthetic images locally, potentially reducing transmission time and total transmitted data between wireless mobile device 14-170 and computing device 14-510.

Figures 5B, 14:
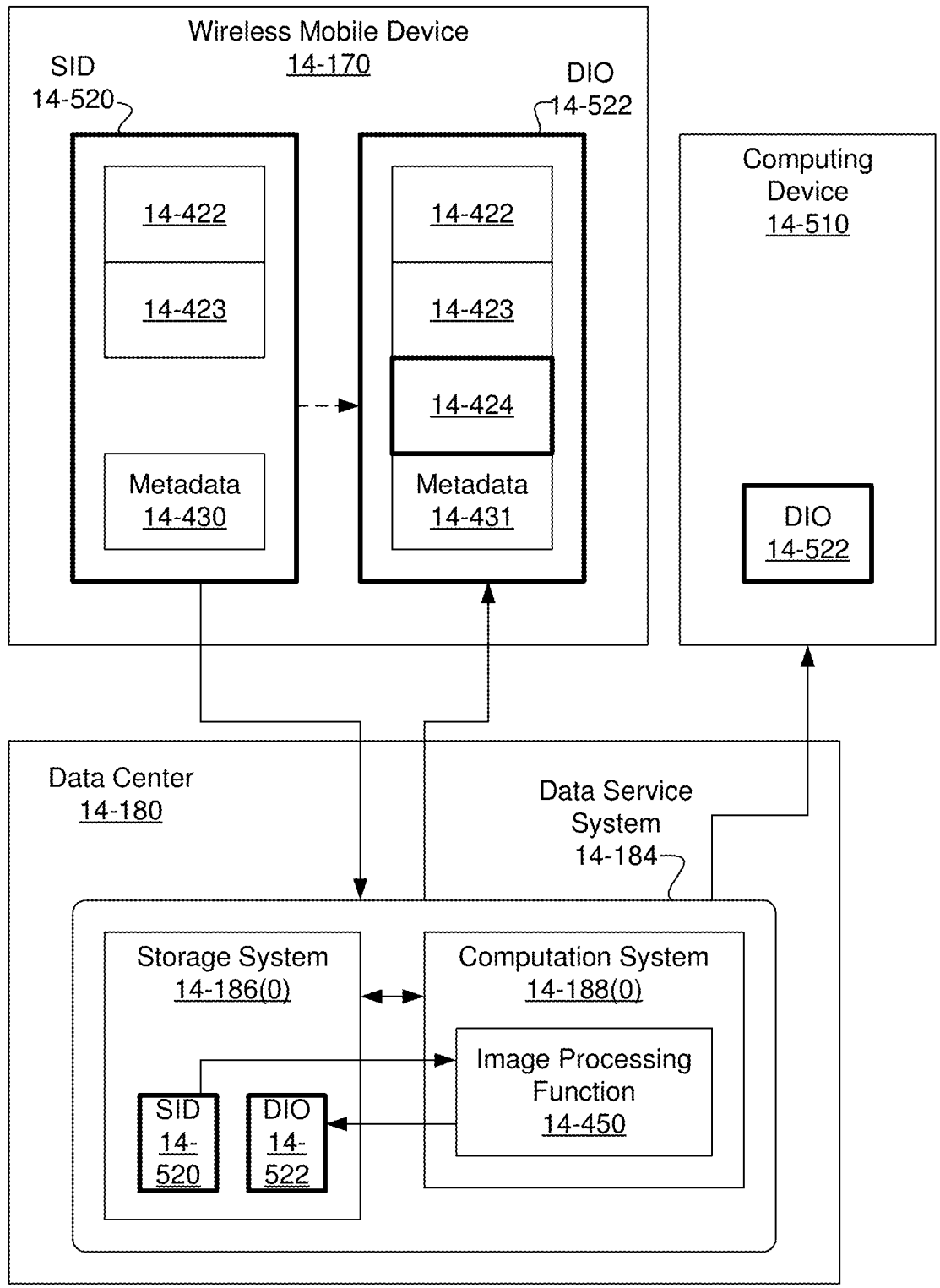

FIG. 14-5B illustrates data service system 14-184 configured to generate a synthetic image 14-424 associated with a DIO 14-522, according to one embodiment of the present invention. DIO 14-522 comprises an instance of a data structure that substantially conforms to DIO 14-410 of FIG. 14-4A. As shown, a data set comprising source image data (SID) 14-520 residing within wireless mobile device 14-170 is transmitted to data service system 14-184.

In one embodiment, SID 14-520 may be structured as a subset of a DIO 14-410 of FIG. 14-4A, and may include at least one source image 14-422 and metadata 14-430. In certain embodiments, SID 14-520 may include one or more processed source images 14-423 and metadata 14-430. Data service system 14-184 may store SID 14-520 within a storage system, such as storage system 14-186(0). Computation system 14-188(0) may execute image processing function 14-450 on SID 14-520 to generate DIO 14-522, comprising at least one synthetic image 14-424, based on SID 14-520.

In one embodiment, data processing function 14-450 may be specified within metadata 14-430 of SID 14-520. In certain embodiments, metadata 14-430 may specify references to image processing functions implemented within computation system 14-188(0). In other embodiments, metadata 14-430 may specify programming instructions that define image processing function 14-450. In an alternative embodiment, data processing function 14-450 may be specified by an application program (not shown) that may be associated with computation system 14-188(0) and configured to execute image processing function 14-450.

In one embodiment, data service system 14-184 may transmit DIO 14-522 to wireless mobile device 14-170. Metadata 14-431 may include at least a portion of metadata 14-430, as well as any additional metadata generated by computation system 14-188(0), such as metadata generated by image processing function 14-450. In an alternative embodiment, data service system 14-184 may transmit synthetic image 14-424 to wireless mobile device 14-170, which may assemble a local copy of DIO 14-522 from SID 14-520 and synthetic image 14-424. Data service system 14-184 may transmit metadata 14-431 or differences between metadata 14-430 and metadata 14-431 to wireless mobile device 14-170 for incorporation within DIO 14-522. Data service system 14-184 may share DIO 14-522 with a computing device 14-510. Such sharing may be directed by a user operating wireless mobile device 14-170. DIO 14-522 may include a substantially minimum set of images needed by a DIO viewer. DIO 14-522 may instead include a set of images needed by the DIO viewer to generate a display image while applying a substantially minimum computation effort.

Figures 5C, 14:
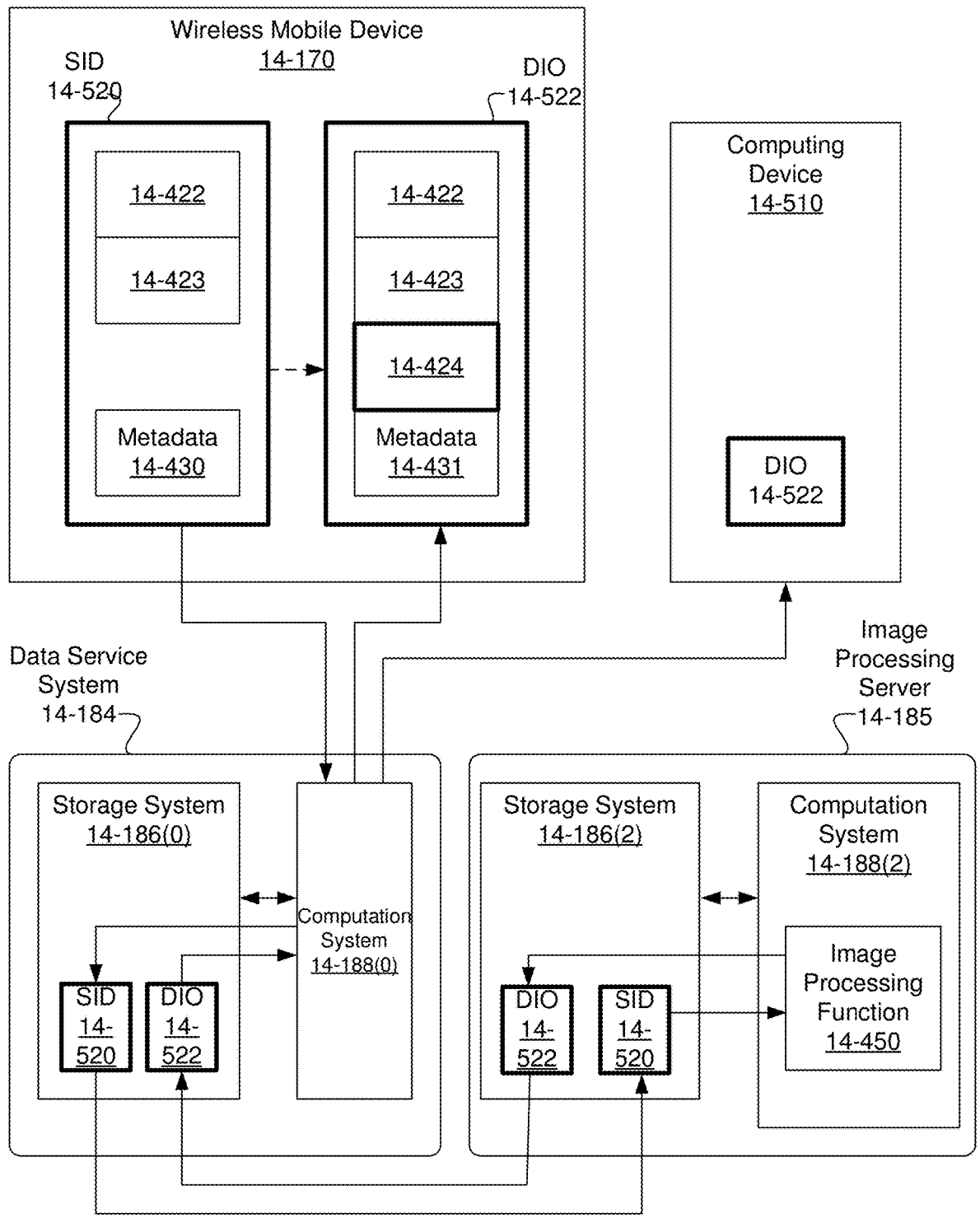

FIG. 14-5C illustrates an image processing server 14-185 configured to generate a synthetic image 14-424 associated with DIO 14-522, according to one embodiment of the present invention. As shown, wireless mobile device 14-170 transmits SID 14-520 to data service system 14-184. Data service system 14-184 stores SID 14-520 within a storage system, such as storage system 14-186(0). Data service system 14-184 then transmits SID 14-520 to image processing server 14-185, which stores SID 14-520 within a storage system, such as storage system 14-186(2).

Computation system 14-188(2) may execute image processing function 14-450 on images comprising SID 14-520 to generate a synthetic image 14-424 comprising DIO 14-522. In one embodiment, data processing function 14-450 may be specified within metadata 14-430. In certain embodiments, metadata 14-430 may specify references to image processing functions implemented within computation system 14-188(2). In other embodiments, metadata 14-430 may specify programming instructions that define image processing function 14-450. In an alternative embodiment, data processing function 14-450 may be specified by an application program (not shown) that is associated with computation system 14-188(2) and configured to execute image processing function 14-450. Image processing server 14-185 may transmit DIO 14-522 to data service system 14-184, which may store DIO 14-522, such as within storage system 14-186(0).

In one embodiment, data service system 14-184 may transmit DIO 14-522 to wireless mobile device 14-170. In an alternative embodiment, data service system 14-184 may transmit the synthetic image 14-424 to wireless mobile device 14-170, which may assemble a local copy of DIO 14-522 from SID 14-520 and synthetic image 14-424. Data service system 14-184 may share DIO 14-522 with a computing device 14-510. Such sharing may be directed by a user operating wireless mobile device 14-170. In one embodiment, data service system 14-184 may provide a web API that enables image processing server 14-185 to access SID 14-520 and to store DIO 14-522 within data service system 14-184. In certain embodiments, storage system 14-186(2) may comprise system memory, such as system memory residing within computation system 14-188(2). In one embodiment, each SID 14-520 and each DIO 14-522 may be stored temporarily until DIO 14-522 is transmitted to data service system 14-184 for storage therein.

In another embodiment, each SID 14-520 and each DIO 14-522 may be stored within data service system 14-184 and may be associated with a specific account, such as a user account, which may be further associated with wireless mobile device 14-170. For example, in one embodiment, a user account may be used to organize which SID 14-520 and DIO 14-522 object(s) are associated with the user. The user account may further associate the user with a cellular services account, which may be distinct from the user account. Of course, in other embodiments, any technically feasible authentication technique may be implemented to authenticate a particular user and authorize the user to access the account.

In one embodiment, data services system 14-184 may be configured to generate a usage record (not shown) that reflects how many DIOs were generated for a given user account. The usage record may be stored in storage system 14-186(0). The usage record may reflect which system, such as data service system 14-184 or image processing server 14-185, generated a given DIO. Alternatively, in another embodiment, the usage record may reflect a net count of generated DIOs generated per system. Each system may maintain an independent usage record; for example, image processing server 14-185 may maintain a usage record of how many DIOs it generated for a given user account. In certain embodiments, the usage record may be used by a customer billing system. In this way, the usage record may facilitate fee-based image-processing services. The fees may be billed through a cellular service agreement or separately to an unrelated user account. Of course, in other embodiments, any technically feasible billing system may be configured to read the usage record and generate account invoices based on the usage record.

One or more usage records may enable a commercial ecosystem to develop, whereby one or more third parties may operate an image processing server 14-185. A given image processing server 14-185 may be configured to implement proprietary image processing functions 14-150, which may be commercially availed to a user operating wireless mobile device 14-170. One example of a proprietary image processing function may be an HDR image processing function, which may be computationally too intense for wireless mobile device 14-170. Another example of a proprietary image processing function may be an image analysis and recognition function that may require a proprietary database of image data that may not be stored on wireless mobile device 14-170.

Figures 6A, 14:
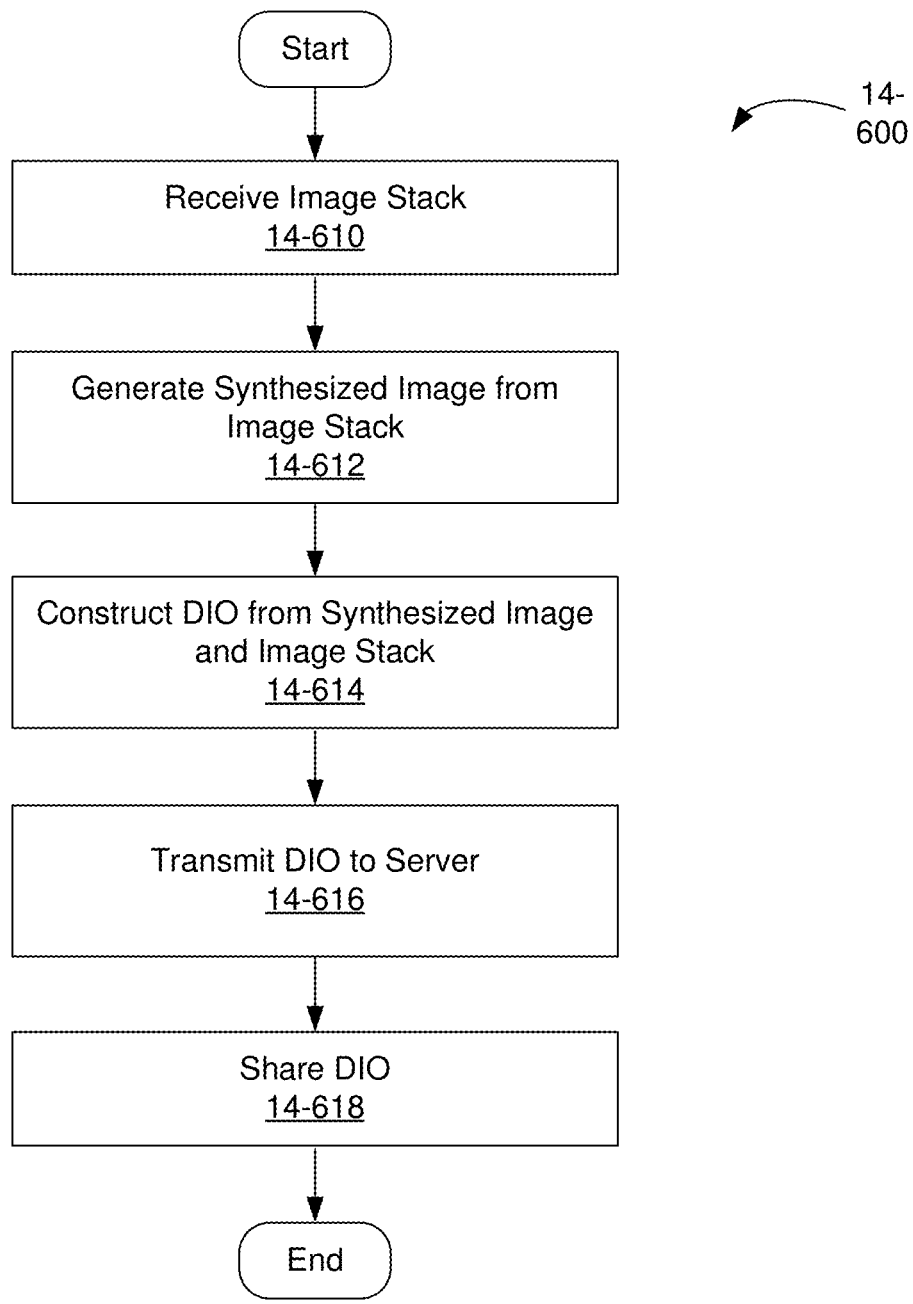

FIG. 14-6A is a flow diagram of a method 14-600 for sharing a DIO generated by a client device, according to one embodiment of the present invention. Although method 14-600 is described in conjunction with the systems of FIGS. 14-1C-14-3C and FIG. 14-5A, persons skilled in the art will understand that any system configured to perform the method steps is within the scope of the present invention. The DIO may comprise DIO 14-521 of FIG. 14-5A.

Method 14-600 begins in step 14-610, where an application program may receive an image stack, comprising one or more images, such as source images 14-422 of FIG. 14-4A or processed source images 14-423. In one embodiment, the application program may comprise application program 14-270 of FIG. 14-2D, configured to execute within processor complex 14-210 of FIG. 14-2C. In step 14-612, the application program may generate a synthesized image, such as synthesized image 14-424. The application program may also generate one or more processed source images, such as a processed source image 14-423. In step 14-614, the application program may construct the DIO based on at least the synthesized image. In step 14-616, the application program may transmit the DIO to a server, such as data service system 14-184 of FIG. 14-5A.

In step 14-618, the application program may share the DIO. In one embodiment, sharing the DIO may comprise the application program instructing the server to share the DIO. In an alternative embodiment, the application program may share the DIO by transmitting the DIO to a peer application executing on a different device. In another alternative embodiment, sharing the DIO may be implied as a consequence of the application program transmitting the DIO to the server. As discussed previously, the process of sharing a DIO may include multiple steps, with each step conducted at different, asynchronous points in time.

Figures 6B, 14:
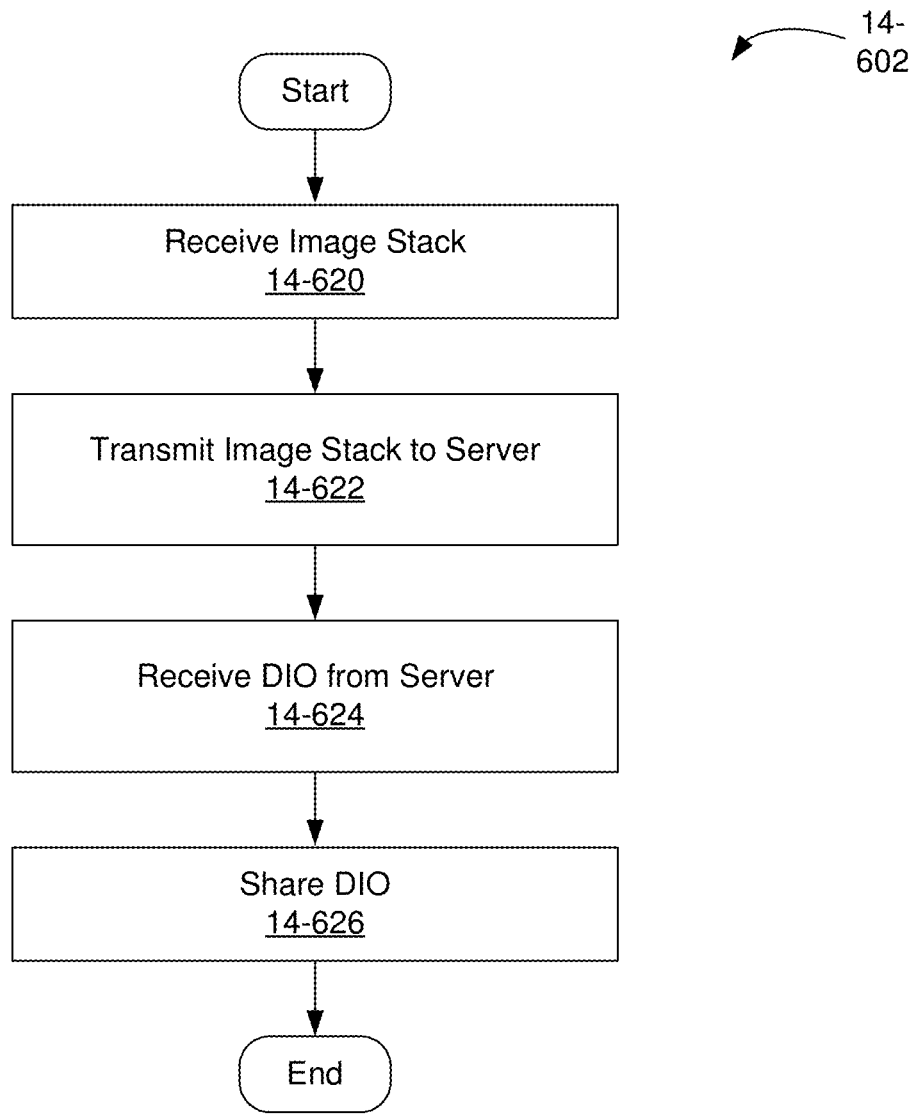

FIG. 14-6B is a flow diagram of a method 14-602 for sharing a DIO, such as DIO 14-522 of FIGS. 14-5B, 14-5C, generated by a data service system, according to one embodiment of the present invention. Although method 14-602 is described in conjunction with the systems of FIGS. 14-1C-14-3C and FIGS. 14-5B-14-5C, persons skilled in the art will understand that any system configured to perform the method steps is within the scope of the present invention.

Method 14-602 begins in step 14-620, where an application program receives an image stack, such as SID 14-520 of FIGS. 14-5B and 14-5C, comprising one or more images. In one embodiment, the application program may comprise application program 14-270 of FIG. 14-2D, configured to execute within processor complex 14-210 of FIG. 14-2C. In step 14-622, the application program may transmit the image stack to a server, such as data service system 14-184. In step 14-624, the application program may receive a DIO, such as DIO 14-522, from the server. In one embodiment, the DIO may include at least one synthetic image 14-424. The application program may assemble a local copy of the DIO to include the at least one synthetic image 14-424. In step 14-626, the application program may share the DIO, as described above in step 14-618 of FIG. 14-6A.

Figures 7A, 14:
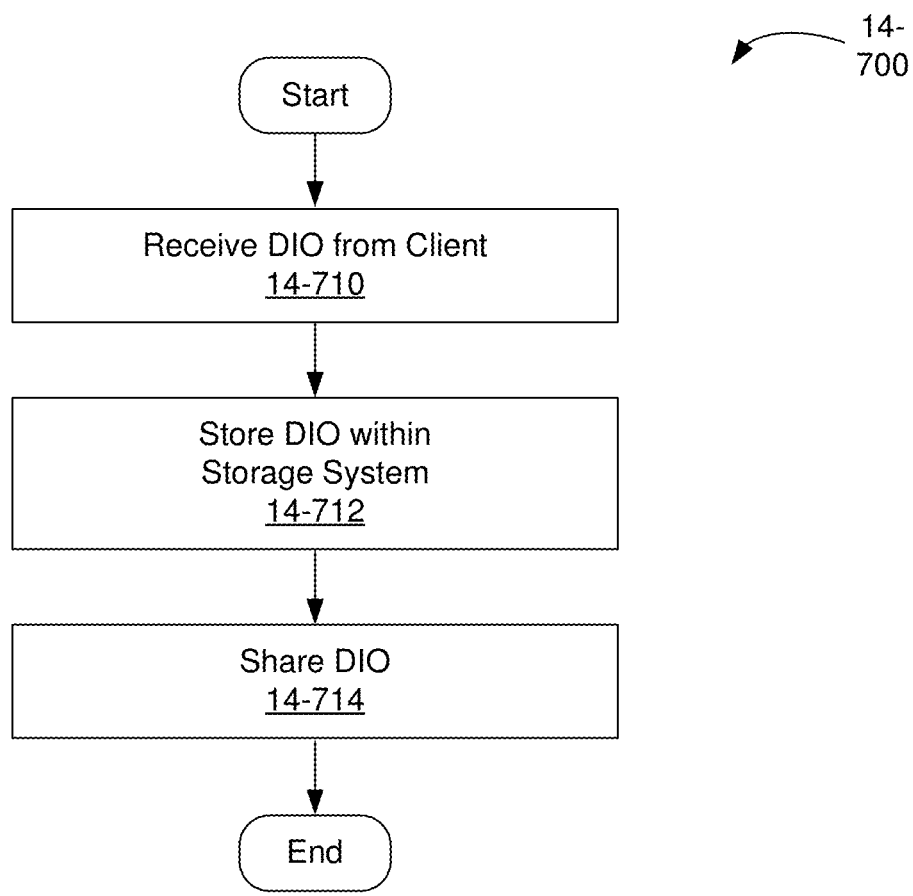

FIG. 14-7A is flow diagram of a method 14-700, performed by a data service system, for sharing a DIO generated by a client device, according to one embodiment of the present invention. Although method 14-700 is described in conjunction with the systems of FIGS. 14-1C-14-3C and FIG. 14-5A, persons skilled in the art will understand that any system configured to perform the method steps is within the scope of the present invention. In one embodiment, the data service system may comprise data service system 14-184 of FIG. 14-5A, the DIO may comprise DIO 14-521, and the client device may comprise wireless mobile device 14-170.

Method 14-700 begins in step 14-710, where the data service system receives a DIO from the client device. In step 14-712, the data service system may store the DIO within a storage system, such as storage system 14-186(0). In step 14-714, the data service system may share the DIO, thereby enabling a sharing target, such as computing device 14-510, to access the DIO. The sharing target may display the DIO to a sharing user through a DIO viewer. In one embodiment sharing the DIO may be initiated by the client device implicitly with the transmission of the DIO to the data service system 14-184. In an alternative embodiment, sharing the DIO may be initiated explicitly by the client device. For example, in one embodiment, the client device may store multiple DIOs within the data service system 14-184, but only share selected DIOs by explicitly indicating to the data service system 14-184 which DIOs need to be shared. In one embodiment, sharing the DIO may comprise updating an associated web page that may be accessed by a sharing target. In another embodiment, sharing may comprise generating an update event through a web API that is being accessed by the sharing target. In yet another embodiment, sharing may comprise transmitting a universal resource locator (URL) to the sharing target. In still yet another embodiment, sharing may comprise transmitting the DIO to the sharing target.

Figures 7B, 14:
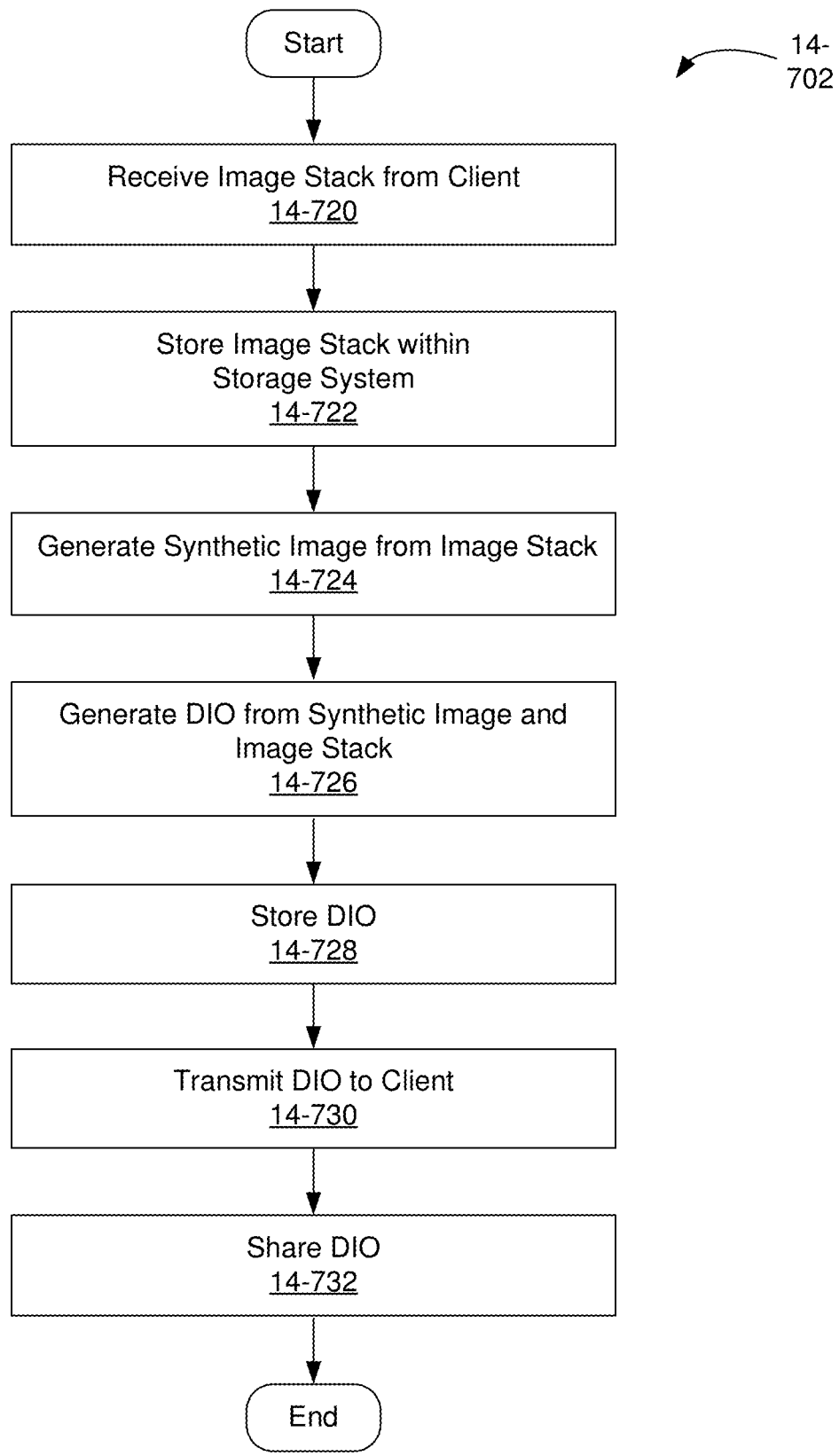

FIG. 14-7B is a flow diagram of a method 14-702, performed by a data service system, for generating and sharing a DIO, according to one embodiment of the present invention. Although method 14-702 is described in conjunction with the systems of FIGS. 14-1C-14-3C and FIG. 14-5B, persons skilled in the art will understand that any system configured to perform the method steps is within the scope of the present invention. In one embodiment, the data service system may comprise data service system 14-184 of FIG. 14-5B, the DIO may comprise DIO 14-522, an image stack may comprise SID 14-520, and wireless mobile device 14-170 may comprise a client device.

Method 14-702 begins in step 14-720, where the data service system receives an image stack from the client device. In step 14-722, the data service system may store the image stack within a storage system, such as storage system 14-186(0). In step 14-724, the data service system may generate a synthetic image, such as synthetic image 14-424 within DIO 14-522. The synthetic image may be based substantially on images within the image stack. The data service system may also generate metadata 14-431 associated with the synthetic image 14-424. In step 14-726, the data service system may generate the DIO from the synthetic image and the image stack. In step 14-728, the data service system may store the DIO in the storage system. In step 14-730, the data service system may transmit the DIO to the client device. As discussed previously, transmitting the DIO to the client device may involve transmitting the whole DIO or just synthetic images comprising the DIO needed to reconstruct a local copy of the DIO within the client device. In step 14-732, the data service system may share the DIO with a sharing target, such as computing deice 14-510.

In one embodiment, generating the synthetic image in step 14-724 may further include generating a record of usage per user, so that each generated synthetic image may be counted. The record may then be coupled to a billing system configured to accrue usage charges to a user account associated with the client device. In one embodiment, the user may be provided with a selection of different image processing services, each configured to generate the synthesized image according to a selected image processing function. In one embodiment, each different image processing service may accrue different usage charges.

Figures 7C, 14:
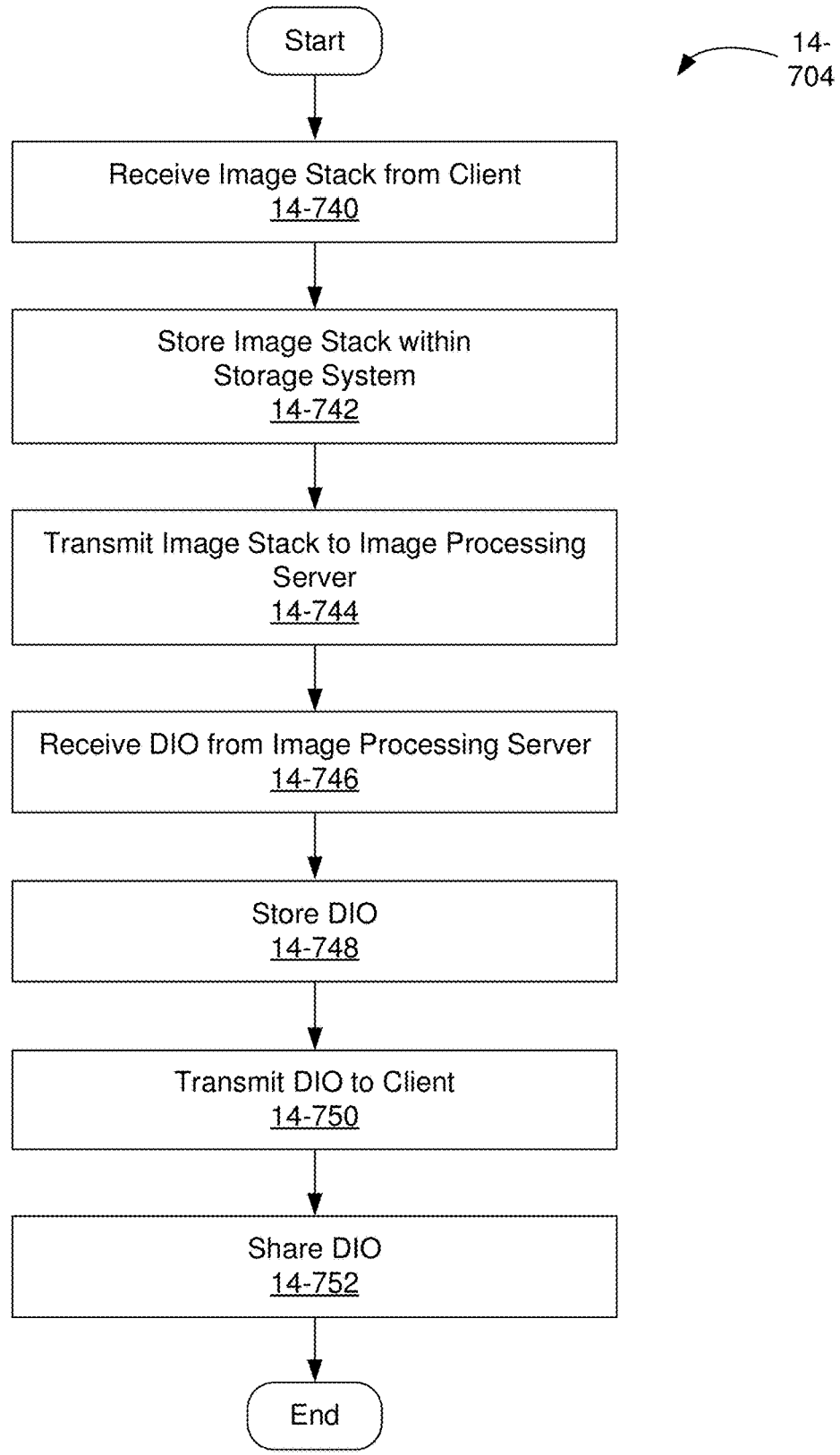
Figures 8, 14:
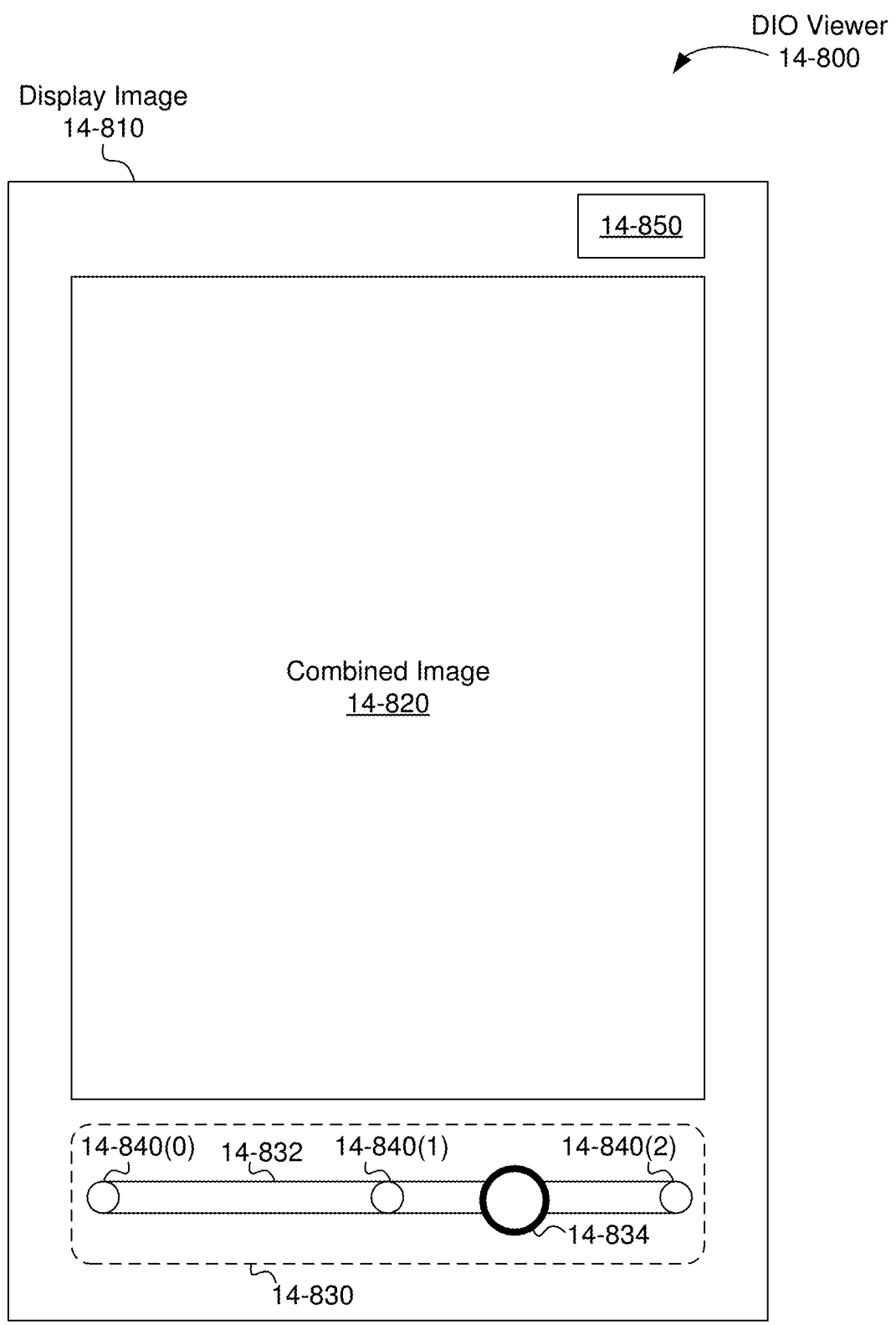

FIG. 14-7C is a flow diagram of a method 14-704, performed by a data service system, for sharing a DIO generated by an image processing server, according to one embodiment of the present invention. Although method 14-704 is described in conjunction with the systems of FIGS. 14-1C-14-3C and FIG. 14-5C, persons skilled in the art will understand that any system configured to perform the method steps is within the scope of the present invention. In one embodiment, the data service system may comprise data service system 14-184 of FIG. 14-5C, the DIO may comprise DIO 14-522, an image stack may comprise SID 14-520, and wireless mobile device 14-170 may comprise a client device.

Method 14-704 begins in step 14-740, where the data service system receives an image stack from the client device. In step 14-742, the data service system may store the image stack within a storage system, such as storage system 14-186(0). In step 14-744, the data service system may transmit the image stack to an image processing server, such as image processing server 14-185. The image processing server may be configured to generate a synthetic image, such as synthetic image 14-424, which may be stored within DIO 14-522. In step 14-746, the data service system may receive the DIO from the image processing server. In step 14-748, the data service system may store the DIO in the storage system. In step 14-750, the data service system may transmit the DIO to the client device. In step 14-752, the data service system may share the DIO with a sharing target, such as computing deice 14-510.

FIG. 14-8 illustrates a DIO viewer 14-800, according to one embodiment of the present invention. DIO viewer 14-800 may be configured to provide an interactive user experience for viewing a DIO, such as DIO 14-410 of FIG. 14-4A.

In various embodiments, DIO viewer 14-800 may include a UI control 14-830, configured to enable a user to enter a viewing parameter, which may be depicted as a position of a control knob 14-834 along a slide path 14-832. To change the viewing parameter, the user may move control knob 14-834. In a touch screen implementation, moving the control knob may involve the user touching and sliding the control knob. The control knob may remain in position after the user lifts their finger from the touch screen. In implementations based on a mouse or track pad, the user may click on and drag the control knob. A combined image 14-820 may be generated based on two or more images associated with the DIO, and further based on the viewing parameter. The viewing parameter may change as the user slides the control knob 14-834, creating a sequence of corresponding new viewing parameters. In one embodiment, the DIO viewer 14-800 may be configured to generate a new combined image 14-820 based on the sequence of new viewing parameters. In this way, the user may touch and hold their finger to the control knob 14-834, and see changes to the combined image 14-820 in real-time as they slide the control knob 14-834 along the slide path 14-832.

In one embodiment, details for how the combined image 14-820 should be generated may be specified in view behavior metadata, such as view behavior metadata 14-436, associated with the DIO 14-410. In another embodiment, each of the two or more images that contribute to combined image 14-820 may be associated with a corresponding anchor point 14-840 along the slide path 14-832. An association between each one of the two or more images and a corresponding anchor point may be specified within the metadata. An order of the two or more images may be specified within the metadata. A position for each anchor point 14-840 may be specified within the metadata, along with an association between each anchor point 14-840 and one image within the DIO 14-410. The one image may comprise one of a source image 14-422, a processed source image 14-423, or a synthetic image 14-424 within the DIO 14-410.

In one embodiment, the metadata may include information related to the control knob 14-834, such as an initial position for control knob 14-834. In one embodiment, the initial position may be established by a user while viewing a DIO within DIO viewer 14-800. When the user closes the DIO, the DIO viewer 14-800 may save the current position as the initial position when the DIO is next opened. The initial position may also be established based on a suggested position for the control knob 14-834. The suggested position may be computed by substantially optimizing a cost function associated with the combined image 14-820, such as an exposure function, color correctness function, histogram function, contrast function, or any other cost function that may be computed from the combined image 14-820. The suggested position may be saved to the DIO when the DIO is initially generated. In one embodiment, the suggested position is displayed as a marker, even if the user changes the position of the control knob 14-834 to establish a different initial position.

In certain embodiments, the control knob 14-834 may be animated to slide along slide path 14-832 as an indication to the user that the control knob 14-834 may be moved and to further indicated to the user what effect moving the control knob 14-834 has on a resulting combined image 14-820. For example, in one embodiment, the control knob 14-834 may be displayed in an initial position, and then slide to a left extreme, and then slide to a right extreme, and then slide back to the initial position, completing the animation. Alternatively, in a separate embodiment, the control knob 14-834 may be displayed at the left extreme, and then slide to the right extreme, and then slide to the initial position, completing the animation. As the control knob 14-834 is animated along slider path 14-832, combined image 14-820 may be updated to reflect a current position for the control knob 14-834. In one embodiment, the metadata may further include animation information, such as the extreme left position and extreme right position along slide path 14-832, how many animation cycles should be performed, animation velocity for the control knob 14-834, granularity of animation along slide path 14-832, and the like.

In some embodiments, the animation may be performed each time the user initially opens a particular DIO within the DIO viewer 14-800. The animation of control knob 14-834 may enable a new user to quickly learn to use the control knob 14-834 within the DIO viewer 14-800, and any user may be provided a quick, visual understanding of the extent of visual impact the control knob 14-834 may have on a current DIO being presented to them.

DIO viewer 14-800 may process the metadata, such as by compiling or instantiating an OpenGL shader program used to generate combined image 14-820. Alternatively, DIO viewer 14-800 may invoke a compositing function or other shader program function that may be built into DIO viewer 14-800 and distinct from the DIO. In one embodiment, the compositing function may implement alpha (opacity) blending to generate combined image 14-820 based on the two or more images, and further based on an alpha value substantially determined by the viewing parameter.

In one embodiment, shown here, anchor point 14-840(0) may correspond to one image from the DIO, anchor point 14-840(1) may correspond to a second image from the DIO, and anchor point 14-840(2) may correspond to a third image from the DIO. The first image may be conceptually behind the second image, and the second image may be conceptually behind the third image. When control knob 14-834 is positioned at anchor point 14-840(0), combined image 14-820 may substantially represent the first image. In this position, the first image may be completely opaque, while the second image may be fully transparent, and the third image may be functionally fully transparent.

In another embodiment, when control knob 14-834 is positioned at anchor point 14-840(1), combined image 14-820 may substantially represent the second image. In this position, the second image may be fully opaque and the third image may be fully transparent. When control knob is positioned between anchor points 14-840(0) and 14-840(1), combined image 14-820 may represent a linear composition of the first image and the second image. In this position, the third image may be functionally fully transparent. The linear composition may be generated using conventional alpha-blending technique. The third image may be fully transparent while control knob 14-834 is positioned within the inclusive range between anchor points 14-840(0) and 14-840(1), or the third image may be excluded from computing combined image 14-820 when control knob 14-834 is within this range. As control knob 14-834 moves from anchor point 14-840(1) to 14-840(2), the third image may be composited with proportionally increasing opacity (decreasing transparency).

While such an embodiment may implement a basic alpha blend operation for generating combined image 14-820, different functions may be implemented for generating combined image 14-820 without departing the scope and spirit of embodiments of the present invention. Furthermore, programming instructions specified within the metadata may define specific functions for generating combined image 14-820 based on two or more images within the DIO, and further based on the viewing parameter derived from a position of control knob 14-834. For example, in one embodiment, the position of control knob 14-834 may have a nonlinear relationship with a viewing parameter controlling the generation of combined image 14-820. In certain embodiments, more than one UI control may be implemented to provide corresponding viewing parameters.

In one embodiment, DIO viewer 14-800 may be configured to generate a synthetic image, such as synthetic image 14-424 prior to presenting a combined image 14-820 to the user. In such an embodiment, DIO viewer 14-800 may load source images, such as source images 14-422, processed source images 14-423, or any combination thereof comprising the DIO and may generate one or more synthetic images 14-424 associated with the DIO. DIO viewer 14-800 may generate the one or more synthetic images based on the metadata or based on a predetermined image processing function. In one embodiment, the image processing function may receive a parameter from a user, such as through a UI control.

In one embodiment, DIO viewer 14-800 may be implemented as a software application, such as application program 14-270 of FIG. 14-2D, executing on a computation platform, such as wireless mobile device 14-170. A display image 14-810 comprising the combined image and the UI control 14-830 may be generated on display unit 14-212 of FIG. 14-2C.

In another embodiment, DIO viewer 14-800 may be implemented as a control script executing as dynamic behavior associated with a web page. Here, at least one source image and at least one synthetic image may be loaded in conjunction with loading the web page, and a local compositing function may generate the combined image 14-820.

In one embodiment, DIO viewer 14-800 may present a UI control, such as a share button 14-850, within display image 14-810. When the user indicates that a DIO should be shared, such as by pressing the share button 14-850, the DIO may be shared, as described previously. The DIO may be shared in conjunction with a particular user account. In one embodiment, a given DIO may reside within wireless mobile device 14-170, and pressing the share button 14-850 may cause the wireless mobile device 14-170 to transmit the DIO to a data service system, such as data service system 14-184; alternatively, pressing the share button 14-850 may cause the wireless mobile device 14-170 to transmit the DIO to a sharing target, such as computing device 14-510 of FIG. 14-5A.

In an alternative embodiment, a given DIO may reside within the data service system, and pressing the share button 14-850 while viewing the DIO within DIO viewer 14-800 may cause the data service system to avail the DIO to other users who may have access to DIOs associated with the user account. For example, in one embodiment, the DIO viewer 14-800 may transmit a command to the data service system to avail the DIO to other users. The command may identify a specific DIO through any technically feasible identifier such as an unique number or name, to other users.

In one embodiment, an application program that implements a UI control is configured to illustrate a corresponding effect of the UI control through a sequence of frames comprising a control animation. The control animation may illustrate any technically feasible function for the UI control. The animation sequence may be executed when a particular application view is first presented. The animation sequence may also be executed when a particular control is made active. For example, in mobile devices with limited screen space, an application program may allow the user to have one or a small number of UI controls active at any one time and to select among different UI controls to be made active. When the user selects a particular UI control, the application program may animate the UI control to illustrate to the user what effect the UI control has within the application program. This technique may be practiced for any type of function associated with any type of application program, the DIO viewer 14-800 providing one exemplary implementation of this technique. Embodiments of the present invention therefore enable any application program that provides a real-time UI control to advantageously indicate the effect of the UI control to a user by animating the control while displaying a corresponding effect.

In one embodiment of the DIO viewer 14-800, a "camera roll" may implement a collection of DIOs that may be browsed by a user and selected for display by the DIO viewer 14-800. In one embodiment, an input gesture, such as a horizontal swipe gesture, causes the DIO viewer 14-800 to display a different DIO within the camera roll. Each DIO within the camera roll may be assigned a position within a sequence of DIOs comprising the camera roll, and a left swipe may select a subsequent DIO for display in the sequence, while a right swipe may select a previous DIO for display in the sequence. Once a DIO is selected for display, the DIO viewer 14-800 may display the DIO. The DIO viewer 14-800 may then animate control knob 14-834 in conjunction with displaying the DIO. The DIO viewer 14-800 may further allow the user to move the control knob 14-834 to adjust combined image 14-820. Additionally, the DIO viewer 14-800 may allow the user to share a DIO, such as by pressing the share button 14-850.

In one embodiment, a camera application may implement a camera view and a DIO view, comprising a DIO viewer 14-800. When a user is framing their picture, the camera application may display a live preview of the picture. When the user takes their picture, the camera application may generate a DIO from their picture. Upon generating the DIO, the camera application may transition to a view display, implemented as DIO viewer 14-800. The user may view their image as a DIO within the DIO viewer 14-800. If the user then enters a swipe gesture, the camera application may select an adjacent DIO within the camera roll for display within the DIO viewer 14-800.

In another embodiment, a DIO viewer may be embedded within a webpage. For example, in one embodiment, a package of viewing elements may be sent to a client station, the viewing elements including metadata associated with the photos, the one or more images necessary to construct the HDR image, and code for modifying the resulting image based on input from a user. In one embodiment, the code may use in some manner webGL to enable manipulation of the images (e.g. blending of the two or more images, etc.).

In one embodiment, a user may receive additional features on the webpage based on a level of access. For example, in one embodiment, a user may have a premium service wherein additional features associated with the webpage are presented to the user, including the ability to modify the exposure, ambient light, strobe (e.g. flash, etc.) light, blending of the two or more images, brightness, contrast, saturation, color scheme, and/or any other element which may be separately controlled.

Still yet, in one embodiment, the bandwidth associated with a user may control the user's ability to interact with the webpage. For example, in one embodiment, the greater the bandwidth associated with the user, the greater the number of options and/or features presented to the user.

Of course, in other embodiments, if a user does not have a premium account (e.g. the user only has a limited or free account, etc.), then limited access to the features and/or options may be presented. For example, in one embodiment, a user using a free account may have the ability to control the blending of the two or more images but lack the ability to separately control any other element. In some embodiments, the free account may be associated with any control and/or feature.

In one embodiment, the client side interaction associated with the DIO includes the ability to package up the image data, metadata, and then transmit such information to a central server. In one embodiment, the server side interaction may include receiving a DIO package (e.g. including the image data, metadata, etc.), and rendering the package according to the functions and parameters specified. Of course, in other embodiments, the server may take any further actions on the DIO package including recognition of objects within the image, determination of locations or information based on the objects within the image, and/or perform any other action which may be relevant to the DIO package.

In some embodiments, the DIO package rendered by the server may be used as the basis for creating a webpage including a DIO viewer. In other embodiments, the DIO viewer may be integrated (or embedded) within a social network (or any other webpage or network system) including manipulation of resulting images, such as HDR images. In one embodiment, the social network may be used to store any amount of data associated with the DIO viewer, including the initial image data, metadata, rendering instructions, processing code, resulting image, and/or any other data associated with the DIO viewer. In other embodiments, the storing of any data associated with the DIO may occur on a temporary basis (e.g. sharing of the DIO viewer is limited to only one week, etc.) or may be on an indefinite or undefined basis as well.

In another embodiment, the metadata which is initially transferred from the client side to the server side may include exposure information, lens configuration, slider positions, default settings, filters to be applied, and/or any other information which may be used to control the image data in some manner.

While the foregoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a computer program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., a hard-disk drive or any type of solid-state random-access semiconductor memory) on which alterable information is stored. Such computer-readable storage media, when carrying computer-readable instructions that direct the functions of the present invention, are embodiments of the invention.

Embodiments of the present invention enable a wireless mobile device to share a dynamic image object (DIO), thereby enabling a recipient to modify their view of an image generated from the DIO using a DIO viewer that is configured to include an interactive user interface (UI) control. In certain embodiments, the DIO viewer may comprise an independent application program. In other embodiments, the DIO viewer may be implemented as a feature of another application having additional features. In one embodiment, the wireless mobile device may be configured to cause a data service system to generate a DIO by processing one or more digital images transmitted from the wireless mobile device to the data service system.

In one embodiment, a DIO may comprise a data object configured to include at least two digital images and may include metadata associated with the at least two digital images. In one embodiment, the metadata may include information related to generating a display image based on combining the at least two digital images. The metadata may also include one or more functions used to generate the display image, an additional image used to generate the display image, or any combination thereof. In another embodiment, a DIO may comprise a data object configured to include one digital image and metadata that may include one or more functions used to generate a display image from the one digital image. The DIO construct is described in greater detail below in FIGS. 14-4A-14-4C.

In one embodiment, a given DIO may be presented to a user through the wireless mobile device executing a DIO viewer and, optionally, presented similarly to other users through different wireless mobile devices or through any other technically feasible computing devices. While certain embodiments are described in conjunction with a wireless mobile device, other embodiments employing different technically feasible computing devices configured to implement the techniques taught herein are within the scope and spirit of the present invention.

Figures 1A, 15:
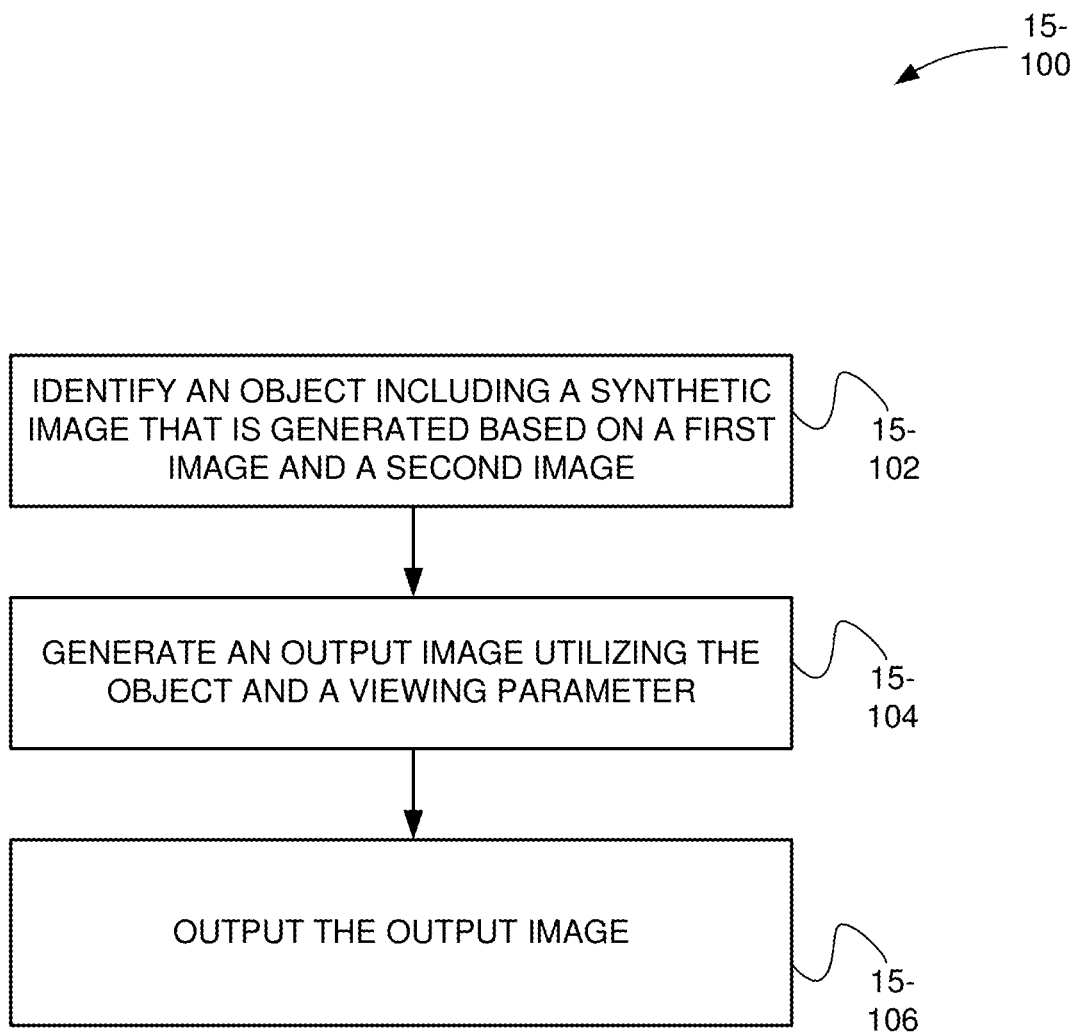
Figures 1B, 15:
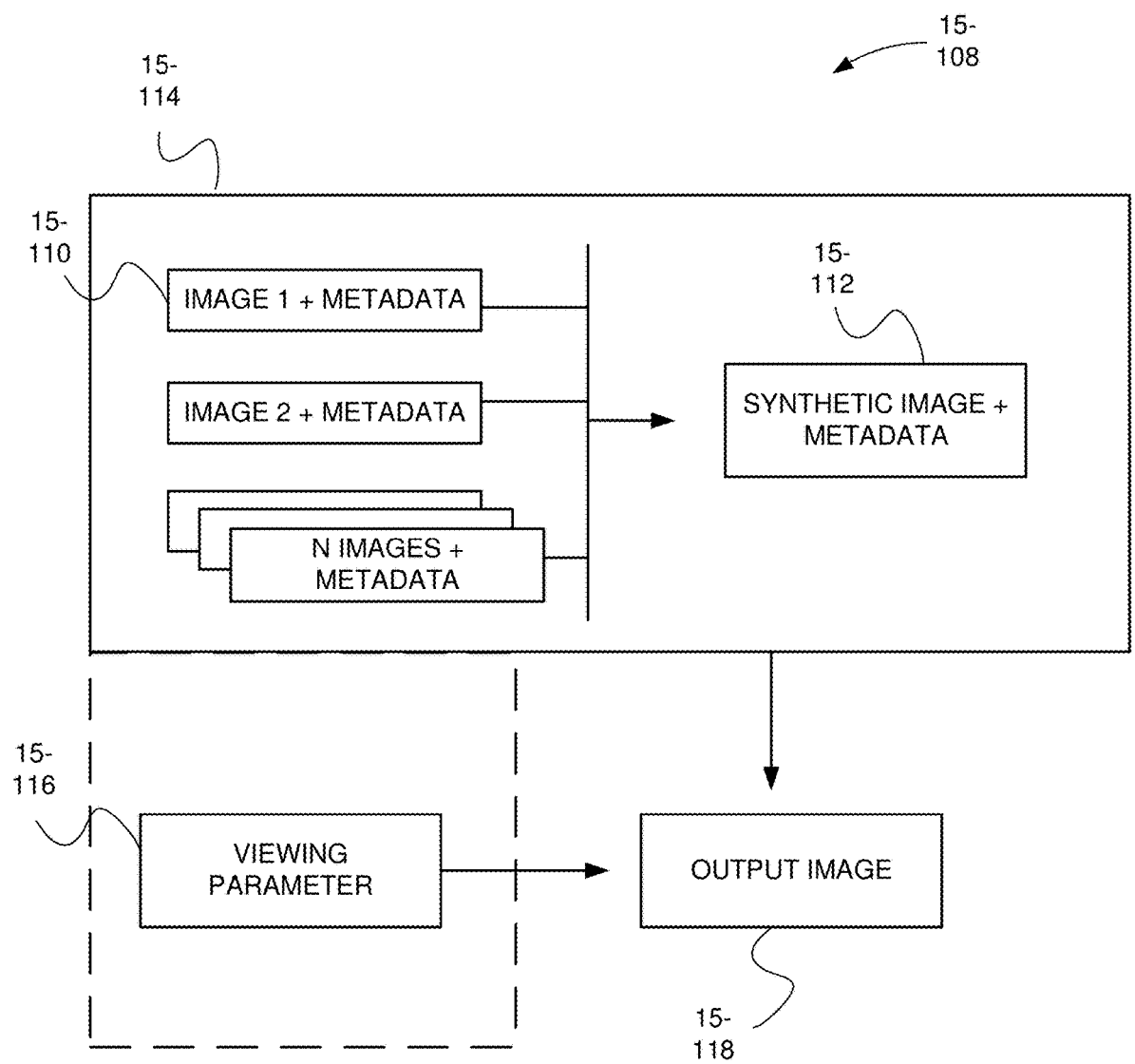

FIG. 15-1A shows a method 15-100 for outputting an output image, in accordance with one embodiment. As an option, the method 15-100 may be implemented in the context of the details of any of the Figures. Of course, however, the method 15-100 may be carried out in any desired environment. Further, the aforementioned definitions may equally apply to the description below.

As shown, an object including a synthetic image that is generated based on a first image and a second image is identified. See operation 15-102. Additionally, an output image utilizing the object and a viewing parameter is generated. See operation 15-104. Further, the output image is outputted. See operation 15-106.

In various embodiments, the first image may be an ambient image and the second image may be a flash image. Of course, in other embodiments, the first image and the second image may be any type of image.

In the context of the present description, a synthetic image includes any image that is based on a combination of at least two input images. In one optional embodiment, such combination may be accomplished utilizing an image synthesis algorithm, and/or any process capable of combining two images together.

In some embodiments, the object may include a dynamic image object. Additionally, in other embodiments, the object may store the first image, the second image, metadata, image metadata (e.g. data associated with the first image and/or second image (and/or any other image), etc.), view behavior metadata, generation behavior metadata, and/or any other information or data which may relate to any of the images in some manner. In one embodiment, any of the data stored in the object, including the first image, the second image, and/or any of the metadata may be used in the generation of the output image.

In one embodiment, the first image or the second image may be used to produce at least one processed image. In another embodiment, the processed image may be stored in the object. Additionally, in one embodiment, at least one processed image corresponding to at least one of the first image or the second image may be stored in the object, for use in the generation of the output image.

In the context of the present description, a viewing parameter includes any parameter that is used to view an image. In one embodiment, a viewing parameter may be used to view a synthetic image, a processed image, the first image, the second image, and/or any other image. In another embodiment, the viewing parameter may be user selectable. In one embodiment, the viewing parameter may include device type, screen size, processor type, amount of RAM, input type, and/or any other feature which may affect how the image (e.g. synthetic image, etc.) is displayed. Additionally, in one embodiment, the viewing parameter may be user selectable.

In various embodiments, operating parameters associated with the viewing parameter may include an ability to control a blend (or mix) between a first image and a second image (and/or any number of images), an exposure, a brightness, a color, a contrast, a sharpness, a filter (e.g. watercolor, color-selection, etc.), a saturation, and/or any other feature which may alter the resulting image in some manner.

Still yet, in one embodiment, a second synthetic image may be generated based on the first synthetic image and at least one of the first image or the second image. Of course, any number of synthetic images may be created based on any previously created synthetic images and/or based on a combination of a previously created synthetic image and the first image or the second image or another image. In one embodiment, the second synthetic image may be stored in the object for use with a viewing parameter. Additionally, in one embodiment, another synthetic image based on the synthetic image and at least one of the first image or the second image may be stored in the object, for use in the generation of the output image.

In one embodiment, the object for use with a viewing parameter may be accessible over a network. For example, in one embodiment, the object may be stored initially on a mobile device. In some embodiments, the mobile device may only store the object for a limited duration. In other embodiments, the object may be sent to a server and transmitted via a network. In one embodiment, the object may be identified by receiving the object from a server, by receiving the object on a client, and/or from or at any other device.

In another embodiment, identifying the first image may include receiving the first image utilizing at least one server. In one embodiment, the identifying the second image may include receiving the second image utilizing the at least one server. Further, in one embodiment, the synthetic image may be generated and stored utilizing the at least one server. In an additional embodiment, the synthetic image may be generated and stored utilizing at least one client.

In one embodiment, application code may be provided for utilizing the object to generate an output image, such that the viewing parameter may be capable of being adjusted utilizing the application code. In another embodiment, a sliding indicia may be displayed, where the viewing parameter is capable of being adjusted in response to sliding user manipulation of the sliding indicia. Still yet, in one embodiment, the output image may be generated utilizing the synthetic image and at least one of the first image or the second image.

FIG. 15-1B shows a process 15-108 for outputting an output image, in accordance with one embodiment. As an option, the process 15-108 may be implemented in the context of the details of any of the Figures. Of course, however, the process 15-108 may be carried out in any desired environment. Further, the aforementioned definitions may equally apply to the description below.

As shown, the process includes image 1+metadata and image 2+metadata. See element 15-110. Additionally, the process may include any number of images and corresponding metadata. In one embodiment, the two or more images and the accompanying metadata are used to create a synthetic image with accompanying metadata. See element 15-112. In one embodiment, an input image (for creating the synthetic image) may include any number of images, and may include original images (not yet processed), as well as synthetic images (already processed).

In one embodiment, the process includes an object. See element 15-114. In various embodiments, the object may include one or more images, metadata, one or more synthetic images, a viewing parameter, and any other data which may be relevant to the one or more images. In one embodiment, the viewing parameter may not be included in the object may be provided separately.

As shown, the process includes a viewing parameter. See element 15-116. Additionally, based on the viewing parameter and the object, an output image is outputted. See element 15-118. In some embodiments, the outputted image may be temporarily saved (e.g. on the server system, etc.) until the user decides to finalize the changes. In other embodiments, if a set threshold of time has been exceeded (e.g. without any changes being made, etc.), the outputted image may be saved in a more permanent manner (e.g. in a non-transitory memory system, etc.).

In one embodiment, outputting the output image may include applying one or more actions to the outputted image, including sharing the outputted image with one or more recipients (e.g. individuals, social network connections, etc.), saving the outputted images to a predefined location (e.g. on the user's hard drive, on Dropbox, on Google Drive, etc.), creating a second version (e.g. low resolution, etc.) of the outputted image (e.g. for sharing with limited bandwidth, etc.), and/or applying any other action to the image after it has been outputted.

In another embodiment, feedback may be received from a user relating to the outputted image. For example, in one embodiment, a user may select to change the blend of a first image and a second image. The outputted image may be displayed based on the user's input. Once the user has finished making any changes to the outputted image, the user may save the outputted image.

Figures 1, 16:
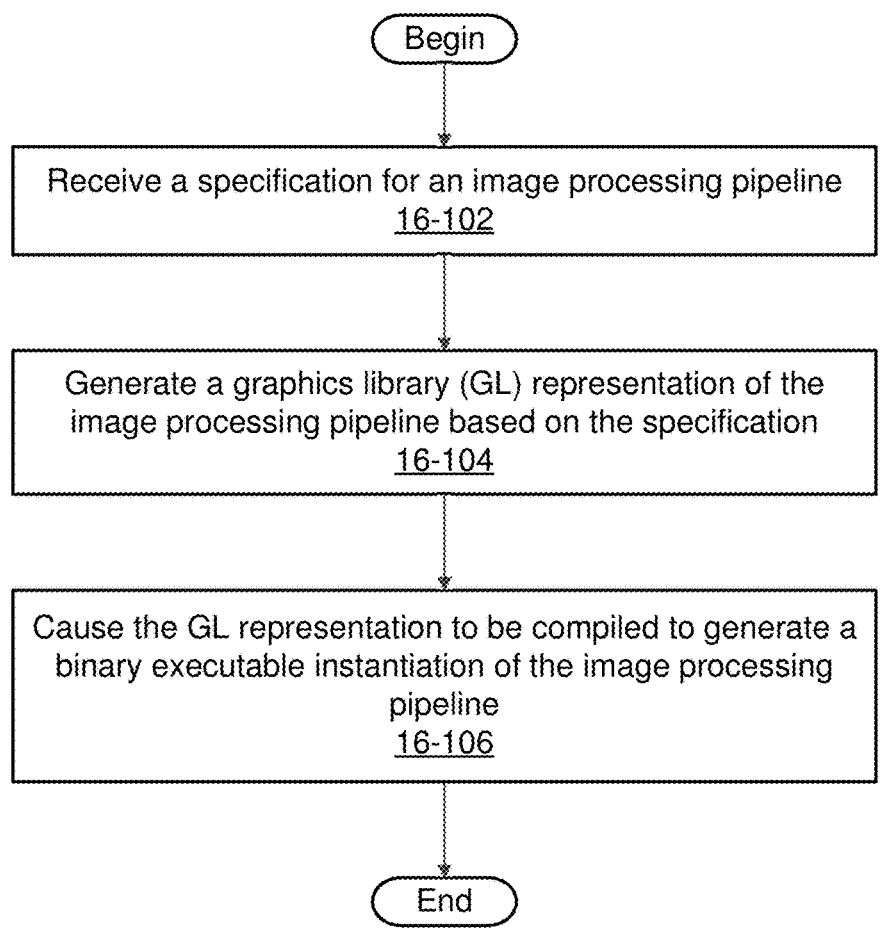
Figures 2, 16:
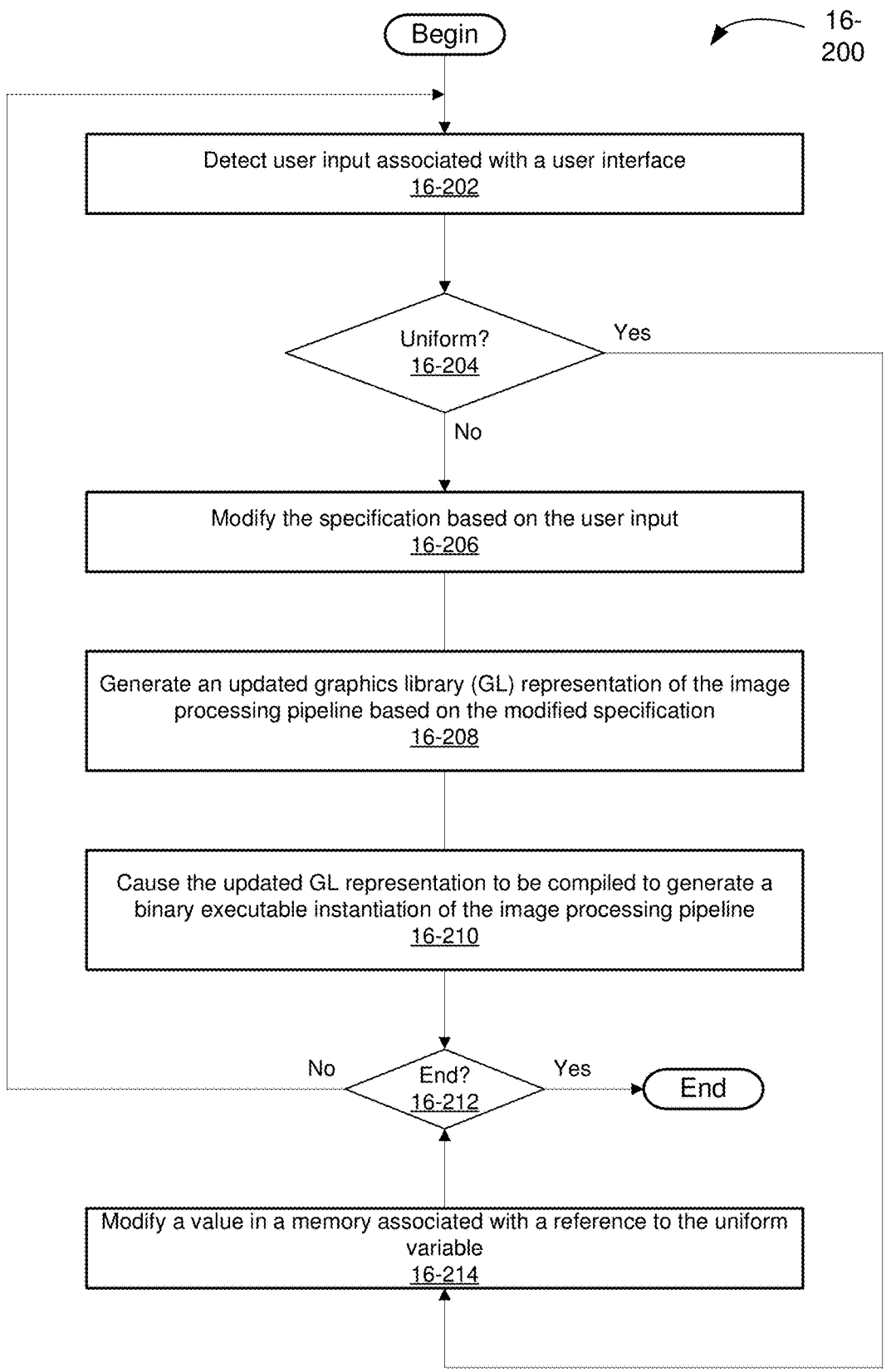

FIG. 16-1 illustrates a flow chart for a method 16-100 for generating a lightweight source code for implementing an image processing pipeline, in accordance with one embodiment. As an option, the method 16-100 may be implemented in the context of the details of any of the Figures. Of course, however, the method 16-100 may be carried out in any desired environment.

In one embodiment, a digital photographic system, such as digital photographic system 300 of FIG. 3A, is configured to perform method 16-100. The digital photographic system 300 may be implemented within a digital camera, such as digital camera 302 of FIG. 3C, or a mobile device, such as mobile device 376 of FIG. 3D.

The method 16-100 begins at step 16-102, where a specification for an image processing pipeline is received. In one embodiment, the specification may be based on configuration settings associated with a user interface of a viewer application. Additionally, the viewer application may be a process or processes executed by a host processor. The viewer application may enable a user to view and manipulate images captured by, for example, a digital photographic system that includes the host processor. In such an embodiment, the viewer application may be associated with a user interface displayed on a display device in order to present options for processing images to a user.

In one embodiment, a digital photographic system may generate a digital image (or simply "image") of a photographic scene subjected to either ambient illumination, strobe illumination, or a combination thereof. In such an embodiment, digital photographic systems may include, without limitation, digital cameras and mobile devices such as smart phones that are configured to include a digital camera module and a strobe unit. Further, in one embodiment, a given photographic scene may be a portion of an overall scene sampled by the digital photographic system.

In another embodiment, two or more images are sequentially sampled by the digital photographic system to generate an image set. Each image within the image set may be generated in conjunction with different strobe intensity, different exposure parameters, or a combination thereof. In one embodiment, exposure parameters may include sensor sensitivity ("ISO" parameter), exposure time (shutter speed), aperture size (f-stop), and focus distance. In other embodiments, one or more exposure parameters, such as aperture size, may be constant and not subject to determination. For example, aperture size may be constant based on a given lens design associated with the digital photographic system. At least two of the images comprising the image set may be sampled in conjunction with a strobe unit, such as a light-emitting diode (LED) strobe unit, configured to contribute illumination to the photographic scene.

In one embodiment, exposure parameters are initially determined and held constant for each image in the image set. The exposure parameters may be initially determined based on ambient lighting conditions. If insufficient ambient lighting is available, such as for extremely dark scenes, then exposure parameters may be determined based on mid-range strobe intensity. For example, mid-range strobe intensity may be selected as fifty-percent of maximum strobe intensity for the strobe unit.

The strobe unit may be configured to modulate strobe intensity to provide a range of illumination contribution among the images within the image set. For example, in one embodiment, the image set may comprise ten images, each with monotonically increasing illumination from the strobe unit. The first of ten images within the image set may be relatively under-exposed with respect to strobe illumination, while the tenth image may be over-exposed with respect to strobe illumination. However, one or more images between the first image and the tenth image will likely be appropriately-exposed with respect to strobe illumination. An image with appropriate illumination may be selected automatically or manually selected by a user. The image with appropriate illumination may then be a resulting image for the photographic scene.

In one embodiment, the digital photographic system may include a viewer application. The viewer application may reside in a memory of the digital photographic system and be associated with a user interface presented on a display of the digital photographic system. In another embodiment, the user interface may include various menus, settings, and user interface elements that enable a user to modify one or more images stored in the memory of the digital photographic system. For example, in one specific embodiment, the user interface may include a slider that enables a user to manually select an image within the image set as the resulting image. The user interface may also include menus that enable a user to select filters to include in an image processing pipeline, checkboxes for selecting particular options associated with the image processing pipeline, and textboxes or drop-down menus for selecting values associated with the image processing pipeline, such as a size of a filter to apply, a threshold value to use with a filter and so forth.

Still yet, in one embodiment, the user may select various options for processing an image or images. By selecting or deselecting certain user interface elements, or by providing values or changing the state of certain user interface elements, a user may conFigure 16—the manner by which the images are processed by an image processing pipeline. The various configuration changes made by the user may be reflected in the specification by the viewer application. For example, in one embodiment, the user interface may be configured to store a data structure that includes the current state of each of the user interface elements in the user interface. The specification may be generated from this data structure. In another embodiment, an application or process may query the user interface to determine the current state of each of the user interface elements and generate the specification based on the current state of the various user interface elements.

In the context of the present description, configuration settings may refer to the combined state of one or more user interface elements in the user interface used to conFIG. 16—the image processing pipeline. For example, a user may select which filters to apply to a given image or images, and in what order, using the user interface such that a resulting image is displayed by the viewer application by processing one or more images via the custom image processing pipeline. In one embodiment, a list of available filters may include, but is not limited to, no filter (e.g., the output is the same as the input), a white balance filter, a noise reducing filter, a smoothing filter or blur filter, an unsharp filter, a color correction filter, and the like.

At step 16-104, a graphics library (GL) representation of the image processing pipeline is generated based on the specification. In one embodiment, a code generator module may create the GL representation by stitching together code segments associated with each of the filters included in the image processing pipeline as defined in the specification. In one embodiment, the GL representation may be an object or data structure that represents a plain text string of source code configured according to an OpenGL™ language specification, and may include calls to an OpenGL application programming interface (API). For example, in one embodiment, the GL representation may represent a shader program, such as a fragment shader, comprising a combination of one or more filters applied to the pixels of an image, where the shader program includes one or more OpenGL functions with corresponding executable mappings. Exemplary executable mappings include source code arithmetic operations mapping to corresponding executable arithmetic instructions or corresponding sequences of instructions, source code variable access operations mapping to executable load/store operations, and the like. In other embodiments, the GL representation may target OpenCL™ CUDA™, or any other technically feasible multi-threaded language.

In one embodiment, the user interface elements included in the user interface may enable a user to specify which filters to include in the image processing pipeline and an order for those filters to be applied to the image(s). Further, a code generator module may receive the specification and generate the GL representation by stitching together code segments associated with each of the elements of the pipeline. The code generator module may also be configured to control the flow of data between nodes in the image processing pipeline by specifying how the output of one node (or filter) is tied to the input of the next node (or filter). In one embodiment, the intermediate data may be consumed immediately by the subsequent node or may be stored temporarily in a buffer, as specified by the code generator module.

In addition, the user interface elements may also specify values or settings for applying those filters, such as by enabling the user to customize threshold values associated with the filters, a window size associated with the filters, and the like. The code generator module may include references to uniform variables in the source code of the GL representation. As defined by the OpenGL standard, a uniform variable is a read-only variable that has the same value for all processed vertices or fragments, but can be changed outside of the shader program via an external application executing on the host processor. In other words, the uniform variable may reference a location in memory that stores a value that can be updated between passes of the image processing pipeline by, for example, the viewer application. By including references to uniform variables in the GL representation and passing certain values to the GL representation in a shared memory, some values specified by the user interface elements can be changed at a later time without explicitly changing the source code included in the GL representation. For example, the user may change the value of a slider UI element associated with a uniform, causing a new resulting image to be generated according to a new uniform value. Similarly, a different texture map may be passed to the binary executable instantiation of the image processing pipeline causing a new resulting image to be generated without changing the binary executable instantiation of the image processing pipeline.

At step 16-106, the GL representation is compiled via a compile service to generate a binary executable instantiation of the image processing pipeline. In one embodiment, the compile service may be associated with a given hardware for executing the image processing pipeline and may be provided by the manufacturer of the hardware for compiling source code that can be executed by that hardware. For example, the image processing pipeline may be executed on one or more graphics processing unit (GPU) cores. The manufacturer of the GPU may provide a compile service module for compiling source code configured for the GPU as either a stand-alone application or as a function call provided via an API implemented by another application (e.g., as a function call made to a driver for the GPU, etc.). In one embodiment, the binary executable instantiation of the image processing pipeline may be executed by the GPU to process one or more images according to the image processing pipeline.

Additionally, in various embodiments, the GL representation may comprise a source code including one or more GL functions with a corresponding executable mapping. The GL function may comprise an OpenGL function. Additionally, an image set may be received that includes a first image of a photographic scene based on a first set of sampling parameters and a second image of the photographic scene based on a second set of sampling parameters, at least one image in the image set may be processed via the binary executable instantiation of the image processing pipeline, In other embodiments, the first set of sampling parameters may comprise ambient exposure parameters for capturing images illuminated by ambient light, and wherein the second set of sampling parameters comprises exposure parameters for capturing images illuminated by a strobe unit. Additionally, the specification may comprise a data structure that identifies at least one filter included in the image processing pipeline and an order for the at least one filter in the image processing pipeline.

In one embodiment, the viewer application, in response to user input associated with the user interface, may be configured to: modify the specification; generate an updated GL representation of the image processing pipeline based on the modified specification; and cause the updated GL representation to be compiled via the compile service to generate an updated binary executable instantiation of the image processing pipeline for execution on the one or more GPU cores.

In another embodiment, the GL representation may include at least one reference to a uniform variable, and the viewer application, in response to user input associated with the user interface, may assign values to the at least one reference to the uniform variable.

In one embodiment, the image processing pipeline may comprise a plurality of filters applied to at least one image in an image set. Additionally, one or more images in an image set may be captured, and a resulting image may be displayed generated by processing the one or more images via the binary executable instantiation of the image processing pipeline.

Further, in another embodiment, the user interface may include at least one of a pull-down menu, a checkbox, a radio button, and a text box, wherein the at least one of the pull-down menu, the checkbox, the radio button, and the text box may define at least part of the image processing pipeline or may specify values for references to uniform variables included in the GL representation.

FIG. 16-2 illustrates a flow chart for a method 16-200 for updating the GL representation of the image processing pipeline, in accordance with one embodiment. As an option, the method 16-200 may be implemented in the context of the details of any of the Figures. Of course, however, the method 16-200 may be carried out in any desired environment. Further, the aforementioned definitions may equally apply to the description below.

In one embodiment, a digital photographic system, such as digital photographic system 300 of FIG. 3A, is configured to perform method 16-200. The digital photographic system 300 may be implemented within a digital camera, such as digital camera 302 of FIG. 3C, or a mobile device, such as mobile device 376 of FIG. 3D.

The method 16-200 begins at step 16-202, where user input associated with a user interface is detected. In one embodiment, method 16-100 is performed to generate a lightweight source code for the image processing pipeline and then that source code is compiled to generate a shader program for execution on specialized hardware such as one or more GPU cores. One or more images are then processed by the image processing pipeline. However, when a user makes changes to the configuration settings for the image processing pipeline, the binary executable instantiation of the image processing pipeline may need to be updated. For example, in one embodiment, a user may change the number of filters included in the image processing pipeline or may change a particular setting associated with one of the filters. Such changes to the configuration settings made by the user using one or more user interface elements should be reflected in the binary executable instantiation of the image processing pipeline.

At step 16-204, the viewer application determines whether the updated configuration setting is associated with a uniform variable. In one embodiment, some configuration settings may specify which filters are included in the image processing pipeline and in what order while other configuration settings may simply specify certain values or settings associated with those filters. These values or settings may be passed to the filter included in the binary executable instantiation of the image processing pipeline via references to uniform variables in the source code. If the configuration setting modified by the user is associated with a uniform variable in the GL representation, then the GL representation does not need to be modified and recompiled. Instead, at step 16-214, the viewer application may simply modify a value in a memory associated with a reference to the uniform variable to adjust the image processing pipeline for processing subsequent images. In one embodiment, a change in any uniform variable triggers execution of the binary executable instantiation of the image processing pipeline to generate a new resulting image but no change is made to the binary executable. After step 16-214, the method 16-200 proceeds to step 16-212, discussed below.

Returning to step 16-204, if the configuration setting modified by the user is not associated with a uniform variable, then, at step 16-206, the viewer application may modify the specification based on the user input. Such user input may, for example, specify a different number and/or order of the filters to be applied to the images by the image processing pipeline. Such modifications to the configuration settings may not simply be effected by changing the value of a uniform variable. Instead, the specification may be modified to define the configuration of the image processing pipeline based on the new configuration settings selected by the user, which may require an updated GL representation of the image processing pipeline. In certain embodiments, code that executes outside the image processing pipeline to manage the image processing pipeline may be configured to adapt accordingly to changes in the specification.

At step 16-208, an updated GL representation of the image processing pipeline is generated based on the modified specification. In one embodiment, a code generator module may stitch together various code segments for the one or more filters included in the image processing pipeline and control the flow of data between nodes in the image processing pipeline. At step 16-210, the GL representation is compiled via a compile service to generate a binary executable instantiation of the image processing pipeline. In one embodiment, the binary executable may be transmitted to the GPU and used to process one or more images according to the updated image processing pipeline. At step 16-212, either the method 16-200 is terminated or the method 16-200 returns to step 16-202 to detect another user input associated with the user interface.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described. While techniques and method disclosed herein are described with respect to altering uniform variables without regenerating the image processing pipeline, texture maps and any other data that does not alter the structure of the image processing pipeline may also be changed without requiring the image processing pipeline or binary executable instantiation of the image processing pipeline to be regenerated. Such changes may or may not trigger computing a new resulting image.

Figures 3, 16:
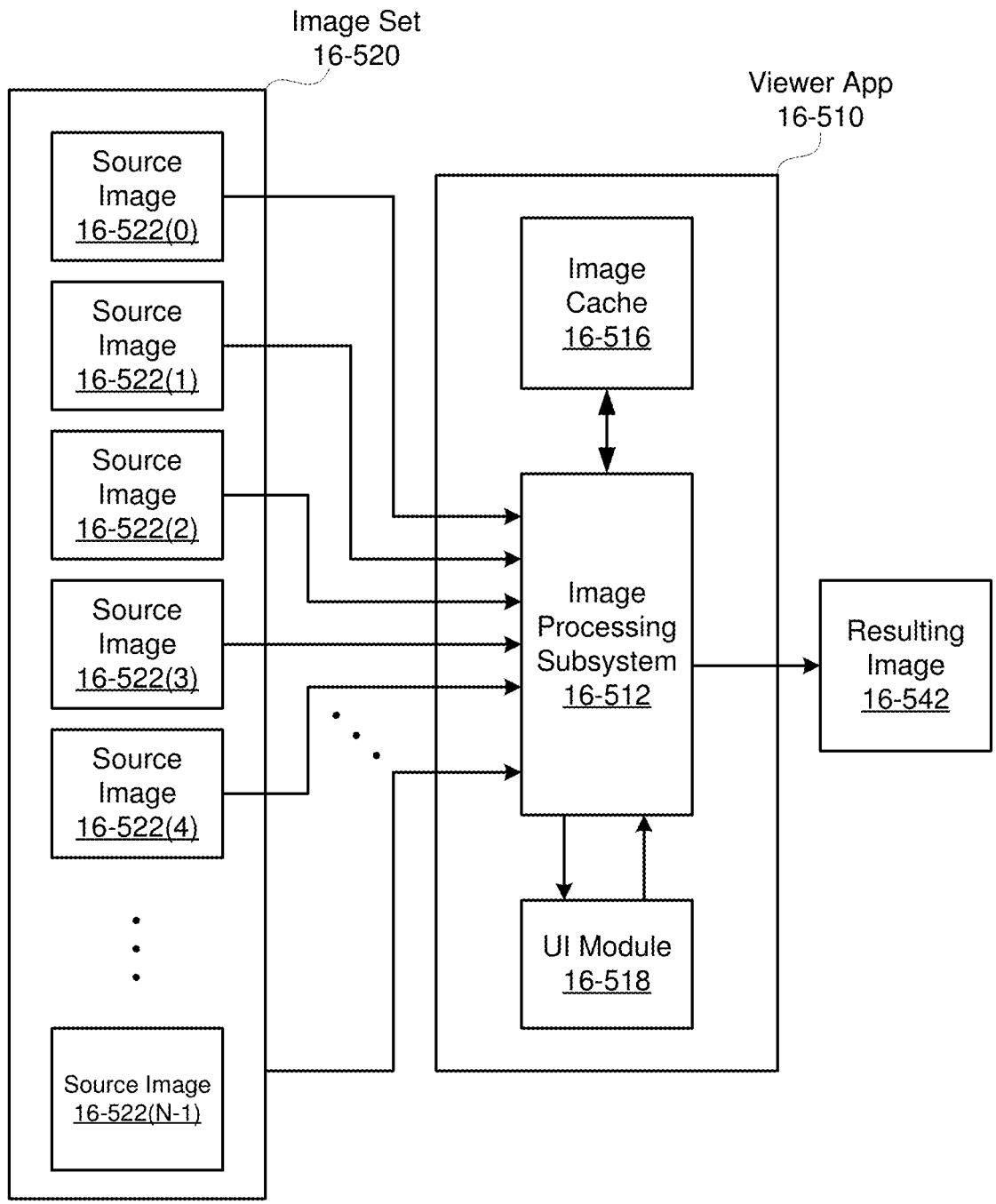
Figures 4, 16:
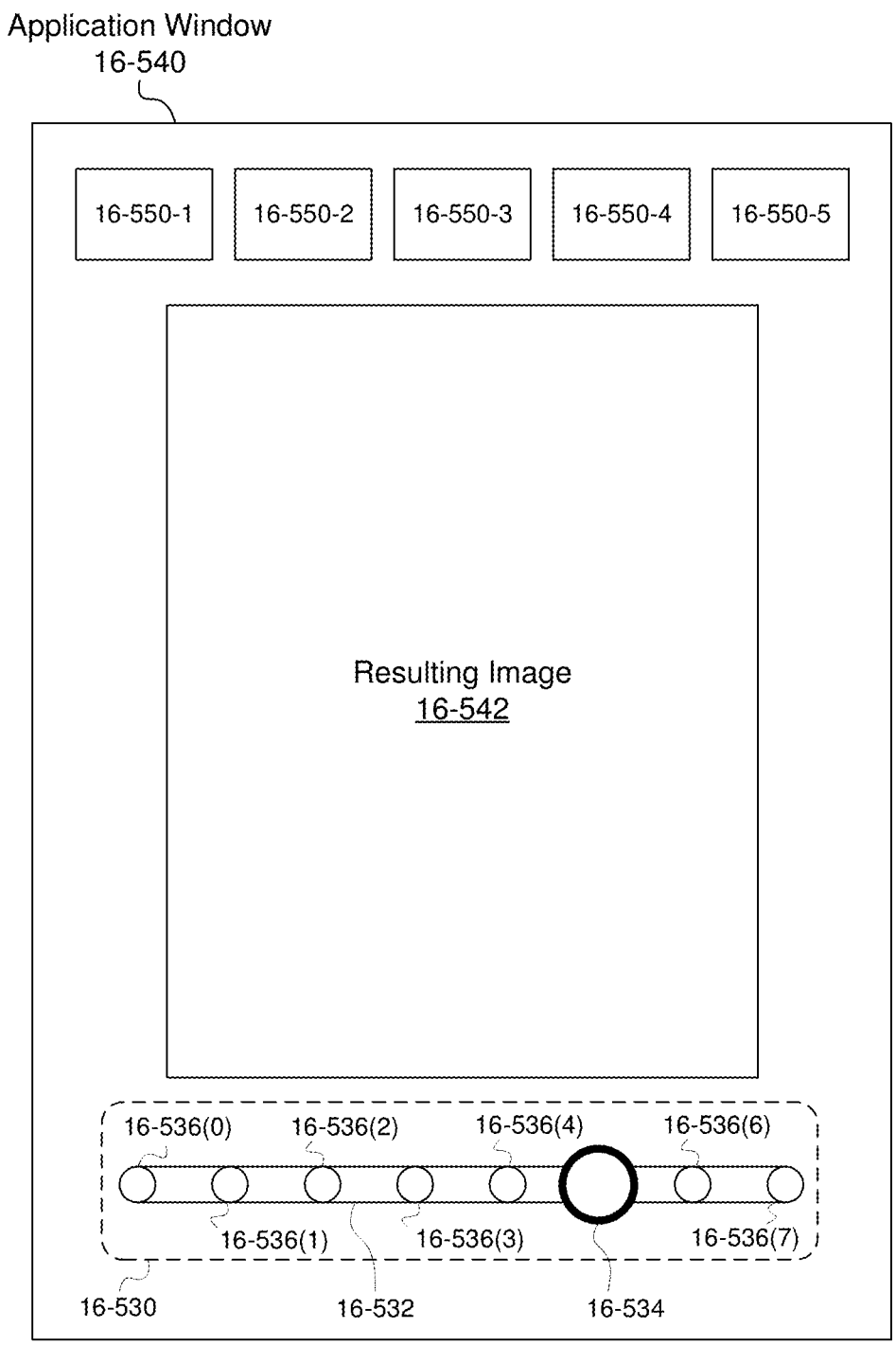
Figures 5, 16:
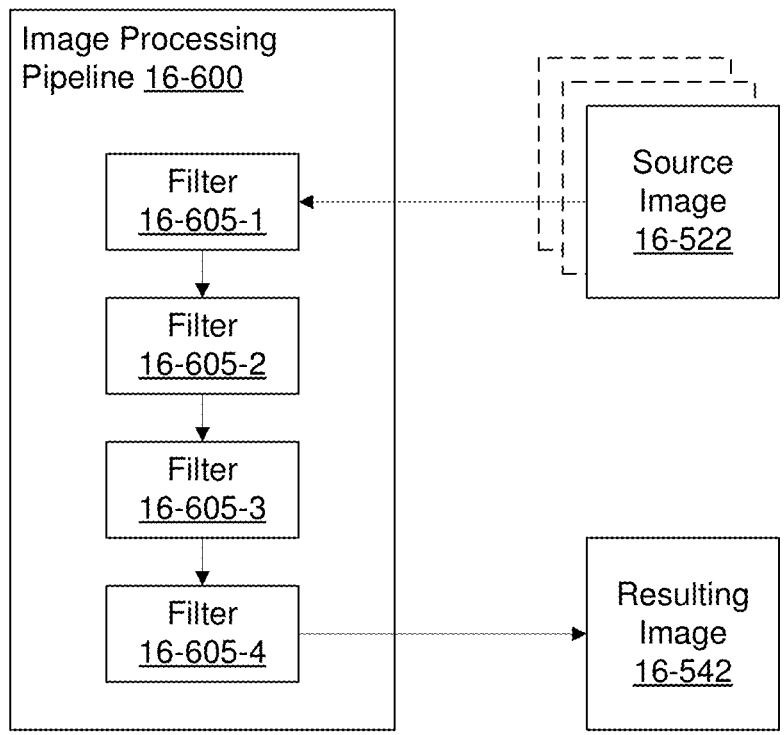
Figures 6, 16:
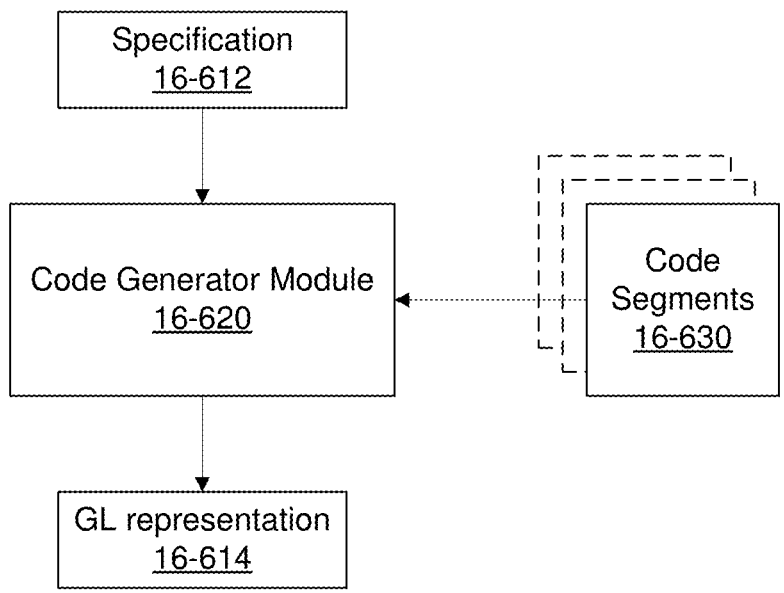
Figures 7, 16:
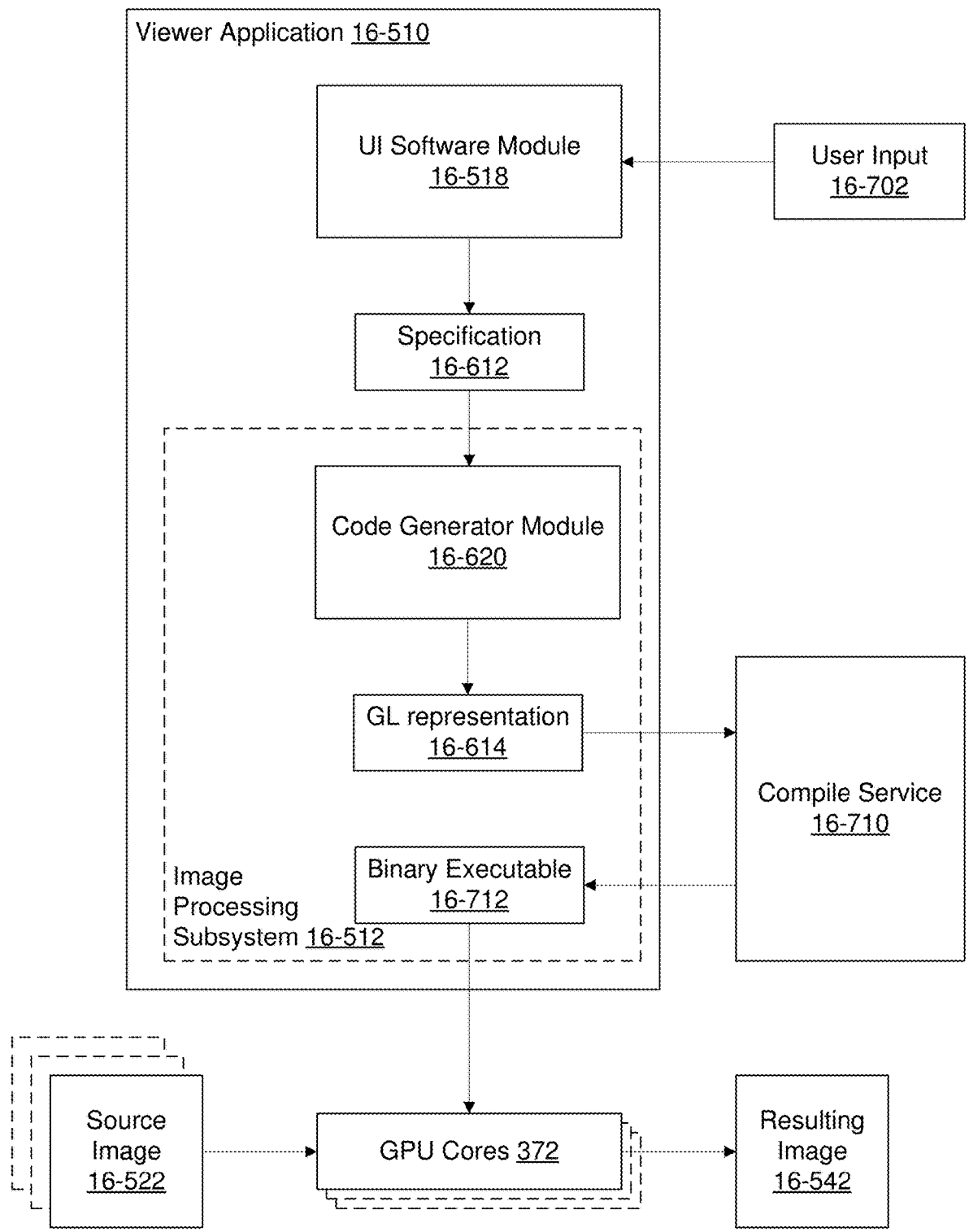

FIG. 16-3 illustrates a viewer application 16-510 configured to generate a resulting image 16-542 based an image set 16-520, in accordance with one embodiment. As an option, the viewer application 16-510 may be implemented in the context of the details of any of the Figures. Of course, however, the viewer application 16-510 may be carried out in any desired environment. Further, the aforementioned definitions may equally apply to the description below.

The image set 16-520 includes two or more source images 16-522, which may be generated by capturing images with the digital photographic system 300 using different exposure parameters.

In one embodiment, the resulting image 16-542 represents a source image 16-522 that is selected from the image set 16-520. The source image 16-522 may be selected according to any technically feasible technique. For example, in one embodiment, a given source image 16-522 may be selected automatically based on based on exposure quality. In an alternative embodiment, a given source image 16-522 may be selected manually through a UI control 16-530, discussed in greater detail below in FIG. 16-4. The UI control 16-530 generates a selection parameter that indicates the manual selection of a particular source image 16-522 in the image set 16-520. An image processing subsystem 16-512 is configured to generate the resulting image 16-542 by processing the selected source image(s) 16-522 via an image processing pipeline. In certain embodiments, the image processing subsystem 16-512 automatically selects a source image 16-522 and transmits a corresponding recommended setting to the UI control 16-530. The recommended setting indicates, through the position of a control knob 16-534 of the UI control 16-530, which source image 16-522 was automatically selected. In one embodiment, a user may keep the recommended setting or select a different source image 16-522 to use for generating the resulting image 16-542 using the UI control 16-530.

In an alternative embodiment, the viewer application 16-510 may be configured to combine two or more source images 16-522 to generate a resulting image 16-542. Further, the two or more source images 16-522 may be mutually aligned by the image processing subsystem 16-512 prior to being combined. The relative position of the control knob 16-534 between any two discrete positions 16-536 of UI control 16-530 may specify a weight assigned to each of two source images 16-522. The weight may be used to perform a transparency/opacity blend (known as an alpha blend) between the two source images 16-522.

In certain implementations, viewer application 16-510 may include an image cache 16-516, configured to include a set of cached images corresponding to the source images 16-522. The image cache 16-516 may provide images that may be used to readily and efficiently generate or display resulting image 16-542 in response to real-time changes to the user interface. In one embodiment, the cached images may be the result of processing one or more of the source images 16-522 according to a particular image processing pipeline associated with the current configuration settings of the user interface. That way, when a user adjusts one of the UI elements, such as UI control 16-530, between two particular discrete positions 16-536 of the UI control, the viewer application can retrieve the cached images from the image cache 16-516 rather than processing the source images 16-522 via the image processing pipeline. In one embodiment, the cached images are rendered to a resolution substantially identical to the screen resolution of display unit 312. Caching images may advantageously reduce power consumption associated with rendering a given source image 16-522 for display.

The viewer application also includes a UI software module 16-518. In one embodiment, the UI software module 16-518 may be configured to render an application window for display on a display device. The application window may include a number of UI elements, described in more detail below in FIG. 16-4. In addition, the UI software module 16-518 may be configured to detect user input with respect to the user interface, such as when a user modifies one of the configuration settings for a particular UI element in the user interface.

In one embodiment, when the UI software module 16-518 detects that user input has modified one of the configuration changes, the UI software module 16-518 may update the specification accordingly. In another embodiment, the specification is an object or data structure stored in a memory that represents the current configuration settings for the image processing pipeline.

FIG. 16-4 illustrates an exemplary user interface associated with the viewer application 16-510 of FIG. 16-3, in accordance with one embodiment. As an option, the user interface of FIG. 16-4 may be implemented in the context of the details of any of the Figures. Of course, however, the user interface of FIG. 16-4 may be carried out in any desired environment. Further, the aforementioned definitions may equally apply to the description below.

As shown in FIG. 16-4, the UI software module 16-518 generates an application window 16-540 for presentation on a display device, such as display unit 312 of the digital photographic system 300. The application window 16-540 may include graphical representations of a resulting image 16-542, a UI control 16-530, and one or more additional UI elements 16-550. The application window 16-540 may comprise a plurality of pixel information stored in, e.g., a frame buffer in a memory and scanned out to the display device as a video signal. As discussed above, the resulting image 16-542 may be a combination of one or more images from the image stack as processed by the image processing pipeline. The resulting image 16-542 may be generated based on the configuration settings for the UI control 16-530 and/or the UI elements 16-550.

In one embodiment, the UI control 16-530 may comprise a linear slider control with a control knob 16-534 configured to slide along a slide path 16-532. A user may position the control knob 16-534 by performing a slide gesture. For example, in one embodiment, the slide gesture may include touching the control knob 16-534 in a current position, and sliding the control knob 16-534 to a new position. Alternatively, in another embodiment, the user may touch along the slide path 16-532 to move the control knob 16-534 to a new position defined by a location of the touch.

In one embodiment, positioning the control knob 16-534 into a discrete position 16-536 along the slide path 16-532 may cause a corresponding source image 16-522 to be processed by the image processing pipeline to generate the resulting image 16-542. For example, in one embodiment, a user may move control knob 16-534 into discrete position 16-536(3), to indicate that source image 16-522(3) is selected. The UI software module 16-518 may indicate to the image processing subsystem 16-512 that one or more configuration settings have been modified and update the specification, if necessary. In one embodiment, the control knob 16-534 may be configured to snap to a closest discrete position 16-536 when released by a user withdrawing their finger.

In an alternative embodiment, the control knob 16-534 may be positioned between two discrete positions 16-536 to indicate that resulting image 16-542 should be generated based on two source images 16-522 corresponding to the two discrete positions 16-536. For example, if the control knob 16-534 is positioned between discrete position 16-536(3) and discrete position 16-536(4), then the image processing subsystem 16-512 generates resulting image 16-542 from source images 16-522(3) and 16-522(4). In one embodiment, the image processing subsystem 16-512 generates resulting image 16-542 by aligning source images 16-522(3) and 16-522(4), and performing an alpha-blend between the aligned images according to the position of the control knob 16-534. For example, if the control knob 16-534 is positioned to be one quarter of the distance from discrete position 16-536(3) to discrete position 16-536(4) along slide path 16-532, then an aligned image corresponding to source image 16-522(4) may be blended with twenty-five percent opacity over a fully opaque aligned image corresponding to source image 16-522(3).

In one embodiment, UI control 16-530 may be configured to include a discrete position 16-536 for each source image 16-522 within a given image set 16-520 being viewed. Each image set 16-520 stored within the digital photographic system 300 of FIG. 3A may include a different number of source images 16-522, and UI control 16-530 may be configured to establish discrete positions 16-536 to correspond to the source images 16-522 for a given image set 16-520.

In addition to UI control 16-530, the application window 16-540 may include one or more UI elements 16-550 that enable a user of the viewer application 16-510 to adjust configuration settings associated with the image processing pipeline. Although only shown conceptually in FIG. 16-4, the UI elements 16-550 may take any form such as drop-down menus, text boxes, check boxes, combo boxes, radio buttons, icons, and the like. In addition to UI elements displayed on the application window 16-540, additional UI elements may be displayed within dialog boxes that are displayed based on user input, such as by selecting one of UI elements 16-550.

In one embodiment, the UI elements 16-550 may be associated with configuration settings that define the image processing pipeline. For example, one UI element 16-550 may comprise a drop-down menu that lists a number of filters to include in the image processing pipeline. A user may select each filter that they want to include in the image processing pipeline by selecting the items in the drop-down menu. As a particular filter is selected, other UI elements 16-550 may be used to specify various configuration settings associated with that filter or to specify other filters to be included in a filter pipeline. For example, in one embodiment, one UI element may be a checkbox for specifying whether the filter should be included in the image processing pipeline. Another UI element 16-550 may be a textbox or drop-down menu for selecting a particular value used when applying that filter, such as a color value, a window size, etc. Another UI element 16-550 may be a series of radio buttons for selecting one of a pre-configured set of values associated with the filter. It will be appreciated that the UI elements 16-550 described herein are only for illustrative purposes and any UI elements capable of receiving user input to specify a value or configuration setting associated with the image processing pipeline is within the scope of the embodiments.

As discussed above, in response to user input that modifies the setting of one of the UI elements 16-550, the UI software module 16-518 may be configured to update the specification based on the state of the UI element 16-550. In one embodiment, the specification is only updated based on a subset of UI elements 16-550 that are related to a change of the image processing pipeline not associated with a reference to a uniform variable. In such an embodiment, a modification to the UI element may be reflected by changing a value in the memory corresponding to the reference to the uniform variable. In contrast, other UI elements 16-550 may be related to a change of the image processing pipeline that is not associated with a reference to a uniform variable. In one embodiment, such changes may be fundamental to the image processing pipeline, such as the addition or removal of a filter, a change in the filter ordering, and so forth, such that the UI software module 16-518 may update the specification and notify the image processing subsystem 16-512 that the image processing pipeline needs to be updated.

FIG. 16-5 illustrates an image processing pipeline 16-600, in accordance with one embodiment. As an option, the image processing pipeline 16-600 may be implemented in the context of the details of any of the Figures. Of course, however, the image processing pipeline 16-600 may be carried out in any desired environment. Further, the aforementioned definitions may equally apply to the description below.

As shown in FIG. 16-5, the image processing pipeline 16-600 receives one or more source images 16-522 and generates a resulting image 16-542. At least one source image 16-522 is processed by a filter (e.g., 605-1, etc.) and the resulting filtered image is forwarded to the next filter (e.g., 605-2, etc.). As image data makes its way down the pipeline, eventually the image data is processed by the last filter in the image processing pipeline, such as filter 16-605-4, and the resulting image data corresponds to the resulting image 16-542. In one embodiment, each filter 16-605 is implemented as a fragment shader, configured to execute as a multi-threaded program where each thread generates one pixel of the resulting image 16-542. In one embodiment, at least one source image is passed to the image processing pipeline 16-600 as a texture map.

It will be appreciated that the types of filters 16-605 implemented in image processing pipelines are numerous. Each manufacturer of a digital camera may implement a different image processing pipeline that is tailored to their specific hardware. Examples of the types of filters 16-605 implemented in image processing pipelines include, but are not limited to, white balance filters, Debayer filters, gamma correction filters, color correction filters, blur filters, unsharp mask filters, noise reducing filters, chroma subsampling filters, and compression filters. It will be appreciated that any type of image processing filter may be implemented as a node of the image processing pipeline 16-600.

In many digital cameras on the market today, the image processing pipeline is pre-configured. For example, an image may be captured by the image sensor and sampled in a predefined way to generate raw image data. The raw image data is then demosaiced (i.e., Debayered) to generate a digital image in an RGB color space. A white balance function may be applied. A filter may also be applied (e.g. Gaussian blur, etc.). Gamma correction may be applied. The image may be converted from one color space to another color space. Finally, the image may be subsampled and compressed to be stored in a particular image format. This image processing pipeline may be implemented in hardware, software, or a combination of hardware and software. In other embodiments, the processing pipeline may not be changed (except that certain filters may be bypassed depending on the cameras settings, such as by not applying the white balance filter).

These image processing pipelines are typically limited to a small number of conventional filters used to make the images have a uniform look. In other words, more complex image processing filters are typically not included in the pre-configured image processing pipelines. Instead, users must transfer the digital images to a desktop computer and edit the images using photo-editing software such as Adobe® Photoshop. The ability to implement the large number of filters available in the photo-editing software in a particular image processing pipeline would be impractical and the limitations of the hardware would quickly be reached by trying to implement a pre-configured image processing pipeline with tens or even hundreds of different filters. By contrast, embodiments of the present invention enable greater flexibility by allowing a user to select specific filters from a set of available filters, and an order for performing filter operations using the selected filters. For example, as shown below in FIG. 16-6, an image processing pipeline can be configured on-the-fly in order to implement only a subset of filters selected from a large number of available filters selected by a user. As such, a large variety of image processing filters may be made available to a user while not being constrained by the hardware of the device.

FIG. 16-6 illustrates the generation of a graphics language (GL) representation 16-614 of the image processing pipeline 16-600 of FIG. 16-5, in accordance with one embodiment. As an option, the generation of the GL representation 16-614 may be implemented in the context of the details of any of the Figures. Of course, however, the generation of a GL representation 16-614 may be carried out in any desired environment. Further, the aforementioned definitions may equally apply to the description below.

As used herein, a graphics language refers to any system of software language semantics, API functions, and related functions used to implement graphics operations. In one embodiment, a graphics language may refer to the OpenGL® standard graphics library (e.g. which may define a standard set of functions that comprise an application programming interface, etc.). In one embodiment, specialized graphics hardware, such as the GPU cores 372 of FIG. 3B, may be utilized to implement the functions defined by the GL and API.

In one embodiment, the manufacturer of the graphics hardware may supply a device driver that executes on a host processor, where the device driver may implement the API calls defined in the OpenGL standards, or some other graphics library like Direct3D®. An application program, such as the viewer application 16-510, may then include calls to the API functions that are linked to the device driver. In one embodiment, when the application makes an API call, the driver is configured to implement the corresponding operation, typically with the use of the specialized graphics hardware.

In another embodiment, GPUs may be specifically designed to process a large amount of data in parallel. This may be particularly useful in image processing applications. Most filters used to process an image can be executed in parallel for each pixel in the image, thereby performing the operation much faster than if each pixel of the image was processed serially. For example, in one embodiment, a blur function will compute a filtered pixel value for each pixel in the image based on a number of pixel values surrounding that particular pixel. These filters may be implemented by creating what is referred to as a shader program, or more specifically, a pixel or fragment shader program.

In the context of the present description, the shader program is defined using source code that includes calls to functions defined in the graphics library. The shader program may be written as a small code segment or group of instructions that will be applied to each pixel in the image being processed. The output of the shader program may be a pixel value (e.g., an rgb vector, an rgba vector, etc.) and may correspond to a particular pixel in the intermediate results or resulting image 16-542.

It will be appreciated that the filters 16-605 included in the image processing pipeline may be implemented as shader programs that are executed on one or more GPU cores 372 of the processor complex 310 of FIG. 3B. Therefore, the abstract image processing pipeline 16-600 of FIG. 16-5 may be implemented by combining a number of shader programs that implement each of the filters 16-605 and then controlling the flow of data through the shader programs to generate the resulting image 16-542.

As shown in FIG. 16-6, a code generator module 16-620 may be implemented within the viewer application 16-510. The code generator module 16-620 receives the specification 16-612 that defines the image processing pipeline 16-600. As discussed above, the specification 16-612 may be a data structure that includes the configuration settings associated with the user interface associated with the viewer application 16-510. The code generator module 16-620 analyzes the specification to determine an order of filters 16-605 included in the image processing pipeline 16-600.

In one embodiment, once the code generator module 16-620 determines which filters 16-605 to include in the image processing pipeline 16-600, the code generator module 16-620 may fetch one or more code segments 16-630 corresponding to each of the filters 16-605. In one embodiment, the code segments 16-630 may be stored in a non-volatile memory, such as NV memory 316 of the digital photographic system 300. In another embodiment, the code segments 16-630, as well as metadata associated with the code segments 16-630, may be stored in a database and fetched in response to a query to the database. The database may be stored in the non-volatile memory of the device, or stored remotely and accessed via a web-service. In one embodiment, if the database is stored remotely, then the code generator module 16-620 may be configured to fetch code segments 16-630 the first time they are included in the image processing pipeline 16-600 and then cache the code segments 16-630 locally for reuse in later implementations of the image processing pipeline 16-600. In such an embodiment, this may allow a large number of filters 16-605 to be made available on the Internet, but only those filters 16-605 that are used to be stored on the local device.

Each code segment 16-630 may include a plain text version of a shader program for a particular filter 16-605. In other words, the code segment 16-630 for a particular filter 16-605 may include the source code for the filter, including any graphics library functions needed to implement the filter 16-605 on the graphics hardware. For example, as shown below, Table 16-1 illustrates the source code included in a first code segment for a "no filter" operation (i.e., the input pixel is returned as the output pixel), and Table 16-2 illustrates the source code included in a second code segment for a white balance operation.

TABLE 16-1

```
DgStitchletNone_frag.glsl:
highp vec3 com_dueLight_none(highp vec3 rgb) {
    return rgb;
}
```

TABLE 16-2

```
DgStitchletWhiteBalance_frag.glsl:
highp vec3 com_dueLight_whiteBalance(highp vec3 rgb, highp float tilt) {
    precision_highp_float;
    if (tilt == 0.) {
        return rgb;
    }
    // perform white balance op based on tilt
    vec3 processed = vec3(...);
    return mix(rgb, processed, tilt);
}
```

In one embodiment, the code segments 16-630 shown above may be stored as objects (e.g., files, etc.) in the non-volatile memory. In addition, the code segments 16-630 may be associated with metadata that describes the code segments 16-630, such as a length of the code segment 16-630, in bytes, the names of the parameters passed to the filter in the code segment 16-630, whether the code segment is associated with any uniform variables, and so forth. Metadata may include any useful information about the code segment 16-630 that may be utilized by the code generator module 16-620 or the viewer application 16-510.

Again, it will be appreciated that the code segments 16-630 shown above are for illustrative purposes and other types of code segments 16-630 are within the scope of the present disclosure. For example, the code segments 16-630 may include source code for a Debayer operation, an unsharp mask operation, a noise reducing operation, an edge detection operation, a color correction operation, a blur operation, and so forth.

Once the code generator module 16-620 has fetched the required code segments 16-630, the code generator module 16-620 may stitch the code segments 16-630 together to generate a single GL representation 16-614 of the image processing pipeline 16-600. More specifically, the code generator module 16-620 may create a single, plain text file or text string with source code for instantiating each of the filters 16-605 included in the image processing pipeline 16-600 using the graphics hardware. In one embodiment, the code generator module 16-620 may include each of the fetched code segments 16-630 in the GL representation 16-614. The code generator module 16-620 also may define references to uniform variables such that one or more values included in the configuration settings may be passed to the filters 16-605 during execution.

In one embodiment, references to uniform variables are included such that certain values specified by the UI elements may be changed without requiring a new GL representation to be generated and compiled. For example, in Table 16-2 above, the white balance operation takes a parameter called "tilt" that may be changed within the UI to adjust the manner that white balance is performed. The tilt parameter allows for compensation of the color temperature and a green-magenta shift of the light used to illuminate a scene.

Finally, the code generator module 16-620 includes a function in the GL representation 16-614 for specifying the processing order for each of the defined filters 16-605. In one embodiment, the function may take a pixel value as an input parameter, process the pixel value based on a first filter 16-605, process the resulting pixel value based on a second filter 16-605, and so forth until the pixel value has been processed by each of the filters 16-605 included in the image processing pipeline 16-600. Table 16-3 illustrates a GL representation of an image processing pipeline having two filters, the no filter operation and the white balance operation shown above in Tables 1 and 2, respectively.

TABLE 16-3

```
// com_dueLight_none
highp vec3 com_dueLight_none(highp vec3 rgb) {
    return rgb;
}
// com_dueLight_whiteBalance
uniform highp float com_dueLight_whiteBalance_tilt_1;
highp vec3 com_dueLight_whiteBalance(highp vec3 rgb,
highp float tilt) {
    precision_highp_float;
    if (tilt = 0.) {
        return rgb;
    }
    // do white balance op based on tilt
    vec3 processed = vec3(...);
    return mix(rgb, processed, tilt);
}
// stitcherFilter
highp vec3 stitcherFilter(highp vec3 rgb) {
    rgb = com_dueLight_none(rgb);
    rgb = com_dueLight_whiteBalance(rgb,
    com_dueLight_whiteBalance_tilt_1);
    return rgb;
});
```

In one embodiment, the code generator module 16-620 may instantiate a stitcher object from a stitcher class. In one embodiment, the stitcher class may include code for adding references to filters 16-605 to the stitcher object and code for generating the GL representation 16-614 based on the filters 16-605 associated with the stitcher object. The main body of the code generator module 16-620 may include a loop for parsing the specification 16-612, fetching the code segments 16-630 for the filters 16-605 identified by the specification 16-612, querying the metadata associated with the code segments 16-630 to determine whether any uniform variables are defined for the filters 16-605, and adding the code segments 16-630 and unique uniform variable definitions to the GL representation 16-614. The main body of the code generator module 16-620 may also include an instruction for adding a main function to the GL representation 16-614 that instantiates the processing order of each of the filters 16-605 included in the image processing pipeline 16-600. Alternatively, the code segments 16-630 may be instantiated and stitched as in-line code within the GL representation 16-614. In other embodiments, more than one image processing pipelines may be similarly generated, each configured to perform certain operations that may operate together to independently within the context of an application such as viewer application 16-510.

FIG. 16-7 illustrates the implementation of the image processing pipeline 16-600 by the viewer application 16-510 of FIG. 16-3, in accordance with one embodiment. As an option, the implementation of the image processing pipeline 16-600 of FIG. 16-7 may be implemented in the context of the details of any of the Figures. Of course, however, the implementation of the image processing pipeline 16-600 of FIG. 16-7 may be carried out in any desired environment. Further, the aforementioned definitions may equally apply to the description below.

As shown in FIG. 16-7, the viewer application 16-510 includes the UI software module 16-518 and the image processing subsystem 16-512, which includes the code generator module 16-620. The UI software module 16-518 receives user input 16-702 that changes at least one configuration setting associated with at least one UI element in the user interface of viewer application 16-510. In response, the UI software module 16-518 updates the specification 16-612 to reflect the image processing pipeline 16-600 defined by the current configuration settings. The code generator module 16-620 receives the updated specification 16-612 and generates the GL representation 16-614 of the image processing pipeline 16-600. Then, the image processing subsystem 16-512 transmits the GL representation 16-614 to a compile service 16-710 to compile the GL representation 16-614 and generate a binary executable instantiation 16-712 of the image processing pipeline 16-600. The image processing subsystem 16-512 then loads the binary executable instantiation 16-712 of the image processing pipeline 16-600 on the graphics hardware, such as one or more GPU cores 372 of the digital photographic system 300. Then, the image processing subsystem 16-512 causes one or more images, such as source images 16-522 to be processed according to the image processing pipeline 16-600 on the graphics hardware to generate the resulting image 16-542.

In one embodiment, the compile service 16-710 may comprise a function included in a device driver for the graphics hardware and may be executed by a host processor. In one embodiment, the compile service may generate the binary executable instantiation 16-712 of the image processing pipeline 16-600 in a matter of milliseconds. Consequently, a resulting image 16-542 may be generated from stored source images 16-522 in a very small time, allowing new image processing pipelines to be defined and compiled in real-time in response to user input 16-702 associated with the user interface. Thus, a user may quickly define new image processing pipelines that include different filters to process a given image using a subset of simple UI elements such as menus and checkboxes and the like. These customizable image processing pipelines may be generated and executed in a matter of milliseconds in order to show the user the response of their changes to the resulting image 16-542.

In one embodiment, the UI software module 16-518 may monitor the user interface to detect the user input 16-702. If any modifications are made, the UI software module 16-518 may determine whether the changes require a new image processing pipeline 16-600 to be generated. If so, the code generator module 16-620 creates a modified GL representation 16-614 that represents the new image processing pipeline 16-600. The modified GL representation 16-614 may be compiled by the compile service and loaded into the graphics hardware to re-process the source image(s) 16-522.

One advantage of the present invention is that a user may specify a customizable image processing pipeline for use on mobile devices that may have scaled down or power-limited hardware. The code for each distinct image processing pipeline is kept lightweight and only includes the code for the included filters. Thus, this code may be easily executed on limited graphics hardware without experiencing undue delays. In conventional systems, the image processing pipeline would typically be implemented with all available filters and a manner to bypass some filters based on configuration settings in the device, or the filters may be modular but require intermediate buffers to store materialized intermediate images. However, because the source code includes the instructions for every available filter, processing images with the pipeline would take a long time and practical limitations required that only a small number of filters would be included in the image processing pipeline. Other filters would need to be manually added later using image editing software. With the system disclosed herein, a user may add a large variety of filters directly into an image processing pipeline of a device such that those filters are immediately applied to the images captured by the device. Furthermore, the device enables real-time modifications to be made to the image processing pipeline so that a user may determine the best possible configuration for their application.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figures 1, 17:
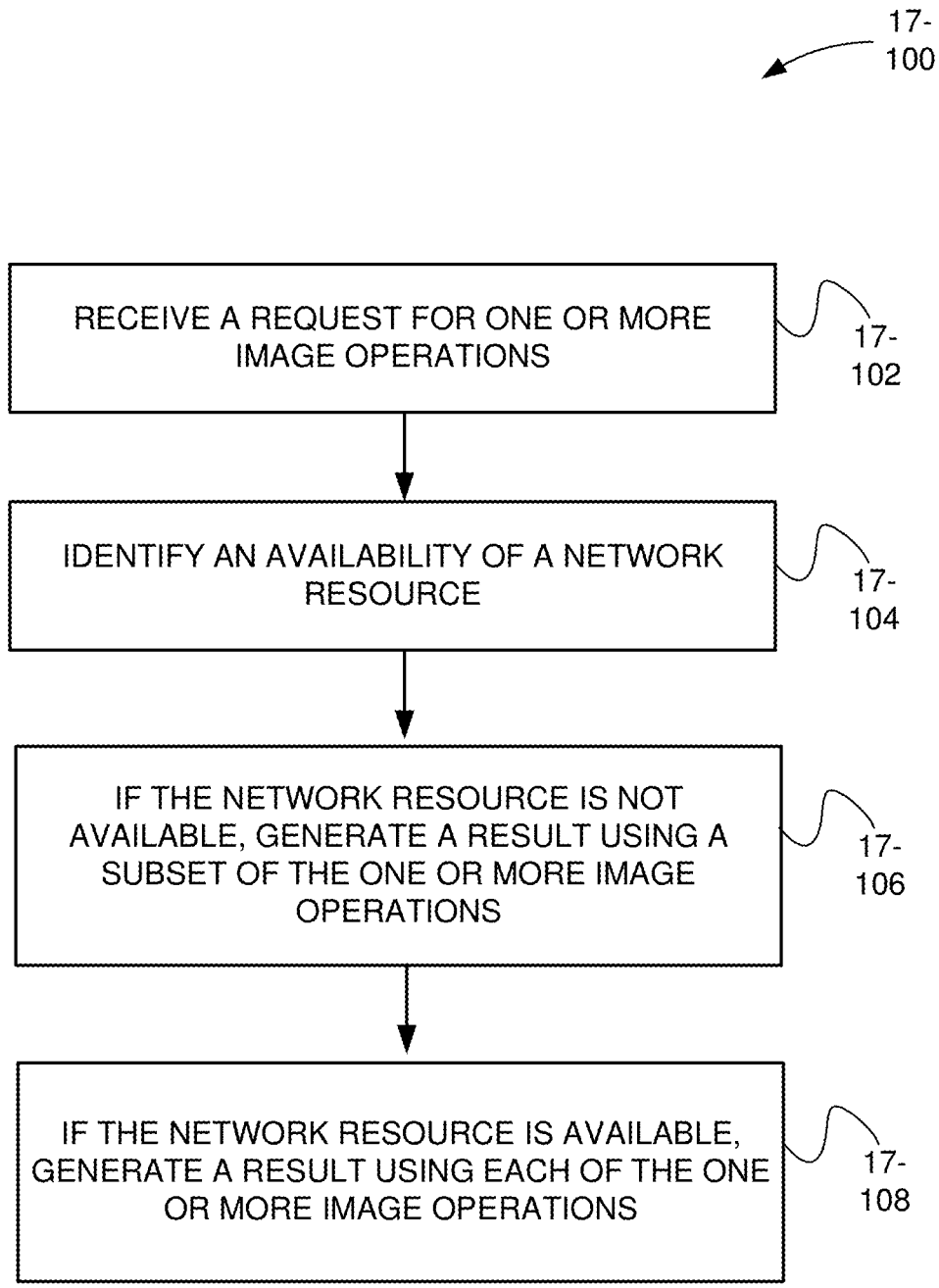
Figures 2, 17:
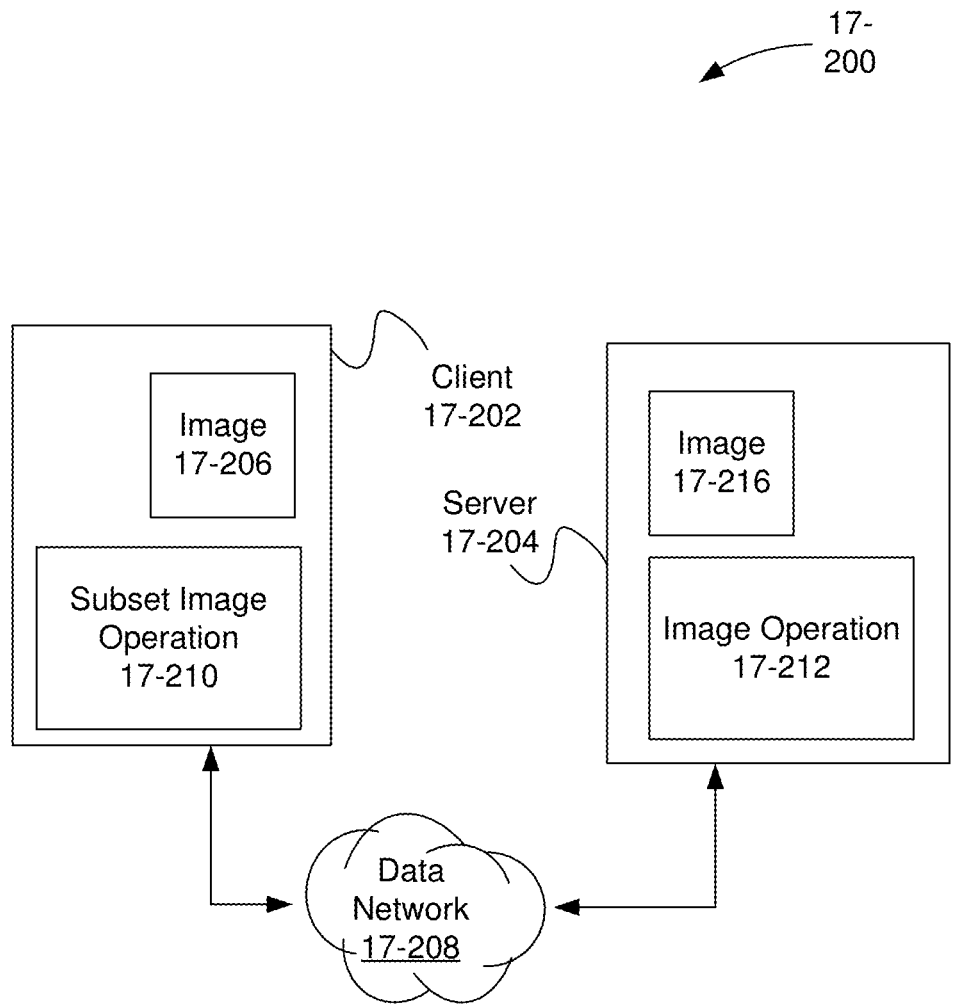
Figures 3, 17:
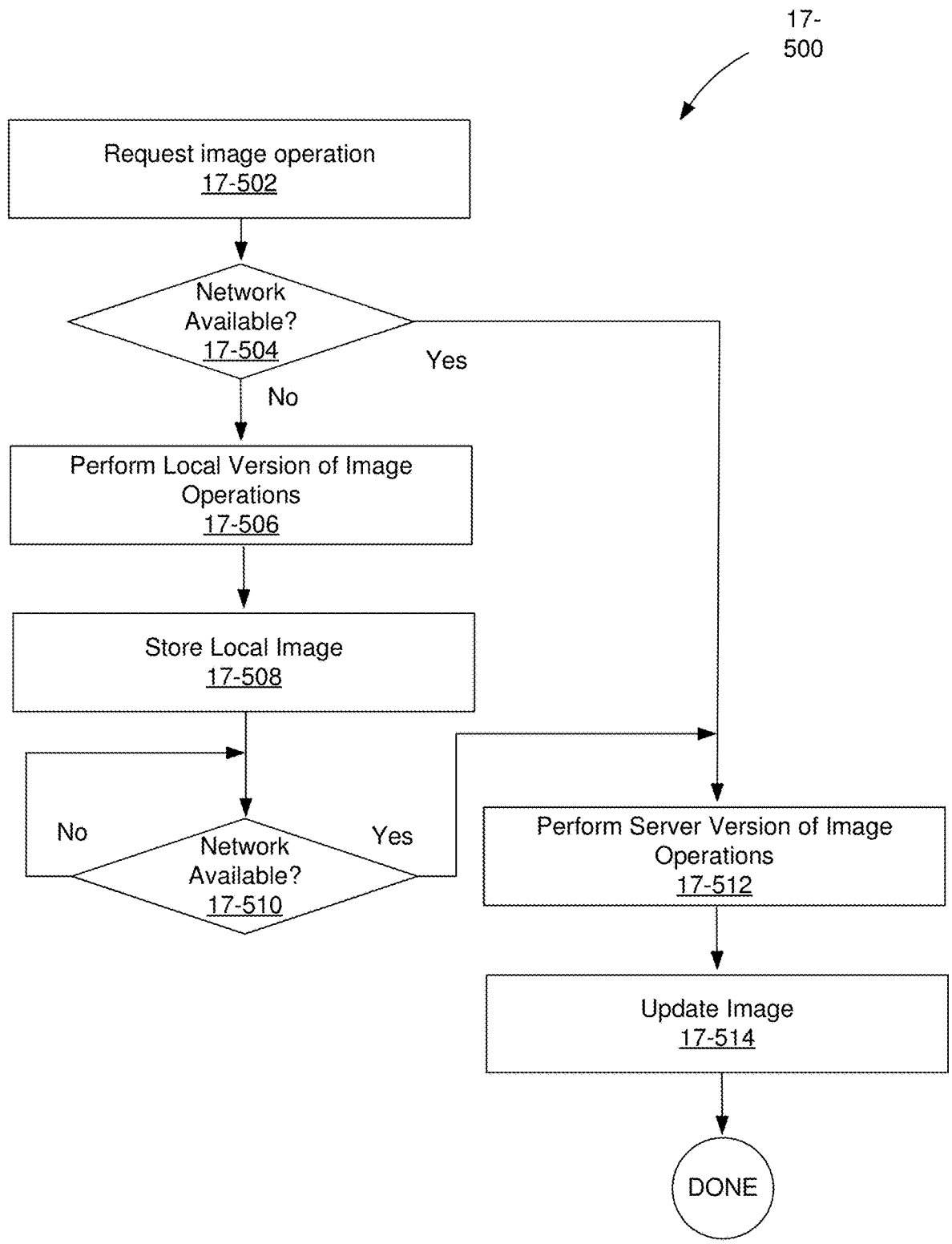
Figures 4, 17:
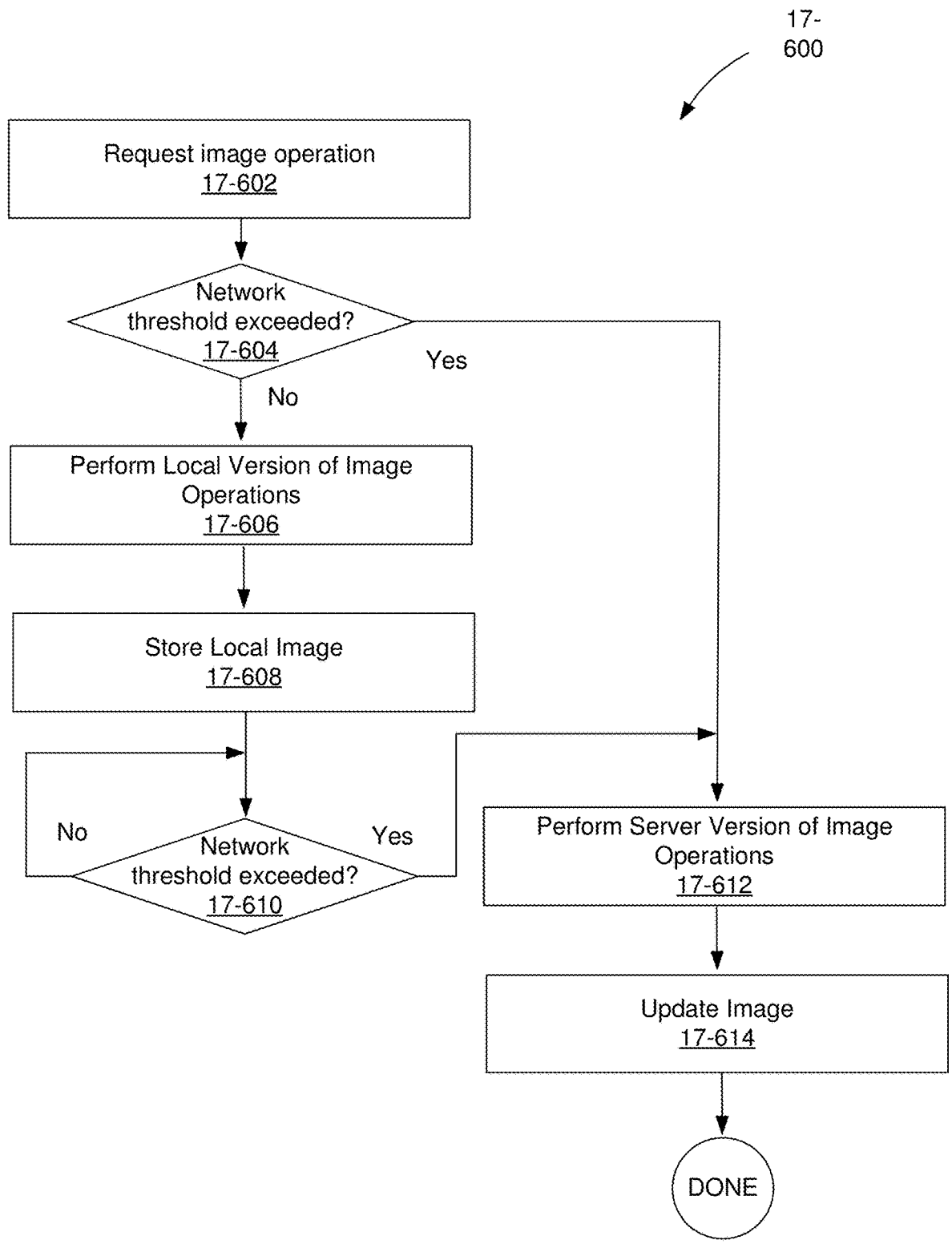
Figures 5, 17:
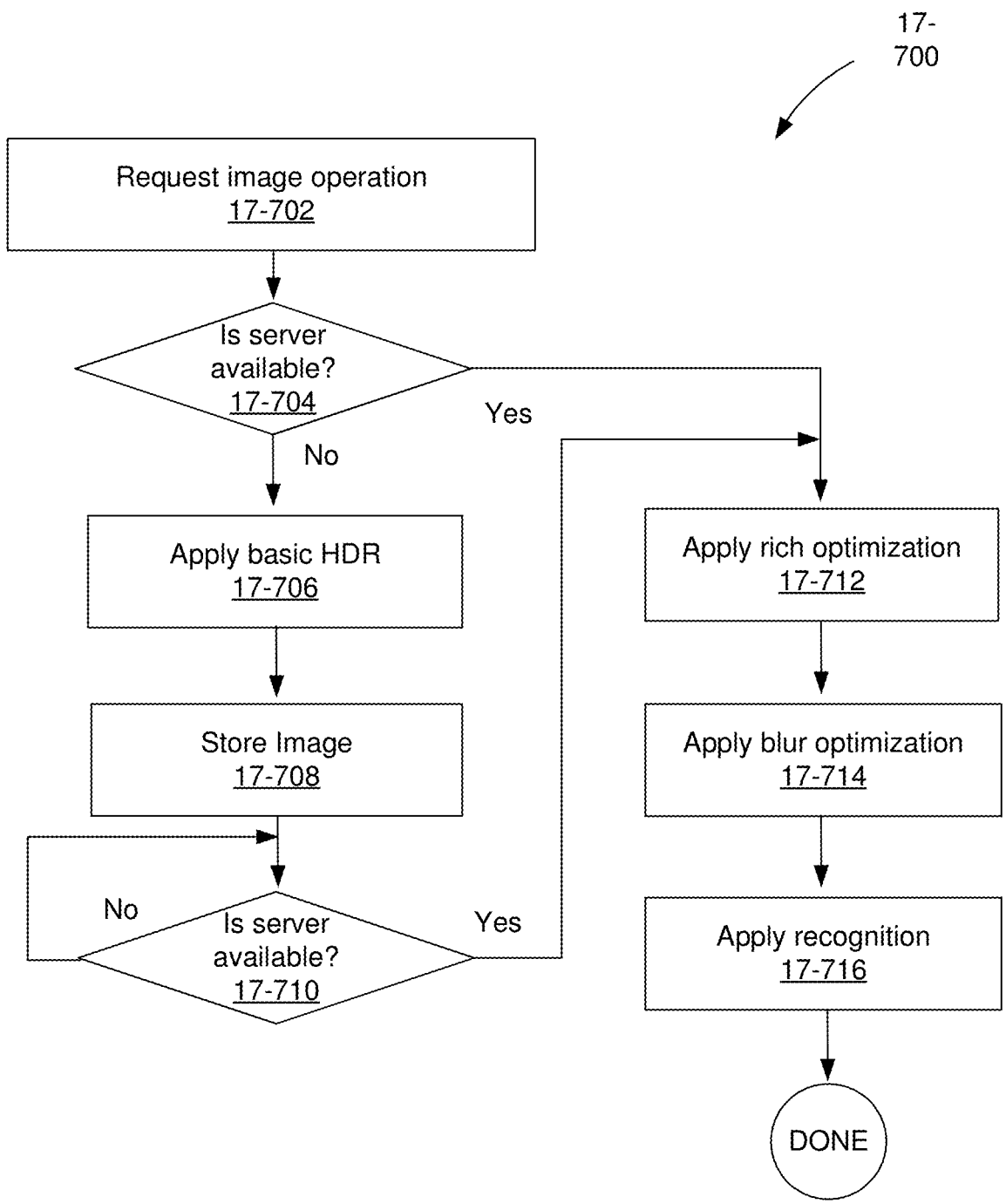
Figures 6, 17:
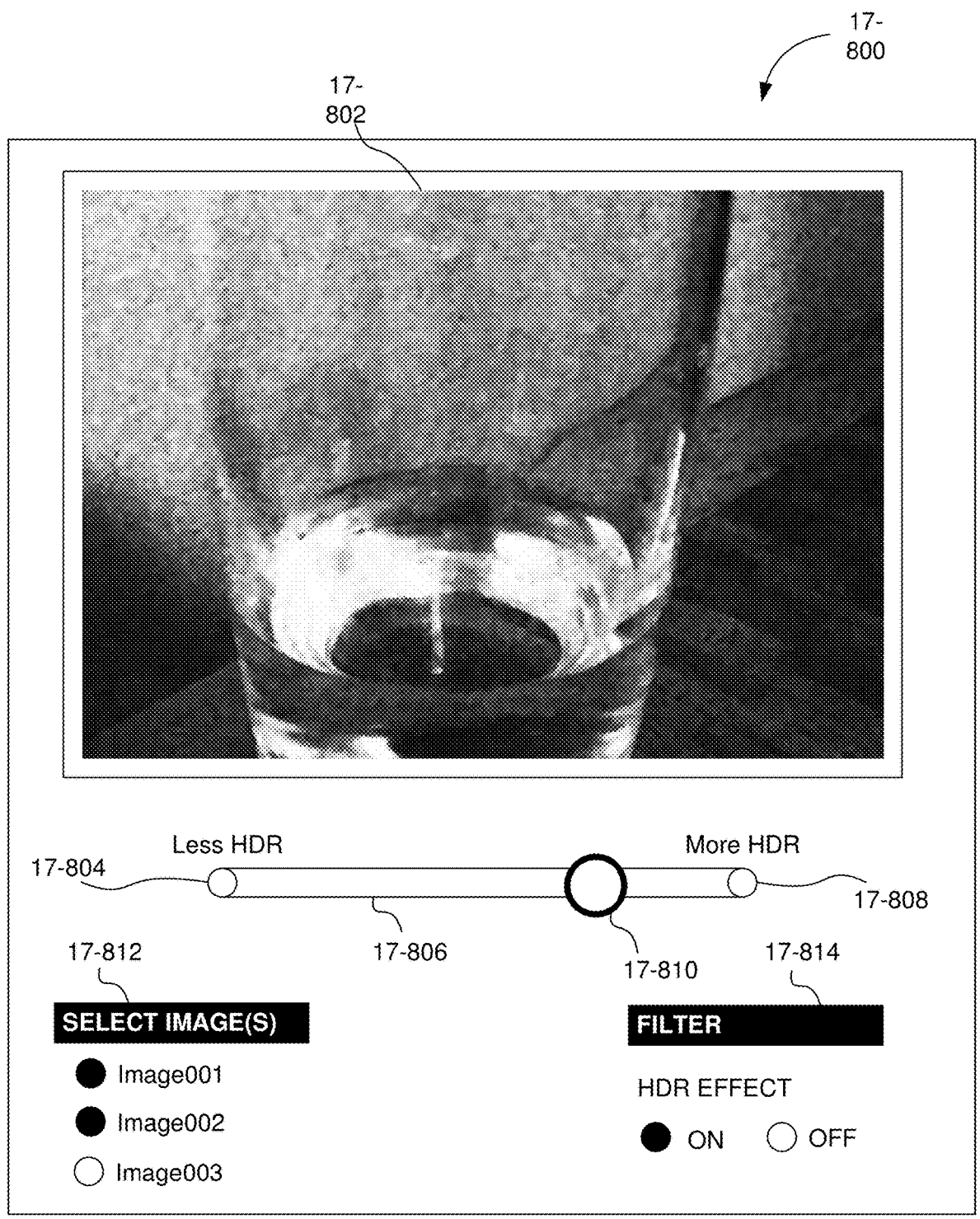
Figures 7, 17:
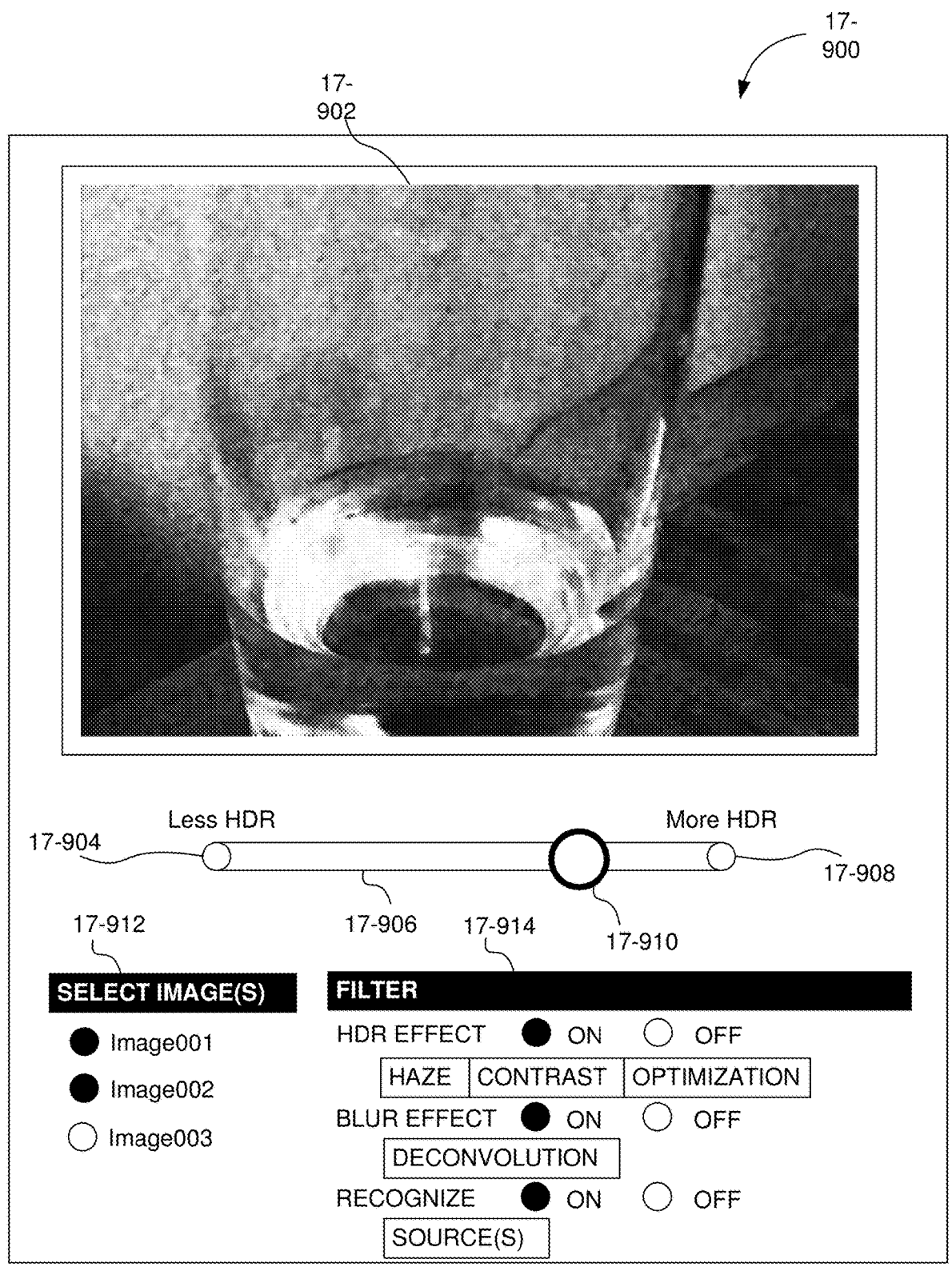
Figures 8, 17:
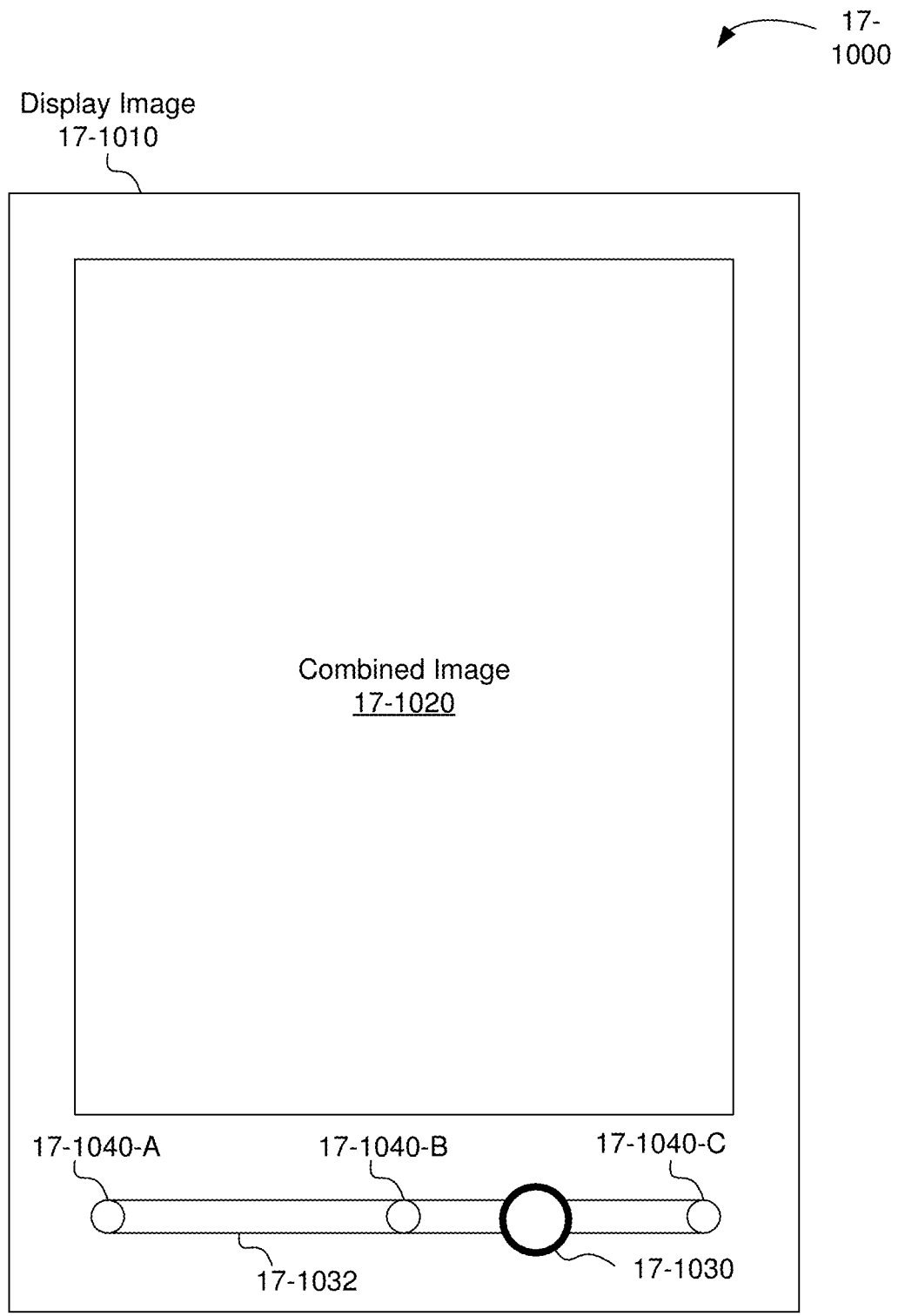
Figures 9, 17:
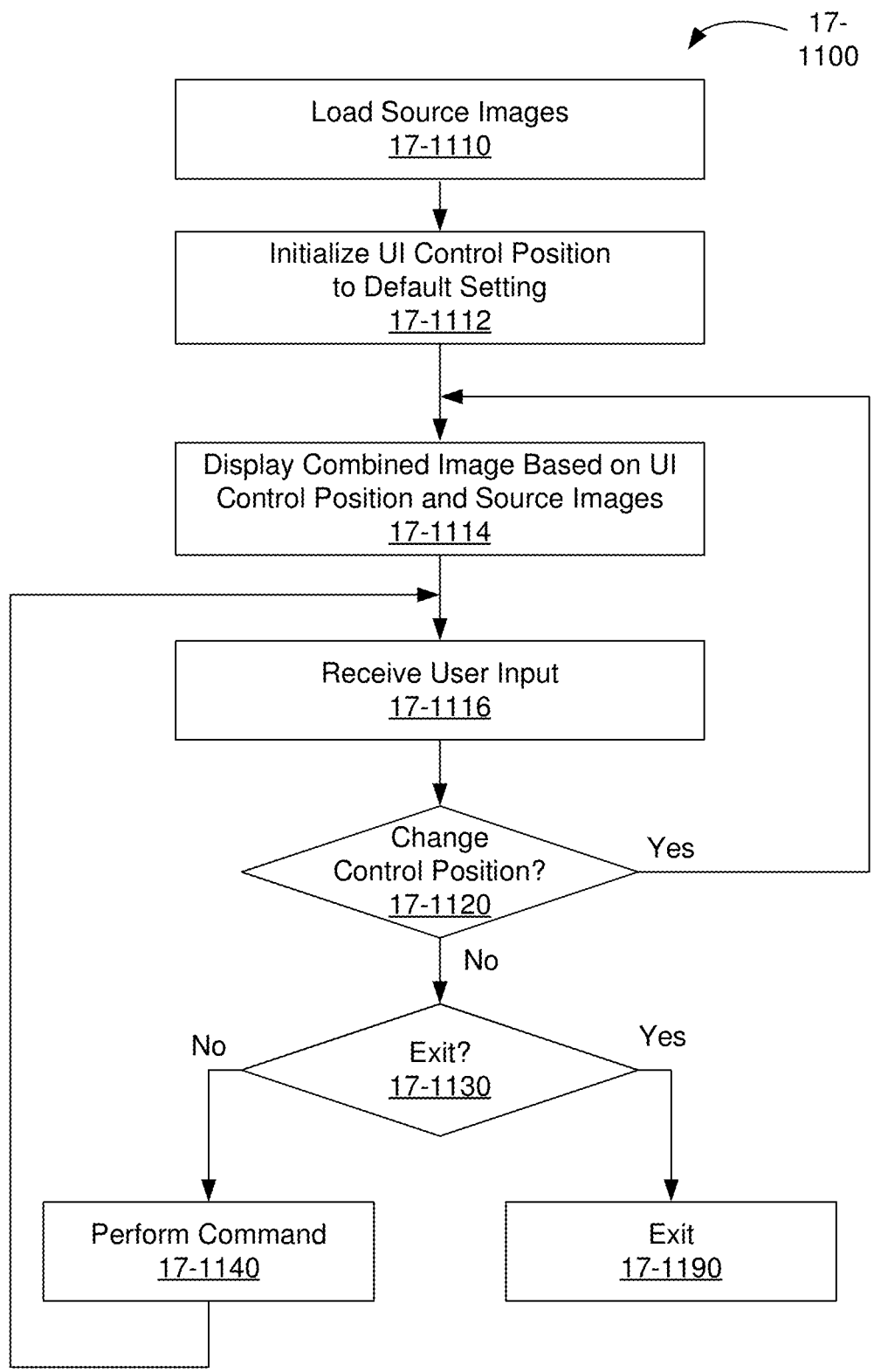

FIG. 17-1 shows a method 17-100 for generating a result using one or more image operations, in accordance with one embodiment. As an option, the method 17-100 may be implemented in the context of the details of any of the Figures. Of course, however, the method 17-100 may be carried out in any desired environment. Further, the aforementioned definitions may equally apply to the description below.

As shown, a request for one or more image operations is received. See operation 17-102. Additionally, an availability of a network resource is identified. See operation 17-104. If the network resource is not available, a result is generated using a subset of the one or more image operations. See operation 17-106. Additionally, if the network resource is available, a result is generated using each of the one or more image operations. See operation 17-108.

In the context of the present description, image operation may include any operation associated with an image. For example, in various embodiments, an image operation may include an enhancement (e.g. image optimization, HDR blend, alpha blend, a blur, etc.), a modification to an image parameter (e.g. contrast, saturation, exposure, white balance, etc.), and/or any other action relating to an image. Further, in one embodiment, the one or more image operations may include at least one of creating a high dynamic range (HDR) image, applying an un-blur/de-convolution, applying a de-hazing procedure, and/or applying a non-facial object identification procedure.

In a separate embodiment, the one or more image operations may include creating a high dynamic range (HDR) image, and creating the HDR image when the network resource is not available may include applying a subset of functionality of a HDR feature, whereas when the network resource is available, creating the HDR image may include applying at least one of a de-haze optimization, a contrast optimization, a white balance optimization, an exposure optimization, and/or a HDR strength optimization, or any combination thereof. In certain embodiments, white balance optimization provided by the network resource implements image region classification and region-based white balance optimization. Such region-based white balance optimization may interpret the influence of each illumination source within a scene and apply localized correction factors to each region.

In one embodiment, the one or more image operations may be associated with pixel data. Additionally, in another embodiment, the pixel data may be the same data used for generating the result using the subset of the one or more image operations or for generating the result using each of the one or more image operations.

Additionally, in the context of the present description, a network resource may include any resource connected to a network. For example, in one embodiment, a network resource may be a server system, a mobile device, a computer system, and/or any other device which may be connected to a network.

In one embodiment, if the network resource is available at a time after the network resource was not available, the result generated using a subset of the one or more image operations may be regenerated using each of the one or more image operations. Further, the result generated using the subset of the one or more image operations may be used as a basis for regenerating the result using each of the one or more image operations.

In a further embodiment, the result using the subset of the one or more image operations may be the same result using each of the one or more image operations. For example, in one embodiment, a subset of the one or more image operations may include correcting the white balance, exposure, and then performing an HDR operation. In such an embodiment, a local device may perform such actions, which may produce the same result as if it had been performed by another device (e.g. a server system, etc.).

In one embodiment, availability of the network resource may be dependent on a network threshold. For example, the network threshold may include a bandwidth rate or a network speed. In one embodiment, the network threshold may be capable of being set by a user. In one embodiment, the network threshold may be automatically set. For example, the automatically setting of the network threshold may depend on the amount of data which is to be transferred. For example, in one embodiment, if the amount of data to be transferred exceeds a set amount (e.g. 500 megabytes, etc.), an increase in the network threshold may occur.

In other embodiments, more than one network threshold may exist. For example, a first network threshold may relate to a first predetermined data amount (e.g. less than 500 megabytes, etc.). In another embodiment, a second network threshold may relate to a second predetermined data amount (e.g. more than 500 megabytes, etc.).

In one embodiment, when a network resource is available, the HDR image may be created. Further, the image may be created in response to user input. In another embodiment, at least one sliding indicia may be displayed, and when the network resource is available, the HDR image may be created in response to the at least one sliding indicia being manipulated by a user. Still yet, each sliding indicia of the at least one sliding indicia may control a function of the HDR, including at least one of a sliding indicia for haze, a sliding indicia for contrast, a sliding indicia for white balance, a sliding indicia for exposure, and/or a sliding indicia for HDR strength.

In a separate embodiment, if the network resource is not available, the result generated using a subset of the one or more image operations may be a preview of the image. Additionally, in one embodiment, the preview may be stored for a limited time period. Further, in another embodiment, if the network resource is later available, the result generated using each of the one or more image operations, may be used to replace the preview of the image. In an alternative embodiment, if the network resource is later available, the result generated using each of the one or more image operations, may be saved as a separate file from the preview of the image.

In one embodiment, a network resource may be used if a processing threshold is surpassed. For example, a processing threshold may include an expected amount of processing time (e.g. more than one minute of processing time, etc.), an expected percentage of processor capacity (e.g. exceeds 50% CPU capacity, etc.), etc. In some embodiments, it may be determined that expected processing time may be less than data transmission time (e.g. upload image to server, download image from server, etc.), therefore the client device (i.e. device which captured the image, etc.) may be used to complete the processing. In another embodiment, it may be determined that expected processing time may be more than data transmission time (e.g. upload image to server, download image from server, etc.), therefore the network resource (e.g. server device, etc.) may be used to complete the processing. In such embodiments, it is assumed that server processing time may be significantly less than a client device (i.e. a server system or cluster of computers has more processing capability, etc.), thereby allowing the processing to occur at the server in a fraction of the time it would otherwise take on the client device.

In another embodiment, a photo is captured by a client device, uploaded to a server, processed by the server, and a resulting image is sent back from the server to the client device. In such an embodiment, the resulting image may, at least one of, be saved as a new image on the client device, replace the original image on the client device, etc. In a separate embodiment, a server may not be accessible. In such an embodiment, a subset of available features may be implemented on the client device until the server is accessible, whereupon higher processing features (e.g. de-convolution, etc.) may occur on the server.

In one embodiment, one or more operations implemented on a local device may be different than one or more operations implemented on a server device. For example, in one embodiment, a local device may correct white balance (e.g. by using device hardware, etc.), whereas the server device may optimize a HDR (e.g. de-haze operation, etc.). In such an embodiment, the HDR optimization may not be available on the local device (e.g. it may require too much processing power, etc.), and the correcting of white balance may not be available on the server system (e.g. local device hardware may not be accessible by the server, etc.).

In various embodiments, a server may transmit an image back to a client device, the transmitting may include sending an image package to a client device, and/or a web page (e.g. for manipulation, for input, etc.) associated with the processed image. In one embodiment, the web page may be associated with a direct object (DIO) package. Of course, any functionality associated with a DIO may be included, utilizing the systems and methods disclose within U.S. patent application Ser. No. 14/503,210, filed Sep. 30, 2014 and entitled "SYSTEMS, METHODS, AND COMPUTER PROGRAM PRODUCTS FOR DIGITAL PHOTOGRAPHY" and U.S. patent application Ser. No. 14/503,224, filed Sep. 30, 2014 and entitled "SYSTEMS, METHODS, AND COMPUTER PROGRAM PRODUCTS FOR DIGITAL PHOTOGRAPHY".

In one embodiment, if a network resource processes an image, the resulting image may be stored on the server device, and/or may also be sent back to the client device for storage. In such an embodiment, a "before" and "after" version of the photo may be displayed to the user. For example, in one embedment, a client device may initially correct the white balance associated with an image (e.g. using hardware, etc.) and send the captured image to a server for processing. After processing, the server may send the image back to the client device and may display both the original image (as stored on the device) and the new processed image from the server. In this manner, a user may select which image should be stored on the client device, including, for example, discarding processing by the server, replacing the photo stored on the client device with the processed photo from the server, retaining the photo stored on the client device and storing additionally the processed photo from the server as a separate photo, and/or providing input to further process the processed image as sent from the server.

As a separate example, in one embodiment, a user may be at a location where a network resource is not accessible, such as a plane. A photo may be captured while at the location and a network resource (e.g. a server, etc.) may not be available for processing of the captured photo. Nonetheless, the user may desire to view the captured photo. As such, the captured photo can be viewed and one or more image operations (e.g. of limited functionality in comparison to the server system, etc.) may be implemented on the local device. And once the user returns to a location where a network resource is accessible, the image may be further processed and enhanced by the network resource (e.g. server, etc.).

In various embodiments, if a network resource is not available, a client device may perform one or more image operations, including but not limited to basic HDR, dehazing, contrast enhancement, and/or white balance correction. In other embodiments, a server may perform, at a minimum, the same one or more image operations as the client device, and may also further provide rich optimization processing, including, but not limited to, de-blurring/deconvolve operations, layer blending, multi-point corrections (e.g. based on white balance, based on exposure points, etc.), a non-facial object or product identification operation, etc.

In one embodiment, once a network resource is available, processing by the network resource may include at least some identification of non-facial items. For example, products, items, brands, locations, monuments, and/or any other items may be recognized and identified. As an example, in one embodiment, an image may be captured of a man standing in front of the White House. In such an embodiment, once a network resource is available, processing by the network resource may include identifying the building as the "White House," identifying his shirt as being sold by Abercrombie & Fitch™ (or any other distinguishable article of clothing, etc.), identifying the location based on the surroundings either in conjunction with geo-tag data or not (e.g. northwest corner of the lot next to the White House, etc.), and/or identifying any other item captured in the photo.

In this manner, processing may include not only enhancing and/or optimizing the captured image but further, identifying one or more items associated with the photo. In one embodiment, identifying one or more items associated with the photo may include facilitating the purchase of an item. For example, in one embodiment, an image taken may identify a sports cap as the "49ers" and selecting the cap in some manner (e.g. through user interaction, etc.) may provide the user an option of purchasing a cap of similar look. Or, in another embodiment, an image taken may be of a sailboat identified as being in the San Francisco harbor. After capturing the image, an option may be presented to the user to display one or more establishments in the general vicinity where the user can rent, buy, or use a sailboat in the San Francisco Bay. Of course, the foregoing examples are not intended to be limiting in any manner. Rather, they are intended to demonstrate, in part, some of the possibilities associated with identifying one or more items associated with a photo.

Additionally, although the identification of one or more items associated with a photo may occur in near real-time (e.g. near immediate after the capturing of an image, etc.) when a network resource is available, the identification may also be deferred until a later time if a network resource is unavailable. In this manner, server processing may be used to enhance and optimize the captured images, as well as identify pertinent information within the captured images.

Furthermore, in one embodiment, the processing may be used for batch processing. For example, in one embodiment, a large number of photos (e.g. 500, etc.) may have been captured. In one embodiment, if the rate of capture exceeds a data connection, then images may be placed in a queue for transfer to and processing by the server. In another embodiment, if a network resource is not available, the captured images may be sent to the server once the network resource becomes available. Further, in one embodiment, batch processing may be associated with a threshold, such as a data threshold. For example, in one embodiment, a data limit may be imposed by a cell phone network plan. In such an embodiment, if the data plan is nearing its limit, one or more images may be placed into a queue for transfer and processing by the server. In one embodiment, the queue may be unloaded once the device's connection to a network changes (e.g. switch from carrier network to WiFi, etc.). In this manner, images may be transferred and processed once a desired network is made available.

FIG. 17-2 shows a system 17-200 for generating a result using one or more image operations, in accordance with one embodiment. As an option, the system 17-200 may be implemented in the context of the details of any of the Figures. Of course, however, the system 17-200 may be carried out in any desired environment. Further, the aforementioned definitions may equally apply to the description below.

As shown, a client 17-202 may include one or more images 17-206, and a subset of one or more image operations 17-210. Additionally, a server 17-204 may include one or more images 17-216, and one or more image operations 17-212. The client 17-202 and the server 17-204 may communicate via a data network 17-208.

In one embodiment, the data network may include an intranet, extranet (e.g. internet, etc.), local network system, cellular network, wireless data network, and/or any other networking system which may connect the client and the server. In one embodiment, the client may include any device which may connect to a central system, such as a server. In another embodiment, one or more images 17-216 may include one or more images 17-206. However, in other embodiments, the one or more images 17-216 and 17-206 may differ. For example, the one or more images 17-216 may be generated by processing the one or more images 17-206.

As described herein, image operation may include any operation associated with an image. For example, in various embodiments, an image operation may include an enhancement (e.g. image optimization, HDR blend, alpha blend, a blur, etc.), a modification to an image parameter (e.g. contrast, saturation, exposure, white balance, etc.), and/or any other action relating to an image. Further, in one embodiment, the one or more image operations may include at least one of creating a high dynamic range (HDR) image, applying a blur, and/or applying a de-hazing procedure.

In a separate embodiment, the one or more image operations may include creating a high dynamic range (HDR) image, and creating the HDR image when the network resource is not available may include applying a subset of functionality of a HDR feature, whereas when the network resource is available, creating the HDR image may include applying at least one of a haze optimization, a contrast optimization, a white balance optimization, an exposure optimization, and/or a HDR strength optimization.

In one embodiment, the one or more image operations may be associated with pixel data. Additionally, in another embodiment, the pixel data may be the same data used for generating the result using the subset of the one or more image operations or for generating the result using each of the one or more image operations.

In another embodiment, one or more images 17-206 may be captured on client 17-202. The client 17-202 may perform one or more image operations (e.g. white color balance, etc.) 210. Additionally, when server 17-204 is available via the data network 17-208, the one or more images 17-206 may be sent from the client 17-202 to the server 17-204 and stored on the server as one or more images 17-216. After receipt of the one or more images, the server 17-204 may perform one or more image operations 17-212. In this manner, in one embodiment, the one or more images 17-206 may receive one or more image operations 17-210, be sent to the server 17-204, and receive further one or more image operations 17-212.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 17-3 shows a method 17-500 for determining if a network is available, in accordance with one embodiment. As an option, the method 17-500 may be implemented in the context of the details of any of the Figures. Of course, however, the method 17-500 may be carried out in any desired environment. Further, the aforementioned definitions may equally apply to the description below.

As shown, an image operation is requested. See operation 17-502. Next, it is determined if a network is available. See decision 17-504. If it is determined a network is not available, a local version of image operations is performed. See operation 17-506. Next, the local image is stored. See operation 17-508. It is then determined if a network is available. See decision 17-510. If it is determined that a network is not available, then the flow loops back to decision 17-510.

If it is determined that a network is available (either by decision 17-504 or 17-510), then a server version of image operations is performed. See operation 17-512. Next, the image is updated. See operation 17-514.

In one embodiment, the local version of image operations 17-506 may be performed regardless of whether the network is available. For example, in one embodiment, the client device may utilize a hardwired component to correct the white balance (or any desired parameter, etc.). In other embodiments, before a local version of image operations 17-506 is performed, it may be determined whether a network is available, and if it is, then local version of image operations 17-506 may not be performed.

In another embodiment, determining whether a network is available may include determining whether a network resource (e.g. a server, etc.) is available. In other embodiments, determining whether a network is available may include determining whether a preferred network is within range (e.g. local WiFi network, Bluetooth network, etc.). In certain embodiments, determining whether a network is available may include attempting to contact a wireless access point, such as a WiFi access point or a cellular access point. Contact with the wireless access point may be initially established through any technically feasible discovery protocol.

In some embodiments, a network may be available but a network resource (e.g. server, etc.) may not be available. In such an embodiment, a local version of image operations (operation 17-506) may be performed, and local image may be stored (operation 17-508) until the network resource is available. In certain embodiments, determining whether a network resource is available may include attempting to contact the network resource, such as through a well-known URL or a well-known internet protocol (IP) address. Any technically feasible authentication and/or authorization mechanism may be implemented to permit access to the network resource by a client device.

In one embodiment, updating an image, operation 17-514, may include, but not be limited to, sending the server-processed one or more images back to a client, saving the one or more images to storage (local storage or networked storage, e.g. an online database system, Dropbox™ service, Onedrive™ service, etc.), embedding metadata relating to information identified (e.g. products, brand, location, etc.) in the one or more images, sending the one or more images to a specific location (e.g. destination address, etc.), and/or taking any other action relating to the server-processed one or more images.

FIG. 17-4 shows a method 17-600 for determining if a network threshold is exceeded, in accordance with one embodiment. As an option, the method 17-600 may be implemented in the context of the details of any of the Figures. Of course, however, the method 17-600 may be carried out in any desired environment. Further, the aforementioned definitions may equally apply to the description below.

As shown, an image operation is requested. See operation 17-602. Next, it is determined if a network threshold (e.g. an available transmission data rate) is exceeded. See decision 17-604. If it is determined a network threshold is not exceeded, a local version of image operations is performed. See operation 17-606. After, the local image is stored. Sec operation 17-608. It is then determined if a network threshold is exceeded. See decision 17-610. If it is determined that a network threshold is not exceeded, then the flow loops back to decision 17-610.

If it is determined that a network threshold is exceeded (either by decision 17-604 or 610), then a server version of image operations is performed. See operation 17-612. Next, the image is updated. See operation 17-614.

In one embodiment, a network threshold may be a minimum upload rate, minimum download rate, percentage of timeout for calls, percentage of erroneous outbound packets, percentage of erroneous inbound packets, a network type (e.g. wifi, etc.) and/or any other network metric. In another embodiment, more than one threshold may exist with a network threshold. For example, in one embodiment, a first threshold may require a minimum of 1 megabit per second upload rate for images (or videos) in excess of 100 megabytes, and a second threshold may require a WiFi connection for images (or videos) in excess of 500 megabytes. Of course, in other embodiments, the thresholds may be altered and/or configured in any manner.

In one embodiment, the local version of image operations 17-606 may be performed regardless of whether the network threshold is exceeded. For example, in one embodiment, the client device may utilize a hardwired component to correct the white balance (or any desired parameter, etc.). In other embodiments, before a local version of image operations 17-606 is performed, it may be determined whether a network threshold is exceeded, and if it is, then local version of image operations 17-606 may not be performed.

In some embodiments, a network threshold may be met but a network resource (e.g. server, etc.) may not be available. In such an embodiment, a local version of image operations (operation 17-606) may be performed, and local image may be stored (operation 17-608) until the network resource is available.

In one embodiment, updating an image, operation 17-614, may include, but not be limited to, sending the server-processed one or more images back to a client, saving the one or more images to storage (local storage or networked storage, e.g. an online database system, Dropbox™ service, Onedrive™ service, etc.), embedding metadata relating to information identified (e.g. products, brand, location, etc.) in the one or more images, sending the one or more images to a specific location (e.g. destination address, etc.), and/or taking any other action relating to the server-processed one or more images.

FIG. 17-5 shows a method 17-700 for determining if a server is available, in accordance with one embodiment. As an option, the method 17-700 may be implemented in the context of the details of any of the Figures. Of course, however, the method 17-700 may be carried out in any desired environment. Further, the aforementioned definitions may equally apply to the description below.

As shown, an image operation is requested. See operation 17-702. Next, it is determined if a server is available. See decision 17-704. If it is determined a server is not available, a basic HDR is applied. See operation 17-706. After, the image is stored. Sec operation 17-708. It is then determined if a server is available. See decision 17-710. If it is determined that a server is not available, then the flow loops back to decision 17-710.

If it is determined that a server is available (either by decision 17-704 or 17-710), then a server may apply rich optimization (operation 17-712), a blur optimization (operation 17-714), and/or recognition (operation 17-716), or any combination thereof.

In various embodiments, if a server is not available, a client device may perform one or more image operations, including but not limited to basic HDR, de-hazing, contrast enhancement, and/or white balance correction. In other embodiments, a server may perform, at a minimum, the same one or more image operations as the client device, and may also further provide rich optimization processing, including, but not limited to, blurring, de-convolve/de-convolution operations, layer blending, multi-point corrections (e.g. based on white balance, based on exposure points, etc.), etc.

In one embodiment, once a server is available, processing by the server may include at least some recognition and/or identification of non-facial items. For example, products, items, brands, locations, monuments, and/or any other items may be recognized and identified. As an example, in one embodiment, an image may be captured of a man standing in front of the White House. In such an embodiment, once a network resource is available, processing by the network resource may include identifying the building as the "White House," identifying his shirt as being sold by Abercrombie & Fitch™ (or any other distinguishable article of clothing, etc.), identifying the location based on the surroundings (e.g. northwest corner of the lot next to the White House, etc.), and/or identifying any other item captured in the photo. Other embodiments relating to the recognition and/or identification of non-facial items may be applicable as disclosed herein.

FIG. 17-6 shows a user interface 17-800 for requesting one or more image operations on a local device, in accordance with one embodiment. As an option, the user interface 17-800 may be implemented in the context of the details of any of the Figures. Of course, however, the user interface 17-800 may be carried out in any desired environment. Further, the aforementioned definitions may equally apply to the description below.

As shown, the user interface 17-800 may include an image 17-802, a first indication point 17-804, a slider track 17-806, a second indication point 17-808, a slider control 17-810, an image selection 17-812, and a filter 17-814. In various embodiments, the user interface 17-800 may be implemented for a local device, for a mobile device, and/or for any other device apart from the server.

In one embodiment, the slider track 17-806 may be dependent on the selected filter 17-814. For example, in one embodiment, the filter may include a HDR effect, the slider being configured to alter the HDR effect between "less HDR" (e.g. first indication point 17-804, etc.) and "more HDR" (e.g. second indication point 17-808, etc.), the configuration occurring through input on a slider control 17-810. In other embodiments, the filter 17-814 comprises a filter selection tool, which may enable the user to select one or more filters to be individually or collectively applied to generate the image 17-802. In certain embodiments, the filter selection tool provides a set of locally available filters, a set of server-based filters, or a combination thereof.

In one embodiment, the image 17-802 being displayed may include one or more images. For example, in one embodiment, the filter being applied may relate to a basic HDR feature which may blend two or more images. In one embodiment, image selection 17-812 may be used to select which images are used for the filter. In other embodiments, image selection may be carried out using a thumbnail selector, a swipe gesture, or any other technically feasible image selection techniques.

In another embodiment, the filters 17-814 displayed may be dependent on the type of network connection, one or more network thresholds, availability of a network resource, availability of a server, and/or any other requirement. For example, in one embodiment, if a network resource (e.g. server, etc.) is not available, then more filters may be displayed on user interface 17-800. In another embodiment, if a network resource (e.g. server, etc.) is available, then fewer filters may be displayed on user interface 17-800. For example, in one embodiment, if a network resource is available, then the user may only have the ability to perform a basic HDR. In another embodiment, if a network resource (e.g. server, etc.) is not available, then the user may have the ability to perform a basic HDR, modify the exposure, modify the saturation, modify the color scheme, and/or potentially change any other parameter associated with the image.

FIG. 17-7 shows a user interface 17-900 for requesting one or more image operations on a server device, in accordance with one embodiment. As an option, the user interface 17-900 may be implemented in the context of the details of any of the Figures. Of course, however, the user interface 17-900 may be carried out in any desired environment. Further, the aforementioned definitions may equally apply to the description below.

As shown, the user interface 17-900 may include an image 17-902, a first indication point 17-904, a slider track 17-906, a second indication point 17-908, a slider control 17-910, an image selection 17-912, and a filter 17-914. In various embodiments, the user interface 17-900 may be implemented in association with a server device. For example, in one embodiment, the user interface 17-900 may be used to control, at least in part, one aspect associated with the server device.

In one embodiment, the slider track 17-906 may be dependent on the selected filter 17-914. For example, in one embodiment, the filter may include a HDR effect, the slider being configured to alter the HDR effect between "less HDR" (e.g. first indication point 17-804, etc.) and "more HDR" (e.g. second indication point 17-808, etc.), the configuration occurring through input on a slider control 17-810.

In one embodiment, the image 17-902 being displayed may include one or more images. For example, in one embodiment, the filter being applied may relate to a HDR feature which may blend two or more images. In one embodiment, image selection 17-912 may be used to select which images are used for the filter.

In various embodiments, the filter 17-914 may include, but not be limited to, a HDR effect, a blur effect, and/or recognize or identify objects within image 17-902. In one embodiment, a HDR effect may include the ability to control a haze, contrast, and/or any other parameter, as well as the ability to select to optimize the image. In another embodiment, a blur effect may include the ability to control the de-convolution of the image. Additionally, in one embodiment, recognizing or identifying objects may include the ability to identify and/or recognize non-facial items. For example, products, items, brands, locations, monuments, and/or any other items may be recognized and identified, consistent with the disclosure herein. Furthermore, such recognition/identification may be deferred based on network availability, and may additionally be performed in conjunction with identifying sources from which to purchase one or more identified items within image 17-902.

FIG. 17-8 illustrates a user interface (UI) system 17-1000 for generating a combined image 17-1020, according to one embodiment. As an option, the UI system 17-1000 may be implemented in the context of the details of any of the Figures disclosed herein. Of course, however, the UI system 17-1000 may be carried out in any desired environment. Further, the aforementioned definitions may equally apply to the description below.

In one embodiment, a combined image 17-1020 comprises a combination of at least two related digital images. In one embodiment, the combined image 17-1020 comprises, without limitation, a combined rendering of a first digital image and a second digital image, such first digital image 17-732 and second digital image 17-734 of FIG. 17-5. In another embodiment, the digital images used to compute the combined image 17-1020 may be generated by amplifying an analog signal with at least two different gains, where the analog signal includes optical scene information captured based on an optical image focused on an image sensor. In yet another embodiment, the analog signal may be amplified using the at least two different gains on a pixel-by-pixel, line-by-line, or frame-by-frame basis.

In one embodiment, the UI system 17-1000 presents a display image 17-1010 that includes, without limitation, a combined image 17-1020, a slider control 17-1030 configured to move along track 17-1032, and two or more indication points 17-1040, which may each include a visual marker displayed within display image 17-1010.

In one embodiment, the UI system 17-1000 is generated by an adjustment tool executing within a processor complex 310 of a digital photographic system 300, and the display image 17-1010 is displayed on display unit 312. In one embodiment, at least two digital images, such as the at least two related digital images, comprise source images for generating the combined image 17-1020. The at least two digital images may reside within NV memory 316, volatile memory 318, memory subsystem 362, or any combination thereof. In another embodiment, the UI system 17-1000 is generated by an adjustment tool executing within a computer system, such as a laptop computer or a desktop computer. The at least two digital images may be transmitted to the computer system or may be generated by an attached camera device. In yet another embodiment, the UI system 17-1000 may be generated by a cloud-based server computer system, which may download the at least two digital images to a client browser, which may execute combining operations described below. In another embodiment, the UI system 17-1000 is generated by a cloud-based server computer system, which receives the at least two digital images from a digital photographic system in a mobile device, and which may execute the combining operations described below in conjunction with generating combined image 17-1020.

The slider control 17-1030 may be configured to move between two end points corresponding to indication points 17-1040-A and 17-1040-C. One or more indication points, such as indication point 17-1040-B may be positioned between the two end points. Each indication point 17-1040 may be associated with a specific version of combined image 17-1020, or a specific combination of the at least two digital images. For example, the indication point 17-1040-A may be associated with a first digital image generated utilizing a first gain, and the indication point 17-1040-C may be associated with a second digital image generated utilizing a second gain, where both of the first digital image and the second digital image are generated from a same analog signal of a single captured photographic scene. In one embodiment, when the slider control 17-1030 is positioned directly over the indication point 17-1040-A, only the first digital image may be displayed as the combined image 17-1020 in the display image 17-1010, and similarly when the slider control 17-1030 is positioned directly over the indication point 17-1040-C, only the second digital image may be displayed as the combined image 17-1020 in the display image 17-1010.

In one embodiment, indication point 17-1040-B may be associated with a blending of the first digital image and the second digital image. For example, when the slider control 17-1030 is positioned at the indication point 17-1040-B, the combined image 17-1020 may be a blend of the first digital image and the second digital image. In one embodiment, blending of the first digital image and the second digital image may comprise alpha blending, brightness blending, dynamic range blending, and/or tone mapping or other non-linear blending and mapping operations. In another embodiment, any blending of the first digital image and the second digital image may provide a new image that has a greater dynamic range or other visual characteristics that are different than either of the first image and the second image alone. Thus, a blending of the first digital image and the second digital image may provide a new computed HDR image that may be displayed as combined image 17-1020 or used to generate combined image 17-1020. To this end, a first digital signal and a second digital signal may be combined, resulting in at least a portion of a HDR image. Further, one of the first digital signal and the second digital signal may be further combined with at least a portion of another digital image or digital signal. In one embodiment, the other digital image may include another HDR image.

In one embodiment, when the slider control 17-1030 is positioned at the indication point 17-1040-A, the first digital image is displayed as the combined image 17-1020, and when the slider control 17-1030 is positioned at the indication point 17-1040-C, the second digital image is displayed as the combined image 17-1020; furthermore, when slider control 17-1030 is positioned at indication point 17-1040-B, a blended image is displayed as the combined image 17-1020. In such an embodiment, when the slider control 17-1030 is positioned between the indication point 17-1040-A and the indication point 17-1040-C, a mix (e.g. blend) weight may be calculated for the first digital image and the second digital image. For the first digital image, the mix weight may be calculated as having a value of 0.0 when the slider control 17-1030 is at indication point 17-1040-C and a value of 1.0 when slider control 17-1030 is at indication point 17-1040-A, with a range of mix weight values between 0.0 and 1.0 located between the indication points 17-1040-C and 1040-A, respectively. Referencing the mix operation instead to the second digital image, the mix weight may be calculated as having a value of 0.0 when the slider control 17-1030 is at indication point 17-1040-A and a value of 1.0 when slider control 17-1030 is at indication point 17-1040-C, with a range of mix weight values between 0.0 and 1.0 located between the indication points 17-1040-A and 17-1040-C, respectively.

A mix operation may be applied to the first digital image and the second digital image based upon at least one mix weight value associated with at least one of the first digital image and the second digital image. In one embodiment, a mix weight of 1.0 gives complete mix weight to the digital image associated with the 1.0 mix weight. In this way, a user may blend between the first digital image and the second digital image. To this end, a first digital signal and a second digital signal may be blended in response to user input. For example, sliding indicia may be displayed, and a first digital signal and a second digital signal may be blended in response to the sliding indicia being manipulated by a user.

This system of mix weights and mix operations provides a UI tool for viewing the first digital image, the second digital image, and a blended image as a gradual progression from the first digital image to the second digital image. In one embodiment, a user may save a combined image 17-1020 corresponding to an arbitrary position of the slider control 17-1030. The adjustment tool implementing the UI system 17-1000 may receive a command to save the combined image 17-1020 via any technically feasible gesture or technique. For example, the adjustment tool may be configured to save the combined image 17-1020 when a user gestures within the area occupied by combined image 17-1020. Alternatively, the adjustment tool may save the combined image 17-1020 when a user presses, but does not otherwise move the slider control 17-1030. In another implementation, the adjustment tool may save the combined image 17-1020 when a user gestures, such as by pressing a UI element (not shown), such as a save button, dedicated to receive a save command.

To this end, a slider control may be used to determine a contribution of two or more digital images to generate a final computed image, such as combined image 17-1020. Persons skilled in the art will recognize that the above system of mix weights and mix operations may be generalized to include two or more indication points, associated with two or more related images. Such related images may comprise, without limitation, any number of digital images that have been generated using a same analog signal to have different brightness values, which may have zero interframe time.

Furthermore, a different continuous position UI control, such as a rotating knob, may be implemented rather than the slider 17-1030 to provide mix weight input or color adjustment input from the user.

FIG. 17-9 shows a method 17-1100 for generating a combined image, according to one embodiment. As an option, the method 17-1100 may be implemented in the context of the details of any of the Figures disclosed herein. Of course, however, the method 17-1100 may be carried out in any desired environment. Further, the aforementioned definitions may equally apply to the description below.

The method 17-1100 begins in step 17-1110, where an adjustment tool executing within a processor complex, such as processor complex 310, loads at least two related source images, such as the first digital image and the second digital image described in the context of FIG. 17-8. In step 17-1112, the adjustment tool initializes a position for a UI control, such as slider control 17-1030 of FIG. 17-8, to a default setting. In one embodiment, the default setting comprises an end point, such as indication point 17-1040-A, for a range of values for the UI control. In another embodiment, the default setting comprises a calculated value based on one or more of the at least two related source images. In certain embodiments, the default setting is initialized to a value previously selected by a user in association with an image object comprising at least the first digital image and the second digital image.

In step 17-1114, the adjustment tool generates and displays a combined image, such as combined image 17-1020 of FIG. 17-8, based on a position of the UI control and the at least two related source images. In one embodiment, generating the combined image comprises mixing the at least two related source images as described previously in FIG. 17-8. In step 17-1116, the adjustment tool receives user input. The user input may include, without limitation, a UI gesture such as a selection gesture or click gesture within display image 17-1010. If, in step 17-1120, the user input should change the position of the UI control, then the adjustment tool changes the position of the UI control and the method proceeds back to step 17-1114. Otherwise, the method proceeds to step 17-1130.

If, in step 17-1130, the user input does not comprise a command to exit, then the method proceeds to step 17-1140, where the adjustment tool performs a command associated with the user input. In one embodiment, the command comprises a save command and the adjustment tool then saves the combined image, which is generated according to a position of the UI control. The method then proceeds back to step 17-1116.

Returning to step 17-1130, if the user input comprises a command to exit, then the method terminates in step 17-1190, where the adjustment tool exits, thereby terminating execution.

In summary, a technique is disclosed for generating a new digital photograph that beneficially blends a first digital image and a second digital image, where the first digital image and the second digital image are both based on a single analog signal received from an image sensor. The first digital image may be blended with the second digital image based on a function that implements any technically feasible blend technique. An adjustment tool may implement a user interface technique that enables a user to select and save the new digital photograph from a gradation of parameters for combining related images.

One advantage of the present invention is that a digital photograph may be selectively generated based on user input using two or more different exposures of a single capture of a photographic scene. Accordingly, the digital photograph generated based on the user input may have a greater dynamic range than any of the individual exposures. Further, the generation of an HDR image may be performed at varying degrees of quality and visual effect based on availability of a network resource for performing computationally intensive image processing. Furthermore, non-facial object identification may be performed against a database of object identification data that may not readily be stored or timely updated on a mobile device. The disclosed technique advantageously provides server-based identification database scale in settings where network access is not available and where such a database is not suitable for local storage on a mobile device.

Still yet, in various embodiments, one or more of the techniques disclosed herein may be applied to a variety of markets and/or products. For example, although the techniques have been disclosed in reference to a photo capture, they may be applied to televisions, web conferencing (or live streaming capabilities, etc.), security cameras (e.g. increase contrast to determine characteristic, etc.), automobiles (e.g. driver assist systems, in-car infotainment systems, etc.), and/or any other product which includes a camera input.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
    at least one non-transitory memory;
    a touch screen;
    a network interface;
    a camera; and
    one or more processors in communication with the at least one non-transitory memory, the touch screen, the network interface, and the camera, wherein the one or more processors execute instructions stored in the at least one non-transitory memory to cause the apparatus to:
        generate a first image, utilizing the camera configured according to a first brightness level;
        generate a second image, utilizing the camera configured according to a second brightness level;
        combine at least a portion of the first image and at least a portion of the second image to generate a first synthetic image;
        process the first synthetic image;
        store, in a first object, the processed first synthetic image and metadata that is related to the generation thereof;
        communicate, utilizing the network interface, the first object to at least one server for storage thereon;
        display, utilizing the touch screen, the processed first synthetic image;
        display, utilizing the touch screen, the processed first synthetic image with a slider user interface element;
        in the event of receipt, utilizing the touch screen, of a sliding user input on the slider user interface element: applying a blur effect on the processed first synthetic image to generate a blurred processed synthetic image; and
        in the event of receipt, utilizing the touch screen, of a save user input on a save user interface element after the receipt of the sliding user input on the slider user interface element, updating the first object to include:
            the processed first synthetic image without the blur effect applied,
            the blurred processed synthetic image with the blur effect applied, and
            additional metadata.

2. The apparatus of claim 1, wherein the one or more processors execute the instructions stored in the at least one non-transitory memory to cause the apparatus to:
    display, utilizing the touch screen, a user interface element for setting an exposure time parameter; and
    in the event of receipt, utilizing the touch screen, of a selection user input on the user interface element for setting the exposure time parameter, set the exposure time parameter based thereon, such that the first image and the second image are generated based on the set exposure time parameter.

3. The apparatus of claim 1, wherein the one or more processors execute the instructions stored in the at least one non-transitory memory to cause the apparatus to:
    display, utilizing the touch screen, the processed first synthetic image with a plurality of user interface elements including a first user interface element for controlling the blur effect on the processed first synthetic image, a second user interface element for controlling a brightness effect on the processed first synthetic image, and a third user interface element for controlling a color effect on the processed first synthetic image;
    in the event of receipt, utilizing the touch screen, of a selection user input on at least one of the first user interface element, the second user interface element, or the third user interface element: display, utilizing the touch screen, at least one slider user interface element for controlling at least one of the blur effect, the brightness effect, or the color effect, on the processed first synthetic image;

in the event of receipt, utilizing the touch screen, of a sliding user input on the at least one slider user interface element: control display, utilizing the touch screen, of the at least one of the blur effect, the brightness effect, or the color effect, on the processed first synthetic image for generating a further processed synthetic image;

display, utilizing the touch screen, of a save user interface element; and in the event of receipt, utilizing the touch screen, of a save user input on the save user interface element after the receipt of the sliding user input on the at least one slider user interface element, update the first object to include the further processed synthetic image and additional metadata.

4. The apparatus of claim 3, wherein the one or more processors execute the instructions stored in the at least one non-transitory memory to cause the apparatus to:

display, utilizing the touch screen and the additional metadata of the first object, the further processed synthetic image with the at least one slider user interface element being set based on the sliding user input; and in the event of receipt, utilizing the touch screen, of an additional sliding user input on the at least one slider user interface element: control display, utilizing the touch screen and the further processed first synthetic image, of the at least one of the blur effect, the brightness effect, or the color effect, on the processed first synthetic image for generating an even further processed synthetic image.

5. The apparatus of claim 1, wherein the apparatus is configured such that the first image and the second image are generated in addition to additional images, such that the first image and the second image are automatically selected, instead of the additional images, for generating the first synthetic image.

6. The apparatus of claim 1, wherein the apparatus is configured such that the first image and the second image are generated in addition to additional images, such that the first image and the second image are automatically selected based on an exposure quality thereof, instead of the additional images, for generating the first synthetic image.

7. The apparatus of claim 1, wherein the apparatus is configured such that, before at least one of the first image or the second image is generated, the camera is configured according to at least one exposure parameter based on an ambient lighting condition.

8. The apparatus of claim 1, wherein the apparatus is configured such that, before the first image and the second image are generated, the camera is configured according to a exposure parameter based on an ambient lighting condition that is present before the first image and the second image are generated.

9. The apparatus of claim 1, wherein the apparatus is configured such that, before the first image and the second image are generated, the camera is configured according to a exposure parameter based on an ambient lighting condition, where the exposure parameter is maintained constant while the first image and the second image are generated.

10. The apparatus of claim 1, wherein the apparatus is configured such that:

before the first image is generated, the camera is configured according to a first exposure parameter based on a first ambient lighting condition; and before the second image is generated, the camera is configured according to a second exposure parameter based on a second ambient lighting condition.

11. An apparatus, comprising:
at least one non-transitory memory;
a touch screen;
a network interface;
a camera; and
one or more processors in communication with the at least one non-transitory memory, the touch screen, the network interface, and the camera, wherein the one or more processors execute instructions stored in the at least one non-transitory memory to cause the apparatus to:
generate a first image, utilizing the camera configured according to a first brightness level;
generate a second image, utilizing the camera configured according to a second brightness level;
combine at least a portion of the first image and at least a portion of the second image to generate a first synthetic image;
process the first synthetic image; and
display, utilizing the touch screen, the processed first synthetic image;
wherein the apparatus is configured such that:
the at least portion of the first image is generated, by:
capturing, utilizing a plurality of pixels of the camera, a first analog signal of a photographic scene at a first time, the first analog signal processed so as to generate: at least a first first-analog-signal portion that is amplified utilizing a first gain, and at least a second first-analog-signal portion that is amplified utilizing a second gain,
generating at least a portion of a first first-image-related source image utilizing the first first-analog-signal portion,
generating at least a portion of a second first-image-related source image utilizing the second first-analog-signal portion, and
combining the at least portion of the first first-image-related source image and the at least portion of the second first-image-related source image, to generate the at least portion of the first image; and
the at least portion of the second image is generated, by:
capturing, utilizing the plurality of pixels of the camera, a second analog signal of the photographic scene at a second time, the second analog signal processed so as to generate: at least a first second-analog-signal portion that is amplified utilizing the first gain, and at least a second second-analog-signal portion that is amplified utilizing the second gain,
generating at least a portion of a first second-image-related source image utilizing the first second-analog-signal portion,
generating at least a portion of a second second-image-related source image utilizing the second second-analog-signal portion, and
combining the at least portion of the first second-image-related source image and the at least portion of the second second-image-related source image, to generate the at least portion of the second image.

12. The apparatus of claim 11, wherein the one or more processors execute the instructions stored in the at least one non-transitory memory to cause the apparatus to:

generate a third image including a first high dynamic range (HDR) image;
generate a fourth image including a second high dynamic range (HDR) image;
filter at least one of the third image or the fourth image utilizing a first filter to create a first filtered image;
filter at least one of the third image or the fourth image utilizing a second filter to create a second filtered image; and
automatically select at least one of the first HDR image, the second HDR image, the first filtered image, or the second filtered image;
store, in an object, the first HDR image, the second HDR image, the first filtered image, and the second filtered image.

13. The apparatus of claim 11, wherein the one or more processors execute the instructions stored in the at least one non-transitory memory to cause the apparatus to:
generate a third image including a first high dynamic range (HDR) image;
generate a fourth image including a second high dynamic range (HDR) image; and
generate a plurality of synthetic images by combining at least a portion of the first HDR image and at least a portion of the second HDR image, where the plurality of synthetic images are stored in an object with the first HDR image and the second HDR image.

14. The apparatus of claim 11, wherein the one or more processors execute the instructions stored in the at least one non-transitory memory to cause the apparatus to:
generate a third image including a first high dynamic range (HDR) image;
generate a fourth image including a second high dynamic range (HDR) image; and
generate a plurality of synthetic images utilizing at least a portion of a motion estimation function when combining at least a portion of the first HDR image and at least a portion of the second HDR image, where the plurality of synthetic images are stored in an object with the first HDR image and the second HDR image.

15. The apparatus of claim 1, wherein the apparatus is configured to generate a first HDR image utilizing the camera, and further comprising another camera that is utilized to generate a second HDR image, such that at least a portion of the first HDR image is combined with at least a portion of the second HDR image, for generating a resulting HDR image that is displayed.

16. The apparatus of claim 1, wherein the one or more processors execute the instructions stored in the at least one non-transitory memory to cause the apparatus to:
store, in a first object, the processed first synthetic image and metadata that is related to the generation thereof; and
communicate, utilizing the network interface, the first object to at least one server for storage thereon.

17. The apparatus of claim 16, wherein the one or more processors execute the instructions stored in the at least one non-transitory memory to cause the apparatus to:
perform an analysis of a representation of at least portion of the first object at the at least one server,
receive a response from the at least one server; and
based on the response, alter at least one aspect of the display of the processed first synthetic image.

18. The apparatus of claim 1, wherein the one or more processors execute the instructions stored in the at least one non-transitory memory to cause the apparatus to:
communicate, utilizing the network interface, a representation of at least a portion of the processed first synthetic image to at least one server;
based on an analysis of the representation of the at least portion of the processed first synthetic image at the at least one server, receive a response from the at least one server; and
based on the response, alter at least one aspect of the display of the processed first synthetic image.

19. The apparatus of claim 18, wherein the apparatus is configured such that the at least one aspect of the display of the processed first synthetic image is altered, by altering a brightness of the display of a least a portion of the processed first synthetic image.

20. The apparatus of claim 18, wherein the apparatus is configured such that the at least one aspect of the display of the processed first synthetic image is altered, by displaying information about at least one object identified in the processed first synthetic image.

21. The apparatus of claim 11, wherein the one or more processors execute the instructions stored in the at least one non-transitory memory to cause the apparatus to:
receive a request for one or more image operations to be performed on the processed synthetic image;
identify an availability of a network resource;
in the event that the network resource is available, receive, utilizing the network interface, a result of the one or more image operations; and
display a modification of the processed synthetic image, based on the result.

22. The apparatus of claim 11, wherein the apparatus is configured such that the at least portion of the first first-image-related source image, the at least portion of the second first-image-related source image, the at least portion of the first second-image-related source image, and the at least portion of the second second-image-related source image, include at least portions of digital images generated utilizing analog-to-digital conversion.

23. The apparatus of claim 11, wherein the apparatus is configured such that the photographic scene at the first time and the photographic scene at the second time is a same single photographic scene.

24. The apparatus of claim 11, wherein the apparatus is configured such that:
the at least portion of the first first-image-related source image is generated utilizing a third gain, and the at least portion of the second first-image-related source image is generated utilizing a fourth gain; and
the at least portion of the first second-image-related source image is generated utilizing the third gain, and the at least portion of the second second-image-related source image is generated utilizing the fourth gain.

25. The apparatus of claim 11, wherein the apparatus is configured such that:
the at least portion of the first first-image-related source image is generated by applying a third gain to the first first-analog-signal portion, and the at least portion of the second first-image-related source image is generated by applying a fourth gain to the second first-analog-signal portion; and
the at least portion of the first second-image-related source image is generated by applying the third gain to the first second-analog-signal portion, and the at least portion of the second second-image-related source image is generated by applying the fourth gain to the second second-analog-signal portion.

26. The apparatus of claim 11, wherein the apparatus is configured such that the first image and the second image are each a high dynamic range (HDR) image.

27. The apparatus of claim 11, wherein the apparatus is configured such that the first analog signal includes a single analog signal, and the second analog signal includes another single analog signal.

28. The apparatus of claim 11, wherein the one or more processors execute the instructions stored in the at least one non-transitory memory to cause the apparatus to:
   display, utilizing the touch screen, a user interface element for setting an exposure time parameter; and
   in the event of receipt, utilizing the touch screen, of a selection user input on the user interface element, set the exposure time parameter based thereon, such that the first image and the second image are generated based on the set exposure time parameter.

29. The apparatus of claim 11, wherein the one or more processors execute the instructions stored in the at least one non-transitory memory to cause the apparatus to:
   store, in a first object, the processed first synthetic image and metadata that is related to the generation thereof;
   display, utilizing the touch screen, the processed first synthetic image with a plurality of user interface elements including a first user interface element for controlling a blur effect on the processed first synthetic image, a second user interface element for controlling a brightness effect on the processed first synthetic image, and a third user interface element for controlling a color effect on the processed first synthetic image;
   in the event of receipt, utilizing the touch screen, of a selection user input on at least one of the first user interface element, the second user interface element, or the third user interface element: display, utilizing the touch screen, at least one slider user interface element for controlling at least one of the blur effect, the brightness effect, or the color effect, on the processed first synthetic image;
   in the event of receipt, utilizing the touch screen, of a sliding user input on the at least one slider user interface element: control display, utilizing the touch screen, of the at least one of the blur effect, the brightness effect, or the color effect, on the processed first synthetic image for generating a further processed synthetic image;
   display, utilizing the touch screen, of a save user interface element; and
   in the event of receipt, utilizing the touch screen, of a save user input on the save user interface element after the receipt of the sliding user input on the at least one slider user interface element, update the first object to include the further processed synthetic image.

30. The apparatus of claim 29, wherein the one or more processors execute the instructions stored in the at least one non-transitory memory to cause the apparatus to:
   display, utilizing the touch screen, the further processed synthetic image with the at least one slider user interface element being set based on the sliding user input; and
   in the event of receipt, utilizing the touch screen, of an additional sliding user input on the at least one slider user interface element: control display, utilizing the touch screen, of the at least one of the blur effect, the brightness effect, or the color effect, on the processed first synthetic image for generating an even further processed synthetic image.

31. The apparatus of claim 11, wherein the apparatus is configured such that the first image and the second image are generated in addition to additional images, such that the first image and the second image are automatically selected, instead of the additional images, for generating the first synthetic image.

32. The apparatus of claim 11, wherein the apparatus is configured such that the first image and the second image are generated in addition to additional images, such that the first image and the second image are automatically selected based on a quality thereof, instead of the additional images, for generating the first synthetic image.

33. The apparatus of claim 11, wherein the apparatus is configured such that, before at least one of the first image or the second image is generated, the camera is configured according to at least one exposure parameter based on an ambient lighting condition.

34. The apparatus of claim 11, wherein the apparatus is configured such that, before the first image and the second image are generated, the camera is configured according to a exposure parameter based on an ambient lighting condition that is present before the first image and the second image are generated.

35. The apparatus of claim 11, wherein the apparatus is configured such that, before the first image and the second image are generated, the camera is configured according to a exposure parameter based on an ambient lighting condition, where the exposure parameter is maintained constant while the first image and the second image are generated.

36. The apparatus of claim 11, wherein the apparatus is configured such that:
   before the first image is generated, the camera is configured according to a first exposure parameter based on a first ambient lighting condition; and
   before the second image is generated, the camera is configured according to a second exposure parameter based on a second ambient lighting condition.

37. The apparatus of claim 11, wherein the apparatus is configured such that the first gain and the second gain are utilized on a pixel-by-pixel basis.

38. The apparatus of claim 37, wherein the apparatus is configured with a capability to apply a third gain and a fourth gain on a line-by-line basis.

39. The apparatus of claim 11, wherein the apparatus is configured such that the first gain and the second gain are utilized on a cell-by-cell basis.

40. The apparatus of claim 39, wherein the apparatus is configured with a capability to apply a third gain and a fourth gain on a line-by-line basis.

41. The apparatus of claim 11, wherein the apparatus is configured such that the first gain and the second gain are utilized on a line-by-line basis.

42. The apparatus of claim 41, wherein the apparatus is configured with a capability to apply a third gain and a fourth gain on a pixel-by-pixel basis.

43. The apparatus of claim 11, wherein the apparatus is configured such that the first image and the second image are sampled to provide zero interframe time.

44. The apparatus of claim 11, wherein the one or more processors execute the instructions stored in the at least one non-transitory memory to cause the apparatus to:
   generate, utilizing the camera, a third image with a first resolution that is different from a second resolution of the first image and the second image; and
   combine at least a portion of the first synthetic image and at least a portion of the third image to generate a second synthetic image.

45. The apparatus of claim 44, wherein the apparatus is configured such that the first resolution is greater than the second resolution.

46. The apparatus of claim 44, wherein the apparatus is configured such that the first image and the second image are generated in addition to additional images, such that the first image and the second image are automatically selected, instead of the additional images, for generating the first synthetic image.

47. The apparatus of claim 44, wherein the apparatus is configured such that only one of the first gain or the second gain is utilized for the third image.

48. The apparatus of claim 47, wherein the apparatus is configured such that the first gain and the second gain are utilized for the first image on a pixel-by-pixel basis, and a third gain is utilized for the third image on a line-by-line basis.

49. The apparatus of claim 44, wherein the apparatus is configured that a third gain is utilized for the third image.

50. The apparatus of claim 49, wherein the apparatus is configured such that the first gain and the second gain are utilized for the first image on a pixel-by-pixel basis, and the third gain is utilized for the third image on a line-by-line basis.

51. The apparatus of claim 44, wherein the apparatus is configured that a third gain and a fourth gain are utilized for the third image.

52. The apparatus of claim 51, wherein the apparatus is configured such that the first gain and the second gain are utilized for the first image on a pixel-by-pixel basis, and the third gain and the fourth gain are utilized for the third image on a line-by-line basis.

53. The apparatus of claim 44, wherein the apparatus is configured with a capability to apply a third gain and a fourth gain, such that only one of the first gain or the second gain is utilized for the third image, and both the third gain and the fourth gain are utilized for the third image.

54. The apparatus of claim 53, wherein the apparatus is configured such that the first gain and the second gain are utilized for the first image on a pixel-by-pixel basis, and the third gain and the fourth gain are utilized for the third image on a line-by-line basis.

55. The apparatus of claim 44, wherein the apparatus is configured such that the at least portion of the first first-image-related source image and the at least portion of the second first-image-related source image represent two different exposures of a single capture of the photographic scene.

56. The apparatus of claim 11, wherein the apparatus is configured such that the at least portion of the first first-image-related source image and the at least portion of the second first-image-related source image represent two different exposures of a single capture of the photographic scene.

57. The apparatus of claim 44, wherein the one or more processors execute the instructions stored in the at least one non-transitory memory to cause the apparatus to:

display, utilizing the touch screen, a user interface element for setting an exposure time parameter;

in the event of receipt, utilizing the touch screen, of a selection user input on the user interface element, set the exposure time parameter based thereon, such that the first image and the second image are generated based on the set exposure time parameter;

display, utilizing the touch screen, the processed first synthetic image with a plurality of user interface elements including a first user interface element for controlling a blur effect on the processed first synthetic image, a second user interface element for controlling a brightness effect on the processed first synthetic image, and a third user interface element for controlling a color effect on the processed first synthetic image;

in the event of receipt, utilizing the touch screen, of a selection user input on at least one of the first user interface element, the second user interface element, or the third user interface element: display, utilizing the touch screen, at least one slider user interface element for controlling at least one of the blur effect, the brightness effect, or the color effect, on the processed first synthetic image;

in the event of receipt, utilizing the touch screen, of a sliding user input on the at least one slider user interface element: control display, utilizing the touch screen, of the at least one of the blur effect, the brightness effect, or the color effect, on the processed first synthetic image for generating a further processed synthetic image;

store, in a first object, the processed first synthetic image and metadata that is related to the generation thereof;

display, utilizing the touch screen, of a save user interface element;

in the event of receipt, utilizing the touch screen, of a save user input on the save user interface element after the receipt of the sliding user input on the at least one slider user interface element, update the first object to include the further processed synthetic image;

display, utilizing the touch screen, the further processed synthetic image with the at least one slider user interface element being set based on the sliding user input;

in the event of receipt, utilizing the touch screen, of an additional sliding user input on the at least one slider user interface element: control display, utilizing the touch screen, of the at least one of the blur effect, the brightness effect, or the color effect, on the processed first synthetic image for generating an even further processed synthetic image;

receive a request for one or more image operations to be performed on the processed synthetic image;

identify an availability of a network resource;

in the event that the network resource is available, receive, utilizing the network interface, a result of the one or more image operations;

display a modification of the processed synthetic image, based on the result;

generate a third image including a first high dynamic range (HDR) image;

generate a fourth image including a second high dynamic range (HDR) image;

filter at least one of the third image or the fourth image utilizing a first filter to create a first filtered image;

filter at least one of the third image or the fourth image utilizing a second filter to create a second filtered image;

automatically select at least one of the first HDR image, the second HDR image, the first filtered image, or the second filtered image; and store, in a second object, the first HDR image, the second HDR image, the first filtered image, and the second filtered image.

58. The apparatus of claim 11, wherein the one or more processors execute the instructions stored in the at least one non-transitory memory to cause the apparatus to:

display, utilizing the touch screen, a user interface element for setting an exposure time parameter;

in the event of receipt, utilizing the touch screen, of a selection user input on the user interface element, set the exposure time parameter based thereon, such that the first image and the second image are generated based on the set exposure time parameter;

display, utilizing the touch screen, the processed first synthetic image with a plurality of user interface elements including a first user interface element for controlling a blur effect on the processed first synthetic image, a second user interface element for controlling a brightness effect on the processed first synthetic image, and a third user interface element for controlling a color effect on the processed first synthetic image;

in the event of receipt, utilizing the touch screen, of a selection user input on at least one of the first user interface element, the second user interface element, or the third user interface element: display, utilizing the touch screen, at least one slider user interface element for controlling at least one of the blur effect, the brightness effect, or the color effect, on the processed first synthetic image;

in the event of receipt, utilizing the touch screen, of a sliding user input on the at least one slider user interface element: control display, utilizing the touch screen, of the at least one of the blur effect, the brightness effect, or the color effect, on the processed first synthetic image for generating a further processed synthetic image;

store, in a first object, the processed first synthetic image and metadata that is related to the generation thereof;

display, utilizing the touch screen, of a save user interface element;

in the event of receipt, utilizing the touch screen, of a save user input on the save user interface element after the receipt of the sliding user input on the at least one slider user interface element, update the first object to include the further processed synthetic image;

display, utilizing the touch screen, the further processed synthetic image with the at least one slider user interface element being set based on the sliding user input;

in the event of receipt, utilizing the touch screen, of an additional sliding user input on the at least one slider user interface element: control display, utilizing the touch screen, of the at least one of the blur effect, the brightness effect, or the color effect, on the processed first synthetic image for generating an even further processed synthetic image;

receive a request for one or more image operations to be performed on the processed synthetic image;

identify an availability of a network resource;

in the event that the network resource is available, receive, utilizing the network interface, a result of the one or more image operations;

display a modification of the processed synthetic image, based on the result;

generate a third image including a first high dynamic range (HDR) image;

generate a fourth image including a second high dynamic range (HDR) image;

filter at least one of the third image or the fourth image utilizing a first filter to create a first filtered image;

filter at least one of the third image or the fourth image utilizing a second filter to create a second filtered image;

automatically select at least one of the first HDR image, the second HDR image, the first filtered image, or the second filtered image; and store, in a second object, the first HDR image, the second HDR image, the first filtered image, and the second filtered image;

wherein the apparatus is configured such that, before at least one of the first image or the second image is generated, the camera is configured according to at least one exposure parameter based on an ambient lighting condition.

59. The apparatus of claim 44, wherein the one or more processors execute the instructions stored in the at least one non-transitory memory to cause the apparatus to:
display, utilizing the touch screen, the photographic scene;
receive, utilizing the touch screen, user input in connection with the photographic scene;
based on the user input, identify a point of interest in the photographic scene;
based on the identification of the point of interest in the photographic scene, identify information associated with the point of interest; and
based on the information associated with the point of interest, set one or more capture parameters for generating the first image, the second image, and the third image including the point of interest in the photographic scene.

60. The apparatus of claim 11, wherein the one or more processors execute the instructions stored in the at least one non-transitory memory to cause the apparatus to:
display, utilizing the touch screen, the photographic scene;
receive, utilizing the touch screen, user input in connection with the photographic scene;
based on the user input, identify a point of interest in the photographic scene; and
based on the identification of the point of interest in the photographic scene, set one or more capture parameters for generating the first image and the second image including the point of interest in the photographic scene.

61. The apparatus of claim 44, wherein the one or more processors execute the instructions stored in the at least one non-transitory memory to cause the apparatus to:
display, utilizing the touch screen, the photographic scene;
receive, utilizing the touch screen, user input in connection with the photographic scene;
based on the user input, identify a point of interest in the photographic scene;
based on the identification of the point of interest in the photographic scene, identify information associated with the point of interest; and
based on the information associated with the point of interest, control a focus on the point of interest in the photographic scene while generating the first image, the second image, and the third image including the point of interest in the photographic scene.

62. The apparatus of claim 11, wherein the one or more processors execute the instructions stored in the at least one non-transitory memory to cause the apparatus to:
display, utilizing the touch screen, the photographic scene;
receive, utilizing the touch screen, user input in connection with the photographic scene;
based on the user input, identify a point of interest in the photographic scene; and
based on the identification of the point of interest in the photographic scene, control a focus on the point of interest in the photographic scene while generating the first image and the second image including the point of interest in the photographic scene.

63. The apparatus of claim 11, wherein the apparatus is configured such that the first image is generated utilizing a single capture of the photographic scene, and the second image is generated utilizing another single capture of the photographic scene.

64. The apparatus of claim 11, wherein the apparatus is configured to generate a first HDR image utilizing the camera, and further comprising another camera that is utilized to generate a second HDR image, such that at least a portion of the first HDR image is combined with at least a portion of the second HDR image, for generating a resulting HDR image that is displayed.

65. The apparatus of claim 11, wherein the one or more processors execute the instructions stored in the at least one non-transitory memory to cause the apparatus to:
store, in a first object, the processed first synthetic image and metadata that is related to the generation thereof; and
communicate, utilizing the network interface, the first object to at least one server for storage thereon.

66. The apparatus of claim 65, wherein the one or more processors execute the instructions stored in the at least one non-transitory memory to cause the apparatus to:
perform an analysis of a representation of at least portion of the first object at the at least one server,
receive a response from the at least one server; and
based on the response, alter at least one aspect of the display of the processed first synthetic image.

67. The apparatus of claim 11, wherein the one or more processors execute the instructions stored in the at least one non-transitory memory to cause the apparatus to:
communicate, utilizing the network interface, a representation of at least a portion of the processed first synthetic image to at least one server;
based on an analysis of the representation of the at least portion of the processed first synthetic image at the at least one server, receive a response from the at least one server; and
based on the response, alter at least one aspect of the display of the processed first synthetic image.

68. The apparatus of claim 67, wherein the apparatus is configured such that the at least one aspect of the display of the processed first synthetic image is altered, by altering a brightness of the display of a least a portion of the processed first synthetic image.

69. The apparatus of claim 67, wherein the apparatus is configured such that the at least one aspect of the display of the processed first synthetic image is altered, by displaying information about at least one object identified in the processed first synthetic image.

70. The apparatus of claim 11, wherein the apparatus is configured such that the at least portion of the first first-image-related source image, the at least portion of the second first-image-related source image, the at least portion of the first second-image-related source image, and the at least portion of the second second-image-related source image, include at least portions of analog images.

71. The apparatus of claim 11, wherein the apparatus is configured such that the camera is configured according to the first brightness level and the first brightness level by setting different gain parameters.

72. The apparatus of claim 11, wherein the apparatus is configured such that the camera is configured according to the first brightness level by setting a first sensitivity parameter, and the camera is configured according to the second brightness level by setting a second sensitivity parameter.

73. The apparatus of claim 11, wherein the apparatus is configured such that the camera is configured according to the first brightness level by setting a first exposure time parameter, and the camera is configured according to the second brightness level by setting a second exposure time parameter.

74. The apparatus of claim 11, wherein the apparatus is configured such that the first synthetic image is processed by utilizing a motion estimation function.

75. The apparatus of claim 11, wherein the apparatus is configured such that the first synthetic image is processed by utilizing an alignment function.

76. The apparatus of claim 1, wherein the apparatus is configured such that the first image is generated utilizing a single capture of a photographic scene, and the second image is generated utilizing another single capture of the photographic scene.

77. The apparatus of claim 11, wherein the apparatus is configured such that at least one of:
the plurality of pixels each include a single cell with a single photodiode;
the plurality of pixels each include multiple cells each with a single photodiode;
the plurality of pixels each include multiple cells and multiple photodiodes;
the plurality of pixels each include only one or more cells and one or more cells photodiodes;
the plurality of pixels each include at least one cell, photodiode, and sampling circuitry;
the plurality of pixels each include at least one cell, photodiode, and sampling circuitry that feeds a row line;
the camera includes an image sensor;
the camera includes an image sensor and post-processing circuitry for processing an output of the image sensor;
the first analog signal includes a charge stored in response to receipt of light of the photographic scene by the plurality of pixels of the camera;
the first analog signal corresponds to a charge stored in response to receipt of light of the photographic scene by the plurality of pixels of the camera;
the first analog signal is captured by drawing a current in relation to a charge stored in response to receipt of light of the photographic scene by the plurality of pixels of the camera;
the first analog signal of the photographic scene at the first time, is a function of light sensed during an open-shutter duration that occurs at the first time;
the capturing includes storing;
the capturing includes communicating;
the first analog signal is processed utilizing at least one amplifying circuit that applies the first gain and the second gain;
the first analog signal is processed by the amplification utilizing the first gain and the second gain;
the processing of the first analog signal includes the amplification utilizing the first gain and the second gain;
the processing of the first analog signal includes only the amplification utilizing the first gain and the second gain;
at least one instance of the generating includes processing an already-existing signal;

at least one instance of the generating includes processing an already-existing signal with at least one electrical circuit of the system;

at least one instance of the generating includes handling an already-existing signal using at least one electrical circuit of the system;

at least one instance of the generating includes generating a new signal;

the first time includes a duration that spans an open-shutter duration;

the first time includes at least one time during an open-shutter duration;

the first time includes a start time of an open-shutter duration;

the first time and the second time are each different instances in time;

the first time and the second time are each different points in time;

the first time and the second time are each different periods in time;

the first time and the second time are each different durations of time;

the first first-analog-signal portion and the second first-analog-signal portion are generated based on a same portion of the first analog signal;

the first first-analog-signal portion and the second first-analog-signal portion are generated based on different portions of the first analog signal;

the first first-analog-signal portion and the second first-analog-signal portion are generated by sampling the first analog signal at different times;

the at least first first-analog-signal portion that is amplified utilizing the first gain, includes a signal portion that exists after the first gain is utilized to the first analog signal;

the at least second first-analog-signal portion that is amplified utilizing the second gain, includes a signal portion that exists after the second gain is utilized to the first analog signal;

the at least first first-analog-signal portion includes a first portion of the processed first analog signal;

the at least second first-analog-signal portion includes a second portion of the processed first analog signal;

the at least first first-analog-signal portion is generated based on a processing of the first analog signal at a particular time;

the at least second first-analog-signal portion is generated based on a processing of the first analog signal at another particular time;

the at least first first-analog-signal portion is generated based on a processing of the first analog signal sampled at a particular time;

the at least second first-analog-signal portion is generated based on a processing of the first analog signal sampled at another particular time;

the at least first first-analog-signal portion is a portion of the first analog signal after the first analog signal being processed at a particular time;

the at least second first-analog-signal portion is a portion of the first analog signal after the first analog signal being processed at another particular time;

the at least first first-analog-signal portion is a portion of the first analog signal after the first analog signal being sampled at a particular time;

the at least second first-analog-signal portion is a portion of the first analog signal after the first analog signal being sampled at another particular time;

the first first-analog-signal portion and the second first-analog-signal portion are part of a same single signal;

the first first-analog-signal portion and the second first-analog-signal portion are part of different signals;

the photographic scene includes a single photographic scene;

the photographic scene includes objects that are present at the first time and the second time;

the photographic scene includes objects that are present at the first time and the second time, but may have moved between the first time and the second time;

the first first-image-related source image is a source image by being a source for generating the first image;

the first first-image-related source image is first-image-related by being related to generating the first image;

the first first-image-related source image is first-image-related by being utilized for generating the first image;

the at least portion of the first first-image-related source image, the at least portion of the second first-image-related source image, the at least portion of the first second-image-related source image, and the at least portion of the second second-image-related source image, include at least portions of line signals;

the at least portion of the first first-image-related source image, the at least portion of the second first-image-related source image, the at least portion of the first second-image-related source image, and the at least portion of the second second-image-related source image, include at least portions of row or column-specific signals;

the at least portion of the first first-image-related source image, the at least portion of the second first-image-related source image, the at least portion of the first second-image-related source image, and the at least portion of the second second-image-related source image, include at least portions of pixel signals;

the at least portion of the first first-image-related source image, the at least portion of the second first-image-related source image, the at least portion of the first second-image-related source image, and the at least portion of the second second-image-related source image, include at least portions of pixel-specific signals;

the first gain and the second gain are utilizing on a cell-by-cell basis, a pixel-by-pixel basis, a line-by-line basis, or a frame-by-frame basis;

each instance of combine includes an average;

each instance of combine includes a merge;

each instance of combine is carried out in an analog domain;

each instance of combine is carried out in a digital domain;

the first gain and the second gain are the only gains utilized to generate the at least portion of the first image;

the first gain and the second gain are the only gains utilized to generate the at least portion of the second image;

the first gain and the second gain are not the only gains utilized to generate the at least portion of the first image;

the first gain and the second gain are not the only gains utilized to generate the at least portion of the second image;

at least one additional processing operation is performed on the at least portion of the first first-image-related source image and the at least portion of the second first-image-related source image, before generating the at least portion of the first image;

no additional processing operation is performed on the at least portion of the first first-image-related source image and the at least portion of the second first-image-related source image, before generating the at least portion of the first image;

the at least portion of the first first-image-related source image is generated utilizing the first first-analog-signal portion, by converting the first first-analog-signal portion from an analog format to a digital format;

the at least portion of the first first-image-related source image is generated utilizing the first first-analog-signal portion, by applying at least one gain to the first first-analog-signal portion;

the at least portion of the first first-image-related source image and the first first-analog-signal portion are different in terms of format;

the at least portion of the first first-image-related source image and the first first-analog-signal portion are different in terms of gain-level;

the at least portion of the first first-image-related source image and the first first-analog-signal portion are different only in terms of format;

the at least portion of the first first-image-related source image and the first first-analog-signal portion are different only in terms of gain-level;

the at least portion of the first first-image-related source image, the at least portion of the second first-image-related source image, the at least portion of the first second-image-related source image, and the at least portion of the second second-image-related source image, include at least portions of analog images;

the at least portion of the first first-image-related source image, the at least portion of the second first-image-related source image, the at least portion of the first second-image-related source image, and the at least portion of the second second-image-related source image, include at least portions of digital images;

the at least portion of the first image and the at least portion of the second image are generated utilizing same processes;

the at least portion of the first image and the at least portion of the second image are generated utilizing same circuitry;

the at least portion of the first image and the at least portion of the second image are generated utilizing same circuit configurations;

the at least portion of the first image and the at least portion of the second image are generated utilizing same gain configurations;

the first gain is associated with a first pixel of the plurality of pixels, and the second gain is associated with a second pixel of the plurality of pixels;

the at least portion of the first image and the at least portion of the second image are generated utilizing different processes;

the at least portion of the first image and the at least portion of the second image are generated utilizing different circuitry;

the at least portion of the first image and the at least portion of the second image are generated utilizing different circuit configurations; or the at least portion of the first image and the at least portion of the second image are generated utilizing different gain configurations.

78. A method, comprising:

at an apparatus including at least one non-transitory memory, a touch screen, a network interface, a camera, and one or more processors in communication with the at least one non-transitory memory, the touch screen, the network interface, and the camera:

generating a first image according to a first brightness level;

generating a second image according to a second brightness level;

combining at least a portion of the first image and at least a portion of the second image to generate a first synthetic image;

processing the first synthetic image;

storing, in a first object, the processed first synthetic image and metadata that is related to the generation thereof;

communicating the first object to at least one server for storage thereon; and displaying the processed first synthetic image;

wherein:

the at least portion of the first image is generated, by:
capturing, utilizing a plurality of pixels of the camera, a first analog signal of a photographic scene at a first time, the first analog signal processed so as to generate: at least a first first-analog-signal portion that is amplified utilizing a first gain, and at least a second first-analog-signal portion that is amplified utilizing a second gain, generating at least a portion of a first first-image-related source image utilizing the first first-analog-signal portion, generating at least a portion of a second first-image-related source image utilizing the second first-analog-signal portion, and combining the at least portion of the first first-image-related source image and the at least portion of the second first-image-related source image, to generate the at least portion of the first image; and the at least portion of the second image is generated, by:
capturing, utilizing the plurality of pixels of the camera, a second analog signal of the photographic scene at a second time, the second analog signal processed so as to generate: at least a first second-analog-signal portion that is amplified utilizing the first gain, and at least a second second-analog-signal portion that is amplified utilizing the second gain, generating at least a portion of a first second-image-related source image utilizing the first second-analog-signal portion, generating at least a portion of a second second-image-related source image utilizing the second second-analog-signal portion, and combining the at least portion of the first second-image-related source image and the at least portion of the second second-image-related source image, to generate the at least portion of the second image.

* * * * *